United States Patent [19]
DeRoo et al.

[11] Patent Number: 5,809,290
[45] Date of Patent: Sep. 15, 1998

[54] PROGRAMMABLE HARDWARE COUNTER

[75] Inventors: David T. DeRoo, St. Joseph; Mark D. Nicol, Stevensville; Michael P. Krau, Benton Harbor, all of Mich.

[73] Assignee: Packard Bell NEC, Sacramento, Calif.

[21] Appl. No.: 847,399

[22] Filed: Apr. 24, 1997

Related U.S. Application Data

[63] Continuation of Ser. No. 475,810, Jun. 7, 1995, abandoned, which is a continuation of Ser. No. 218,413, Mar. 25, 1994, abandoned.

[51] Int. Cl.⁶ .................................................... G06F 1/08
[52] U.S. Cl. .......................................... 395/555; 395/556
[58] Field of Search .................................. 395/556, 555, 395/558; 377/39, 52

[56] References Cited

U.S. PATENT DOCUMENTS

| | | | |
|---|---|---|---|
| 3,568,069 | 3/1971 | Gabor | 328/14 |
| 3,789,195 | 1/1974 | Meier | 235/92 |
| 4,130,863 | 12/1978 | Schweitzer et al. | 364/158 |
| 4,236,213 | 11/1980 | Richardson | 369/931 |
| 4,256,114 | 3/1981 | Carlson et al. | 607/27 |
| 4,301,405 | 11/1981 | Carlson | 324/76.62 |
| 4,337,529 | 6/1982 | Morokawa | 368/10 |
| 4,648,042 | 3/1987 | Staiger | 369/486 |
| 4,740,915 | 4/1988 | Bonitz et al. | 364/31.07 |
| 4,787,032 | 11/1988 | Culley | 395/728 |
| 4,805,199 | 2/1989 | Muramatsu | 377/39 |
| 4,829,301 | 5/1989 | Chan et al. | 341/122 |
| 4,935,925 | 6/1990 | Williams et al. | 370/83 |
| 4,942,606 | 7/1990 | Kaiser | 380/4 |
| 4,959,860 | 9/1990 | Watters | 380/4 |
| 4,982,109 | 1/1991 | Burwell | 307/265 |
| 4,984,213 | 1/1991 | Abdoo | 365/230.3 |
| 5,138,640 | 8/1992 | Fleck et al. | 377/39 |
| 5,138,707 | 8/1992 | Haller et al. | 395/550 |
| 5,226,122 | 7/1993 | Thayer | 395/275 |
| 5,377,346 | 12/1994 | Williams | 395/550 |
| 5,437,021 | 7/1995 | David et al. | 395/550 |

OTHER PUBLICATIONS

Joseph D. Greenfield, "Practical Digital Design Using ICs", Joh Wiley & Sons, 1983, pp. 245–266.
Alan Clements, "Microprocessor System Design", PWS–KENT Publishing Co., 1987, pp. 385–393.
Press Release: "Zenith Data Systems introduces new class of high–performance modular notebook PCs", May 16, 1994.

*Primary Examiner*—Mehmet B. Geckil
*Attorney, Agent, or Firm*—Fitch, Even, Tabin & Flannery

[57] ABSTRACT

A programmable hardware timer provides a relatively consistently measure of predetermined time intervals over a relatively wide range of performance levels. The programmable hardware timer includes a downcounter, driven by a predetermined clock frequency, that counts a preprogrammed number of preselected time intervals. The time intervals, also programmable, are written to registers which, in turn, are used to control the downcounter such that the zero flag on the downcounter goes active at the predetermined time interval. A second downcounter is used to enable multiples of the predetermined time interval to be selected.

5 Claims, 46 Drawing Sheets

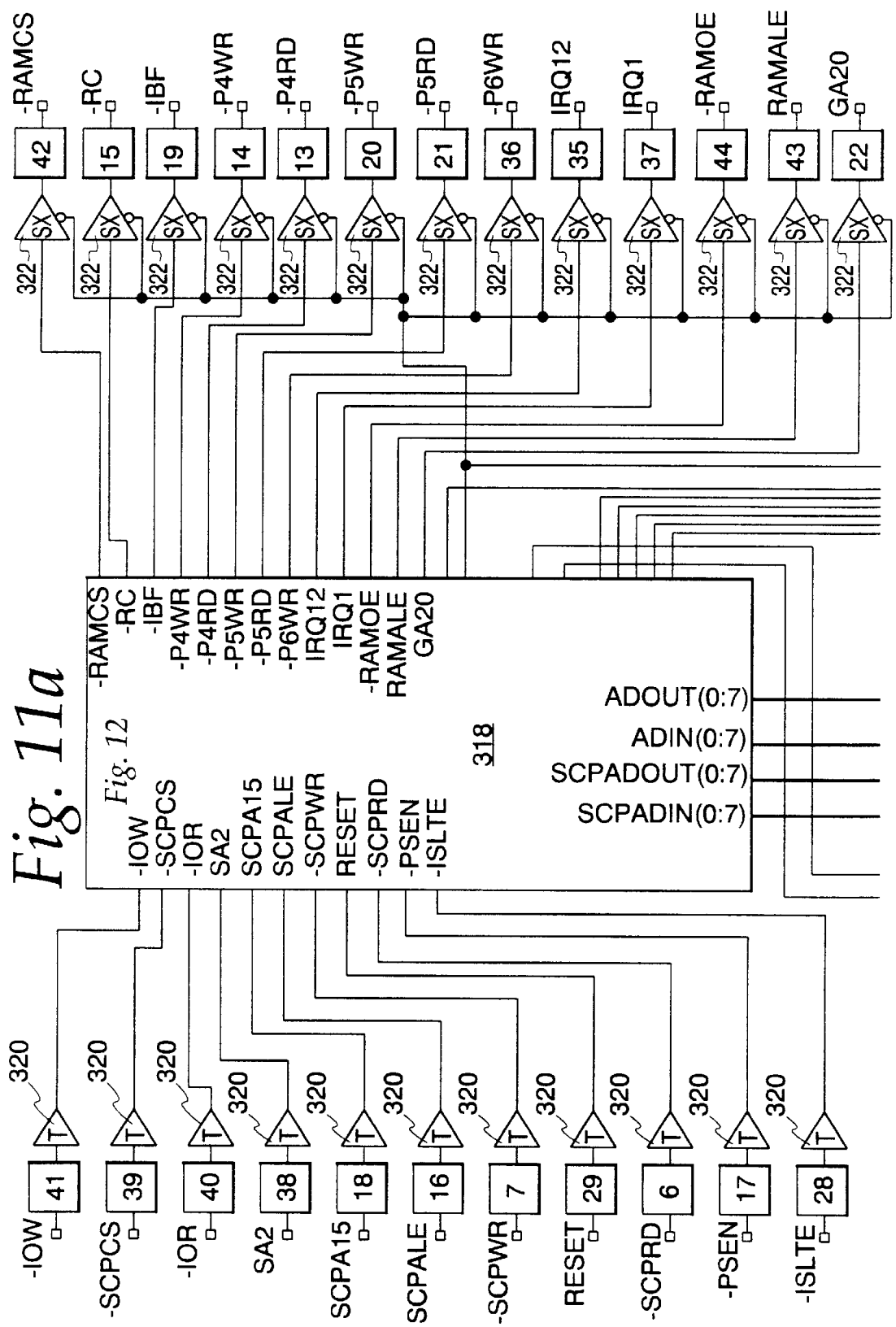

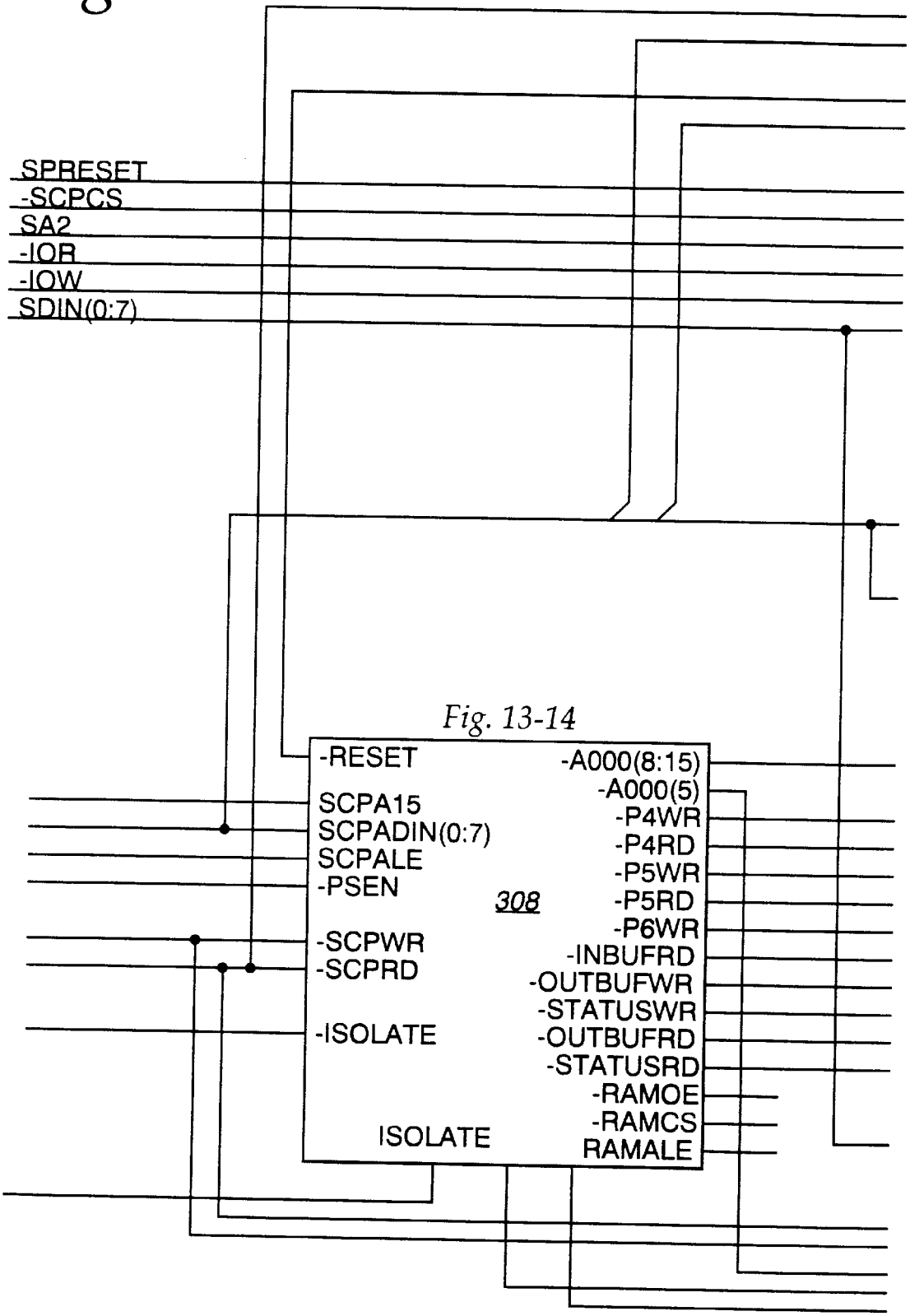

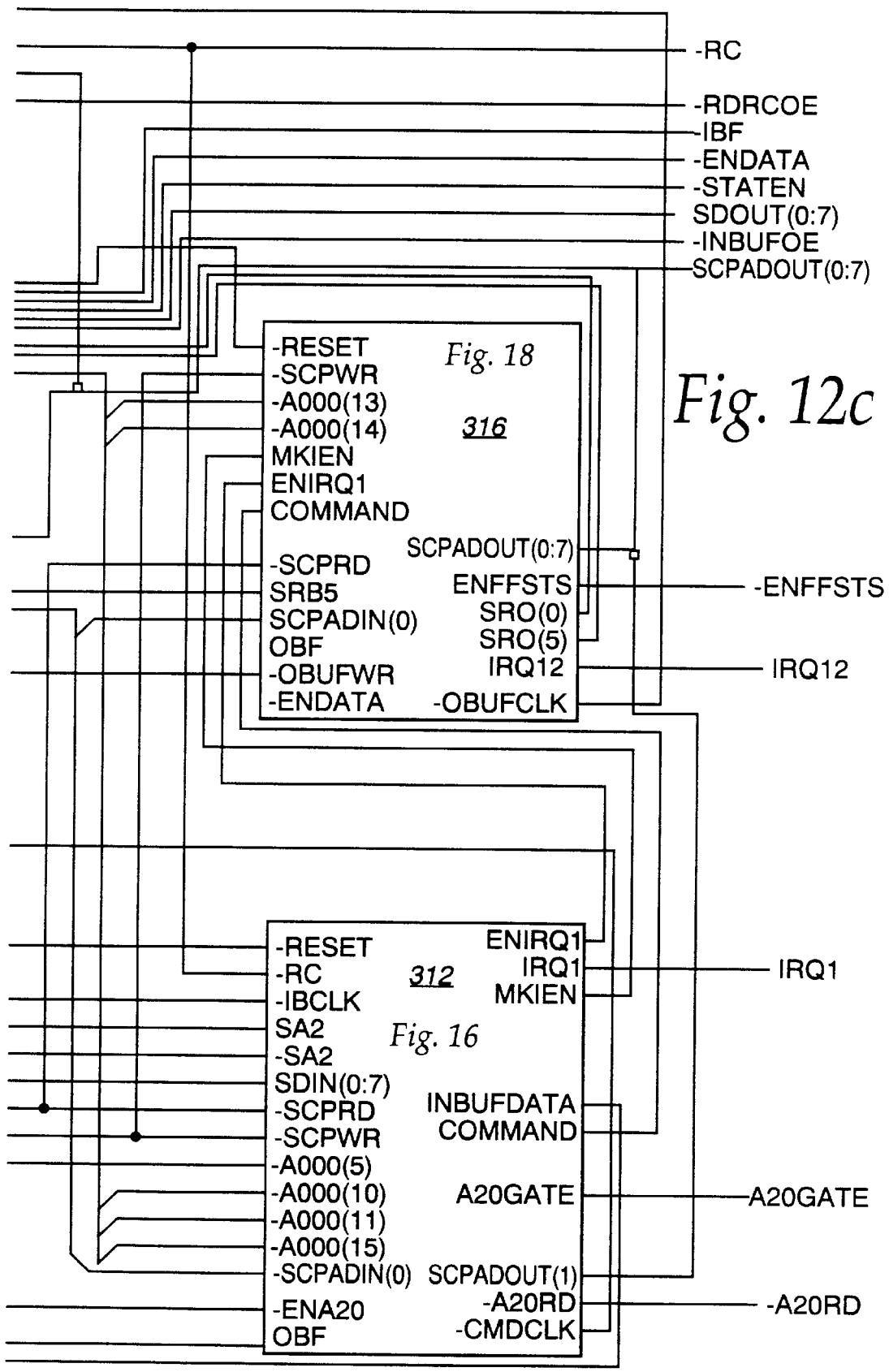

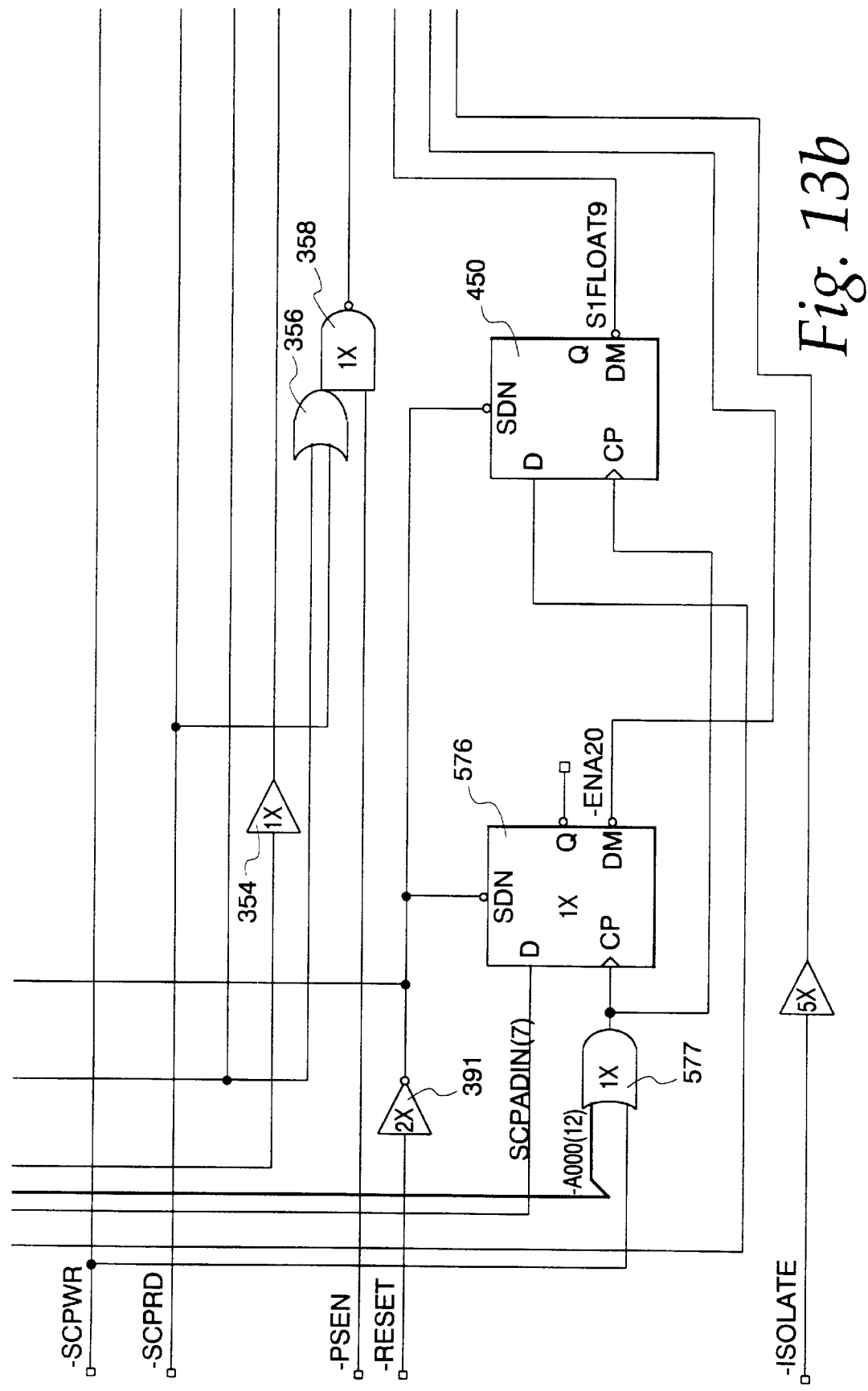

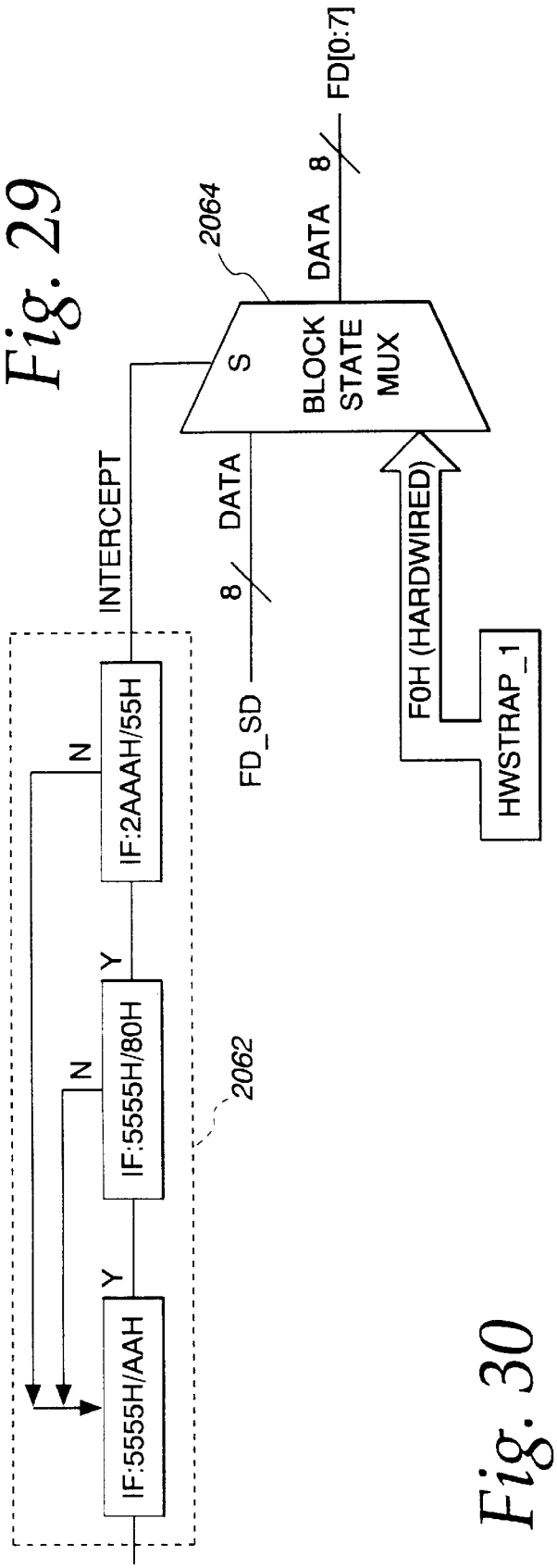

*Fig. 35*

| Pin | Signal | | Signal | Pin |
|---|---|---|---|---|
| 50 | MSCLK | | | |
| 49 | MSDATA | | | |
| 48 | SCPCLK | | | |
| 47 | SCPRESET | | | |
| 46 | N_SCPINT | | | |
| 45 | SCPA11 | | | |
| 44 | SCPA10 | | | |
| 43 | SCPA9 | | | |
| 42 | SCPA8 | | | |
| 41 | VDD13 | | | |
| 40 | VSS3 | | | |
| 39 | SCPAD7 | | | |
| 38 | SCPAD6 | | | |
| 37 | SCPAD5 | | | |
| 36 | SCPAD4 | | | |
| 35 | SCPAD3 | | | |
| 34 | SCPAD2 | | | |
| 33 | SCPAD1 | | | |
| 32 | SCPAD0 | | | |
| 31 | SCPALE | | | |

| 51 | KBDATA | N_SCPPSE | 30 |
|---|---|---|---|
| 52 | KBCLK | N_SCPWR | 29 |
| 53 | FA0 | N_SCPRD | 28 |
| 54 | FA1 | N_IOWC | 27 |
| 55 | FA2 | N_IORC | 26 |
| 56 | FA3 | N_MWTC | 25 |
| 57 | FA4 | N_MRDC | 24 |
| 58 | FA5 | N_CSFLSH | 23 |
| 59 | FA6 | N_RESET | 22 |
| 60 | FA7 | AEN | 21 |
| 61 | FA8 | VDD3 | 20 |
| 62 | FA9 | SA17 | 19 |
| 63 | FA10 | SA16 | 18 |
| 64 | FA11 | SA15 | 17 |
| 65 | FA12 | SA14 | 16 |
| 66 | VSS1 | VSS3 | 15 |
| 67 | VDD1 | SA13 | 14 |
| 68 | FA13 | SA12 | 13 |
| 69 | FA14 | SA11 | 12 |
| 70 | FA15 | SA10 | 11 |
| 71 | FA16 | SA9 | 10 |
| 72 | FA17 | SA8 | 9 |
| 73 | FD0 | SA7 | 8 |
| 74 | FD1 | SA6 | 7 |
| 75 | FD2 | SA5 | 6 |
| 76 | FD3 | SA4 | 5 |
| 77 | FD4 | SA3 | 4 |
| 78 | FD5 | SA2 | 3 |
| 79 | FD6 | SA1 | 2 |
| 80 | FD7 | SA0 | 1 |

| Pin | Signal |
|---|---|
| 81 | VSST |
| 82 | VPPEN |
| 83 | N_FWR |
| 84 | N_FRD |
| 85 | N_FASTRC |
| 86 | A20GATE |
| 87 | SD0 |
| 88 | SD1 |
| 89 | SD2 |
| 90 | VSS |
| 91 | VDD |
| 92 | SD3 |
| 93 | SD4 |
| 94 | SD5 |
| 95 | VSS1 |
| 96 | SD6 |
| 97 | SD7 |
| 98 | IRQMS |
| 99 | IRQKB |
| 100 | IOCHRDY |

PROGRAMMABLE HARDWARE COUNTER

This application is a continuation of U.S. patent application Ser. No. 08/475,810 filed Jun. 7, 1995, now abandoned, which is a continuation of U.S. patent application Ser. No. 08/218,413 filed Mar. 25, 1994, now abandoned.

CROSS REFERENCE TO RELATED APPLICATIONS

This application is related to the following applications all filed Mar. 25, 1994: NON-VOLATILE SECTOR PROTECTION FOR AN ELECTRICALLY ERASABLE READ ONLY MEMORY, Ser. No. 08/217,800, now abandoned in favor of continuation U.S. patent application Ser. No. 08/554,667, filed on Nov. 8, 1995, entitled PROTECTED ADDRESS RANGE IN AN ELECTRICALLY ERASABLE PROGRAMMABLE READ-ONLY MEMORY; SHARED CODE STORAGE FOR MULTIPLE CPUS, Ser. No. 08/217,958, now abandoned in favor of continuation U.S. patent application Ser. No. 08/480,047, filed on Jun. 6, 1995; METHOD TO PREVENT DATA LOSS IN AN ELECTRICALLY ERASABLE READ ONLY MEMORY, Ser. No. 08/218,412, now abandoned in favor of continuation U.S. patent application Ser. No. 08/478,363, filed on Jun. 7, 1995; PROGRAMMABLY RELOCATABLE CODE BLOCK, Ser. No. 08/217,646, now abandoned in favor of continuation U.S. patent application Ser. No. 08/549,304, filed on Oct. 27, 1995, entitled APPARATUS TO ALLOW A CPU TO CONTROL A RELOCATION OF CODE BLOCKS FOR OTHER CPUS; METHOD TO STORE PRIVILEGED DATA WITHIN THE PRIMARY CPU MEMORY SPACE, Ser. No. 08/218,273, abandoned in favor of continuation U.S. patent application Ser. No. 08/572,190, filed on Dec. 13, 1995, now abandoned in favor of continuation U.S. patent application Ser. No. 08/914,733, filed on Aug. 19, 1997; METHOD FOR WARM BOOT FROM RESET, Ser. No. 08/218,968, now abandoned in favor of continuation U.S. patent application Ser. No. 08/607,445, filed Feb. 27, 1996; WRITE ONCE READ ONLY REGISTERS, Ser. No. 08/220,961, now abandoned in favor of continuation U.S. patent application Ser. No. 08/575,004, filed Dec. 19, 1995, entitled WRITE INHIBITED REGISTERS, divisional U.S. patent application Ser. No. 08/480,613, filed Jun. 7, 1995, abandoned in favor of continuation U.S. patent application Ser. No. 08/710,639, filed Sep. 18, 1996 now abandoned in favor of continuation U.S. patent application Ser. No. 08/874,446, filed on Jun. 16, 1997 and divisional U.S. patent application Ser. No. 08/484,452, filed Jun. 7, 1995, now abandoned in favor of continuation U.S. patent application Ser. No. 08/680,099, filed Jul. 12, 1996; ALTERNATE I/O PORT ACCESS TO STANDARD REGISTER SET, Ser. No. 08/217,795, now abandoned in favor of continuation U.S. patent application Ser. No. 08/579,037, filed on Dec. 19, 1995.

BACKGROUND OF THE INVENTION

1. Field of the Invention

The present invention relates to a programmable hardware counter and, more particularly, a programmable hardware timer particularly suited for use in computer systems that enables relatively consistent time intervals to be measured over a relatively wide range of performance levels.

2. Description of the Prior Art

In known computer systems, the firmware, normally stored in non-volatile memory, is executed immediately after power-up and performs several functions including testing and initializing the hardware within the computer system. While such operations are being carried out, the firmware must be able to track the amount of time lapsed between operations for various reasons including interrogating the hardware to determine whether there has been a device failure. In particular, when hardware devices are initialized, a response from the device is normally returned within a specific period of time. If the response from the device is not returned in the predetermined time period, the device is considered to have failed.

In known computer systems, software timing loops have been used for measuring such time intervals. Such software timing loops normally use an integer variable that is initialized with a specific value. This value is tested, decremented and looped until the value goes to zero. Although such a method provides adequate performance in most situations, certain problems have been known to develop with such methods which can result in system failure. In particular, since the system firmware is normally designed to operate across a relatively wide range of performance levels, it can be difficult, if not impossible, to precisely tune the timing loops to meet all requirements. For example, a software timing loop will execute considerably faster on a 66 MHz Intel type 80486 CPU than it will on a 25 MHz Intel type 80386 CPU. Such discrepancies in the time intervals can lead to system failure.

SUMMARY OF THE INVENTION

It is an object of the present invention to solve various problems in the prior art.

It is yet a further object of the present invention to provide a method for measuring predetermined time intervals that is relatively consistent over a relatively wide range of performance levels.

Briefly, the present invention relates to a programmable hardware timer adapted to relatively consistently measure predetermined time intervals over a relatively wide range of performance levels. The programmable hardware timer includes a downcounter, driven by a predetermined clock frequency, that counts a preprogrammed number of preselected time intervals. The predetermined time intervals are written to registers which, in turn, are used to control the downcounter such that the zero flag on the downcounter goes active at the predetermined time interval. A second downcounter is used to enable multiples of the predetermined time interval to be selected.

DESCRIPTION OF THE DRAWINGS

These and other objects and advantages of the present invention will become readily apparent upon consideration of the following detailed description of the attached drawings wherein:

FIGS. 11A and 11B are a top level diagram of a mouse keyboard interface (MKI) illustrated in FIG. 10;

FIGS. 12A–C are a block diagram of the MKI illustrated in FIG. 11;

FIGS. 13A–C are a schematic diagram of the address decode and RAM control logic in accordance with the present invention;

FIG. 29 is a schematic diagram of chip erase command trap illustrated in FIG. 28;

FIG. 30 is a table of standard commands for programmable devices;

FIG. 35 is a pin diagram of the HUI in accordance with the present invention.

DETAILED DESCRIPTION

Three embodiments of the invention are disclosed. The first embodiment relates to a System Control Processor Interface (SCPI), illustrated in FIGS. 2–9. The second embodiment relates to a Mouse Keyboard Interface (MKI), illustrated in FIGS. 10–19. The third embodiment relates to a Human User-Input Interface (HUI), illustrated in FIG. 20. It should be noted that the representation of the HUI in FIGS. 20–35 is merely conceptual and that the actual hardware description is contained in the Verilog code, attached as Appendix I. All three embodiments of the invention emulate an Intel 8042 bus as well as provide relatively faster control of the Gate A20 signal. The MKI, in addition to providing relatively faster control of the Gate A20 signal than the SCPI by eliminating the need for service from the SCP in order to set the Gate A20 signal. The HUI integrates the SCPI and the MKI interfaces into a single device along with an interface for a common memory device accessible by a central processing unit (CPU) and a system control processor (SCP).

SCPI

Figure 1:
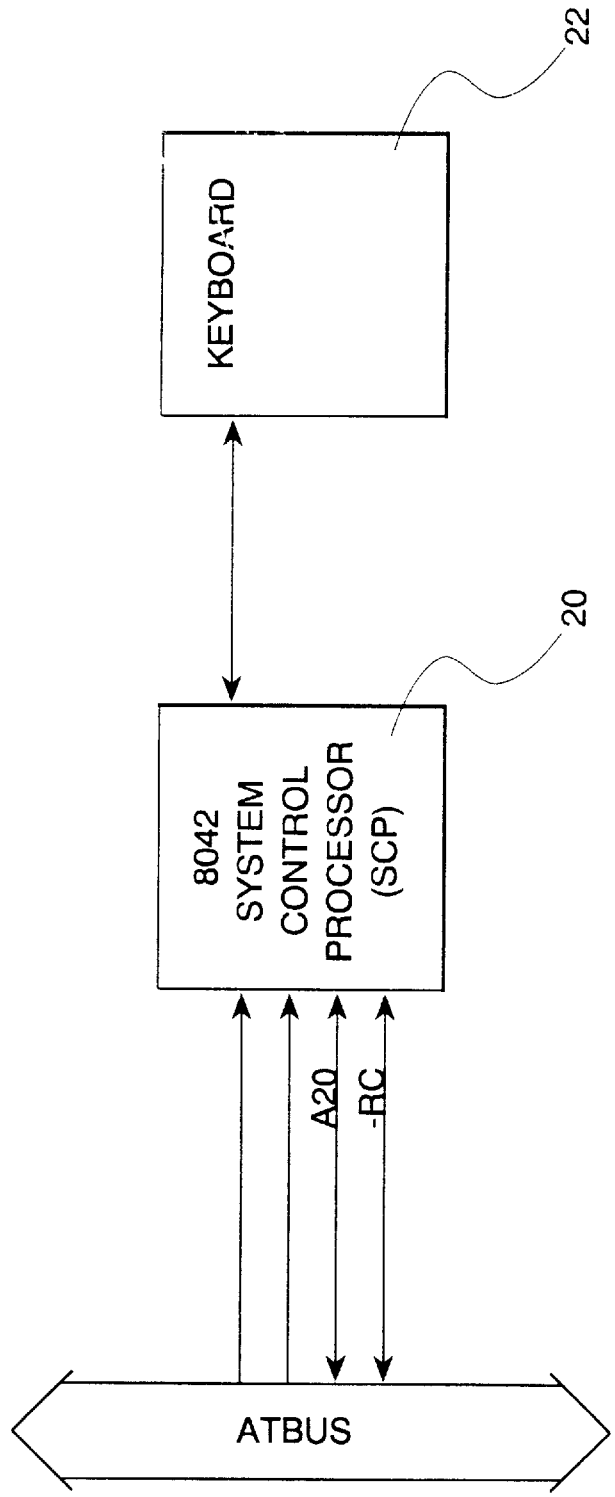
FIG. 1 is a simplified block diagram of a portion of a prior art type PC/AT compatible personal computer illustrating an Intel 8042 microprocessor as an SCP.
Figure 2:
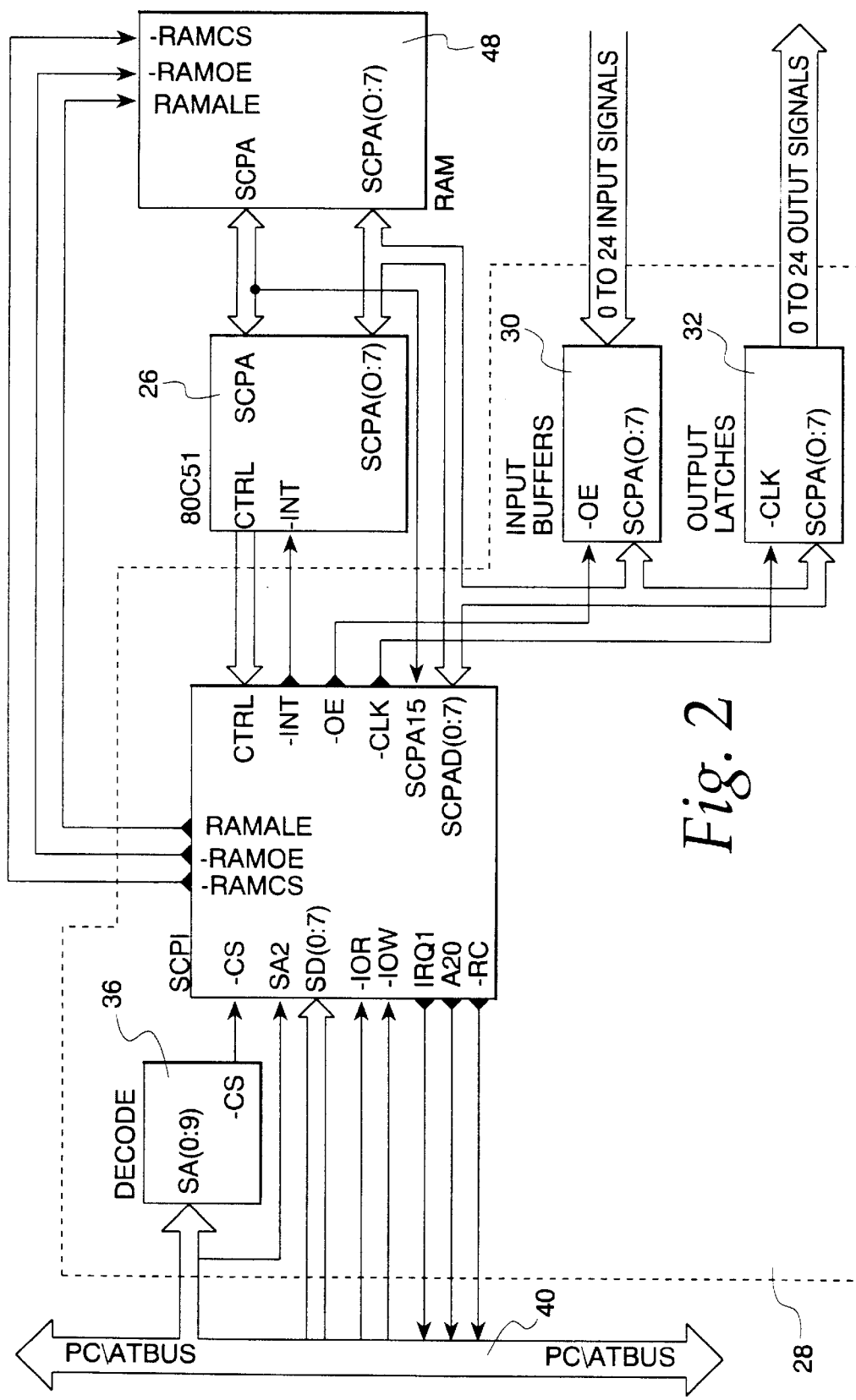
FIG. 2 is a block diagram of the system in accordance with the present invention which utilizes a system control processor interface (SCPI) for emulating an Intel 8042 bus.

Referring to the drawing and in particular FIG. 1, a portion of a known PC/AT compatible personal computer is illustrated. An SCP 20 acts as an interface between a CPU (not shown) and various peripherals, such as a keyboard 22. In such an application, the SCP 20 monitors the keyboard 22 and communicates with the CPU.

In known newer type PC/AT machines, an Intel 8042 is used as the SCP 20 while either an Intel 80286, 80386 or an 80486 is used as a CPU. An Intel 8042 is relatively slow and can decrease the overall system performance. However, in order to remain IBM PC/AT-compatible, any change in the SCP requires emulation of the Intel 8042.

The SCPI allows the SCP 20 (FIG. 1) to be replaced with a relatively faster SCP 26, such as an Intel 8051 or any microprocessor that emulates an Intel 8042. The SCPI, generally identified with the reference numeral 28, is connected between a PC/AT system bus 40 and the SCP 26. The SCP 26 and the SCPI 28 emulate the Intel 8042 to maintain system compatibility.

Figure 3A:
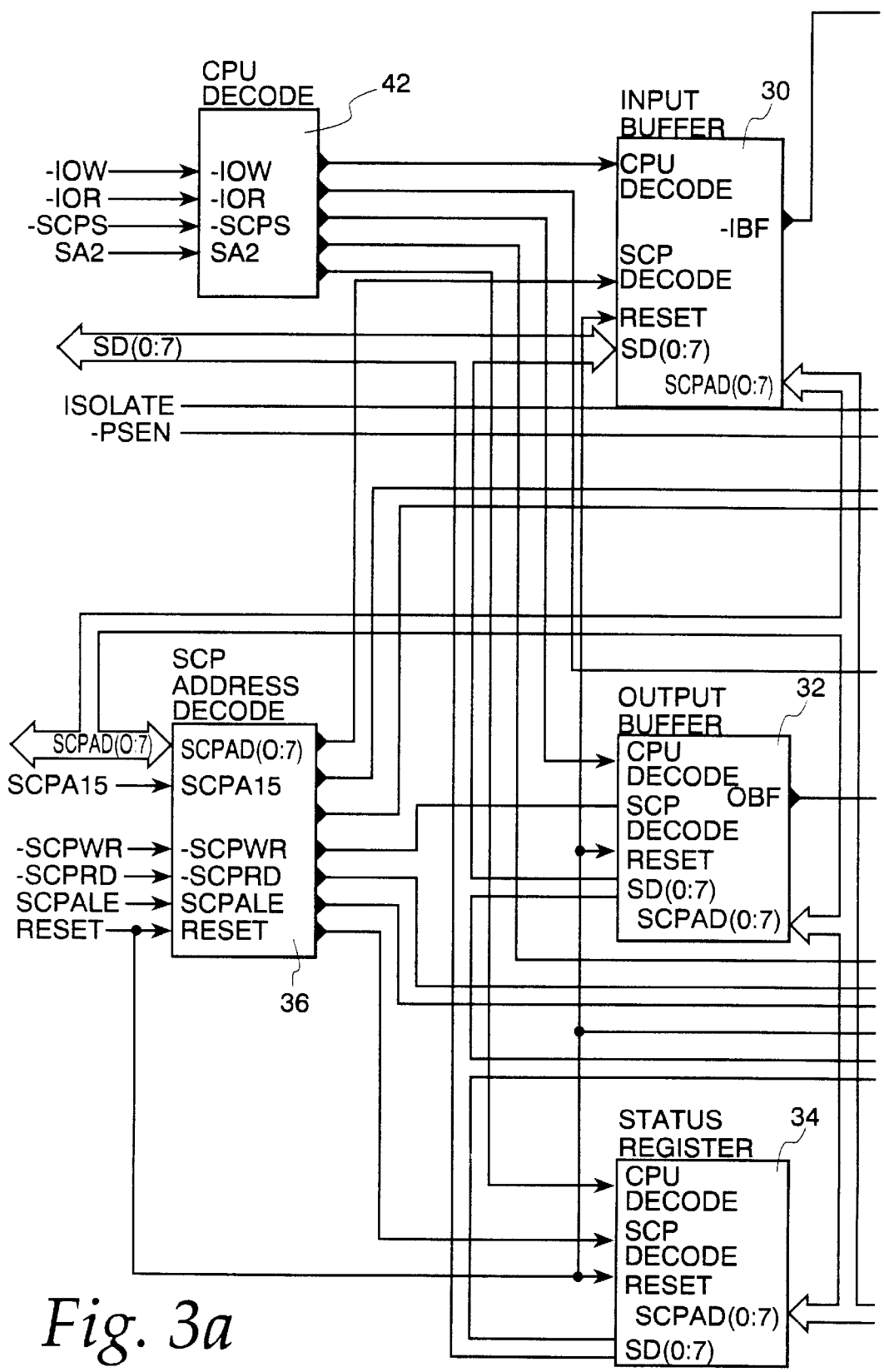
FIGS. 3A and 3B are a block diagram of the SCPI in accordance with the present invention.
Figure 3B:
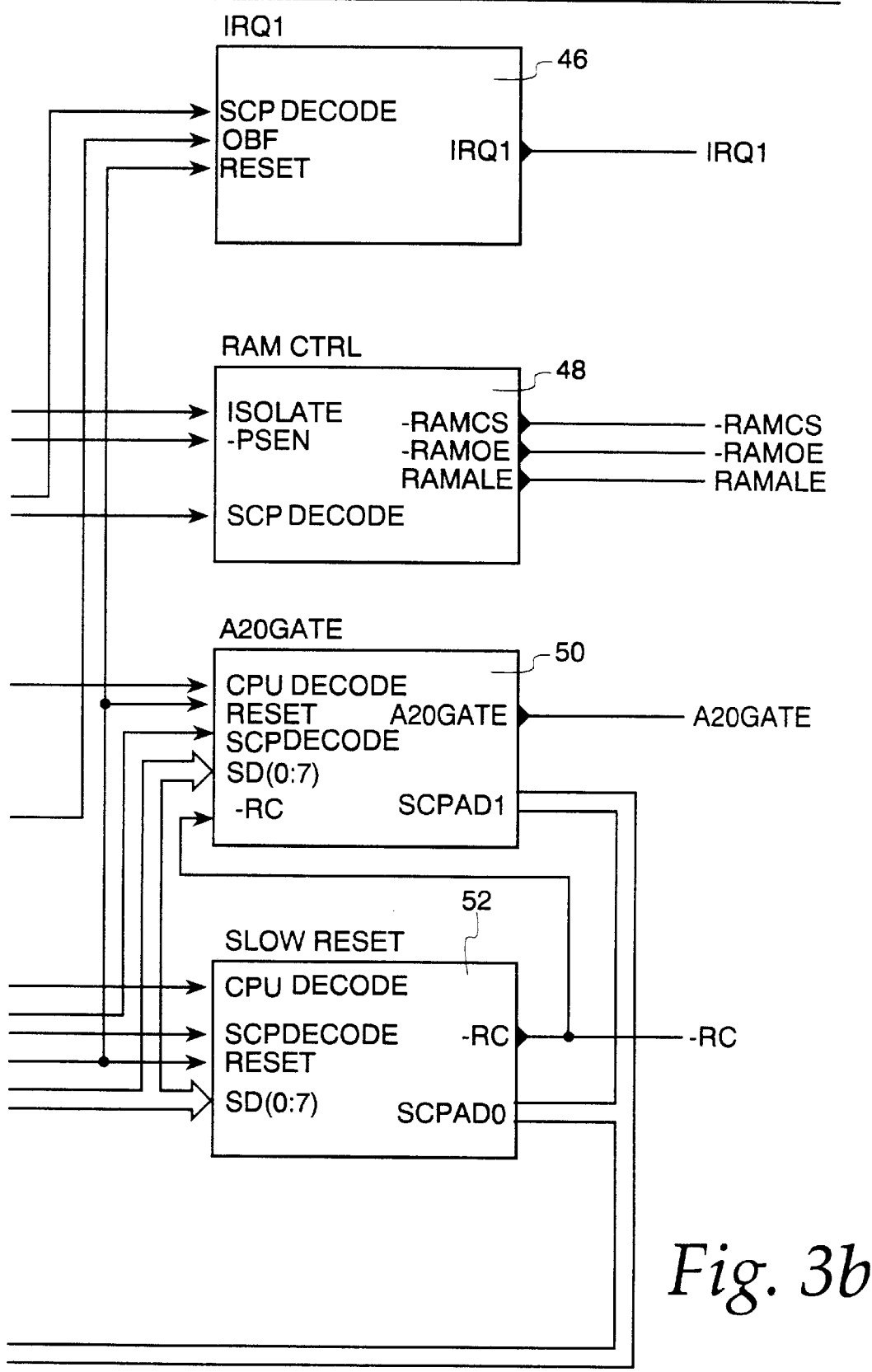

An internal block diagram of the SCPI 28 is provided in FIG. 3. As will be discussed in detail below, the SCPI 28 allows communication between the SCP 26 and the CPU, as well as communication between the CPU and the SCP 26 by way of three registers (FIG. 3); an input buffer 30, an output buffer 32 and a status register 34. The SCPI 28 further includes SCP 26 address decoding logic 36, CPU decoding logic 42, slow reset logic 44, external random access memory (RAM) control logic 48, interrupt logic 46 and A20 signal logic 50.

Another important aspect of the SCPI relates to control of the A20 signal which allows memory access above the one megabyte boundary. This signal is set virtually immediately after the command/data sequence and data are received. In known systems, a command to control A20 signal is written by the CPU to an input buffer. In order to allow time for the SCP to read the data and set the gate A20, a delay is incorporated to allow the SCP to read the data and set the A20 signal. Since some of the new microprocessors run much faster than the application software program allows, a time-out can occur long before the A20 signal is set, resulting in the computer running code out of the wrong memory space. The system in accordance with the present invention solves this problem.

SCPI PIN DESCRIPTION

Figure 10:
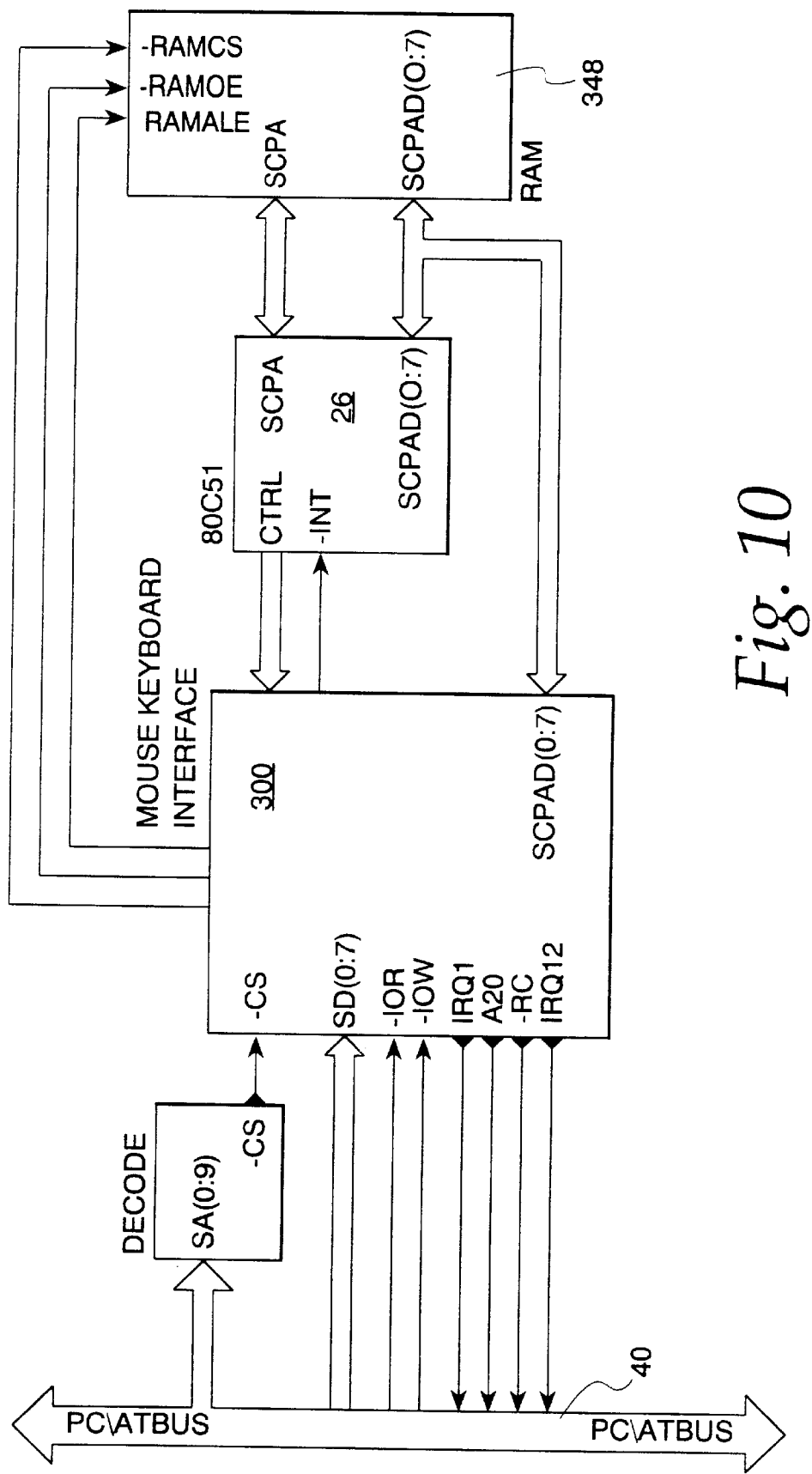
FIG. 10 is a block diagram of a system in accordance with an alternate embodiment of the present invention which utilizes a mouse keyboard interface (MKI) for emulating an Intel 8042 bus.

The SCPI 28 is a 44 pin integrated circuit as illustrated in FIG. 10, which may be formed as a gate array, such as by VLSI Technologies, Inc. Pin descriptions are provided in TABLE I.

TABLE I

SCPI PIN DESCRIPTION

| PIN NO. | TYPE | NAME | PIN DESCRIPTION |
|---|---|---|---|
| | | | CPU Interface |
| 29 | I | RESET | Hardware Reset of SCPI |
| 41 | I | –IOW | CPU I/O Write Strobe |
| 40 | I | –IOR | CPU I/O Read Strobe |
| 39 | I | –SCPCS | Decode of SA 9:0 Provide an active signal when an access to 062H–06EH (even) happens |
| 38 | I | SA2 | System Address Bus Bit 2 |
| 4, 5, 8, 9, 26, 27, 30, 31 | B | SD0:7 | System Data Bus Bits 0–7 |
| 37 | 0 | IRQ1 | Keyboard Interrupt |
| 22 | 0 | A20GATE | Enable access to the memory above 1 megabyte |
| 15 | 0 | –SLOWRST | System Processor reset |
| | | | SCP Interface |
| 18 | I | SCPA15 | A15 from the SCP Processor |
| 2, 3, 10, 11, 24, 25, 32, 33 | B | SCPAD0:7 | Multiplexed address data bus from SCP |
| 16 | I | SCPALE | Address Latch Enable for SCPAD0:7 |
| 6 | I | –SCPRD | Memory Read Strobe |
| 7 | I | –SCPWR | Memory Write Strobe |
| 17 | I | –PSEN | Program Store Enable Read strobe to external Program Memory |
| 19 | 0 | –IBF | Input Buffer Full Interrupt to SCP when the CPU has written to the Input Buffer |
| | | | External RAM Control |
| 42 | 0 | –RAMCS | RAM Chip Select |
| 44 | 0 | –RAMOE | RAM Output Enable |
| 43 | 0 | RAMALE | RAM Address Latch Enable |
| | | | External Port Control |
| 14 | 0 | –P4WR | Port 4 Write. Used to clock SCPAD0:7 into 8 external Flip-Flops. Provides 8 extra outputs for the SCP |
| 13 | 0 | –P4RD | Port 4 Read. Output enable a buffer to SCPAD 0:7 to provide 8 inputs |
| 20 | 0 | –P5WR | Port 5 write. Used to clock SCPAD0:7 into 8 external Flip- |

TABLE I-continued

SCPI PIN DESCRIPTION

| PIN NO. | TYPE | NAME | PIN DESCRIPTION |
|---|---|---|---|
| | | | Flops. Provides 8 extra outputs for the SCP |
| 21 | 0 | –P5RD | Port 5 Read. Output enable a buffer to SCPAD 0:7 to provide 8 inputs |
| 36 | 0 | –P6WR | Port 6 Write. Used to clock SCPAD0:7 into 8 external Flip-Flops. Provides 8 extra outputs for the SCP |
| 35 | 0 | –P6RD | Port 6 Read. Output enable a buffer to SCPAD 0:7 to provide 8 inputs |
| | | Power and Ground | |
| 28 | I | –ISOLATE | In the event the SCP is operating while the rest of the unit is not powered, this signal will isolate the rest of the signals |
| 1, 34 | | VCC | Power Supply |
| 12, 23 | | GND | Ground |

The required output current driving capability of the pins is listed in TABLE II.

TABLE II

CURRENT DRIVING ABILITY OF OUTPUTS

The output pins of the SCPI should have the following current driving abilities:

| | |
|---|---|
| SCPAD 0:7 | 12 mA |
| SD 0:7 | 16 mA |
| IRQ1 | 4 mA |
| –SLOWRST | 4 mA |
| A20GATE | 12 mA |
| –IBF | 2 mA |
| –RAMCS | 2 mA |
| –RAMOE | 2 mA |
| RAMALE | 8 mA |
| –P4WR | 8 mA |
| –P5WR | 8 mA |
| –P5RD | 8 mA |
| –P6WR8 | mA |
| –P6RD8 | mA |

SCP INTERFACE

It is to be understood that, as used herein, an "H" at the end of a number indicates that the number is a hexadecimal number. It is also to be understood that a minus sign (–) in front of a signal name, such as –IOW, indicates the logical complement of the signal and is identical to the format $\overline{\text{IOW}}$.

The SCP 26 can address the SCPI 28, as well as external RAM that is local only to the SCP 26. A signal SCPA15 determines if it is a RAM access or an SCPI access. If external RAM 48 is not used, the signal SCPA15 can be tied low, thus allowing all external memory accesses to be to the SCPI 28.

Figure 4A:
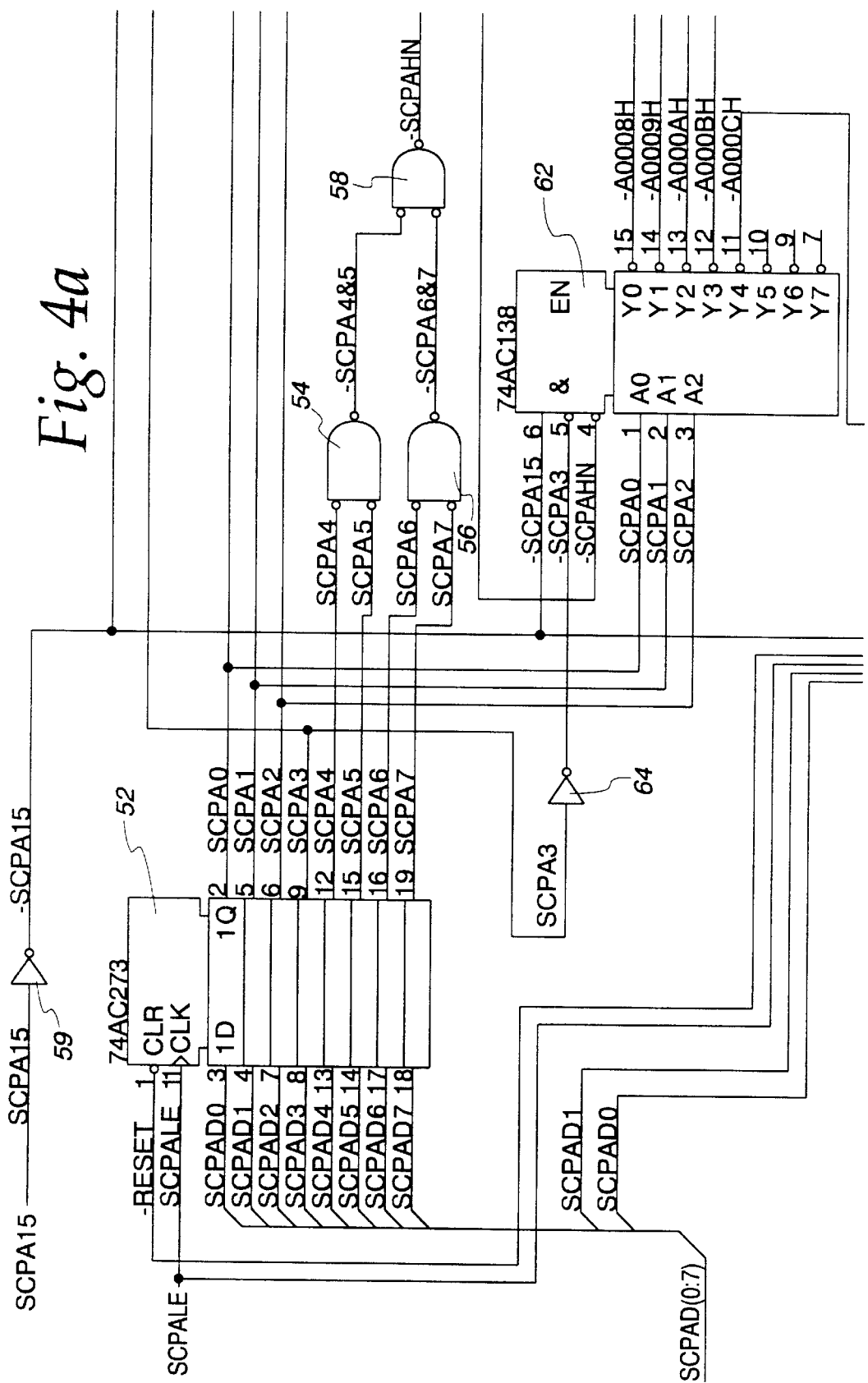
FIGS. 4A–C are a schematic diagram of the address decoding circuitry in the SCPI in accordance with the present invention.
Figure 4B:
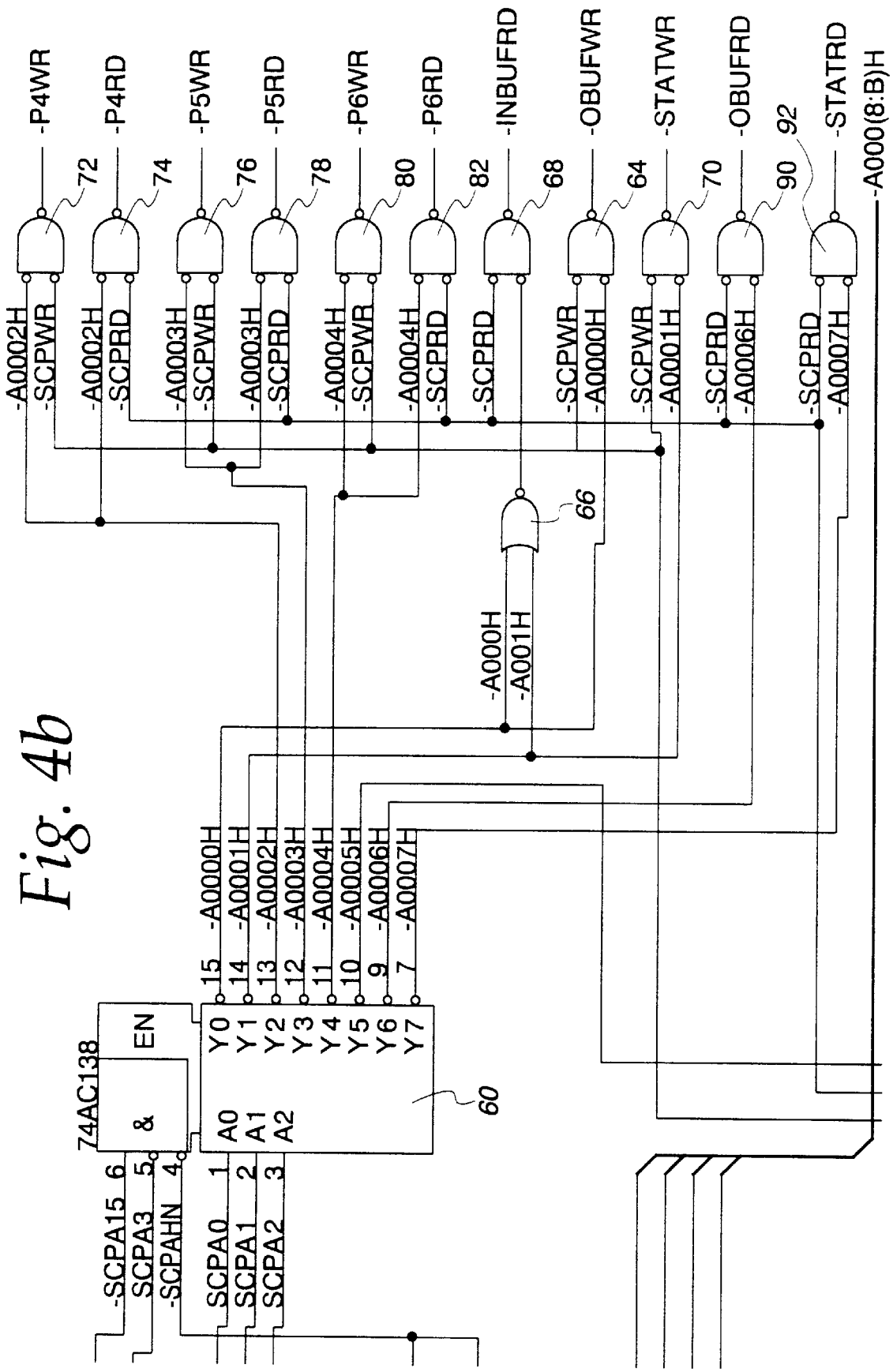
Figure 4C:
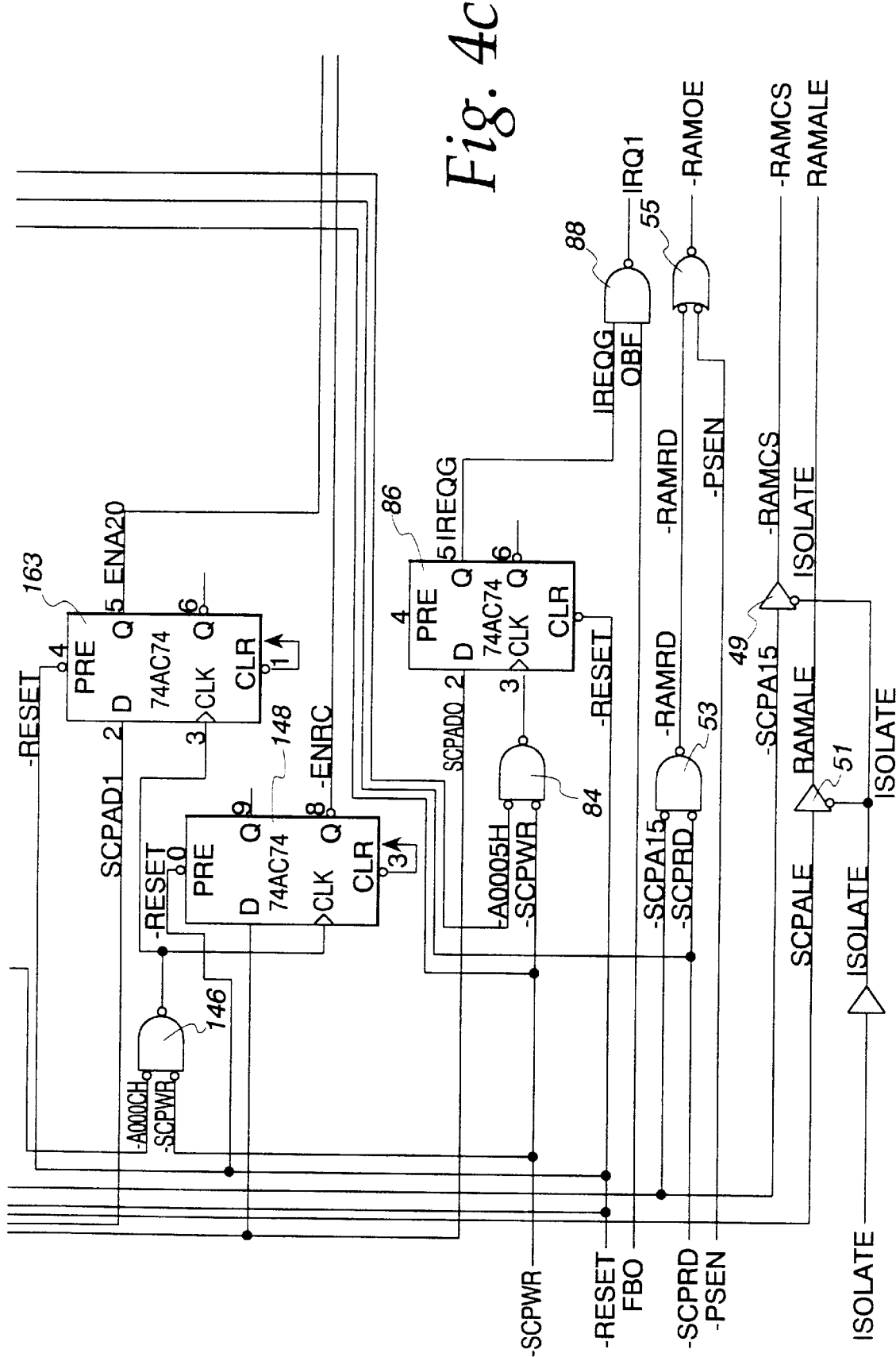
Figure 5A:
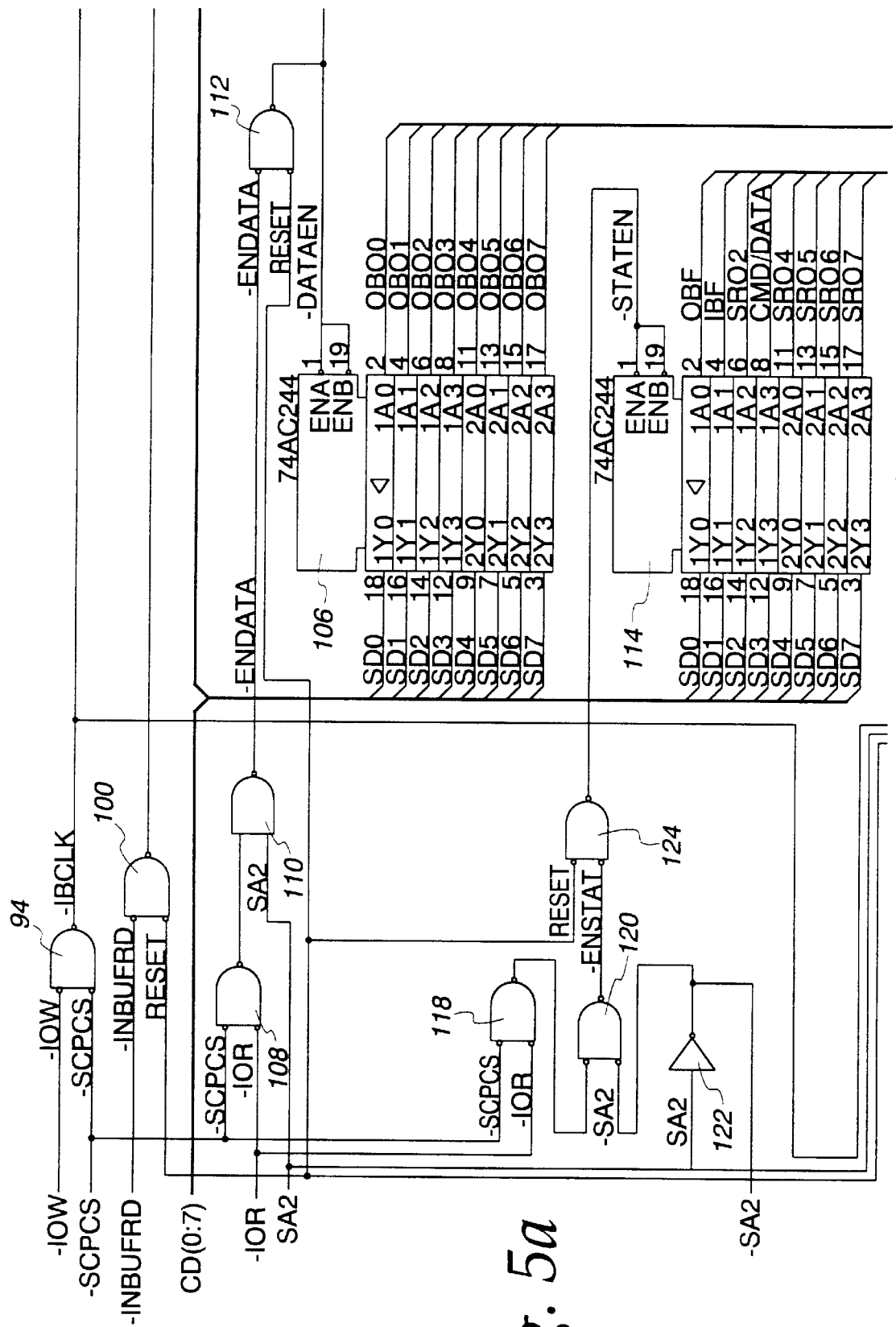
FIGS. 5A–C are a schematic diagram of SCP/CPU interface logic circuitry in accordance with the present invention.
Figure 5B:
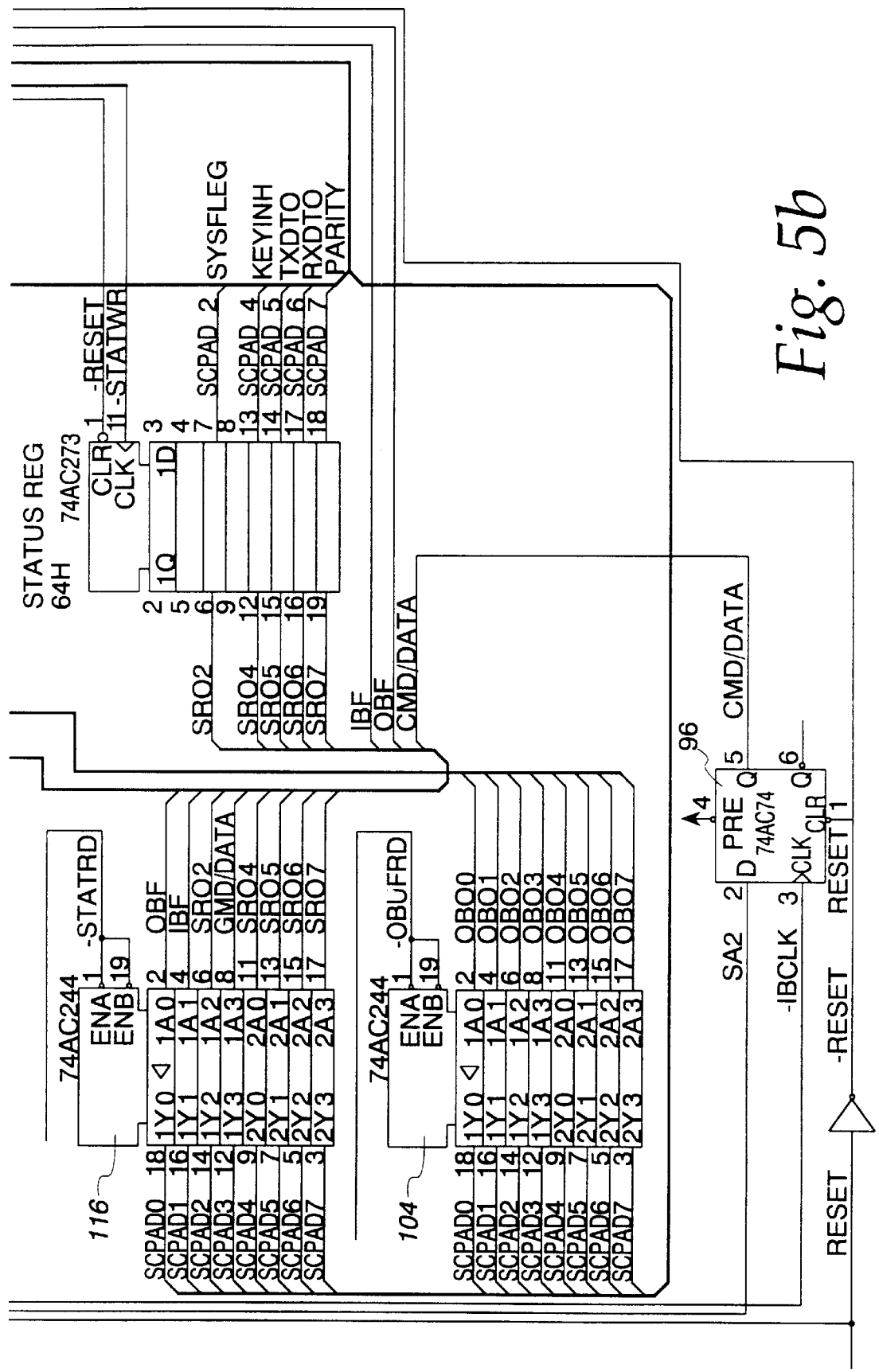
Figure 5C:
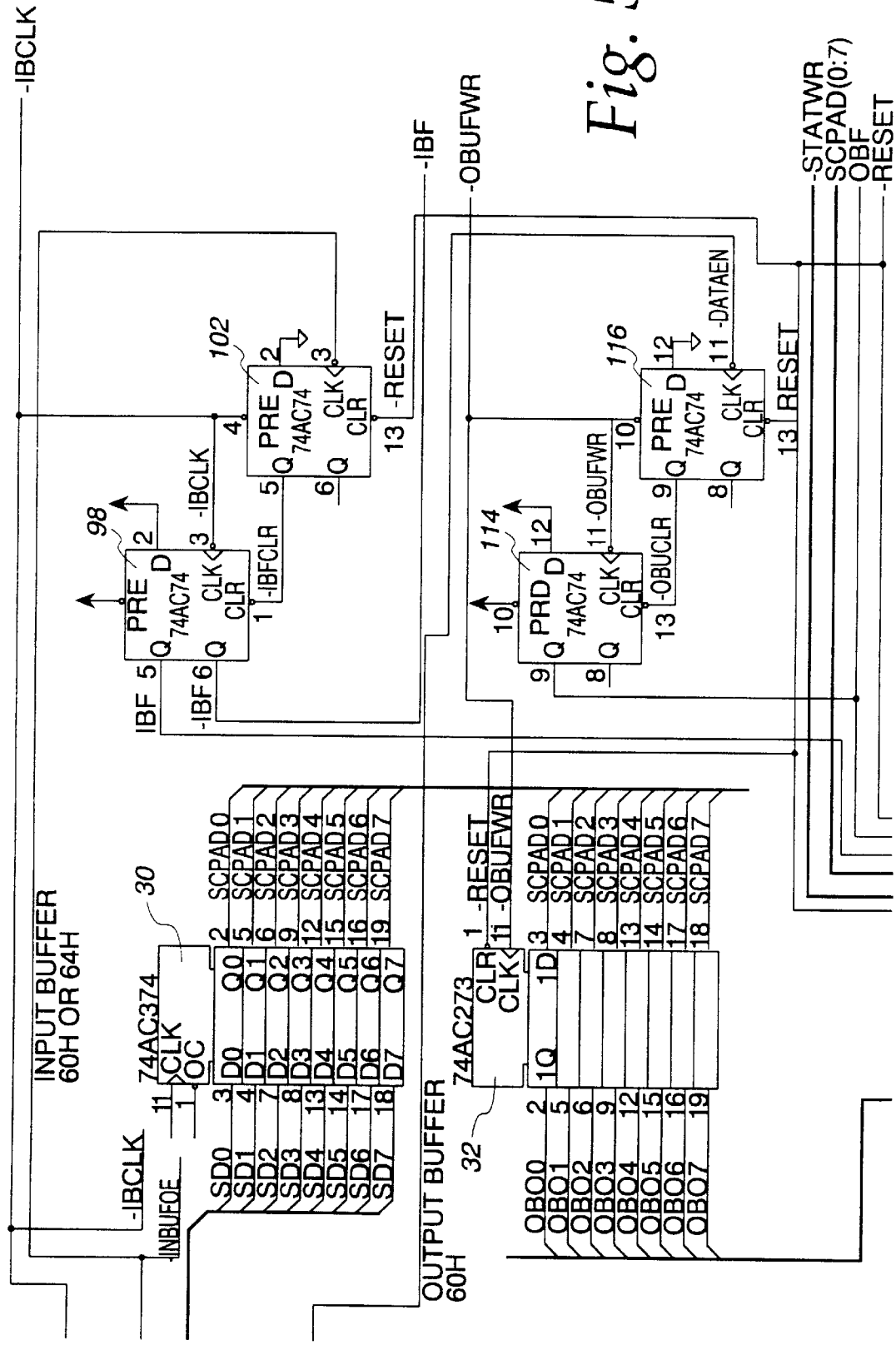

The RAM control circuitry 48 is illustrated in detail in FIG. 4. Thirty-two kilobytes of external RAM 48 can be addressed by the SCP 26 at addresses 8000H to FFFFH for program storage. More particularly, the SCPI 28 generates a RAM chip select signal (−RAMCS), a RAM output enable signal (−RAMOE) and a RAM address latch enable signal (RAMALE) for external RAM control. The RAM chip select signal (−RAMCS) is available at the output of a tristate device 49. The signal (−SCPA15) is applied to the input of the tristate device 49 indicating a RAM access. The tristate device 49 is controlled by an ISOLATE signal (discussed below), which enables the tristate device 49 except under certain conditions such as when the SCP 26 is operating with no power available to the other components. The RAM address latch enable signal (RAMALE) is available from another tristate device 51, also controlled by the ISOLATE signal. The input to the tristate device 51 is a signal (SCPALE), an address latch enable for the SCP external address data bus (SCPAD0–SCPAD7).

The RAM output enable signal (−RAMOE) is generated by a NAND gate 53 and a NOR gate 55. The output of the NOR gate 55 represents the signal (−PSEN), program memory enable, is applied to an inverting input of the NOR gate 55. A RAM read signal (−RAMRD) is applied to another inverting input of the NOR gate 55. The signal (−RAMRD) is available at the output of a NAND gate 53. The NAND gate 53 receives two inputs. One input is an SCP read signal (−SCPRD). The other signal is (−SCPA15) which represents a RAM access.

The SCP interface to the SCPI is accomplished through a memory mapping scheme identified by the logic block 36 and illustrated in detail in FIG. 4. The scheme utilizes Intel 8051 external memory address data lines (SCPAD0–SCPAD7) connected as inputs to an 8-bit register 52, which may be a Motorola type 74AC373. During a memory access, a lower address byte is latched into the register 52 using an SCP latch enable signal (SCPALE), applied to the clock input (CLK) of the register 52.

The addresses from the SCP external address data lines (SPCAD0–SCPAD1) are available at the output of the register 52 forming an 8-bit internal address bus (SCPA0–SCPA7). The upper 4-bits of the internal address bus (SCPA4–SCPA7) are decoded by three NAND gates 54, 56 and 58. More specifically, bits SCPA4 and SCPA5 are applied to inverting inputs of the NAND gate 54. Bits SCPA6 and SCPA7 are applied to inverting inputs of the NAND gate 56. The outputs of the two NAND gates 54 and 56 are applied to inverting inputs of the NAND gate 58. The NAND gate 58 generates a signal (−SCPAHN) which indicates that the upper address bits (SCPA4–SCPA7) are low. This signal (−SPAHN) is applied to an inverting enable input of a decoder/demultiplexer 60 and to an inverting input enable of a decoder/demultiplexer 62. The decoder/demultiplexers 60 and 62 may be Motorola Model No. 74AC138.

The lower 4-bits (SCPA0–SCPA3) of the internal address bus (SCPA0–SCPA7) are also applied to the input (A0–A2) of the decoder/demultiplexers 60 and 62. Since the bit SCPA3 is low for addresses A0000H through A0007H and high for addresses A00008H through A0000CH, it is applied to an inverting enable input of the decoder/demultiplexer 60 to generate address signals A0000H through A00007H. The signal (−SCPA15), indicating an SCPI access available at the output of an inverter 59, is applied to a noninverting enable input of the decoder/demultiplexer 60. Thus, address signals A0000H through A00007H are generated at the output of the decoder 60 in response to the address bus bits SCPA0 through SCPA2.

The signals (−SCPAHN) and (−SCPA15) are also applied to non-inverting and inverting enabling inputs of the decoder/demultiplexer 62, respectively. The bit SCPA3 is applied to an inverter 64 to produce an (−SCPA3) signal which is low for addresses above A0007H. The signal (−SCPA3) is applied to an inverting enable input of the decoder/demultiplexer 62. Since the signal (−SCPA3) is low for addresses A00008H through A000CH, the decoder/demultiplexer 62 can also decode these addresses from the address lines SCPA0–SCPA2.

Address signals (−A0000H through −A000H) are generated at the output terminals (Y0–Y7) of the decoder/demultiplexers 60 and 62. These address signals are further combined with other signals to generate memory mapped control signals. More specifically, the address signal −A0000H is applied to an inverting input of a NAND gate 64 along with a system control processor write signal (−SCPWR) to generate an output buffer write signal (−OBUFWR). The output buffer write signal (−OBUFWR) allows the SCP 26 to write a byte to the output buffer 32 at the address A0000H.

The address signals −A0000H and −A0001H are also applied to a NOR gate 66. The output of the NOR gate 66 is applied to an inverting input of a NAND 5 gate 68. A system control processor read signal (−SCPRD) is applied to NAND gate 68 along with the output of the NOR gate 66 to produce an input buffer read signal (−INBUFRD). The input buffer read signal (−INBUFRD) allows the SCP 26 to read the contents of the input buffer 30 at address A0000H or A0001H.

The address signal −A0001H is also applied to a NAND gate 70 along with an SCP write signal (−SCPWR) to generate a status register write signal (−STATWR). The status register write signal (−STATWR) 15 allows the SCP 26 to write to the status register 34 at address A0001H.

The address signals −A0002H through −A0004H allow the SCP 26 to access external ports P4–P6. These address signals are applied to inverting inputs of six NAND gates 72, 74, 76, 78, 80 and 82, along with system control processor write (−SCPWR) or system control processor read (−SCPRD) signals as shown in FIG. 4, to enable the SCP 26 to read and write to the external ports P4–P6 at addresses A0002H, A0003H and A0004H. Each external port can provide 8 additional input pins and 8 additional output pins for the SCP 26.

The address signal −A0005H is used as an SCP/CPU interface to generate a keyboard interrupt (IRQ1) logic 46. More specifically, the address signal −A0005H is applied to an inverting input of a NAND gate 84. An SCP write signal (−SCPWR) is applied to another inverting input of the NAND gate 84. The output of the NAND gate 84 is applied to the clock input (CLK) of a D-type flip-flop 86. One bit SCPAD0 of the external SCP address bus is applied to the D input of the flip-flop 86. The output from the NAND gate 84 is used to strobe the bit SCPAD0 into the flip-flop 86 to generate an IREQG signal. This signal (IREQG) is applied to the input of a NAND gate 88, along with an output buffer flag full signal (OBF). When bit SCPAD0 is high, the keyboard interrupt signal (IRQ1) is enabled when the SCP 26 writes to address A0005H. During such a condition, when bit SCPAD0 is low, the keyboard interrupt signal (IRQ1) is disabled. During such a condition, the NAND gate 88 allows an interrupt signal (IRQ1) to be generated by the SCPI 28 when the output buffer 32 is full.

The address signal (−A0006H) is applied to an inverting input of a NAND gate 90 along with an SCP read signal (−SCPRD). The output of the NAND gate 90 is an output buffer read signal (−OBUFRD),which allows the SCP 26 to read the output buffer 32 at address A0006H.

The address A0007H is applied to an inverting input of a NAND gate 92 along with an SCP read signal (–SCPRD). The output of the NAND gate 92 is a status register read signal (–STATRD) which allows the SCP 26 to read the status register 34 at address A0007H.

The address signals A008H, A0009H, and A000CH relate to the slow reset system. The address signals A000AH and A000BH are used to generate the A20 signal. These address signals will be discussed in detail below.

CPU TO SCP INTERFACE

Communication between the CPU and the SCP 26 is by way of an input buffer 30, an output buffer 32 and a status register 34. The input buffer 30 is an 8-bit register with tristate outputs (Q1–Q7), such as a Motorola type 74AC374. In such a device, a clock input (CLK) and output enable input (OC) are common to all 8-bits. The output buffer 32 and the status register 34 are also 8-bit registers.

These registers 32 and 34 may be octal D-type flip-flops having separate D-type inputs (D0–D7) and separate tristate outputs (Q0–Q7), such as a Motorola type 74AC273. Such devices contain a clock input (CLK) and a clear (CLR) input, common to all eight flip-flops.

The input buffer 30 may be written to only by the CPU and read only by the SCP 26. The CPU writes to the input buffer 30 at addresses 60H or 64H by writing to the system data bus (SD0–SD7). The system 10 data bus (SD0–SD7) is applied to the data inputs (D007) of the input buffer 30. The address is decoded by a CPU logic circuit 42 which does not form part of the present invention. A signal (–SCPCS) is generated by the CPU decode logic circuit 42 if the address is either 60H or 64H. The signal (–SCPCS) is applied to an inverting input of a NAND gate 94. A CPU input/output write signal (–IOW) is applied to another inverting input of the NAND gate 94 to produce a signal (–IBCLK), which indicates that the CPU is writing to the input buffer 30 at either address 60H or 64H. The signal (–IBCLK) is applied to the clock input (CLK) of the input buffer 30. Thus, any time the CPU writes to address 60H or 64H, data on the system data bus 40 (SD0–SD7) is strobed into the input buffer 30.

The CPU can either write data or a command to the input buffer register 30. Any time the CPU writes to the input buffer 30, a command data flag (CMD/DATA) is set in the status register 34 (bit 3). This lets the SCP 26 know that a byte containing either a command or data is in the input buffer 30. A write to 64H represents a command (command data flag high), while a write to 60H represents data (command data flag low).

The command data flag (CMD/DATA) is set by way of a flip-flop 96. More particularly, bit SA2 of the system address bus is applied to a D input of a flip-flop 96. Bit SA2, depending on whether it is high or low, determines whether CPU addressed 60H or 64H. The signal (–IBCLK) is applied to the clock input (CLK) of the flip-flop 96. The output signal (CMD/DATA) from the flip-flop 96, depending on whether it is high or low, enables the SCP 26 to determine whether the last byte written to the input register 30 by the CPU was command or data.

Each time the CPU writes to the input buffer 30, an input buffer full flag (IBF), bit 1 of the status register 34, is set as well as the CMD/DATA flag, as discussed above. The input buffer full flag (IBF) acts as an interrupt to the SCP 26 to let it know there is a byte in the input register 30 from the CPU which has not yet been read. The command/data flag tells the SCP 26 whether the last byte written by the CPU was a command (written to address 64H) or data (written to address 60H).

A D type flip-flop 98 having its D input tied high is used for the input buffer full flag (IBF). A signal (–IBCLK) is applied to the clock input (CLK) of the flip-flop 98. Thus, the input buffer flag (IBF) will be set each time the CPU writes to input buffer 30.

Once the SCP 26 determines whether the byte in the input buffer 30 is command or data, it reads the byte in the input buffer 30 and the input buffer flag IBF is cleared by the SCPI 28. More particularly, the SCP 26 reads the byte out of the input buffer 80 by reading addresses A000H or A001H. More specifically, an input buffer read signal (–INBUFRD) is applied to a NAND gate 100 along with a reset signal. The (–INBUFRD) signal is a decode of addresses A0000H and A0001H and is active any time the SCP 26 is attempting to read these addresses. The output of the NAND gate 100 is an input buffer/output enable signal (–INBUFOE) which is applied to the enable input (OC) of the input buffer 30 which allows the byte to appear on the multiplexed system control processor address data bus SCPAD0–SCPAD7 to be read by the SCP 26. Prior to this state, the input buffer output 26 is in a high impedance state.

After the SCP 26 reads the input buffer 30, the input buffer full flag (IBF) is cleared automatically by a flip-flop 102. More particularly, the input buffer enable signal (–INBUFOE) is applied to the clock input (CLK) of the flip-flop 102. The D input of this flip-flop is tied to system ground. Thus, once the byte in the input buffer 30 is placed on the system control processor address data lines (SCPAD0–SCPA07) and read, an input buffer clear signal (–IBFCLR) is generated by the flip-flop 102 and applied to the clear input (CLR) of a flip-flop 98. This clears the input buffer full flag (IBF). In order to avoid writing over a byte in the input buffer 30, the CPU should check the input buffer full flag (IBF) in the status register 34 prior to writing to the input buffer 30.

The system control processor SCP communicates back to the CPU through the output buffer 32 and the status register 34. The output buffer 32 is read only by the CPU at address 60H and read and written to by the SCP 26. During normal operation, the SCP 26 can only write to the output buffer 32. In order to avoid overwriting a byte in the output buffer 32 that has not yet been read by the CPU, the SCP 26 should read the status register 34 before writing to the output buffer 32.

The status register 34 is an 8-bit register consisting of 8 D-type flip-flops with a common clock and an asynchronous reset, such as a Motorola type 74AC223. The status register 34 may be written to and read by the SCP 26. The read capability enables the SCP 26 to read the output buffer full flag (OBF) and the command data flag (CMD/DATA). The status register 34 may be read any time by the CPU. Bit definitions for the status register 34 are provided in TABLE III.

The SCP 26 can write to the output buffer 32 by writing to address A0000H. As previously discussed, this generates an output buffer write signal (–OBUFWR) which is applied to the clock input (CLK) of the output buffer 32. The external SCP address data lines (SCPAD0–SCPAD7) are applied to the inputs of the output buffer 32. The output bits of the output buffer (OB00–OB07) are applied to inputs of registers 104 and 106, which may be octal buffer and line drivers having tristate outputs, such as a Motorola type 74AC244.

The output lines of the register 106 are tied to the system data bus SD0–SD7 to allow the CPU to read the output buffer 32. More specifically, the CPU reads the register 106 at address 60H. This is accomplished with three NAND gates 108, 110 and 112. A signal (–SCPCS), indicative of an address 60H or 64H, and a signal (–IOR), indicative of a read operation by the CPU, are applied to inverting inputs of the NAND gate 108. The output of the NAND gate 108 is applied to an inverting input of the NAND gate 110. The output of the NAND gate 108 is a signal representing that the CPU is reading address 60H or 64H. A signal SA2, indicating whether the address is 60H or 64H, is applied to another inverting input of the NAND gate 110. If the address is 60H, an enable data signal (–ENDATA) is generated at the output of the NAND gate 110. This signal (–ENDATA) is applied to an inverting input of the NAND gate 112 to produce a data enable signal (–DATEN). The signal (–DATEN) is then applied to the enable inputs ENA/ENB of the register 106. This allows the CPU to read the register 106 which is representative of the byte contained in the output buffer 32.

Each time the SCP 26 writes to the output buffer 32, the output buffer full flag (OBF) is set automatically. The output buffer full flag (OBF) is available at the output of a flip-flop 114. This flag is set by applying an output buffer write signal (–OBUFWR) to the clock input (CLK) of the flip-flop 114. The (–OBUFWR) signal is generated any time the SCP 26 writes to the output buffer 32. More specifically, a D input of the flip-flop 114 is tied high. Thus, an output buffer full flag (OBF) will be generated any time the SCP writes to the output buffer 32.

Once the CPU reads the output buffer 32, the output buffer full flag (OBF) is cleared by a flip-flop 116. More particularly, the data enable signal (–DATEN) from the NAND gate 112 is applied to the clock input (CLK) of the flip-flop 116. The (–DATEN) signal represents that CPU is reading the output buffer 32 at address 60H. By applying this signal to the flip-flop 116, an output buffer full flag clear signal (–OBFCLR) is generated at the output of the flip-flop 116 each time the CPU reads the register 106. This signal (–OBFCLR) is applied to the clear CLR input of the flip-flop 114 to clear the output buffer full flag (OBF) each time the CPU reads the output buffer 32.

A register 104 allows the SCP 26 to read the byte in the output buffer 32. More specifically, the output of the register 104 is connected to the SCP address data lines (SCPAD0–SCPAD7). The SCP 26 reads the register 104 at address A0006H by producing an output buffer read signal (–OBUFRD). This signal (–OBUFRD) is applied to enable inputs ENA/ENB of the register 104 to place the byte in this register on the SCP address data lines (SCPA00–SCPA07) to be read by the SCP 26.

The SCP 26 can write to the status register 34 at address A0001H which generates a signal (–STATWR). This signal (–STATWR) is applied to the clock input CLK of the status register 34 to enable the SCP 26 to write to the status register 34 by way of the internal SCP address data lines (SCPAD0–SCPAD7).

This data is then available on the status register output bus SR00–SR07 which is applied to registers 114 and 116. The registers 114 and 116 may be of the same type as registers 104 and 106. The register 116 allows the SCP 26 to read the status register 34. More specifically, the status register 34 may be read by the SCP 26 at the output of the register 116 on the SCP address data bus (SCPAD0–SCPAD7) any time the SCP 26 reads address A0007H. During this condition, a status read signal (–STATRD) is generated and applied to the enable inputs ENA and ENB of register 116, which allows the SCP 26 to read this register 54.

The CPU can read the output of the status register 34 at register 114. More specifically, the output of the register 56 is connected to the system data bus SD0–SD7. The CPU reads the output of the register 56 at address 64H by applying a status enable signal (–STATEN) to the enable inputs ENA and ENB of the register 114. The signal (–STATEN) is generated by three gates 118, 120 and 122, and an inverter 124. More particularly, an SCP chip select signal (–SCPCS) is applied to an inverting input of the NAND gate 118. This signal represents that the CPU is addressing either A60H or A64H. An I/O write signal (–IOR) is applied to another inverting input of the NAND gate 118. The output of the first NAND gate 118 represents that the CPU is reading at an address 60H or 64H. The output of the NAND gate 118 is applied to an inverting input of the NAND gate 120. A signal SA2 is applied to the inverter 122 to generate a signal –SA2. The –SA2 signal indicates whether the address is A60H or A64H. The output of the inverter 122 is applied to another inverting input of the NAND gate 120. The output of the NAND gate 120 is applied to an inverting input of the NAND gate 124 which generates a status enable signal (–STATEN) any time the CPU is reading at an address A64H.

TABLE III

STATUS REGISTER BIT DEFINITION
The status register 34 is an 8-bit register. Three bits are generated by the SCPI 28, while 5-bits are written by the SCP 26. Specifically, the output buffer full flag (OBF), the input buffer full flag (IBF) and the command data flag (CMD/DATA) are generated by the SCPI 28. The remaining bits are written by the SCP 26.
Definitions for the 7 bits are as follows:

| BIT NUMBER | DEFINITION |
| --- | --- |
| Bit 7 | Parity error |
| Bit 6 | Receive time out |
| Bit 5 | Transmit time out |
| Bit 4 | Inhibit switch |
| Bit 3 | Command/Data |
| Bit 2 | System flag |
| Bit 1 | Input buffer full flag (IBF). |
| Bit 0 | output buffer full flag (OBF) |

The command/data bit indicates whether the last byte written by the CPU was a command or data.

The IBF signal indicates when the CPU has written a byte to the input buffer but the system control processor SCP has not yet read the byte out of the input buffer 30. It can also be used by the CPU as a flag to indicate that the system control processor SCP is ready to receive a byte.

The OBF signal indicates when the SCP 26 has written a byte to the output buffer 32 which has not yet been read by the CPU. The OBF signal can also be used by the SCP 26 as a flag to indicate that the CPU is ready to receive a byte.

SLOW RESET

The slow reset signal (–RC) is an active low output signal to reset the CPU. It can be set by the CPU or set and cleared by the SCP 26. It is cleared when the SCPI 28 is reset by the reset pin.

The SCP 26 can control the slow reset signal (–RC) by writing to addresses A0008H or A0009H. A write to address A0008H forces the slow reset signal active while a write to A0009H forces the slow reset signal (–RC) inactive. The data written to either location is ignored. All that is relevant is that a write takes place at the proper memory location.

More specifically, the address signal (–A0008H) is applied to a NAND gate 126, along with a SCP write signal (−SCPWR). The output of the NAND gate 126 is a slow reset active signal (−SCPSRC). This signal (−SCPSRC) is applied to the clock input (CLK) of a flip-flop 128. The D input of a flip-flop 128 is tied to system ground. Thus, any time the address A0008H is written to by the SCP 26, a slow reset signal (SSETRC), is generated at the output of the NAND gate 128. This signal (SSETRC) along with input buffer read signal (−INBUFRD), is applied to inverting inputs of a NAND gate 130. The output of the NAND gate 130 is applied to an inverting input of a NOR gate 132. The output of the NOR gate 132 is applied to a preset input (PRE) of a flip-flop 134 to set the slow reset signal (−RC).

The slow reset signal (−RC) can be cleared by the SCP 26 by writing to the address A0009H. More specifically, the address signal (−A0009H) is applied to an inverting input of a NAND gate 136. The output of the NAND gate 136 is applied to the clear (CLR) input of the flip-flop 128.

The CPU can also set the slow reset signal (−RC) with a single write command unless it is prevented from doing so by the SCP 26, as discussed below. Specifically, the CPU can set the slow reset signal active by writing an even byte from F0H to FEH to address 64H. NAND gates 138 and 140 decode these bytes from the CPU. More specifically, system data bits SD4, SD5, SD6 and SD7 are applied to the NAND gate 138. The output of the NAND gate 138 is applied to the NAND gate 140. System data bit SD0 is applied to an inverting input of the NAND gate 140. The output of the NAND gate 140 is a signal (−CPURC) representative of an even data byte between F0H and FEH. This signal (−CPURC) is applied to a NAND gate 142. A signal (−ENRC) is applied to another inverting input of the NAND gate 142. As will be discussed later, the signal (−ENRC) indicates whether CPU control of the slow reset signal has been disabled by the SCP 26. The output of the NAND gate 142 is applied to the D input of the slow reset flip-flop 134. A command clock signal (CMD/CLK), which represents that the CPU addressed the address 64H, is applied to the clock input (CLK) of the slow reset flip-flop 134.

The output of the flip-flop 134 is a signal representative of a slow reset signal (−RC). This signal (−RC) is applied to the input of a tristate device 144 which indicates the status of the slow reset signal (−RC) to be read by the SCP. More particularly, the output of the tristate device 144 is applied to a system control processor data line SCPAD0. The tristate device 144 is controlled by a NAND gate 146. An SCP read signal (−SCPRD), along with an address signal −A0008H, is applied to inverting inputs of the NAND gate 146. The NAND gate 146 generates an enable signal (−RDRCOE) which enables the tristate device 144. Thus, whenever the SCP 26 reads address A0008H, the tristate device 144 is enabled to place the output of the slow reset flip-flop 134 on the system control address data bit SCPAD0. A logical 0 indicates that the slow reset is active, while a logical 1 indicates that the slow reset signal is inactive.

The SCP 26 can also disable the CPU control of the slow reset by writing to address A000CH. More specifically, a signal representative of the address A000CH is applied to a NAND gate 146 (FIG. 4), along with the system control processor write signal (−SCPWR). The output of the NAND gate 146 is applied to a clock input (CLK) of a flip-flop 148. The SCP data bit SCPAD1 is applied to a D input of the flip-flop 148. If the data bit SCPAD1 is high, the slow reset will be enabled. If the data bit SCPAD1 is low, the slow reset will be disabled. The output of this flip-flop 148 is an enable reset signal (−ENRC) which is applied to the NAND gate 142 (FIG. 7) to either enable or disable the CPU from controlling the slow reset signal.

A20 SIGNAL CONTROL

The A20 signal allows memory above one megabyte to be accessed. This A20 signal can be set by the SCP 26 directly or by the SCPI 28 in response to a CPU command. The CPU controls the gate A20 with a 2-byte sequence. The first byte D1H is a command byte written to the address 64H. The second byte is a data byte written to the address 60H. The system data bit SDI determines whether the A20 is to be set or cleared. The data bit SD1 is applied to the D input of an A20 signal flip-flop 168. The output of the flip-flop 168 is the A20 signal.

Figure 6A:
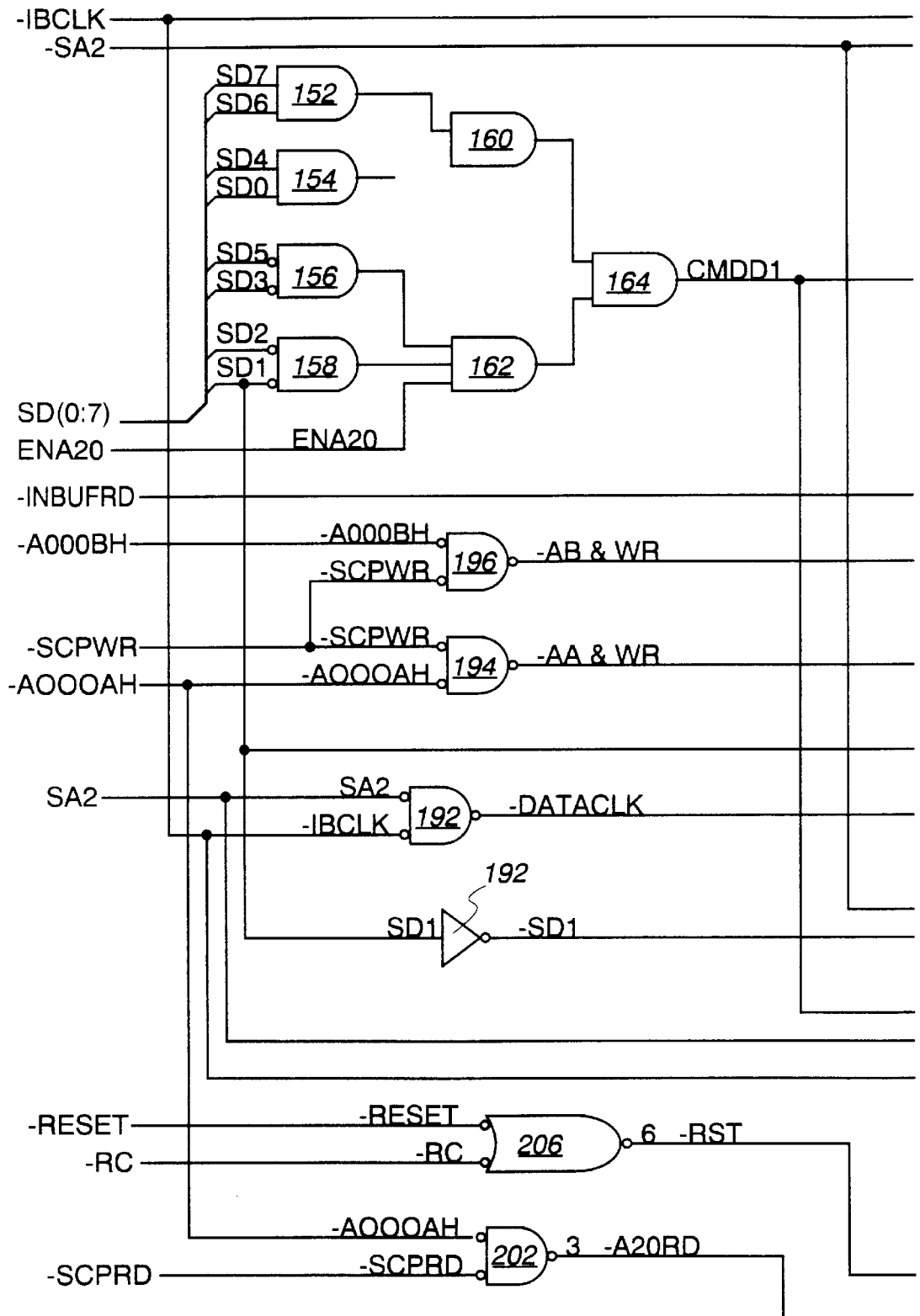
FIGS. 6A–C are a schematic diagram of the control logic for the A20 signal control in accordance with the present invention.
Figure 6B:
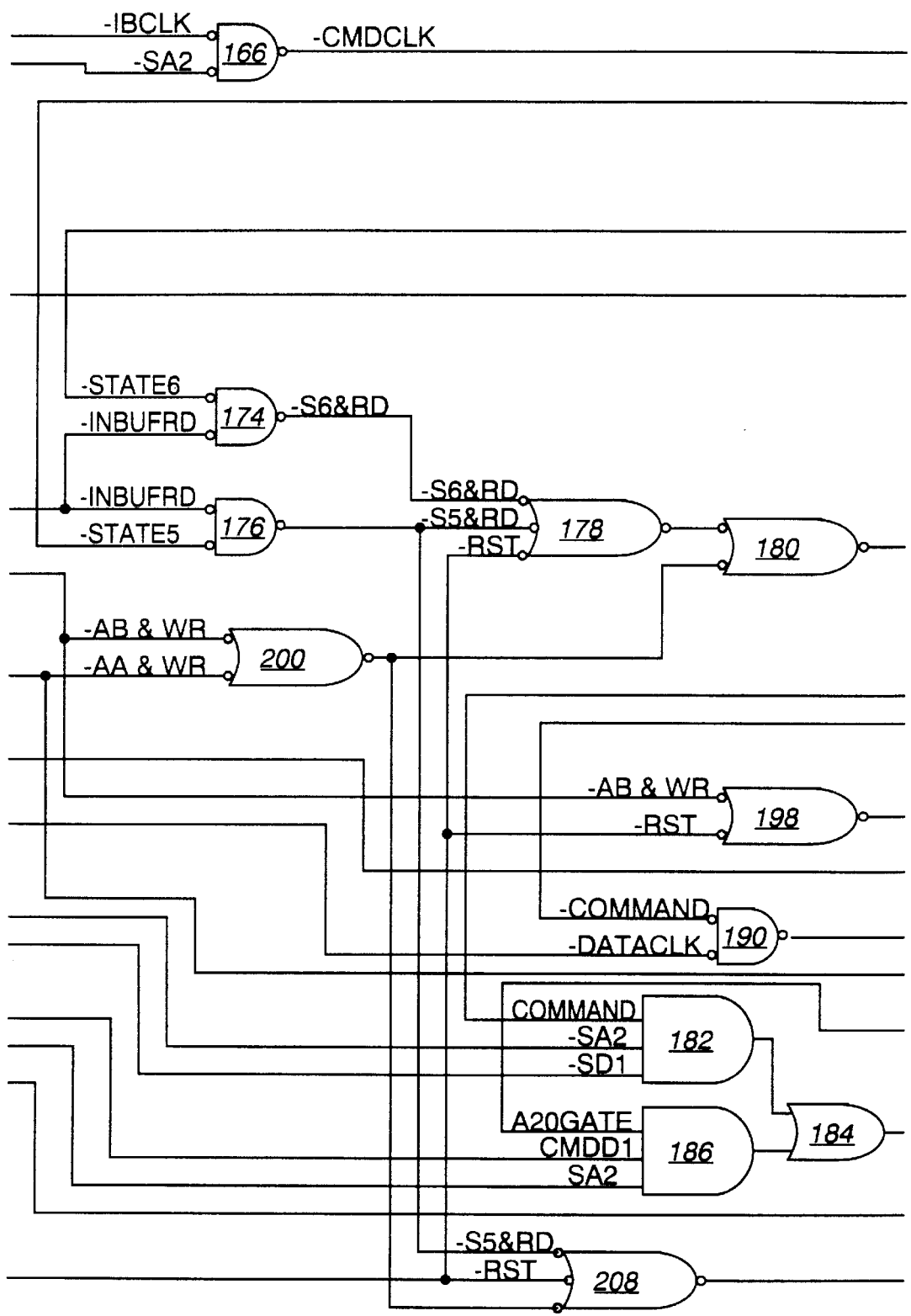
Figure 6C:
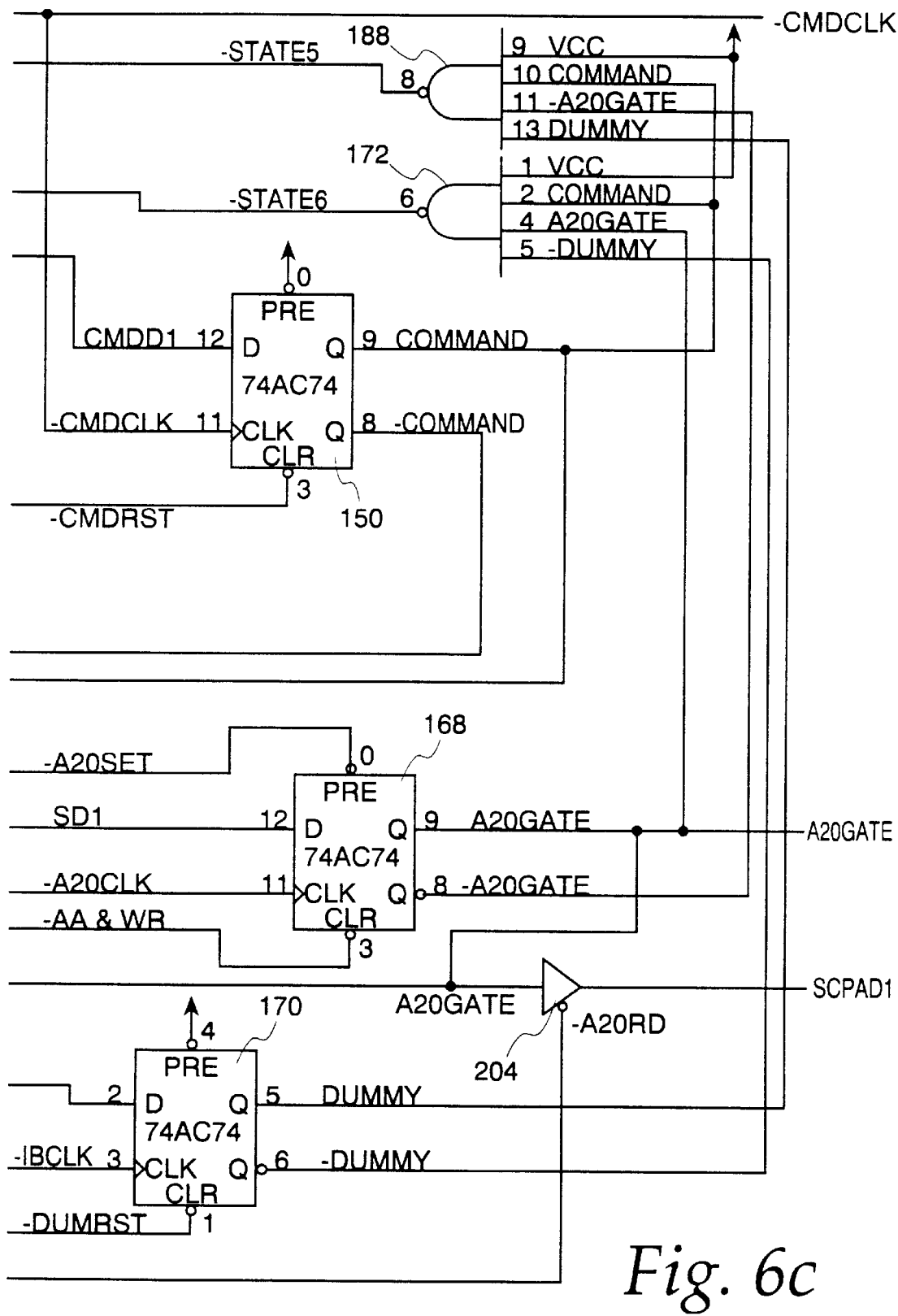
Figure 7:
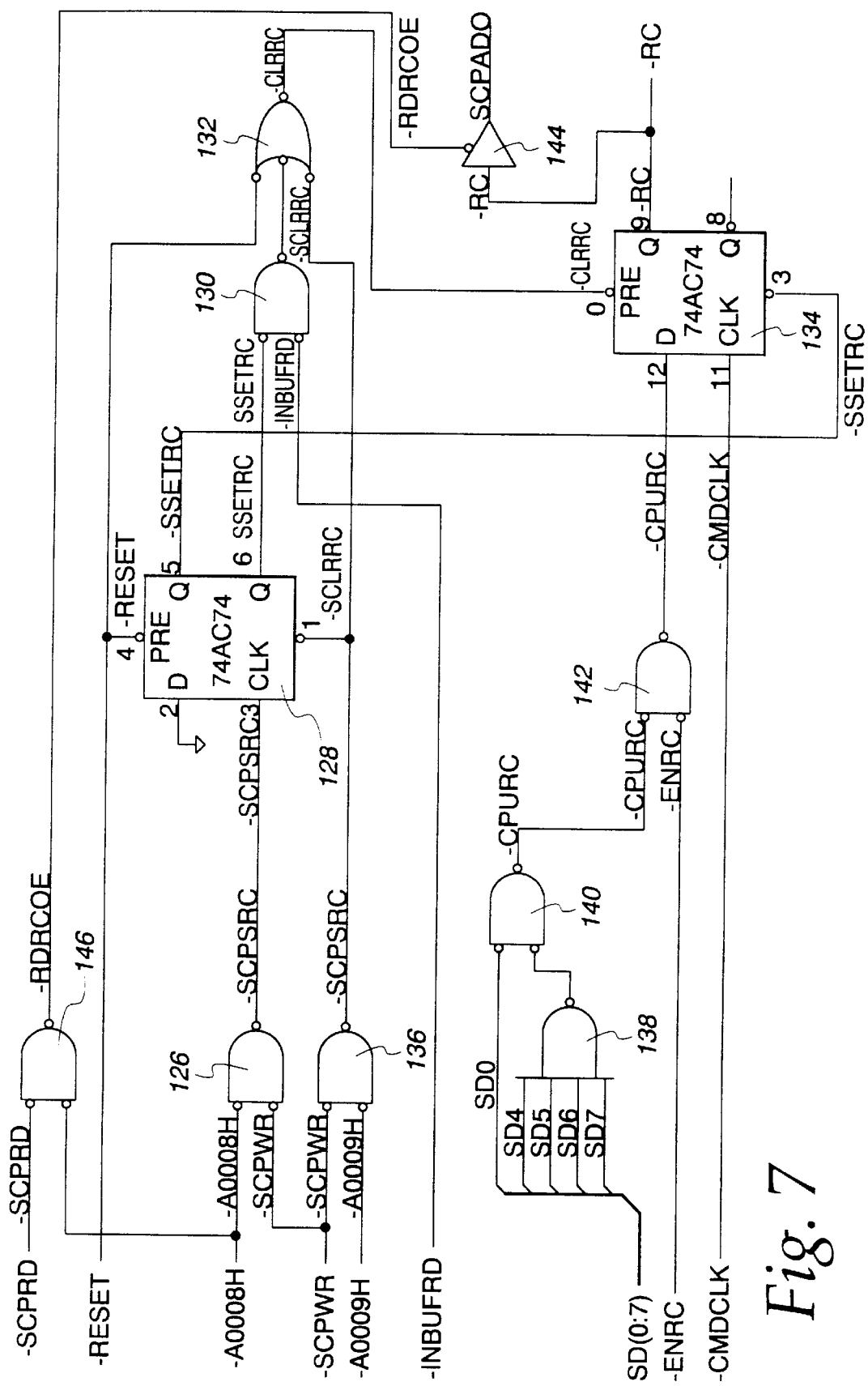
FIG. 7 is a schematic diagram of slow reset control logic in accordance with the present invention.

The CPU command signal (COMMAND) is available at a command flip-flop 150. The CPU command signal is generated when the CPU writes a byte D1H to address 64H. The command byte D1H is decoded by seven of NAND gates 152, 154, 156, 158, 160, 162 and 164 (FIG. 6). These NAND gates decode the system data bits SD0 through SD7 to provide a command data signal (CMDD1) when the CPU writes a command D1 to address 64H. More specifically, the system data bits (SD0–SD7) are applied to inverting inputs of the NAND gates 152, 154, 156 and 158, as shown in FIG. 6. The outputs of NAND gates 152 and 154 are applied to a NAND gate 160. The outputs of the NAND gates 156 and 158 are applied to the NAND gate 162 along with a signal (ENA20). The outputs of the NAND gates 160 and 162 are applied to a NAND gate 164 which generates a command signal (CMDDL) any time the byte D1H is written to address 64H.

The signal (ENA20) is generated by a flip-flop 163. This flip-flop 163 enables SCP 26 to disable the A20 signal. More specifically, a bit SCPAD1 is applied to the D input of the flip-flop 163. If bit SCPAD1 is high, the A20 signal is enabled. If bit SCPAD1 is low, the A20 signal is disabled.

The signal (CMDD1) is applied to a D input of the command flip-flop 150. Another signal, command clock (−CMDCLK) is applied to the clock input (CLK) of the command flip-flop 150. The command clock signal (−CMDCLK) is generated by a NAND gate 166 which receives signal (−IBCLK) and an input signal SA2. The IB clock signal (−IBCLK) represents that the address written to by the CPU is either 60H or 64H. The signal −SA2 identifies that the address is 64H. The output of the NAND gate 166 is the command clock signal (CMDCLK).

Figure 8:
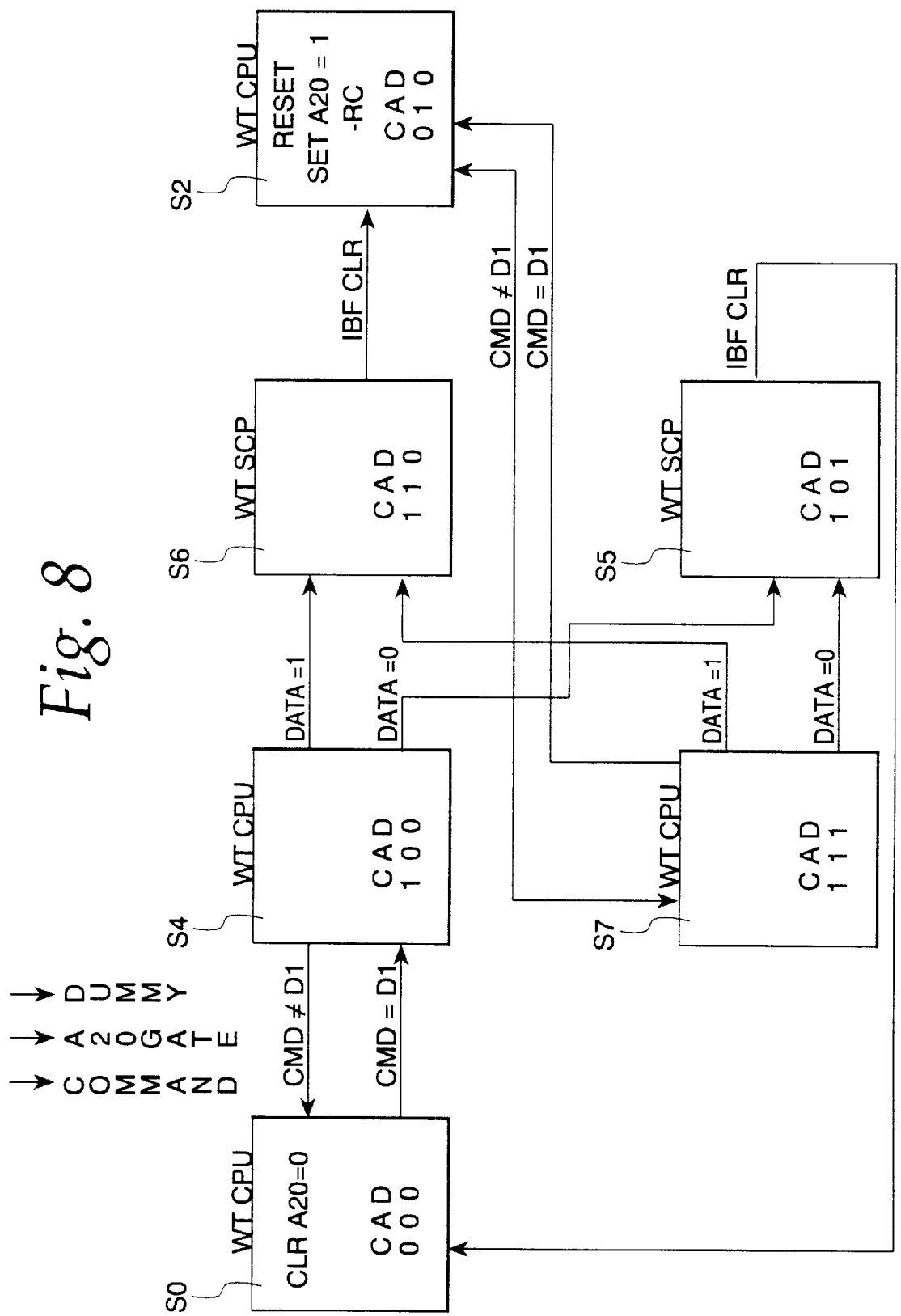
FIG. 8 is a state diagram of the A20 signal control logic in accordance with the present invention.
Figure 9:
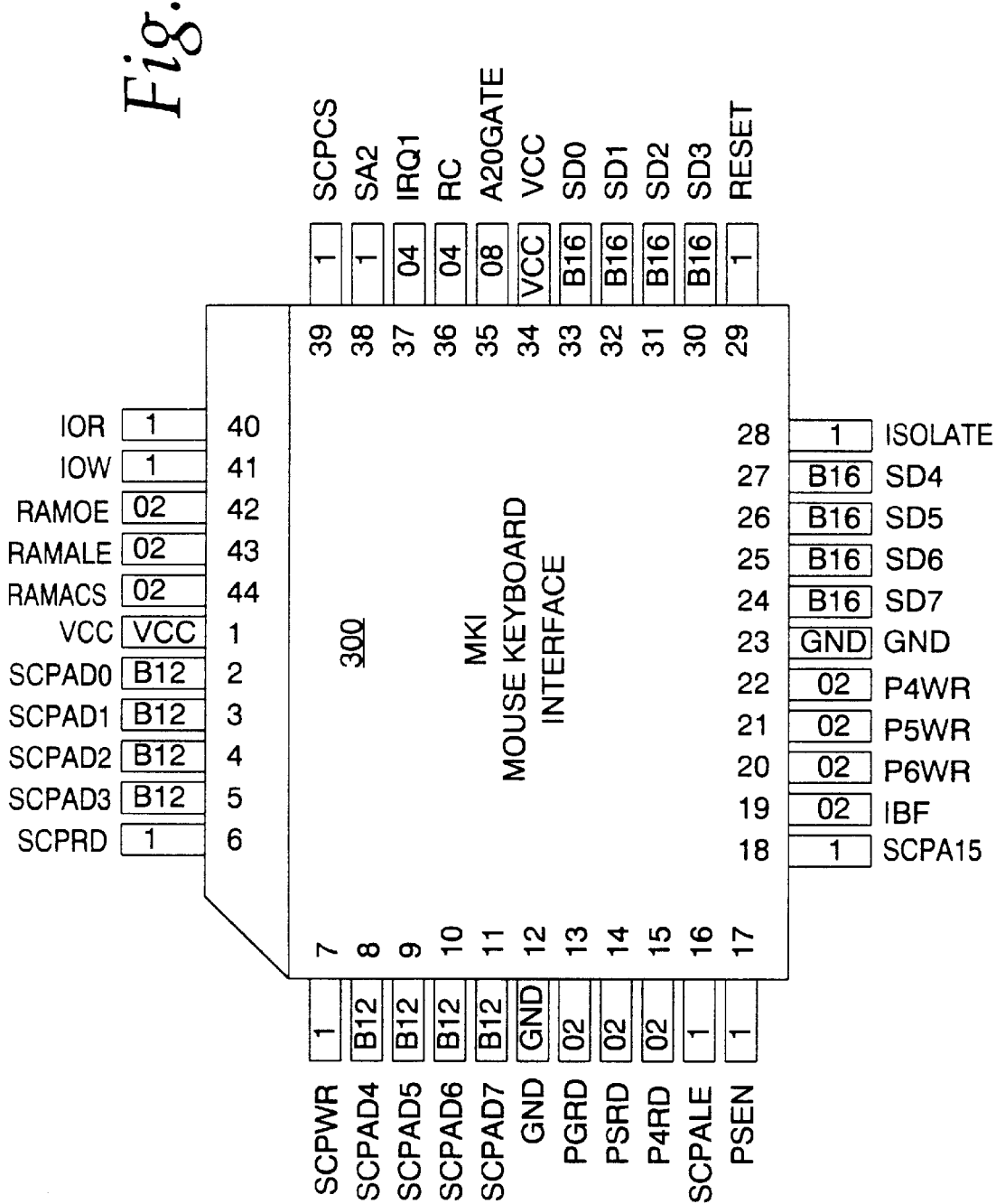
FIG. 9 is a pin-out diagram for the SCPI in accordance with the present invention.

In order to better understand the system, a state diagram for the A20 signal logic is provided in FIG. 8. The states refer to the states of the command flip-flop 150, the A20 signal flip-flop 168 and a dummy flip-flop 170, respectively. The dummy flip-flop 170 is required because of the number of states. The states in FIG. 8 are numbered for the states of these flip-flops. For example, state 7 (binary 111) represents that the flip-flops 150, 168 and 170 are all set.

The system starts in state 0 where the flip-flops 150, 168 and 178 are all clear. The system then proceeds to state 4 where the command flip-flop 150 is set as discussed above. Once the command flip-flop 166 is set, the system waits for the data byte from the CPU to either set or reset the gate A20. When the system data byte is received and the gate A20 is set as discussed above, the system proceeds to state 6. In this state, both the command flip-flop 150 and the gate A20 flip-flop 162 have previously been set. An important feature of the invention relates to the fact that there was no waiting from the time the data byte was received from the CPU to set the gate A20. This greatly enhances the speed at which the gate A20 is set by the CPU.

The output of a NAND gate 172 is representative of state 6. The NAND gate 172 receives a signal (COMMAND)

from the command flip-flop 150 and an A20 signal from the A20 signal flip-flop 168. Also applied to the NAND gate 172 is a signal VCC and a signal from the dummy flip-flop 170, which is clear at state 6.

After state 6, the system can only proceed to state 2 wherein the command flip-flop 150 is cleared. The command flip-flop 150 is cleared once the SCP 26 reads the data out of the input buffer 30. This is accomplished by NAND gates 174 and 176 and NOR gates 178 and 180. More specifically, a signal representative of state 6 (–STATE6) is applied to an inverting input of the NAND gate 174. An input buffer read signal (–INBUFRD) is applied to another inverting input of the NAND gate 174. The output of the NAND gate 174 indicates that the SCP 26 has read the data in the input buffer 30. The output of the NAND gate 174 is applied to an inverting input of a NOR gate 178. The output of the NOR gate 178 is applied to an inverting input of the NOR gate 180. The output of the NOR gate 180 is representative of a command reset signal (–CMDRST) which is applied to the clear input (CLR) of the command flip-flop 150. This signal (CMDRST) thus resets the command flip-flop 150 once the SCP 26 has read the data byte in the input buffer 30. once this occurs, the system proceeds to state 2.

In state 2, the command flip-flop 166 and the dummy flip-flop 170 remain clear and the A20 signal flip-flop 168 remains set. The system sits in state 2 waiting for another command from the CPU. If another command is received, the system proceeds to state 7 where the command flip-flop 150 is set. In state 7, the system waits for a data byte from the CPU to indicate what is to be done with gate A20. Once the data is received, the dummy flip-flop 170 is set. More specifically, a command signal (COMMAND) from the command flip-flop 150 is applied to an AND gate 182 representing that the command flip-flop 156 has been set. A signal (–SA2) is applied to another input of the AND gate 182. The (–SA2) signal represents that a CPU command was written to address 64H. A signal (–SD1) is also applied to the AND gate 182 generated by way of an inverter 184. The output of the AND gate 182 is applied to one input of the OR gate 184. The output of the OR gate 184 is applied to the D input of the dummy flip-flop 170. An (–IBCLK) signal is applied to the clock input (CLK) of the dummy flip-flop 170. The (–IBCLK) signal is a decode and indicates that the CPU has written to either address 60H or 64H. Thus, the dummy flip-flop 170 is set in state 7 after a command has been written by the CPU to the command flip-flop 150.

The dummy flip-flop 170 may also be set by an AND gate 186. More specifically, the output of the AND gate 186 is applied to another input of the OR gate 184. The AND gate 186 has three inputs. One input is from the A20 signal flip-flop 168. A second input is from the NAND gate 164 which indicates that the CPU has written a command D1. The last input is an SA2 signal which indicates that the command was written to address 64H. Thus, the AND gate 186 will be enabled any time the gate A20 has been set and a command has been written to address 64H by the CPU. Once the system is in state 7, if data is received indicating that the gate A20 flip-flop 168 is to be disabled, the system proceeds to state 5. In state 5, the command flip-flop is cleared, the dummy flip-flop remains set and the A20 signal flip-flop 168 is cleared.

A signal representative of state 5 is generated by a NAND gate 188. Signals from the dummy flip-flop 170, the A20 signal flip-flop 168 (–A20 GATE), the command flip-flop 150 (COMMAND) and VCC are applied to the input of the NAND gate 188. The output of the NAND gate 188 is a signal (–STATE5) which is applied to the NAND gate 176 to clear the command flip-flop 150 when the system is in state 5.

The A20 signal flip-flop 168 is cleared by the system data bit SD1 which is applied to the D input of the flip-flop 168. If the SD1 signal is low, the A20 signal flip-flop 168 is cleared. The bit SD1 is strobed into the flip-flop 168 by a NAND gate 190. A signal (–COMMAND) is applied to an inverting input of the NAND gate 190 from the command flip-flop 150. A signal (–DATA CLK) is applied to another inverting input of the NAND gate 190. The (–DATA CLK) is generated by a NAND gate 192. A signal SA2 is applied to one inverting input of the NAND gate 192 while a signal (–IBCLIC) is applied to another inverting input to strobe the A20 signal flip-flop 168 any time the CPU writes data to address 60H.

After state 5, the system proceeds back to state 0 where the command flip-flop 150 and the dummy flip-flop 170 are cleared. The command flip-flop 150 is cleared automatically in state 5 when the input buffer flag IBF is cleared. More specifically, once the SCP reads the input buffer 30, an input buffer read signal (–INBUFRD) is generated. This signal (INBUFRD) and a state 5 signal (–STATE5) are applied to inverting inputs of the NAND gate 176. The output of the NAND gate 176 is applied to an inverting input of the NOR gate 178 which clears the command flipflop 150. The output of the NAND gate 176 is also applied to an inverting input of a NOR gate 208. The output of the NOR gate 208 is applied to the clear input (CLR) of the dummy flip-flop 170. Thus, the command flip-flop 150 and the dummy flip-flop 170 will be cleared in state 5 and the system will return to state 0 where the command flip-flop 150, the A20 gate flip-flop 168 and the dummy flip-flop 170 are all clear.

The SCP 26 can also gain control of the gate A20 flip-flop 168 through memory map. Specifically, a write to address 000AH by the SCP 26 can clear the A20 signal flip-flop 168. More specifically, a signal representative of these addresses (–000H) is applied to an inverting input of NAND gate 194. A SCP write signal (–SCPWR) is applied to another inverting input of the NAND gate 194. The output of the NAND gate 194 is applied to the clear input (CLR) of the A20 signal flip-flop 168 to enable the SCP 26 to clear the signal.

The SCP 26 can set the A20 signal by writing to address 000BII. Specifically, the address signal (–000BH) is applied to an inverting input of a NAND gate 196 along with an SCP write signal (–SCPWR). The output of the NAND gate 196 is applied to an inverting input of a NOR gate 198 whose output is tied to the present input (PRE) of the A20 signal flip-flop 168.

The SCP 26 can also read the status of the gate A20 flip-flop 168 by reading address 000AH. Specifically, a signal representative of the system control processor read signal (–SCPRD) is applied to an inverting input of a NAND gate 202. A signal representative of an address signal (–000AH) is applied to another inverting input. The output of the NAND gate 202 is applied to a tristate device 204 to allow the data from the gate A20 flip-flop to be placed on the system control processor address data bus bit SCPAD 1 to be read by the SCP 26.

The gate A20 can also be set active by the SCPI 28 when a command is received to set slow reset active or the SCPI is reset by the reset pin. More specifically, a reset signal and a slow reset signal (–RC) are applied to a NOR gate 206. The output of the NOR gate 206 is applied to an inverting input of the NOR gate 208 which clears the dummy flip-flop 170. The output of the NOR gate 206 is also applied to one input of the NOR gate 198 which sets the gate A20 flip-flop 168. The output of the NOR gate 206 is also applied to an inverting input of the NOR gate 178 which, in turn, is connected to the NOR gate 180 which clears the command flip-flop 150.

An SCP write to either address 000AH or 000BH clears the command flip-flop 150. More specifically, the output of the NAND gates 194 and 196 are applied to inverting inputs of a NOR gate 200. The output of the NOR gate 200 is applied to an inverting input of the NOR gate 180. The output of the NOR gate 180 is applied to the clear input (CLR) of the command flip-flop 150.

RESET

A reset signal (-RESET) from the CPU is used to reset the system. Specifically, the reset signal is applied to an inverting input of the NOR gate 206 which clears the command flip-flop 150, the A20 signal flip-flop 168 and the dummy flip-flop 120. The reset signal is also applied to the clear input (CLR) of the flip-flop 86 to clear the interrupt signal IRQ1. Reset signals are also used to clear the input buffer 30, output buffer 32, the status register 34, the input buffer full flag flip-flop 98 and the output buffer full flag flip-flop 114.

ISOLATE

An isolate signal is an active low input signal to tristate certain signals on the SCPI 28 in the event that the SCP 26 and SCPI 28 are used in a manner where the rest of the system is not powered, for example, during battery charging of a portable battery powered converter. Tristating the pins identified in TABLE IV below can avoid problems to the SCP 26.

TABLE IV

The pins in the SCPI that get tristated are as follows:

| SCPAD 0:7 | IRQ1 | P4WR |
|---|---|---|
| -IBF | A20 gate | P4RD |
| SD 0:7 | SLOWRST | P5WR |
| -RAMOE | -RAMCS | P5RD |
|  | -RAMALE | P6WR |
|  |  | P6RD |

MOUSE KEYBOARD INTERFACE (MKI)

An important distinction between the SCPI 28 and the MKI is that the MKI does not need to interrupt the SCP 26 to allow the CPU to control the A20 signal. Consequently, the MKI allows for relatively faster switching of the A20 signal than the SCPI 28. More specifically, as described above, the CPU controls the A20 signal with a 2-byte sequence from the CPU to the input buffer 30. The first byte is a command byte D1 written to the address 64H. In the previous embodiment utilizing the SCPI 28, after the CPU writes the command byte, the Input Buffer Full (IBF) flag is set in the status register 34. This IBF flag is used to interrupt the SCP 26. After the SCP 26 reads the command byte D1H, the IBF full flag is cleared, which allows the CPU to write the second byte to the input buffer 30 which also requires processing by the SCP 26. As discussed above, the bit SD1 in the second byte determines whether the A20 signal is to be set or cleared.

With such a system, there is inherently a certain amount of delay after a byte is written to the input buffer 30 until the SCP 26 can retrieve the command data bytes. The MKI allows for faster switching of the A20 signal by recognizing the command and data bytes from the CPU, thus eliminating the need to interrupt the SCP 26 which may be busy with other tasks. Since no interrupt is generated after the command byte D1H, the CPU can immediately send the data byte without waiting for the SCP 26 to read the input buffer 30. The MKI can also recognize the data byte, thus eliminating the processing time of the SCP 26.

As illustrated in FIG. 10, the MKI, generally identified with the reference numeral 300, also allows the SCP 20 (FIG. 1) to be replaced with a relatively faster SCP 26, such as an Intel 8051 or other microprocessor that emulates a type Intel 8042 microprocessor to maintain IBM compatibility with type PC/AT machines. The MKI 300 is connected between the PC/AT system bus 40 and the SCP 26.

Figure 12B:
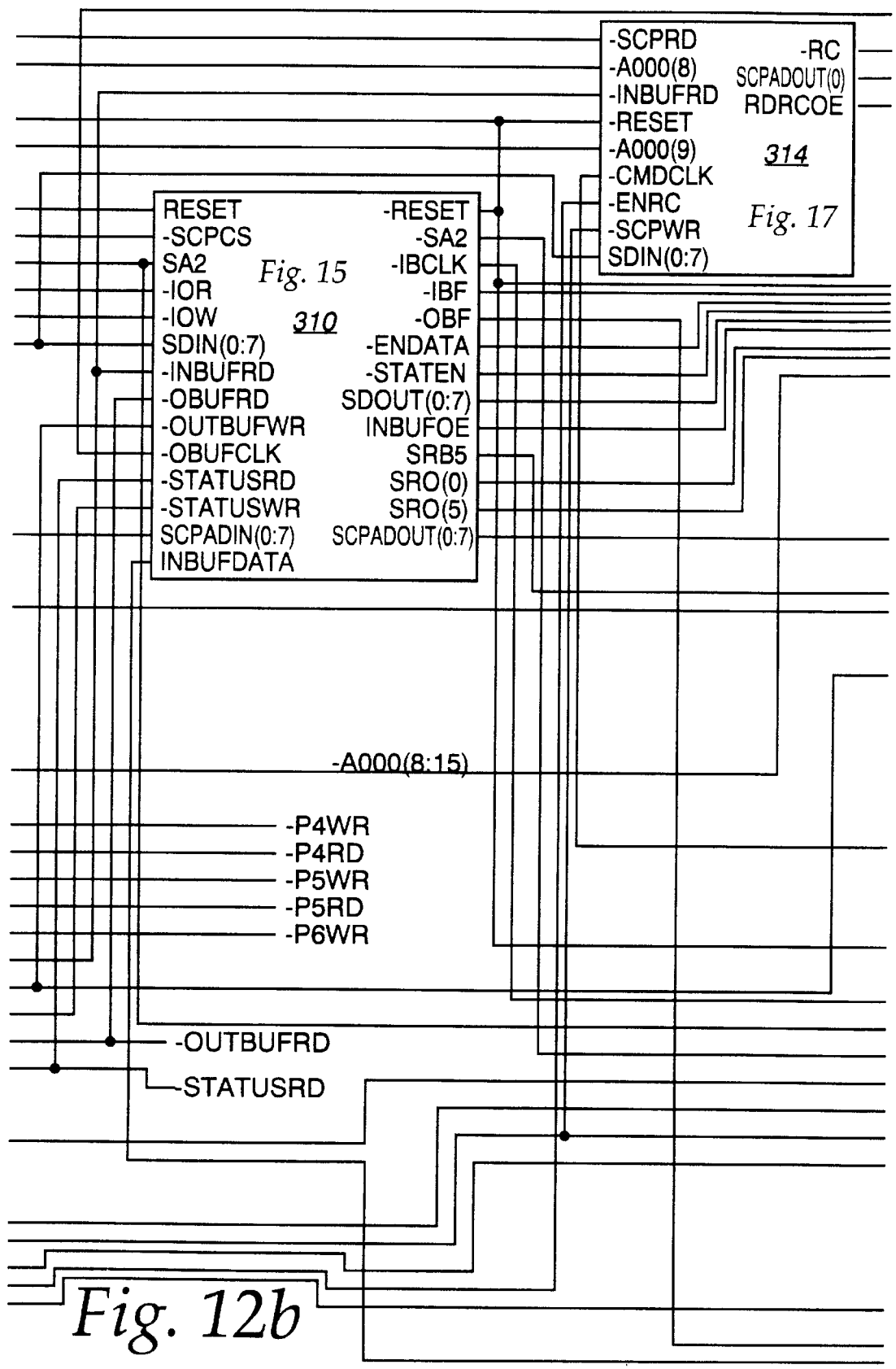
Figure 14A:
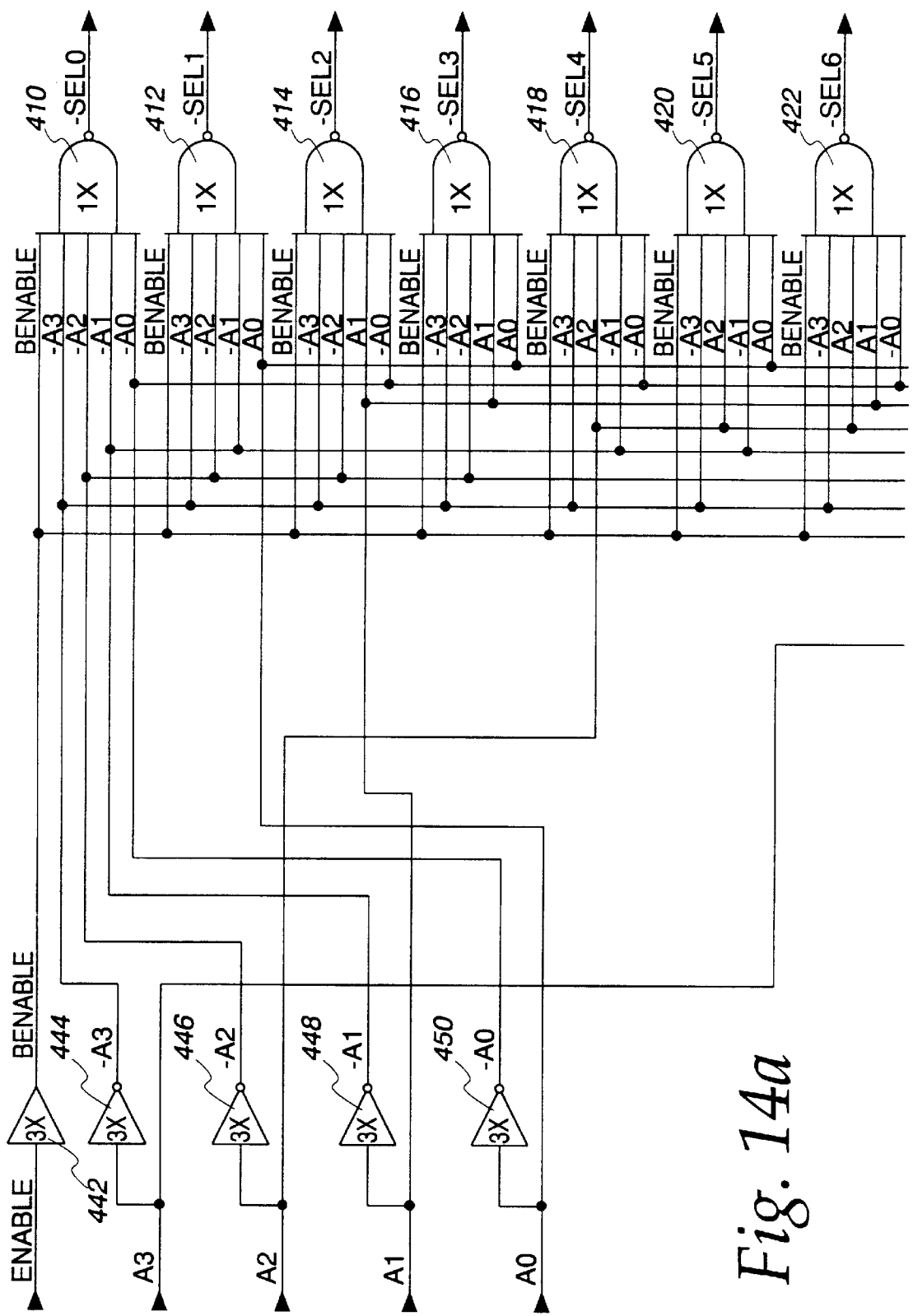
FIGS. 14A and 14B are a schematic diagram of an address decode circuit in accordance with the present invention.
Figure 14B:
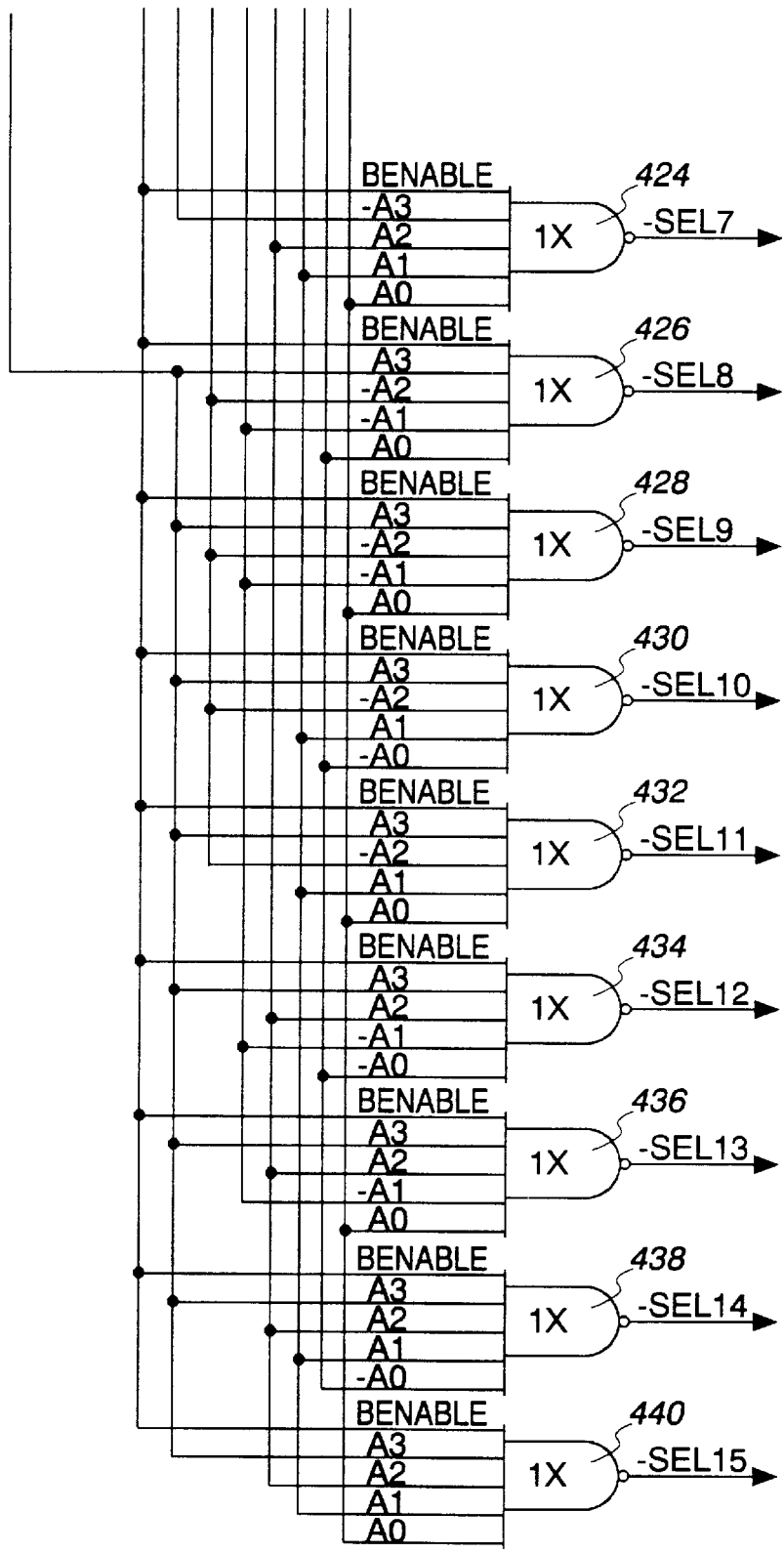
Figure 15A:
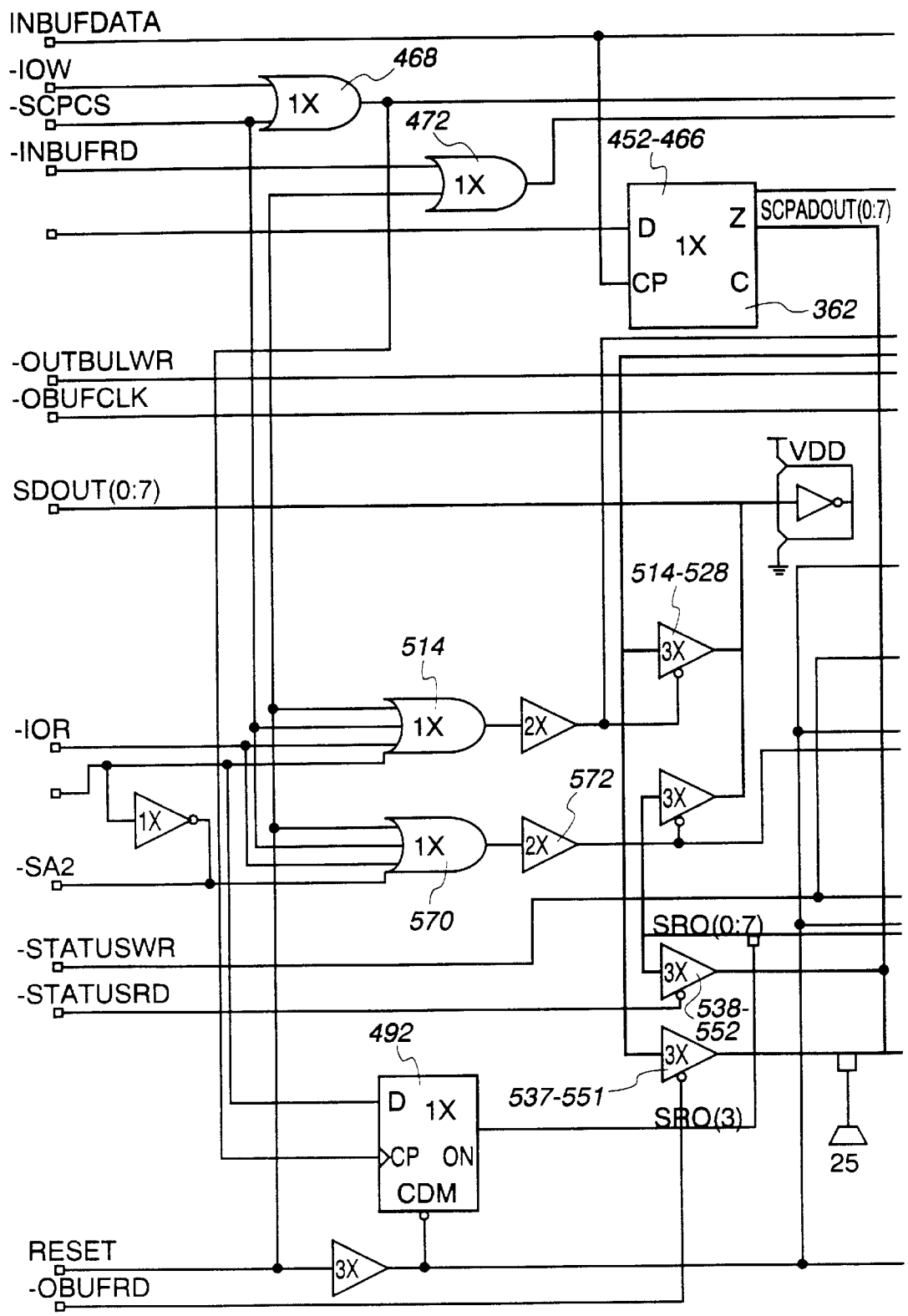
FIGS. 15A and 15B are a schematic diagram of the CPU interface logic in accordance with the present invention.
Figure 15B:
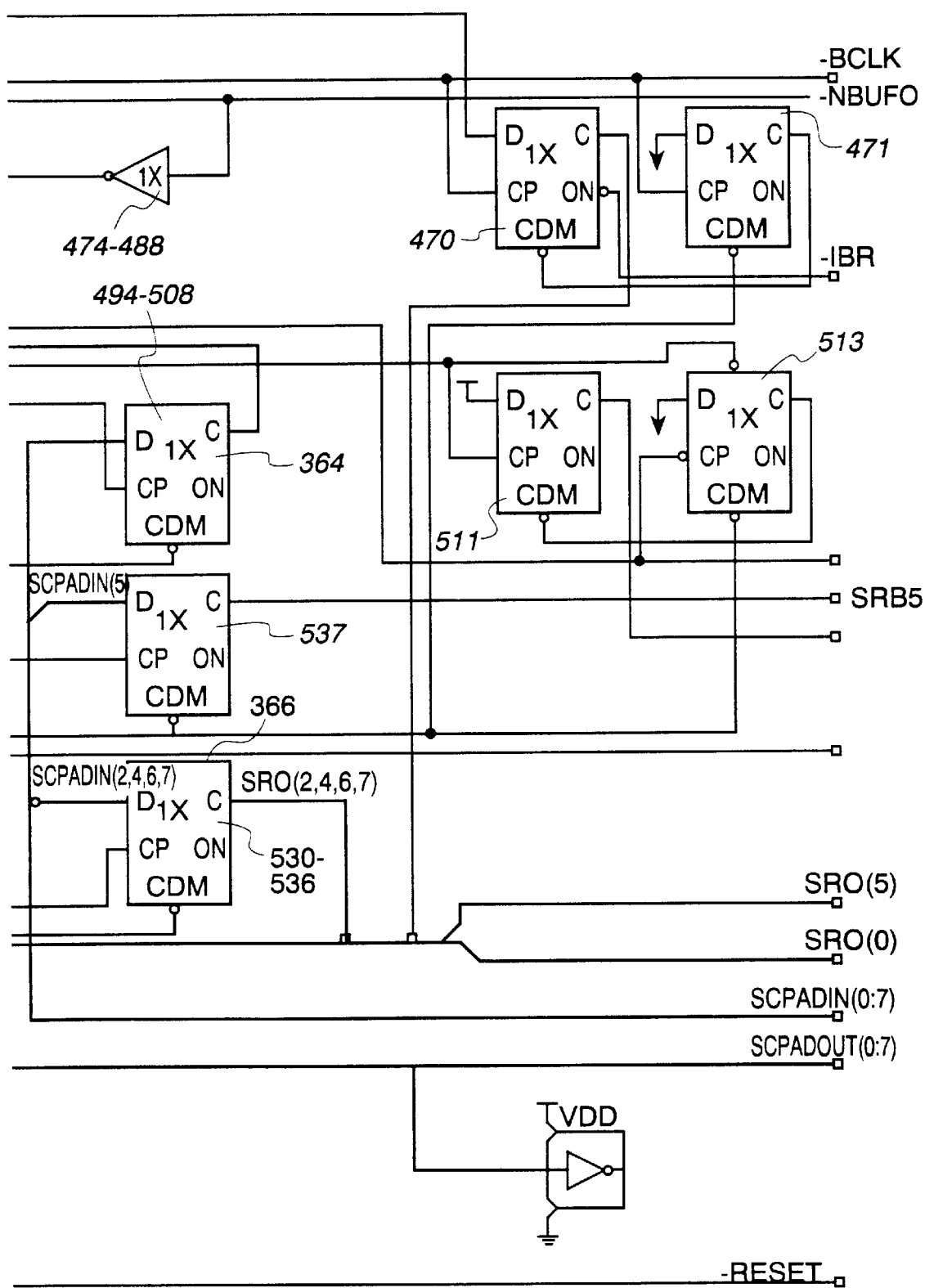

Similar to the SCPI 28, the MKI 300 allows communication between the CPU and the SCP 26 by way of three registers; an input buffer, an output buffer and a status register (FIG. 15). As shown in FIG. 12 and discussed below, the MKI 300 further includes address decode and RAM control logic 308 (FIGS. 13–14), CPU interface logic 310 (FIG. 15), gate A20 control logic 312 (FIG. 16), Slow Reset logic 314 (FIG. 17) and IR12 control logic 316 (FIG. 18).

MKI PIN DESCRIPTION

The MKI 300 is a forty-four pin integrated circuit as illustrated in FIGS. 11–19, which may be formed as a gate array, such as by VLSI Technologies Inc. Pin descriptions are provided in TABLE V.

| PIN NO | TYPE | NAME | PIN DESCRIPTION |
|---|---|---|---|
| \multicolumn{4}{c}{CPU Interface} | | | |
| 29 | I | RESET | Hardware reset of MKI |
| 41 | I | -IOW | CPU I/O Write Strobe |
| 40 | II | -IOR | CPU I/O Read Strobe |
| 39 | I | -SCPCS | Decode of SA <9:0>. Provide an active signal when an access to 062H–06EH (even) happens |
| 38 | I | SA2 | System Address Bus Bit 2 |
| 4, 5, 8, 9, 26, 25, 27, 30, 31 | B | SD0:7 | System Data Bus Bits 0–7 |
| 37 | O | IRQL | Keyboard Interrupt |
| 35 | O | IRQ12 | Auxiliary Keyboard Interrupt |
| 22 | O | A20 GATE | Enable access to the memory above 1 Megabyte |
| 15 | O | -SLOWRST | System Processor reset |

TABLE V

| PIN NO. | TYPE | NAME | PIN DESCRIPTION |
|---|---|---|---|
| \multicolumn{4}{c}{External RAM Control} | | | |
| 42 | O | -RAMCS | RAM Chip Select |
| 44 | O | -RAMOE | RAM Output Enable |
| 43 | O | RAMALE | RAM Address Latch Enable |
| \multicolumn{4}{c}{SCP Interface} | | | |
| 18 | I | SCPA15 | A15 from the SCP Processor |
| 2, 3, 10, 11, 24, 25, 32, 33 | B | SCPAD0:7 | Multiplexed address data bus from the SCP |
| 16 | I | SCPALE | Address Latch Enable for SCPAD0:7 |
| 6 | I | -SCPRD | Memory Read Strobe |
| 7 | I | -SCPWR | Memory Write Strobe |
| 17 | I | -PSEN | Program Store Enable. Read strobe to external Program Memory |
| 19 | O | -IBF | Input Buffer Full. Interrupt to SCP when the CPU has written to the Input Buffer |
| \multicolumn{4}{c}{External Port Control} | | | |
| 14 | O | -P4WR | Port 4 Write. Used to clock SCPAD0:7 into 8 external |

TABLE V-continued

| PIN NO. | TYPE | NAME | PIN DESCRIPTION |
|---------|------|------|-----------------|
|  |  |  | flip-flops. Provides 8 extra outputs for the SCP |
| 13 | O | –P4RD | Port 4 Read. Output enable a buffer to SCPAD <0:7> to provide 8 inputs |
| 20 | O | –P5WR | Port 5 Write. Used to clock SCPADO:7 into 8 external flip-flops. Provides 8 extra outputs for the SCP |
| 21 | O | –P5RD | Port 5 Read. Output enable a buffer to SCPAD <0:7> to provide 8 inputs |
| 36 | O | –P6WR | Port 6 Write. Used to clock SCPADO:7 into 8 external flip-flops. Provides 8 extra outputs for the SCP. |
| Power and Ground | | | |
| 28 | I | –ISOLATE | In the event the SCP is operating while the rest of the unit is not powered, this signal will isolate the rest of the signals |
| 1, 34 |  | VCC | Power Supply |
| 12, 23 |  | GND | Ground |

The required output current driving capabilities of the pins are listed in TABLE VI.

TABLE VI

| SCPAD <0:7> | 12 mA |
|---|---|
| SD <0:7> | 16 mA |
| IRQ1 | 4 mA |
| IRQ12 | 4 mA |
| –SLOWRST | 4 mA |
| A20 GATE | 12 mA |
| –IBF | 2 mA |
| –RAMCS | 2 mA |
| –RAMOE | 2 mA |
| RAMALE | 2 mA |
| –P4WR | 8 MA |
| –P4RD | 8 mA |
| –P5WR | 8 mA |
| –P5RD | 8 mA |
| –P6WR | 8 mA |

CONTROL LOGIC

Figure 11B:
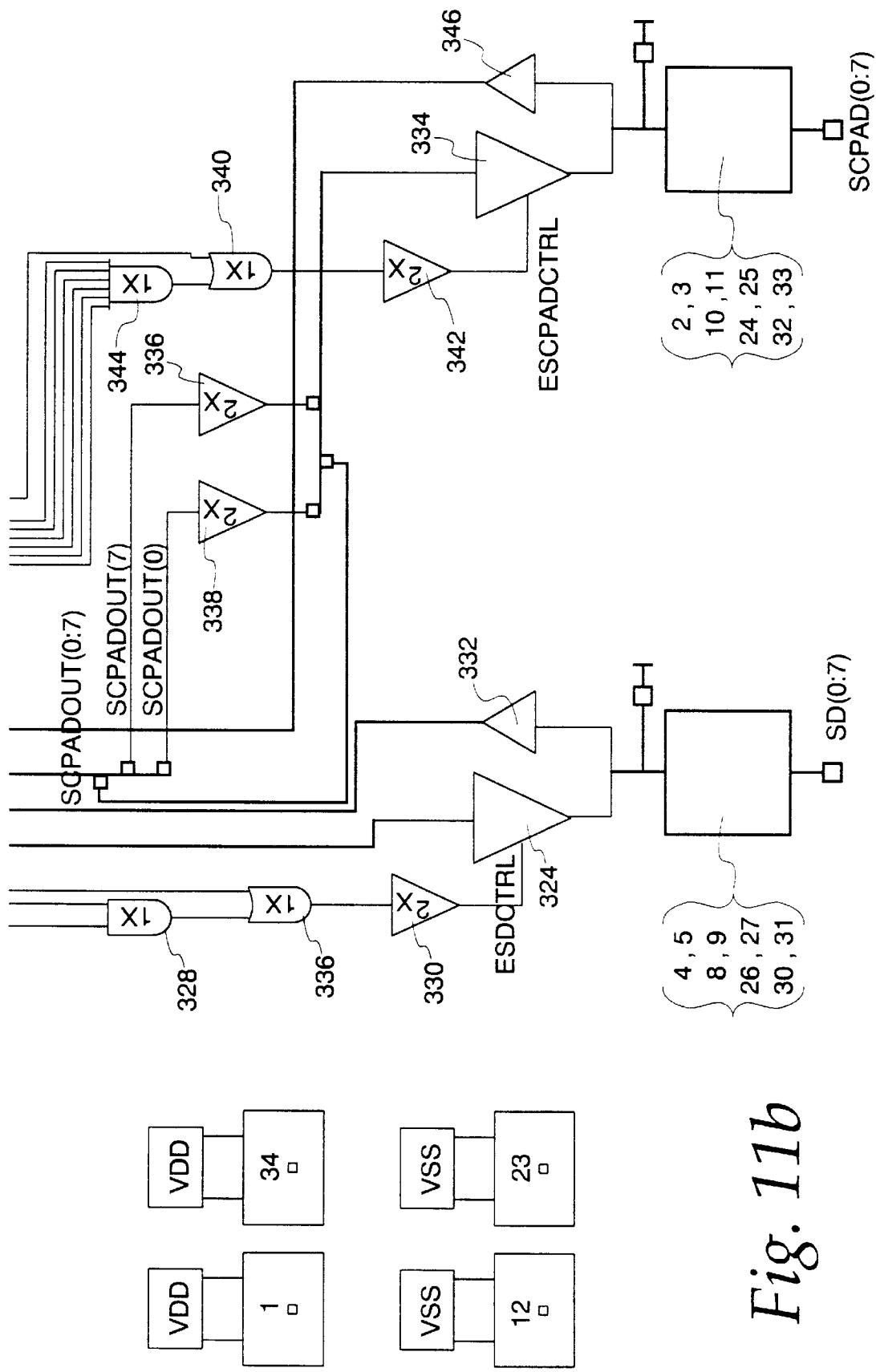

Referring to FIG. 11, a VLSI top level block diagram is shown. As shown, pins 6, 7, 16, 17, 18, 28, 29, 38, 39, 40 and 41 are unidirectional input pins connected to the control logic, generally identified with the reference numeral 318 by way of buffers 320. Pins 13, 14, 15, 19, 20, 21, 22, 35, 36, 37, 42, 43 and 44 are unidirectional output pins with tristate outputs connected to the control logic 318 by way of tristate devices 322. The tristate devices 322 are controlled by an ISOLATE signal which places the output pins in a high impedance state during a test mode.

Pins 1 and 34 are power supply pins while pins 12 and 23 are for ground. The remainder of the pins 2, 3, 4, 5, 8, 9, 10, 11, 24, 25, 26, 27, 30, 31, 32 and 33 are bidirectional. Pins 4, 5, 8, 9, 26, 27, 30, 31 relate to the system data bus SD [0:7], while pins 2, 3, 10, 11, 24, 25, 32 and 33 relate to the SCP address/data bus SCPAD [0:7]. Each of these buses are split into two buses, internal to the MKI 300, to provide the bidirectional capability. More specifically, as shown in FIG. 11, within the MKI 300, the system data bus SD [0:7] is comprised of input bus SDIN [0:7] and an output bus SDOUT [0:7]. The internal system data output bus SDOUT [0:7] is connected to the system data bus output pins SD [0:7] (e.g., pins 4, 5, 8, 9, 26, 27, 30 and 31) by way of tristate devices 324. The tristate devices 324 are under the control of an OR gate 326 and an AND gate 328. The OR gate 326 is a two input OR gate. An ISOLATE signal is applied to one input to place the system data bus SD [0:7] in a high impedance state during a certain mode of operation. More specifically, the ISOLATE signal is an active low input signal to tristate certain signals on the MKI 300 during certain conditions, such as during battery charging in a portable. During all other modes of operation, the tristate devices 324 are under the control of the AND gate 328. Two signals ENDATYK and STATEN, discussed below, which are generated during read operations by the CPU, are used to enable the system data output bus SDOUT [0:7] by way of a plurality of buffers 330. The internal system data input bus SDIN [0:7] is connected to the system data bus SD [0:7] by way of buffers 332.

Similarly, the system control processor address/data bus SCPAD [0:7], available at pins 2, 3, 10, 11, 24, 25, 32 and 33, is split into two internal buses SCPADOUT [0:7] and SCPADIN [0:7]. The internal SCPADOUT [0:7] bus is connected to the pins 2, 3, 10, 11, 24, 25, 32 and 33 by way of tristate devices 334. More specifically, bits SCPADOUT [2:7] are applied directly to the tristate devices 334, while bits SCPADOUT [0] and SCPADOUT [1] are tied to the tristate devices 334 by way of buffers 336 and 338, respectively. The tristate devices 334 are under the control of an OR gate 340 whose output is tied to the tristate device 334 by way of a plurality of buffers 342. One input to the OR gate 340 is the ISOLATE signal to tristate the SCPADOUT [0:7] bus during certain modes of operation, as discussed above. In all other modes of operation, the tristate devices 334 are under the control of an AND gate 344 whose output is applied to the input of the OR gate 340. The AND gate 344 is a six input AND gate 344. The signals –RDRCOE (FIG. 17), –A20RD (FIG. 16), –STATUSRD (FIG. 13), –OUTBUFRD (FIG. 13), –INBUFOE (FIG. 15) and –ENFESTS (FIG. 18) are applied to the AND gate 344 to control the tristate devices 342 during read operations of the SCPADOUT [0:7] bus, as will be discussed below. The SCPADIN [0:7] bus is tied to the output pins by way of the buffers 346.

SCP INTERFACE

The SCP 26 interface to the MKI 300 is accomplished through a memory mapping scheme using the Intel 8051 microprocessor external address/data bus SCPAD [0:7]. The MKI 300 allows the SCP 26 to communicate with the CPU, as well as external ports through memory mapping. Additionally, the SCP 26 is adapted to control the gate A20 signal, as well as the slow reset and interrupt signals IRQL and IRQ12. An SCP memory map is illustrated in TABLE VIII. A description of the SCP memory map is provided in TABLE VII.

TABLE VII

SCP Memory-Map Description

0000H: SCP to CPU Interface: Output Buffer/Input Buffer
Write: The SCP can write a byte to the Output Buffer at this location. The Output Buffer Full signal (OBF) is pulled active at the end of the write cycle.
Read: The SCP can read the contents of the Input Buffer at this location. The Input Buffer Full signal (IBF) is cleared at the end of the read cycle.

0001H: SCP to CPU Interface: Output Buffer/Input Buffer
Write: The SCP can write a byte to the Status Register at this location. Bits 0 (OBF), 1 (IBF), and 3 (CMD/DATA) are not written by the SCP, but are generated internal to the MKI.
Read: The SCP can read the contents of the Input Buffer at this location. The Input Buffer Full signal (IBF) is cleared at the end of the read cycle. This is the same as a read to 0000H.
0002H: SCP to External Port Interface: (P4.0–4.7)
Write: A byte can be written to external flip-flops at this location to provide eight more output pins for the SCP.
Read: A byte can be read from an external buffer at this location to provide eight more input pins to the SCP.
0003H: SCP to External Port Interface: (P5.0–5.7)
Write: A byte can be written to external flip-flops at this location to provide eight more output pins for the SCP.
Read: A byte can be read from an external buffer at this location to provide eight more input pins to the SCP.
0004H: SCP to External Port Interface: (P6.0–6.7)
Write: A byte can be written to external flip-flops at this location to provide eight more output pins for the SCP.
Read: Not used.
0005H: SCP to CPU Interface: IRQ1
Write: IRQ1 can be enabled or disabled with a write to this location using the SCP data bit 0.
  SCPAD0=1=>Enable IRQ1
  SCPAD0=0=>Disable IRQ1
Read: Not used.
0006H: SCP to SCP Interface: Output Buffer
Write: Not used.
Read: The value that the SCP wrote into the Output Buffer can be read back here.
0007H: SCP to SCP Interface: Status Register
Write: Not used.
Read: The value that the SCP wrote into the Status Register can be read back here. Bits 0, 1 and 3 are the signals OBF, IBF, and CMD/DATA respectively; they were not written by the SCP but are generated internally.
0008H: SCP to CPU Interface: Slow Reset
Write: A write to this location forces the Slow Reset signal low (active).
Read: The Slow Reset signal can be read back at this location in the SCP data bit 0 (SCPAD0).
0009H: SCP to CPU Interface: Slow Reset
Write: A write to this location forces the Slow Reset signal high (inactive).
Read: Not used.
000AH: SCP to CPU Interface: gate A20
Write: A write to this location forces the gate A20 signal low (inactive).
Read: The gate A20 signal can be read back at this location in the SCP data bit 1 (SCPAD1).
000BH: SCP to CPU Interface: gate A20
Write: A write to this location forces the gate A20 signal high (active).
Read: Not used.
000CH: SCP to CPU Interface: gate A20 & Slow Reset
Write: The automatic MKI generation of gate A20 and Slow Reset can be enabled or disabled at this location. The default on Reset is both enabled.
  SCPAD1=1=>Enable gate A20
  SCPAD1=0=>Disable gate A20
  SCPAD0=1=>Enable Slow Reset
  SCPAD0=0=>Disable Slow Reset
Read: Not used.

000DH: SCP to CPU Interface: Auxiliary Output Buffer write
Write: When the SCP writes to this address the data will be written into the Output Buffer and the Auxiliary Output Buffer Full (AOBF) bit (bit 5) and the OBF bit (bit 0) of the Status Register will be set. The OBF is cleared when the CPU reads the Output Buffer, and the AOBF stays set until the SCP writes to the output Buffer through the address 0000H.
Read: The SCP can read back some of the flip-flops in the MKI here. This support is added to help with any Suspend/Resume function that is active in the computer. The byte reads back as:
  SCPAD7=>Command D1 received.
  SCPAD6=>IRQ1 Enable.
  SCPAD5=>IRQ12 Enable.
  SCPA04=>Mouse Output Buffer Full.
  SCPAD3=>Auxiliary Output Buffer Full.
  SCPAD2=>MKI Function Enabled.
  SCPAD1=>Not used.
  SCPAD0=>Not used.
000EH: SCP to CPU Interface: IRQ12
Write: IRQ12 can be enabled or disabled with a write to this location using the SCP data bit 0.
  SCPAD0=1=>Enable IRQ12
  SCPAD0=0=>Disable IRQ12
Read: Not used.
000FH: SCP to CPU Interface: MKI Enable
Write: This address is used to enable or disable the MKI features. When enabled the MKI SCPI will not generate an IBF on a CPU write of the command "D1" or the following data. When disabled the chip will function the same as the SCPI, with an IBF generated on all CPU writes of the Input Buffer. The default on Reset is disabled.
  SCPAD0=1=>Enable MKI feature.
  SCPAD0=0=>Disable MKI feature.
Read: Not used.
8000H–FFFFH: SCP to External RAM Interface.
Write: Write external RAM (program &/or data).
Read: Read from external Program/Data memory.

TABLE VIII

SCP MEMORY MAP

| | |
|---|---|
| | I0000H |
| External RAM for Program/Date Storage. 32k bytes max. | 8000H |
| MKI Feature: Enable/Disable generation of IBF for a CPU write of command 'D1' and the data.<br>SCPAD0 = 1 = > Enable<br>SCPAD0 = 0 = > Disable | 000FH |
| IR012: Enable/Disable IR012<br>SCPAD0 = 1 = > Enable<br>SCAPD0 = 0 = > Disable | 000EH |
| Auxiliary Output Buffer: Write a byte to the output buffer and set the Auxiliary Output Buffer Full, and OBF bits of the Status Register. Read back information from the chip flip-flops. | 000DH |
| Gate A20 & Slow Reset: Enable/Disable automatic generation of the gate A20 and slow reset signals. | 000CH |
| Gate A20: A Write to this Location forces the A20 signal high (active). | 000BH |
| Gate A20: A Write to this Location forces the A20 signal low (inactive). A Read at this location returns the value of A20 in SCPAD1. | 000AH |
| Slow Reset: A Write to this location forces the –RC signal high (inactive). | 0009H |

TABLE VIII-continued

SCP MEMORY MAP

| | |
|---|---|
| Slow Reset: A Write to this location forces the −RC signal low (active). A Read at this Location returns the value of −RC in SCPAD0. | 0008H |
| Status Register: The Status Register can be read back at this location. SCPAD <0:7>. | 0007H v |
| Output Buffer: The Output Buffer can be read back at this Location. SCPAD <0:7>. | 0006H |
| IRQ1: Enable/Disable IRQ1. SCPAD0 = 1 = > Enable SCPAD0 = 0 = > Disable | 0005H |
| Port 6: Write External Port #6 (6.0–6.7) | 0004H |
| Port 5: Read/Write External Port #5 (5.0–5.7) | 0003H |
| Port 4: Read/Write External Port #4 (4.0–4.7) | 0002H |
| Status Register: Write a byte to the Status Register Input Buffer: Read the byte out of the Input Buffer. | 0001H |
| Output Buffer: Write a byte to the Output Buffer. Input Buffer: Read the byte out of the Input Buffer. | 0000H |

Thirty-two kilobytes of external RAM 348 (FIG. 10) can be accessed by the SCP 26 between addresses 8000H–FFFFH. Since the SCP address bit SCPA 15 will only be high or a logical 1 for addresses 80000H and above, this bit SCPA 15 is used to determine whether the SCP 26 access is a MKI 300 access or a RAM 348 access. If external RAM 348 is not used, the bit SCPA [15] can be tied low, thus allowing all external memory accesses by the SCP 26 to be to the MKI 300.

ADDRESS DECODE AND RAM CONTROL LOGIC

Figure 13A:
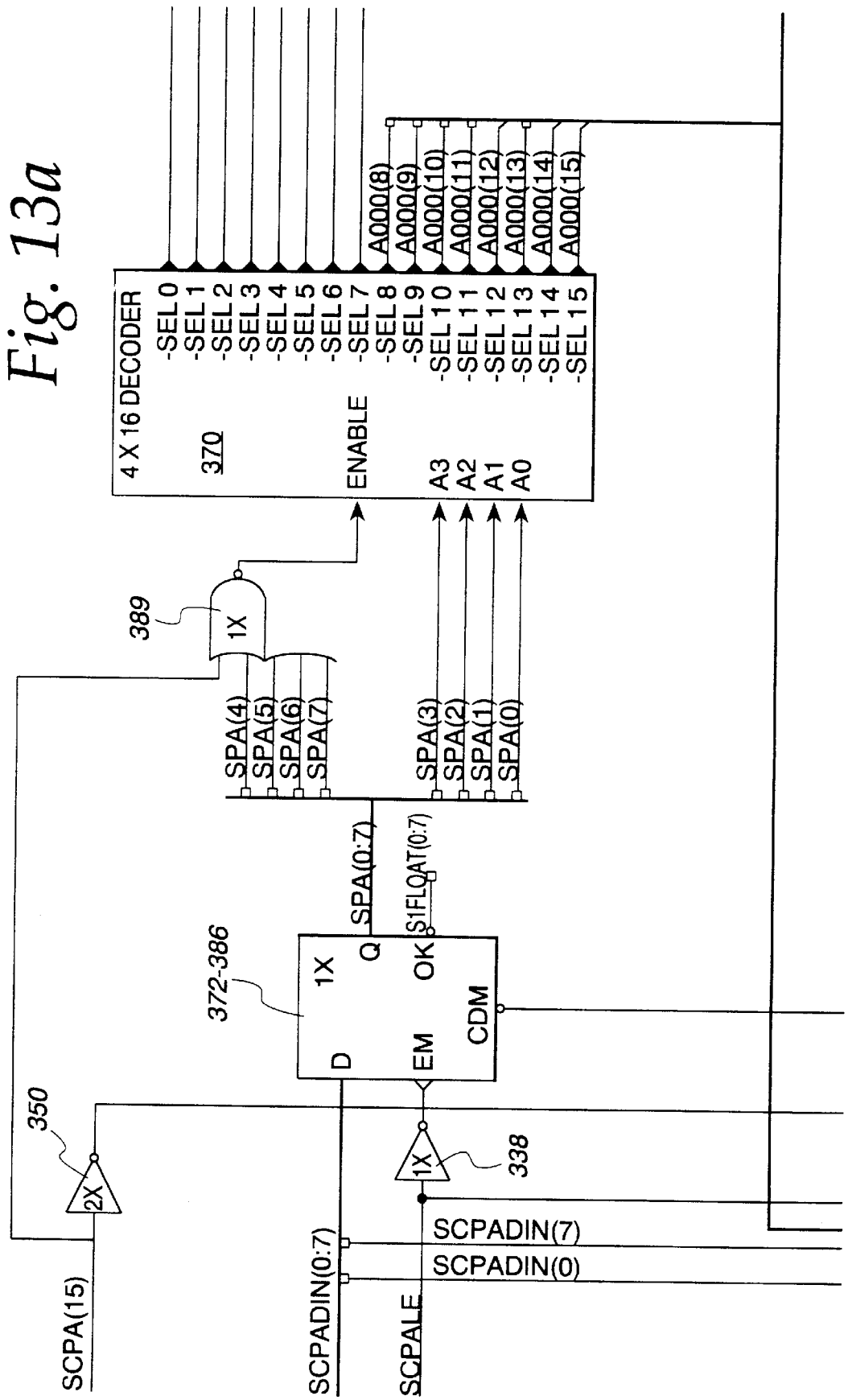
Figure 13C:
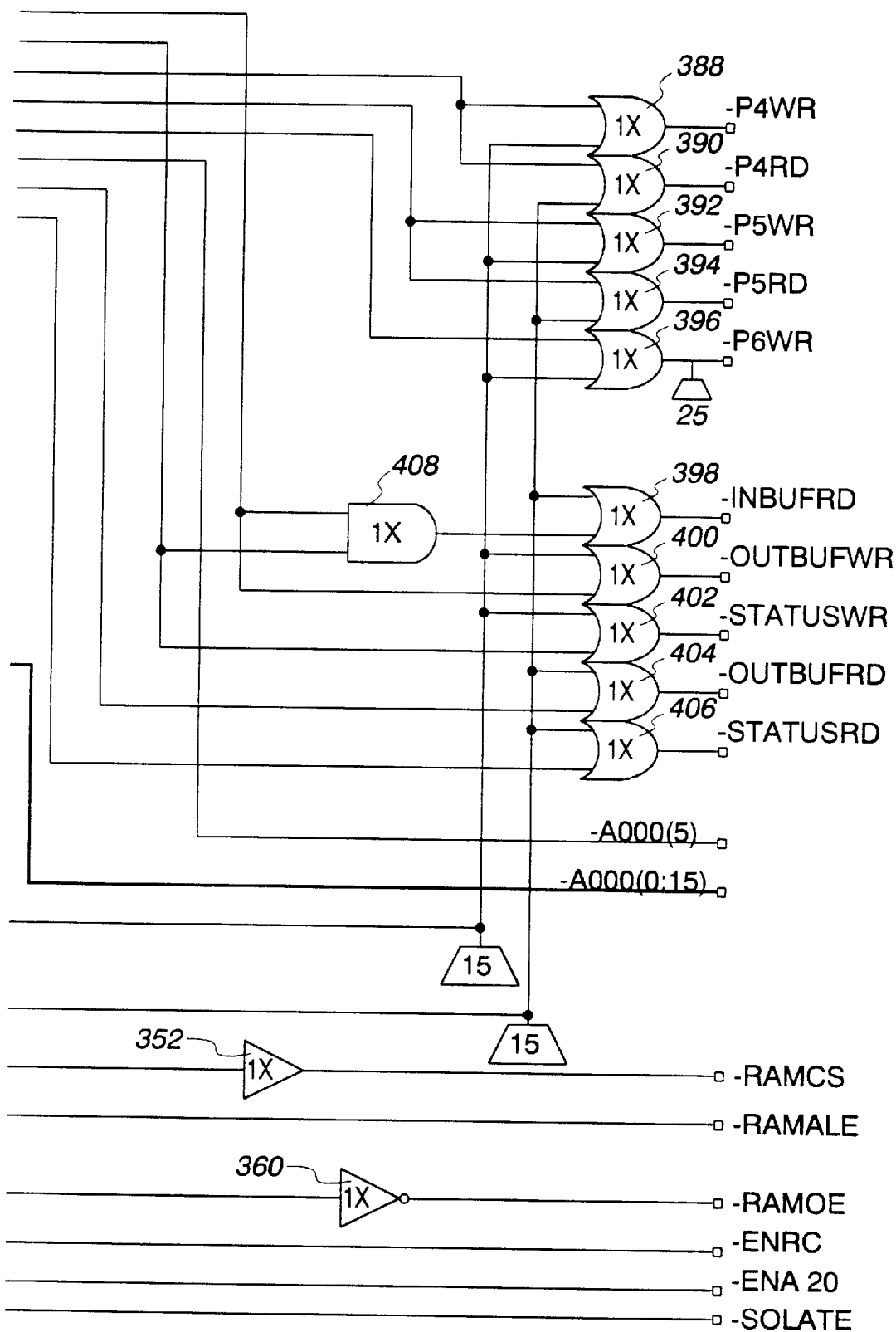

The address decode and RAM control logic 308 is illustrated in FIGS. 13 and 14. As previously mentioned, thirty-two kilobytes of external RAM 348 can be addressed by the SCP 26 at addresses 8000H-FFFFH for program storage. More particularly, the MKI 300 generates a RAM chip select signal (−RAMCS), a RAM output enable signal (−RAMOE) and a RAM address latch enable signal (RAMALE) for external RAM control. These signals, along with SCP read and write signals (SCPRD, SCPWR), allow the SCP 26 to read and write to the RAM 348. Thus, as discussed above, the SCP address bit SCPA 15 determines whether the access is a RAM 348 access or a MKI 300 access. More particularly, the bit SCPA 15 is inverted by way of an inverter 350 and applied to a buffer 352 to generate the RAM chip select signal (−RAMCS) during a RAM 348 access. The RAM chip select signal (−RAMCS) is active low and will be active any time the address lines 8000H-FFFH are placed on the SCP 26 address data bus SCPAD [0:7].

The address on the SCP address data bus SCPAD [0:7] is latched by a RAM address latch enable signal (RAMALE). The RAM address latch enable signal (RAMALE) is generated by the MKI 300 and is derived from the SCP address latch enable signal (SCPALE) available from the SCP 26. More specifically, the SCP address latch enable signal (SCPALE) is applied to a buffer 354. The RAM address latch enable signal (RAMALE) is available at the output of the buffer 354. In order for the SCP 26 to write a byte to the external RAM 348, an SCP write signal (SCPWR) is brought low. The SCP 26 can read a byte from the RAM 348 by way of the RAM output enable signal (−RAMOE). More specifically, the RAM output enable signal (−RAMOE) is generated by the MKI 300 by ORing an SCP read signal (−SCPRD) with the RAM access control signal SCPA 15 by way of an OR gate 356. The output of the OR gate 356, which indicates a read by the SCP 26 of the RAM 348, is NANDed with a control signal (−PSEN) by way of a NAND gate 358. The signal PSEN relates to a program store enable and provides a strobe for accessing external memory stored in the RAM 348. Since the RAM output enable signal (−RAMOE) is active low, the output of the NAND gate 358 is applied to an inverter 360. The RAFI output enable signal (−RAMOE) is available at the output of the inverter 360.

In addition to accessing the RAM 348, the SCP 26 can also access various external input/output ports (port P4, port P5 and port P6) as well as communicate with the CPU by way of an input buffer 362, an output buffer 364, a status buffer 366 and an auxiliary output buffer 368 through memory mapping. The SCP 26 can both read and write to ports P4 and P5, while port P6 is a write only port relative to the SCP 26. The output ports (P4, P5 and P6), as well as the input buffer 362, output buffer 364, status register 366 and an auxiliary output buffer 368 are located at addresses 0000H through 000FH as delineated in TABLE VIII. As previously mentioned, the SCP 26 address bit SCPA [15] is low for addresses in this range and is active high only for addresses 8000H and above, indicative of a RAM access. Thus, the bit SCPA 15 may be applied to a decoder 370 (FIG. 13) for decoding addresses between 0000H and 0000FH. More specifically, the lower 8-bits of an SCP address are applied to latches 372 through 386 by way of the SCP internal address data bus SCPADIN [0:7]. The latches 372 to 386 are enabled by an SCP address latch enable signal (−SCPALE), which is active below and available at the output of an inverter 388. The signal (−SCPALE) is applied to an enable input (EN) of the latches 372–386. The latches 372–386 are reset by a signal (−RESET), available at the output of a buffer 391.

The outputs of the address latches 372 to 386 are applied to the 4×16 address decoder 370 by way of an internal address bus SPA [0:7]. more specifically, the upper nibble (e.g., SPA [7:4]) is NORed with the SCPA 15 by way of a NOR gate 389 signal to enable the address decoder 370 any time the SCP 26 is not accessing the RAM 348. For addresses 0000H through 000FH, the bits SPA [7:4] in the upper nibble will all be low. These bits, SPA [7:4] are applied to the NOR gate 389, which is used to enable the decoder 370. The lower nibble (e.g., SPA [3:0]) is applied to the address inputs A3, A2, A1, A0, respectively, of the address decoder 370. The output of the address decoder 370 is then used to generate read and write signals for the various input output ports (P4, P5 and P6), as well as for the input buffer 362, output buffer 364 and status register 366 buffers. Additionally, the address decoder 370 generates address control signals a A000 [15:8] and A000 [5], as will be discussed below. More specifically, the address decoder 370 provides sixteen outputs SEL0–SEL15, which are all active low. The decoder 370 output signals are ORed with SCP write (−SCPWR) and SCP read (−SCPRD) signals to generate read and write signals for the various input output ports, as well as the input buffer 362, output buffer 364 and status register 366 by way of the OR gates 388 to 406. Moreover, since the input buffer 362 can be read at either address 0000H or address 0001H, the select outputs (−SEL0) and (−SEL1) are ANDed by way of an AND gate 408 and applied to the OR gate 398 to generate the input buffer read signal (−INBUFRD). The address decoder 370 is illustrated in FlG. 14. The 4×16 decoder 370 includes four address inputs A3, A2, A1 and A0, as well as an enable input (available at the output of the NOR gate 389) to provide sixteen outputs SEL0–SEL15. As previously discussed, the lower nibble of the internal address bus SPA [3:0] is applied to the address inputs A3, A2, A1 and A0. The enable input is connected to the output of the NOR gate 389 which indicates an address range between 0000H and 000FH. Sixteen select outputs are provided SEL0–SEL15 which are active low. The select outputs, (–SEL0) to (–SEL15), are available at the output of NAND gates 410 through 440.

The 4×16 address decoder 370 also includes a buffer 442 and four inverters 444, 446, 448 and 450. The enable signal is applied to the input of the buffer 442. A buffer enable signal (BENABLE), available at the output of the buffer 442, is applied to the inputs of each of the NAND gates 410 through 440. The address inputs A3, A2, A1 and A0 are applied to various of the NAND gates 410,through 440, as well as to inverters 444, 446, 448 and 450 as shown in FIG. 14. The outputs of the NAND gates 410 through 440 are select inputs (–SEL0) to (–SEL15) which are used to form various read and write signals, as well as address control signals as previously discussed.

CPU TO SCP INTERFACE

Communication between the CPU and the SCP 26 is by way of an input buffer 362, the output buffer 364, a status register 366 and an auxiliary output buffer as illustrated in FIG. 15 and discussed below.

The input buffer 362 is an 8-bit register comprised of flip-flops 452, 454, 456, 458, 460, 462, 464 and 466. This 8-bit register 362 is write only to the CPU and address 60H or 64H, and is read only to the SCP 26. More specifically, the CPU system data bus (SD [7:0]), which is connected to the internal system data in bus SDIN [0:7] by way of pins 4, 5, 8, 9, 26, 27, 30 and 31, is applied to D inputs of the flip-flops 452, 454, 456, 458, 460, 462, 464 and 466 in order to enable the CPU to write to the input buffer 362. Data is clocked into the flip-flops 452, 454, 456, 458, 460, 462, 464 and 466 by an input buffer clock signal (–IBCLK). More specifically, the input buffer clock signal (–IBCLK) is applied to the clock (CP) inputs of the flip-flops 452, 454, 456, 458, 460, 462, 464 and 466. The input buffer clock signal (–IBCLK) is generated by ORing a CPU write signal (–IOW) with a system control processor chip select signal (–SCPCS), both active low, by way of an OR gate 468. These signals 10 write (–IOW) and system control processor chip select (–SCPCS) are generated by the CPU whenever the CPU writes to the MKI 300. These signals are applied to pins 39 and 42 of the MKI 300.

An important aspect of the invention, as will be discussed below, relates to the availability of the MKI 300 to recognize a 2-byte sequence from the CPU for control of the gate A20 signal without interrupting the SCP 26. This feature is available whenever the MKI 300 is placed in a MKI mode. When the MKI 300 is not in the MKI mode, the control of 30 the gate A20 signal will be similar to the SCPI 28, which requires the SCP 26 to read the input buffer 362 and clear the input buffer full flag (IBF) for each of the bytes in the two byte sequence to control the gate A20 signal. Except for control of the gate A20 signal when the MKI feature is enabled, as discussed above, any time the CPU writes to the input buffer, an input buffer full flag (IBF) is set and a command/data flag is set. The input buffer full flag (IBF) is provided by a pair of flip-flops 470 and 471. The input buffer clock signal (–IBCLK) is applied to the clock input (CP) of the flip-flop 470. An input buffer data signal INBUFDATA (FIG. 16) is applied to a D input of the flip-flop 470. As will be discussed below, the input buffer data signal (INBUFDATA) is under the control of a MKI enable signal (MKIEN) which only generates an input buffer data signal (INBUFDATA) when the MKI feature is disabled. The signal INBUFDATA indicates that the input buffer contains a byte which is either command or data. The input buffer data signal (INBUFDATA) is clocked into the input buffer full flag flip-flop 470 by the input buffer clock signal (–IBCLK). The output of the flip-flop 470 is applied to bit 1 of a status register output bus SRO [1] to indicate to the SCP 26 that a byte is contained in the input buffer 362. Once the system SCP 26 initiates a read of the input buffer 362, an input buffer output enable signal (–INBUFOE) is generated at the output of an OR gate 472. An input buffer read signal (–INBUFRD) is ORed with a reset signal by way of the OR gate 472 to generate the input buffer output enable signal (–INBUFOE). The input buffer output enable signal (–INBUFOE) is applied to an output enable input (OE) of the flip-flops 452–456 by way of inverters 474, 476, 478, 480, 482, 484, 486 and 488 to enable the outputs of the flip-flops 452 to 466 to be connected to the internal SCP address data output bus SCPADOUT [0:7], which, in turn, is applied to the SCP system data output bus SCPAD [0:7].

When the MKI feature is disabled, once the SCP 26 reads the data from the input register 362, the input buffer full flag (IBF) is cleared automatically by the MKI 300. More specifically, the input buffer output enable signal (–INBUFOE) is applied to a clock input of the flip-flop 471 whose D input is tied low. Thus, the input buffer output enable signal (–INBUFOE) clears the flip-flop 471 once the SCP 26 reads the byte from the status register 362. The Q output of the flip-flop 471 is applied to a clear input (CDN) of the flip-flop 470 to clear the input buffer full flag (IBF). In order to prevent the input buffer full flag (IBF) from being cleared prior to the SCP 26 reading the byte from the input buffer 362, the flip-flop 471 is preset by an input buffer clock signal (–IBCLK) which is applied to a preset (SDN) input of the flip-flop 490. This sets the flip-flop 471 to prevent the input buffer full flag (IBF) from being cleared until the SCP 26 reads the byte from the input register 362.

In addition to setting the input buffer flag (IBF), a command data flag (CMDATA) is also set whenever the CPU writes a byte to the input buffer 362. The command data flag (CMDATA) is used to set bit 3 of the status register 366 to indicate to the SCP 26 that the input register 362 contains either command or data. More specifically, an address bit SA2 from the CPU bus is used to decode whether the CPU wrote to address 60H or 64H. A write to 64H indicates a command while a write to 60H indicates data. The address bit SA2 will be high for 64H and low for 60H. This bit SA2 is applied to a D input of a flip-flop 492, which is used as a command data flag. This signal SA2 is clocked into the flip-flop 492 by the input buffer clock signal (–IBCLK), which is applied to the clock input (CP) of the flip-flop 492. The output of the flip-flop 492 indicates whether command or data was written by the CPU to the input buffer 362. This output is used to set bit 3 of the status register 366.

The output buffer 364 is an 8-bit register which includes the flip-flops 494 through 508. The output buffer 364 is read only to the CPU at address 60H and is written to by the SCP 26. The SCP 26 can also read the output buffer 364. The SCP internal address data bus SCPADIN [0:7] is applied to the D inputs of the flip-flops 494–508. The data on the bus SCPADIN [0:7] is clocked into the flip-flops 494, 508 by an output buffer clock signal (–OBUFCLK) which is applied to the clock inputs (CP) of the flip-flops 494 to 508. The output buffer clock signal (–OBUFCLK) is active low to enable the SCP 26 to write a byte to the output buffer 364 at address 0000H.

The flip-flops 494–508 also act as the Auxiliary Output Buffer when the SCP addresses 000DH. More specifically, an address decode signal (–00013) from the address decoder 370 is ORed with an SCP write signal (–SCPWR) by way of an OR gate 510 (FIG. 18). The output of the OR gate 510 indicates that the SCP 26 initiated a write to the address 000DH.

The flip-flops 494–508 are clocked by an output buffer clock signal (–OBUFCLK). More specifically, the output of the OR gate 510 is ANDed with an output buffer write signal (–OBUFWR) by way of an AND gate 512 which is active low any time the SCP writes to address 0000H. The output of the AND gate 512 is the signal output buffer clock signal (–OBUFCLK), which represents that the SCP 26 address either 0000H or 000DH.

Any time the SCP 26 writes to the output buffer 364, an output buffer full flag (OBF) is set in the status register 366. A pair of flip-flops 511 and 513 are used to set the output buffer full flag; bit 0 of the status register 366. The output buffer full flag (OBF) is set by the flip-flop 511. More particularly, an output buffer write signal (–OUTBUFWR) is applied to a clock input of the flip-flop 511. The D input of the flip-flop 511 is tied high. Thus, whenever the SCP 26 writes to the output buffer 364, the flip-flop 511 will be set indicating an output buffer full flag (OBF); which is tied to an internal status register bus bit SRO [0].

The MKI 300 also resets the output buffer full flag (OBF) whenever the CPU reads the byte in the output buffer 364. This is accomplished by the flip-flop 513. More specifically, the flip-flop 513 is set by the output buffer write signal (–OUTBUFWR) which is applied to the set input (SDN). The Q output of the flip-flop 513 is applied to a clear input (CDN) of the flip-flop 511. The D input of the flip-flop 513 is tied low. An enable data signal (–ENDATA) is applied to the clock input (CP) of the flip-flop 513.

The enable data signal (–ENDATA) represents that the CPU has read the byte in the output buffer 364 at address 60H. More specifically, an IO read signal (–IOR), which indicates that the CPU has initiated a read operation, is ORed with a CPU address signal A2 which is low for address 60H. These signals, along with an SCPCS signal, which indicates that the CPU addressed either address 60H or 64H, are applied to an OR gate 514 along with a reset signal. The output of the OR gate 514 is applied to a buffer 516. The output of the buffer 516 is the enable data signal (–ENDATA) which indicates that the CPU has initiated a read to address 60H. This enable data signal (–ENDATA) is applied to the clock input (CP) of the flip-flop 513, whose D input is tied low in order to clear the flip-flop 513. Since the Q output of the flip-flop 513 is connected to the clear input (CDN) of the flip-flop 511, the flip-flop 511 can thus be cleared any time the CPU reads the byte from the output buffer 364.

The enable data signal (–ENDATA) is also used to control tristate devices 514 to 528, used to connect an internal output buffer bus OBO [0:7] to the Q output of the flip-flops 484 through 508 to the system data output bus SDOUT [0:7].

The SCP 26 can read the output of the output buffer 364 by way of tristate devices 537–551. More particularly, the Q outputs of the flip-flops 494–508 are tied to the internal SPADOUT [0:7] by way of the tristate devices 537–551. The tristate devices 537–551 are under the control of an output buffer read signal (–OUTBUFRD), a decode signal, available at the output of the OR gate 404 (FIG. 13), which indicates the SCP read address 0001H.

The status register 366 is an 8-bit register and includes the flip-flops 530, 532, 534 and 536. The status register 366 is read only to the CPU at address 64H and written to by the SCP 26. The SCP 26 can also read the status register 366 in order to determine the status of the output buffer full flag (OBF) and the command data flag (CMDATA). Five of the bits of the status register are written by the SCP 26, while three are generated by the MKI 300 (IBF, OBF) command data. The status register bit definition is provided in TABLE IX.

TABLE IX

STATUS REGISTER BIT DEFINITION

Status Register Bit Definition:

Bit 7 Parity Error—Written by the SCP.
Bit 6 Receive Time-Out—Written by the SCP.
Bit 5 Transmit Time-Out—Written by the SCP when MKI features are disabled.
  Auxiliary Output—Generated by the MKI when the MKI features are Buffer Full enabled and the SCP writes to the Auxiliary output Buffer.
Bit 4 Inhibit Switch—Written by the SCP.
Bit 3 Command/Data—Generated by the MKI. This signal indicates whether the last byte written by the CPU was a Command (written to address 64H) or Data (written to address 60H).
Bit 2 System Flag—Written by the SCP.
Bit 1 Input Buffer Full—Generated by the MKI. This signal indicates when the CPU has written a byte to the Input Buffer but the SCP has not yet read the byte out of the latch. It can be used by the CPU as a flag to indicate that the SCP is ready to receive a byte.
Bit 0 Output Buffer Full—Generated by the MKI. This signal indicates when the SCP has written a byte to the Output Buffer but the CPU has not yet read the byte out of the latch. It can be used by the SCP as a flag to indicate that the CPU is ready to receive a byte.

As noted in TABLE IX, the SCP 26 writes bits 2, 4, 6 and 7 to the status register 366, while bits 0, 1 and 3 are generated by the MKI 300. Bit 5 can either be written by the SCP or generated by the MKI depending on whether the MKI 300 is enabled. Accordingly, bits 2, 4, 6 and 7 of the system control processor address data input bus SCPADIN [2, 4, 6, 7] are applied to the D input of the flip-flops 530, 532, 534 and 536. These bits are clocked into the flip-flops 530 through 536 by a status write signal (–STATUSWR). The status write signal (–STATUSWR) is a decoded signal from the address decoder 370 (FIG. 13) which indicates that the SCP is writing to the status register 366 at address 0001H. The Q output of the flip-flops 530, 532, 534 and 536 are applied to an internal status register output bus SRO [0:7]. As previously discussed, the input buffer full flag (IBF) from flip-flop 470 and the output buffer full flag (OBF) from the flip-flop 511 are applied to the status register output bus bits 0 and 1, respectively.

As indicated in TABLE IX, bit 5 is a dual function bit and is either written by the SCP 26 or generated by the MKI 300, depending upon whether the MKI feature is enabled. More specifically, when the MKI feature is disabled, the SCP 26 can write bit SRO [5] by way of bit SCPADIN [5], applied to D input of a flip-flop 537 (FIG. 15). This bit SCPADIN [5] is clocked into the flip-flop 537 by a status write signal (–STATUSWR). The status write signal (–STATUSWR) is a decode signal from the address decoder 370 and is active low whenever the SCP 26 writes to address 0001H. The output of the flip-flop 537 is a status register bit 5 signal (SRB5), which is applied to an OR gate 539 (FIG. 18) to generate a status register output bit SRO [5], which, in turn, is applied to the internal status register bus SRO [0:7] (FIG. 15).

When the MKI feature is enabled, the status register bit SRO [5] is generated by the MKI 300. More specifically, during such a condition, the status register bit SRO [5] is generated by a flip-flop 541 (FIG. 18) whose output is applied to the OR gate 539 to generate the bit SRO [5], as discussed above. A D input of the flip-flop 541 is tied high. The flip-flop 541 is clocked by the output of the OR gate 510 which indicates that the SCP 26 addressed the auxiliary output buffer by writing to address 000DH.

Since the status register 366 may be read by either the SCP 26 or the CPU, the status register output bus SRO [0:7] is connected to the system control processor address data output bus SCPADOUT [0:7] by way of tristate devices 538–552 and to the system data output bus SDOUT [0:7] by way of tristate devices 554–568. More particularly, the Q outputs of the flip-flops 530, 532, 534 and 536 are applied to bits SRO [2, 4, 6, 7], respectively. The bits SRO [2, 4, 6, 7] are written by the SCP 26, as discussed above. The remainder of the bits (e.g., SRO [0, 1, 3, 5]) are generated by the MKI 300 as illustrated in TABLE IX. These bits SRO [0, 1, 3, 5] are available, as discussed below. More specifically, bit SRO [0] which indicates that the output buffer 364 is full, is available at the output of an OR gate 553 (FIG. 18). The OR gate 553 is a two input OR gate. One input is an output buffer full signal (OBF), available at the flip-flop 511 (FIG. 15). The output of the flip-flop 668 is applied to the other input, which indicates that SCP wrote a byte to the output buffer 364. Bit SRO [5] is written by the SCP 26 when the MKI feature is disabled and generated by the MKI 300 when the MKI features are enabled. This bit SRO [5] is available at the output of an OR gate 555 (FIG. 15). The OR gate 555 is a two input OR gate. One input is a status register bit 5 signal (SRB 5), available at the output of the flip-flop 368 (FIG. 15) which indicates that the auxiliary output buffer full flag is set. This signal (SRB 5) is ORed with the output of a flip-flop 557 (FIG. 18) whose D input is tied high. The flip-flop 557 is clocked by the output of the OR gate 510 which indicates the SCP 26 addressed the auxiliary output buffer 368. The flip-flop 557 is cleared by an AND gate 557 which resets SRO [5] on system reset by an output buffer write signal (–OBUFWR), available at the output of an OR gate 400 (FIG. 13), which indicates that the SCP 26 initiated a write to the output buffer 364 at addressed 0000H. Bit SRO [3] is available at the output of the flip-flop 492, which indicates that a command/data byte was written by the CPU.

The tristate devices 538 to 552 are under the control of a status read signal (–STATUSRD), which is a decoded signal from the address decoder 370 which allows the SCP 26 to read the contents of the status register 366 at address 0007H. The tristate devices 554 to 568 are under the control of a status enable signal (STATEN). The status enable signal (STATEN) allows the CPU to read the contents of the status register 366 at address 64H. The status enable signal (–STATEN) is generated at the output of an OR gate 570. An SCP chip select signal (–SCPCS), which indicates that the CPU addressed either 60H or 64H, is applied to one input. An IO read signal (–IOR) is applied to another input along with an address decode signal which indicates that the address 64H was addressed. The output of the OR gate 570 is applied to a buffer 572. The output of the buffer 572 is the enable data signal (–ENDATA). The output buffer 364, status register 366, as well as the input buffer flag (IBF), output buffer flag (OBF), auxiliary output buffer flag (AOBF) and the command data flag (CMDATA) may all be reset by the CPU. More specifically, a reset signal (–RESET), available at the output of an inverter 74, is applied to the clear inputs (CDN) of the flip-flops 490, 512, 368 and 492 to reset the input buffer flag (IBF), output buffer flag (OBF), auxiliary output buffer flag (AOBF) and the command data flag (CMDATA), respectively. The reset signal (–RESET) is also applied to the clear input (CDN) of the flip-flops 494 through 508 to reset the output buffer 364, as well as to the clear input (CDN) of the flip-flops 530 through 536 to reset the status register (366) bits which are written by the SCP.

GATE A20 CONTROL

The gate A20 signal is an active high output signal from the MKI 300 to allow the system to access memory above the 1 megabyte boundary. It can be set or cleared by both the CPU and the SCP 26. An important aspect of the invention relates to eliminating the need for an SCP interrupt for processing of the 2-byte sequence from the CPU to control the gate A20 signal when the MKI 300 is enabled. Rather than interrupt the SCP 26 for the command byte D1 and the data byte, these bytes are decoded by the MKI 300, thus eliminating the need for processing by the SCP 26. By eliminating the need to interrupt the SCP 26 for the 2-byte sequence, the switching of the gate A20 signal is relatively faster with the SCPI 28.

The CPU can control the gate A20 with a 2-byte sequence. The first byte is a command D1H written to the address 64H. The second byte is a data byte written to the address 60H. The MKI 300 will automatically set or clear the gate A20 for the CPU unless this feature is disabled by the SCP 26. More specifically, the SCP 26 can disable the generation of the gate A20 signal by the MKI 300 by writing to address A000CH. More specifically, bit SCPAD1, which is applied to the internal SCP address data bus SCPADIN [0:7], is used to control whether the automatic generation of the A20 signal is enabled or disabled. A "1" enables the feature, while a "0" disables the feature. The bit SCPADIN [1] is applied to a D input of a latch 576 (FIG. 13). A decoded address signal (–A000[12]), which indicates that the SCP has addressed 0000H, is applied to one input of the OR gate 577. An SCP write signal (–SCPWR) is applied to the other input of the OR gate 577. The output of the OR gate 577 indicates that the SCP has written to address A000CH. If the bit SCPADIN [1] is a "1, an enable 20 signal (–ENA20) which is active low, will be available at the output of the latch 576. If the bit SCPADIN [1] is low, the automatic generation of the gate A20 signal will be disabled.

Figure 16A:
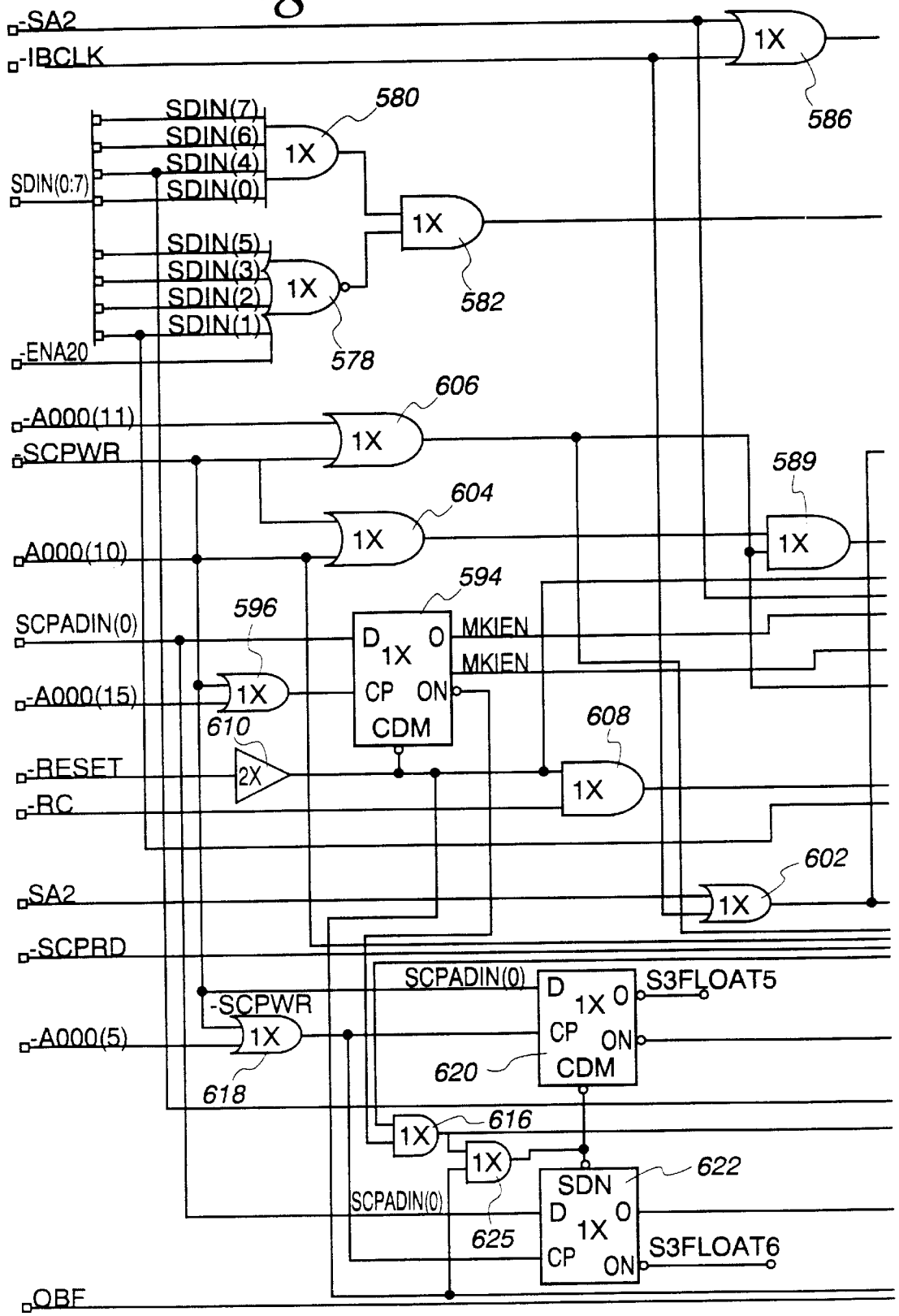
FIGS. 16A and 16B are a schematic diagram of the Gate A20 control logic in accordance with the present invention.
Figure 16B:
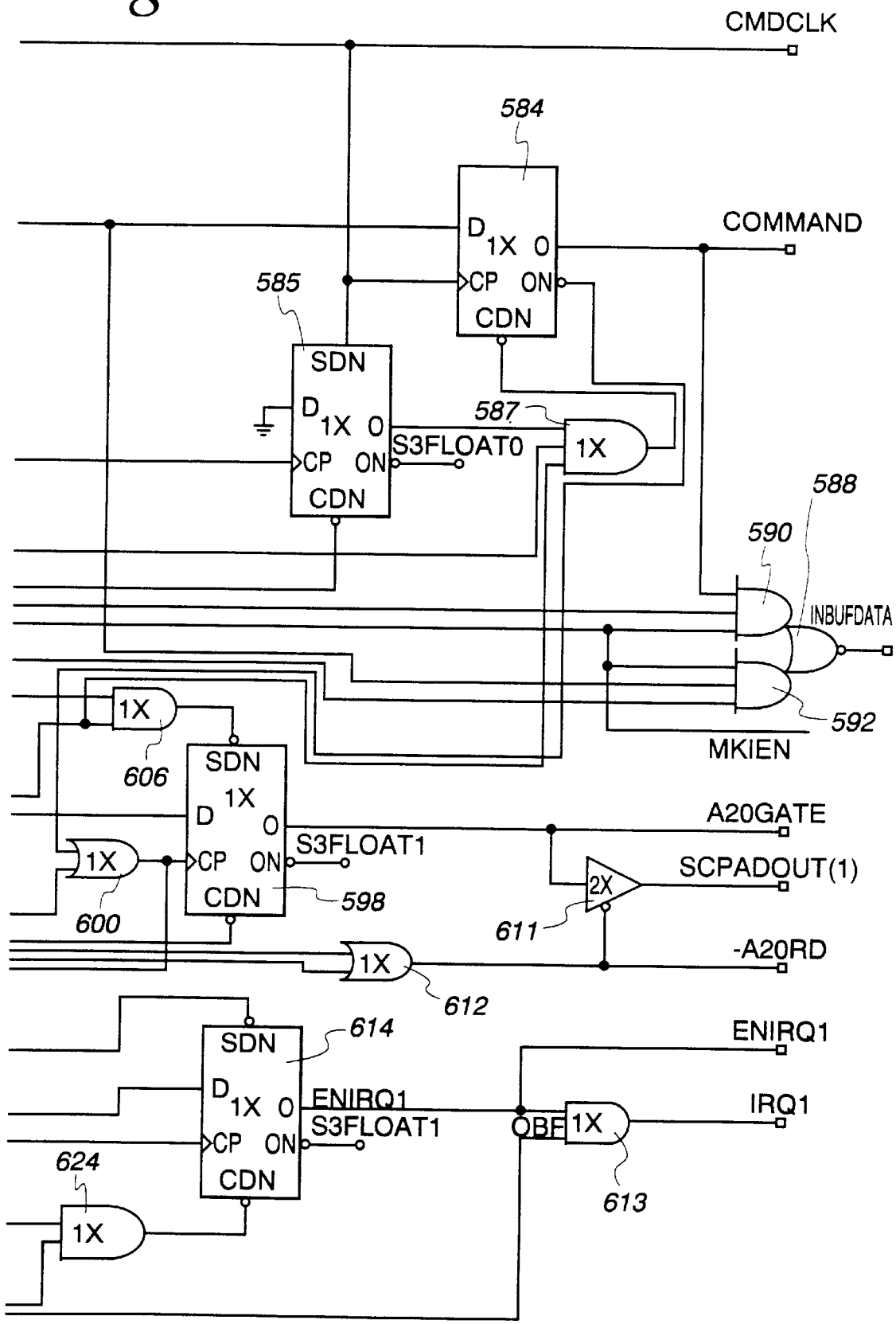

The command D1 is decoded by circuitry which includes a NOR gate 578 and two AND gates 580 and 582. The enable signal (–ENA20) is applied to the NOR gate 578 (FIG. 16). The system data bus SD [7:0], SD [7, 6, 4, 0] bits are applied to the AND gate 580, while the bits SD [5, 3, 2, 1] are applied to the NOR gate 578 along with the enable signal (–ENA20). The output of the NOR gate 578, as well as the output of the AND gate 580, is applied to a two input AND gate 582. The output of the AND gate 582 is a decode of the command D1.

The decoded D1 command signal from the AND gate 582 is applied to a command latch 584. This signal is clocked into the latch 584 by a command clock signal (–CMDCLK). The command clock signal (–CMDCLK) is available at the output of the OR gate 586. An SA2 signal is applied to one input of the OR gate 586. The SA2 signal indicates whether the CPU wrote to address 60H or 64H. The IB clock signal (–IBCLK) is applied to the other input of the OR gate 586. The IB clock signal (–IBCLK) indicates that the CPU initiated a write to the address 60H or 64H. The SA2 signal (–SA2) is available at the output of an inverter 586 (FIG. 15) which indicates that the CPU addressed 64H. The command clock signal (–CMDCLK) is applied to the clock input (CP) of the flip-flop 584 to latch the command signal D1 on the output. Circuitry, which includes a flip-flop 585 and AND gates 587 and 589, is used to reset the command latch 584. More specifically, the output of the AND gate 587 is applied to the clear input (CDN) of the command latch 584. The AND gate 587 is a three input AND gate. One input to the AND gate 587 is a signal available at an output of an AND gate 608 which, as discussed below, is active low during a reset and slow reset condition to reset the command latch during these conditions. The other input to the AND gate 587 is an output of an AND gate 589 which, as will be discussed, indicates that the SCP 26 has taken control of the gate A20 signal by writing to either address 000AH or 000BH. Lastly, a Q output of the flip-flop 585 is applied to the AND gate 587. The D input of the flip-flop 585 is tied low. The output of an OR gate 602 (discussed below) is applied to the clock input (CP) of the flip-flop 585 to clear the command latch 584 when a data byte is written by the CPU.

Bit 1 of the data byte, the second byte in the 2-byte sequence, determines the state of the gate A20. The gate A20 signal is set active if bit SDIN [1] is set and will be disabled if this bit is low. The MKI 300 will automatically set or clear the gate A20 signal unless this feature is disabled by the SCP 26 at address 000CH. More specifically, the A20 gate signal is available at the output of a latch 598. Bit 1 from the system data bus is applied by way of the system data internal bus SDIN [1] to the D input of the latch 598. Bit 1 is clocked into the latch by an A20 clock signal which is applied into the clock input (CP) of the latch 598. The A20 clock signal is available at the output of an OR gate 600. One input to the OR gate 600 is the output of an OR gate 602 which indicates that the CPU has written to either address 60H or 64H. More particularly, an SA2 signal is applied to one input of the OR gate 602. An IB clock signal (–IBCLK) is applied to the other input of the OR gate 602. The IB clock signal (–IBCLK) further indicates that the CPU has written to either 64H or 60H. The SA2 signal indicates that a command was written to 64H. The other input signal to the OR gate 600 is a (–COMMAND) signal from the latch 584 QN output. This allows the gate A20 latch 598 to be set when the second data byte is written by the CPU.

The input buffer data signal (INBUFDATA) controls whether the input buffer full flag (IBF) is set when the CPU writes to the input buffer 364. As discussed below, the input buffer data signal (INBUFDATA) is under the control of a MKI enable signal (MKIEN). More specifically, when the MKI feature has been enabled, the input buffer data signal (INBUFDATA) will be inhibited such that the MKI 300 can process the 2-byte sequence from the CPU for the gate A20 control without interrupting the SCP 26. When the MKI feature is disabled, the system processes the bytes, similar to SCPI 28, by setting an input buffer full flag (IBF) each time the CPU writes to the input buffer 364.

The input buffer data signal (INBUFDATA) is generated at the output of a NOR gate 588. The NOR gate 588 is a two input NOR gate. The output of an AND gate 590 is applied to one input while the output of another AND gate 592 is applied to the other input. When the MKI feature is disabled (e.g., MKIEN low), the outputs of the AND gates 590 and 592 will be low which, in turn, will enable the input buffer data signal (INBUFDATA). Thus, the input buffer flag (IBF) will be set each time the CPU writes to the MKI 300. When the MKI feature is enabled (MKIEN is set), one or the other of the AND gates 590, 592 will be high while the other is low causing the NOR gate 588 to be low. More specifically, a command byte D1, written by the CPU to address 64H, will cause the output of the AND gate 592 to be high since the D1 input (from the AND gate 582), the SA2 input (indicating a CPU write to address 644) and the MKI enable signal (MKIEN) to the AND gate 592 will all be high during this condition. However, the (–SA2) input to the AND gate 590 will cause the output of the AND gate 590 to be low and, thus, the output of the NOR gate 588 to be low, which, in turn, disables the input buffer flag (IBF). Similarly, when the data byte is written by the CPU, the AND gate 590 will be high and the AND gate 592 will be low, disabling the input buffer data signal (INBUFDATA).

The MKI enable signal is available at the output of a latch 594. This signal MKIEN is active high and is applied to the inputs of the AND gates 590 and 592. When the MKI enable signal is low, this will disable the AND gates 590 and 592 such that the input buffer data signal will be active during the command/data 2-byte sequence.

The MKI enable signal MKIEN is controlled by the SCP 26. More specifically, the SCP 26 can write to address 000FH to either enable or disable the MKI enable latch 594. Bit SCPAD [0] of the SCP address data bus, which is applied to the internal SCP address data bus SCPADIN [0], controls whether the MKI 300 is enabled or disabled. If SCPADIN [0] is 1, the MKI enable (MKIEN) is set. When the SCP 26 writes a 0 to SCPADIN [0], the MKI feature is disabled. The SCPADIN [0] is applied to the D input of the latch 594. A decode signal, available at the output of an OR gate 596 is applied to the clock inputs (CP) of the address latch 594. A decode signal (–a00015) from the address decoder 370 is applied to one input of the OR gate 596, along with an SCP write signal (SCPWR). The output of the OR gate 596 will indicate any time the SCP 26 initiates a write to the address 000FH.

The SCP 26 can also control the gate A20 signal by writing to either address 000AH or 000BH. More particularly, an address decode signal (–A00010) from the address decoder 370 indicates that the SCP address A00AH is applied to one input of a two input OR gate 604 along with an SCP write signal (–SCPWR). The output of the OR gate 604 is applied to a clear input (CDN) of the A20 latch 598 to force the gate A20 signal low or inactive. The SCP can also force the gate A20 signal high by writing to address A00BH. More specifically, a decoded address signal A000 [11], which indicates that the SCP 26 wrote to the address A00BH, is applied to an OR gate 606, along with an SCP write signal (–SCPWR). The output of the OR gate 606 is applied to a preset input of the A20 latch 598 by way of an AND gate 606.

In order to initialize the MKI 300 during a reset or slow reset condition, a reset (–RESET) is applied to one input of the AND gate 608 by way of a buffer 610. A slow reset signal (–RC), discussed below, is applied to the other input. The output of the OR gate 608 sets the gate A20 signal (a2Ogate) high on reset and slow reset.

The SCP 26 can also read the status of the gate A20 latch 548 by reading address A000AH. More particularly, the output of the gate A20 latch 598 is applied to the system control processor address data output bus SCPADOUT [1] by way of a tristate device 611 to enable the SCP 26 to read the status of the gate A20 signal. The tristate device 611 is under the control of an A20 read signal (−A20RD), which is available at the output of an OR gate 612. The OR gate 612 is a two input OR gate. One input is from the SCP read signal (−SCPRD). The other input is a decoded address signal (−A00010) from the address decoder 370 which indicates that the SCP wrote to address A000AH.

IRQ1

IRQ1 is an active high output signal that informs a CPU that the output buffer is full. It can be enabled by either the SCP or the CPU. The default on reset is disabled. When the MKI feature is enabled, the CPU can enable/disable the IRQ1 with a write output port command. More specifically, the write output port command is the 2-byte sequence by the CPU when the CPU writes a command D1 to the input buffer 362 at address 64H followed by a byte of data to the input buffer at address 60H. The data byte is used to control the CPU interrupt IRQ1 when the output buffer is full, as well as control the setting of the gate A20 signal. TABLE X indicates the bit definitions for the data byte.

TABLE X

WRITE OUTPUT COMMAND DATA BIT DEFINITIONS

| | |
|---|---|
| Bit 7 | Keyboard data (output) |
| Bit 6 | Keyboard clock (output) |
| Bit 5 | Input Buffer Empty |
| Bit 4 | Output Buffer Full |
| Bit 3 | Reserved |
| Bit 2 | Reserved |
| Bit 1 | Gate A20 |
| Bit 0 | System Reset |

The CPU interrupt IRQ1 is available at the output of an AND gate 613. One input to the AND gate 613 is an output buffer flag (OBF) available from the flip-flop 510 (FIG. 15). The other input to the AND gate 613 is an enable IRQ1 signal (ENIRQ1). The enable signal (ENIRQ1) is available at the output of the latch 614. As indicated in TABLE X, bit SDIN [4], which indicates that the output buffer is full, is used to control the enablement of the interrupt signal (IRQ1). This bit SDIN4 is applied to the D input of the latch 614 and is clocked into latch 614 by the output of an OR gate 616 applied to the clock (CP) input. One input to the OR gate 616 is from the QN output of the latch 594, which indicates that the MKI feature is disabled. This signal (−MKIEN) enables the interrupt IRQ1 when the MKI feature is disabled. The other input to the OR gate 616 is the output of the OR gate 600 which is used to clock the A20 signal.

The interrupt IRQ1 can also be controlled by the SCP 26. More specifically, the SCP can write to address 0005H to enable or disable IRQ interrupt. More particularly, a decode signal A0005 is applied to an OR gate 618 along with an SCP write signal (−SCPWR). The output of the OR gate 618 indicates that the SCP has written to address A005H. The output of the OR gate 618 is applied to the clock input of latches 620 and 622. The latch 620 is used to enable the IRQ1 interrupt while the latch 622 is used to disable it. More particularly, a QN output of the latch 620 is applied to a preset input of the latch 614, while the Q output of the latch 620 is applied to the clear (CDN) input of the latch 614 by way of an AND gate 624, wherein the output of the latch 614 is ANDed with a reset signal, which causes the latch 614 to be reset during a system reset by the CPU. An AND gate 625 is used to preset the latch 622 and clear the latch 620. The AND gate 625 is a two input AND gate. A reset signal (−RESET) is applied to one input to clear the interrupt IRQ1 during a reset condition. The other input to the AND gate 625 is the output of the OR gate 616 which clears the latch 620 when the command byte is written, as long as the MKI feature is enabled.

Bit SCPAD [0] is used to enable or disable the IRQ1 interrupt. This bit SCPAD [0] is applied to the D input of the latches 620 and 622 by way of the internal SCPA address data bus SCPADIN [0]. If SCPAD [0] equals 0, then the interrupt IRQ1 is enabled. Otherwise the interrupt is disabled.

SLOW RESET

Figure 17:
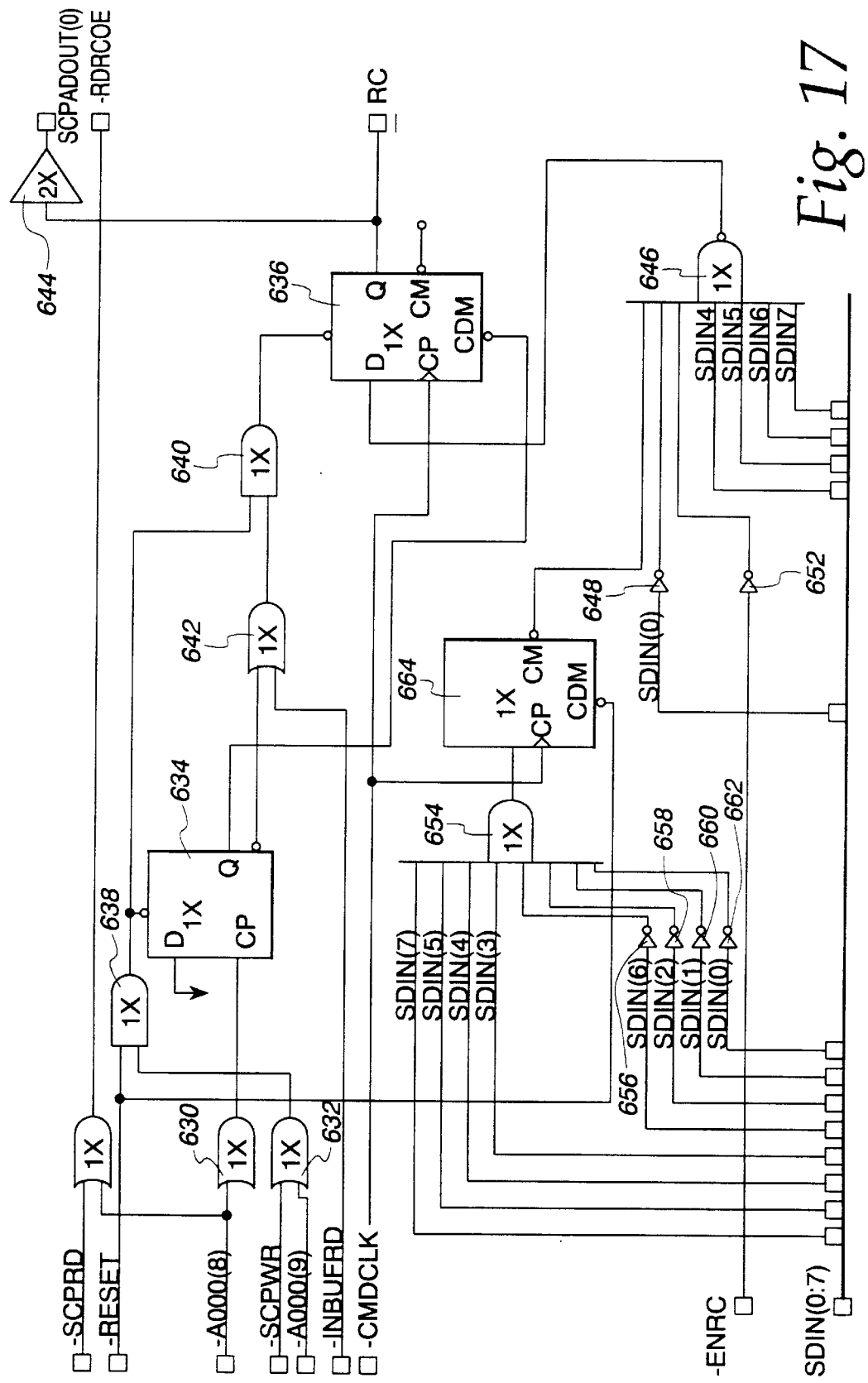
FIG. 17 is a schematic diagram of the slow reset logic in accordance with the present invention.
Figure 18:
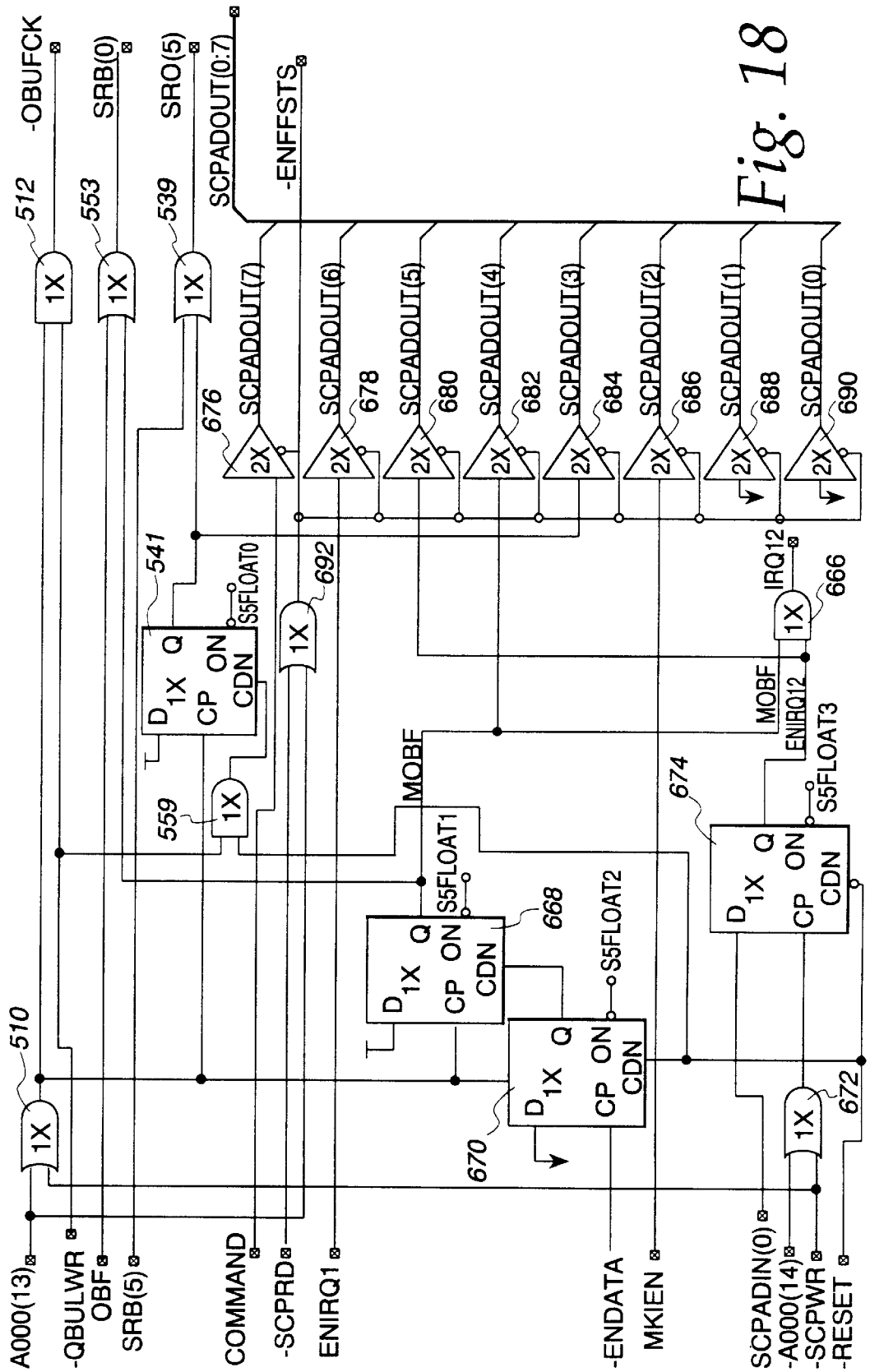
FIG. 18 is a schematic diagram of the IRQ12 mouse interrupt logic in accordance with the present invention.
Figure 19:
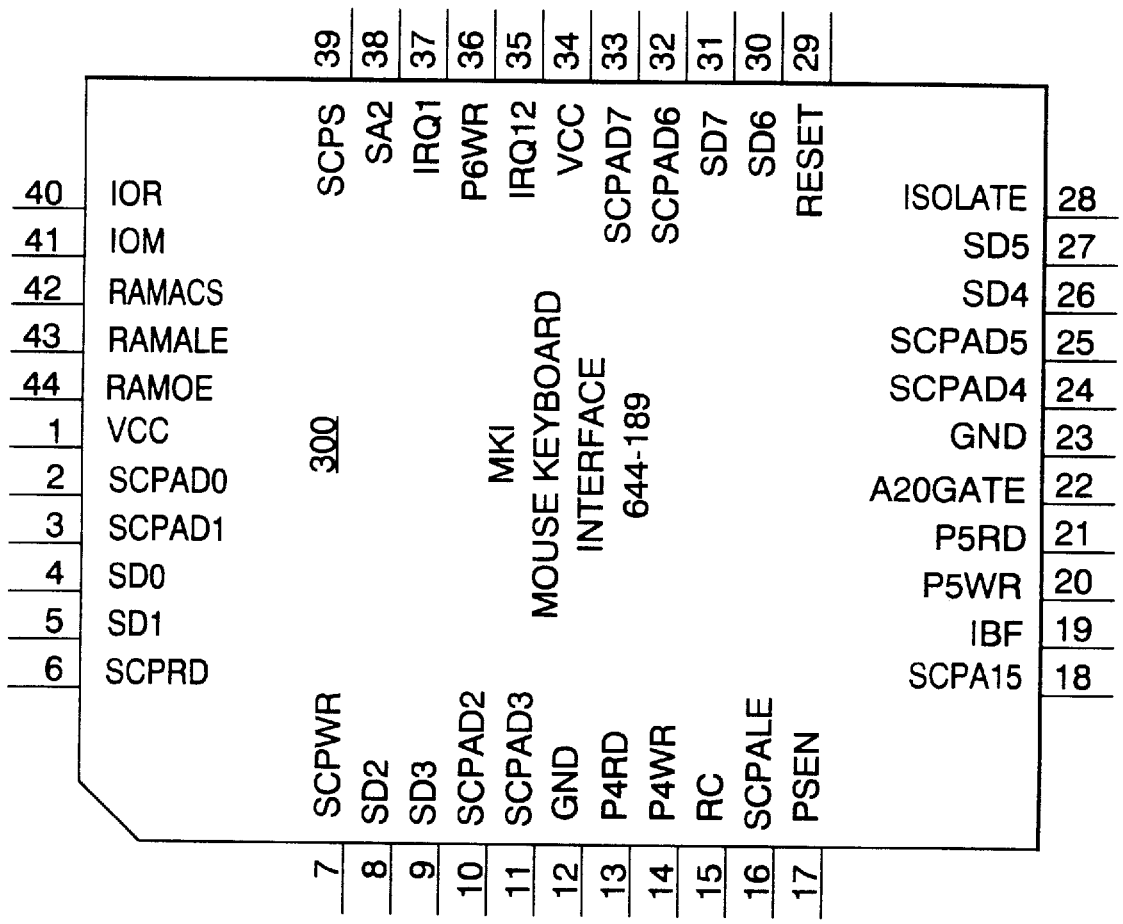
FIG. 19 is a pin diagram for the MKI in accordance with the present invention.

The slow reset signal (−RC), illustrated in FIG. 17 is an active low output signal to reset the CPU. It can be set by the CPU or set and cleared by the SCP 26. It is cleared when the MKI 300 is reset by the reset pin.

The SCP 26 can gain control of slow reset through the memory map. A write to location 0008H forces the slow reset signal active while a write to address 0009H forces the slow reset signal inactive. More specifically, the decoded address signals A0008H and A0009H, from the address decoder 370, are applied to OR gates 630 and 632, and ORed with an SCP write signal (−SCPWR). The output of the OR gate 630 is applied to a clock input of a flip-flop 634 whose D input is grounded. The Q output of the flip-flop 634 is applied to a clear input (CDN) of a flip-flop 636. The output of the flip-flop 636 is a slow reset signal (−RC). Thus, any time the SCP 26 writes to address A008H, the output of the flip-flop 634 will go low which, in turn, clears the flip-flop 636 to generate the active low slow reset signal (−RC).

An SCP 26 write to address 0009H forces the slow reset signal to go inactive. More specifically, the output of the OR gate 632 is ANDed with a system reset signal (−RESET) by way of the AND gate 638 which allows the SCP to clear the system reset signal, and, additionally, allows the slow reset signal to be cleared on system reset. The output of the AND gate 638 is applied to a preset input (SDN) of the flip-flop 634, as well as to an AND gate 640. Thus, any time the SCP 26 writes to address 0009H or there is a reset signal from the CPU, the flip-flop 634 will be preset. This causes the QN output from the flip-flop 634 to be low, which is ORed with an input buffer read signal in an OR gate 642. The output of the OR gate 642 is applied to the other input of the AND gate 640 whose output is applied to a preset input of the flip-flop 636.

The SCP 26 can also read the status of the slow reset signal by initiating a read to address 0008H. More particularly, an SCP read signal (−SCPRD) is ORed with a decoded address signal (−A0008) by way of the OR gate 642. The output of the OR gate forms a read RC operate enable signal 642. This control signal (−RDRCOE) is used to control a tristate device 644 which is connected to the Q output of the flip-flop 636 on one end and to the system control processor address data output bus bit SCPADOUT [0].

The CPU can also set the slow reset signal active with a signal command write. More particularly, reset is set active by the CPU when an even byte between F0 and FE is written to address 64H. The circuitry which includes the NAND gate 646 and the inverter 648 decodes even bytes between F0H and FEH. More particularly, the internal system data bus internal bits SDIN [7:4] are applied to inputs of the NAND gate 646. These bits will all be high for the addresses F0H through FEH. Bit SDIN [0], which is low for even bytes between F0 and FE, is applied to the inverter 648 whose output, in turn, is applied to the NAND gate 646. Two interlock signals are also applied to the NAND gate 646 to disable the slow reset (-RC) during certain situations. First, the SCP can disable the slow reset feature by writing to address 000CH. More particularly, the decoded address signal A00012, available at the output of an OR gate 576 (FIG. 13) which indicates an SCP write to address 000CH, is applied to a clock input of a latch 650 (FIG. 13). Bit 0 of the SCP internal address data bus is used to either enable or disable the slow reset. Thus, bit SPADIN0 is applied to the D input of the latch 650. If bit SCPADIN [0] equals 1, the slow reset will be enabled, while a 0 will disable the slow reset. The QN output of the latch 650 is an enable RC signal (ENRC), which is applied to one input of the AND gate 646 (FIG. 17) by way of an inverter 652 to either enable or disable the slow reset signal.

To accommodate an established firmware unlocking scheme to enable the slush, the automatic setting of the slow reset signal by the CPU write of a command F8 is disabled for one command write after the command B8 is written by the CPU. The slush enable consists of a 4-byte sequence, the first two bytes being B8 and F8. The MKI 300 will, thus, disable the automatic generation of the slow reset signal for one command byte after it receives a command byte B8. The circuitry for decoding the command byte D8 includes the AND gate 654, the inverters 656, 658, 660, 662 and the latch 664. For the command byte B8, bits SDIN [6, 2, 1, 0] will be low. These bits are applied to the inverters 656, 658, 660 and 662. The output of the inverters 656, 658, 660 and 662 are applied to the AND gate 654. The bits SDIN [7, 5, 4, 3], which are high for the command signal B8, are also applied to the inputs of the AND gate 654. The output of the AND gate 654 represents a decoded B8 command signal, which is applied to a D input of the latch 664. The command clock signal (CMDCLK) is used to clock the flip-flop 664. As previously discussed, this signal indicates that the CPU wrote to address 64H. Thus, the QN output of the latch 664 will indicate that the byte B8 was written to the address 64H by the CPU. This output is applied as a permissive to the NAND gate 646. The output of the NAND gate 646 is applied to a D input of a latch 636, while the command clock signal (-CMDCLK) is applied to the clock input CP to enable the CPU to control the slow reset signal, unless this feature has been disabled by the SCP or the command byte B8 has been received by the system. After the SCP reads the byte from the input buffer, the slow reset signal is cleared. The flip-flop 664 is also reset on system reset.

IRQ12

The MKI 300 allows a type PS/2 mouse to be interfaced with the SCP 26 by way of an auxiliary device connector (e.g., a 6-pin mini D1N connector). Data from the mouse is sent by the SCP 26 to the CPU by way of the output buffer 364. This data sets the output buffer full bit of the status register 366 just like normal data from the SCP 26 and, additionally sets the auxiliary output buffer full flag (e.g., bit of the status register 366). When enabled, an IRQ12 interrupt is set by an auxiliary output full flag (MOBF). When the output buffer 364 is read by the CPU, output buffer full signal is cleared; however, the auxiliary output buffer full signal (MOBF) is left active until the SCP 26 writes a non-mouse byte to the output buffer 364.

The interrupt IRQ12, an interrupt to the CPU for type PS/2 mouse, is available at the output of an AND gate 666 (FIG. 18). This interrupt IRQ12 will be enabled unless it is disabled by the SCP or the MKI is disabled. More particularly, a mouse output buffer full flag (MOBF) is applied to one input of the AND gate 666. The mouse output buffer full flag (MOBF) is generated by circuitry which includes the flip-flop 668 and 670. Any time the SCP 26 writes to the auxiliary output buffer at address 000DH, the flip-flop 670 will be set by way of the output of the OR gate 510. This signal is also applied to a clock input of the flip-flop 668 whose D input is tied high to generate the mouse output buffer full flag at the Q output of the flip-flop 668. After the CPU reads the status register 366, an enable data signal (-ENDATA) clears the mouse output buffer full flag (MOBF). More particularly, the enable data signal (-ENDATA) is applied to the clock input (CP) of the flip-flop 670. The D input is tied low. The Q output of the flip-flop 670 is applied to the clear input (CDN) of the flip-flop 668. Thus, as the CPU reads the status register 366, the output of the flip-flop 670 will go low and, in turn, clear the mouse output buffer full flag which is tied to one input of the AND gate 666. The SCP 26 can disable the interrupt IRQ12 by writing to address 000EH. Thus, a decoded output signal A000 [14], which indicates a SCP write to the address A000EH, is ORed with a SCP write signal by way of an OR gate 672. The output of the OR gate 672 is applied to a clock input (CP) of an enable latch 674. Bit 1 of the SCP address data bus is used to control whether the interrupt IRQ12 is enabled or disabled. More specifically, SCPAD [0] equal "1" will enable the interrupt, while SCPAD [0] equal "0" will disable the interrupt. Thus, the SCAPDIN [0] is applied to the D input of the flip-flop 674. The Q output of this flip-flop 674 is applied to the AND gate 666 to either enable or disable the interrupt IRQ12, depending on the status of the bit SCPAD0. The flip-flop 674 is reset by system reset.

The circuitry also supports a suspend resume feature whereby certain data may be read back by the SCP 26 should the processing be suspended. The signal commands, ENIRQ1, ENIRQ12, MOBF, AOBF and MKIEN are applied to tristate devices 676 through 686. Two unused tristate devices 688 to 690 are tied to ground. The output of these tristate devices 676–690 are applied to the system control processor address data output bus SCAPOUT [0:7]. The tristate devices 676–690 are under the control of the signal enable flip-flop status (-ENFESTS). This signal (-ENFFSTS) is available at the output of an OR gate 692. A SCP read signal (-SCPRD) is ORed with a decoded address signal A000 [13] to enable these bits to be read any time the SCP reads to address 000DH.

HUMAN USER-INPUT INTERFACE (HUI)

The HUI is an application specific integrated circuit (ASIC) which integrates the SCPI and MKI interfaces discussed above into a single device along with an interface for a common memory device, which may be reprogrammable, for a central processing unit (CPU) and a system control processor (SCP). The common memory device enables the basic input/output system (BIOS) for the CPU, as well as the firmware for the SCP to be stored in the same memory device. As such, the number of external memory devices in the computer system can be reduced in order to simplify the design of the system, as well as reduce the costs of the computer system. More particularly, in known computer systems, the BIOS for the CPU is stored in a separate read only memory (ROM) or flash memory device, while the firmware for the SCP is normally stored in a separate memory device, which may be onboard the microcontroller for the SCP depending on the particular microcontroller selected for the SCP or in a separate memory device. For example, Intel type 80C51 microcontrollers are known to be used for the SCP. Such microcontrollers have on-board internal ROM for storing the firmware for the SCP and are relatively more expensive and considerably more difficult to field upgrade. Alternatively, other microcontrollers, such as an Intel type 80C31 are known to be used which do not contain on-board ROM. In such cases, an external memory device is used which increases the cost of the system. In such embodiments, both alternatives increase the cost of the computer system. The HUI solves this problem by providing an interface to enable both the SCP and the CPU to share a common memory device and, additionally, incorporates the SCPI and MKI interfaces, as well as several other features, as discussed below.

Figure 20:
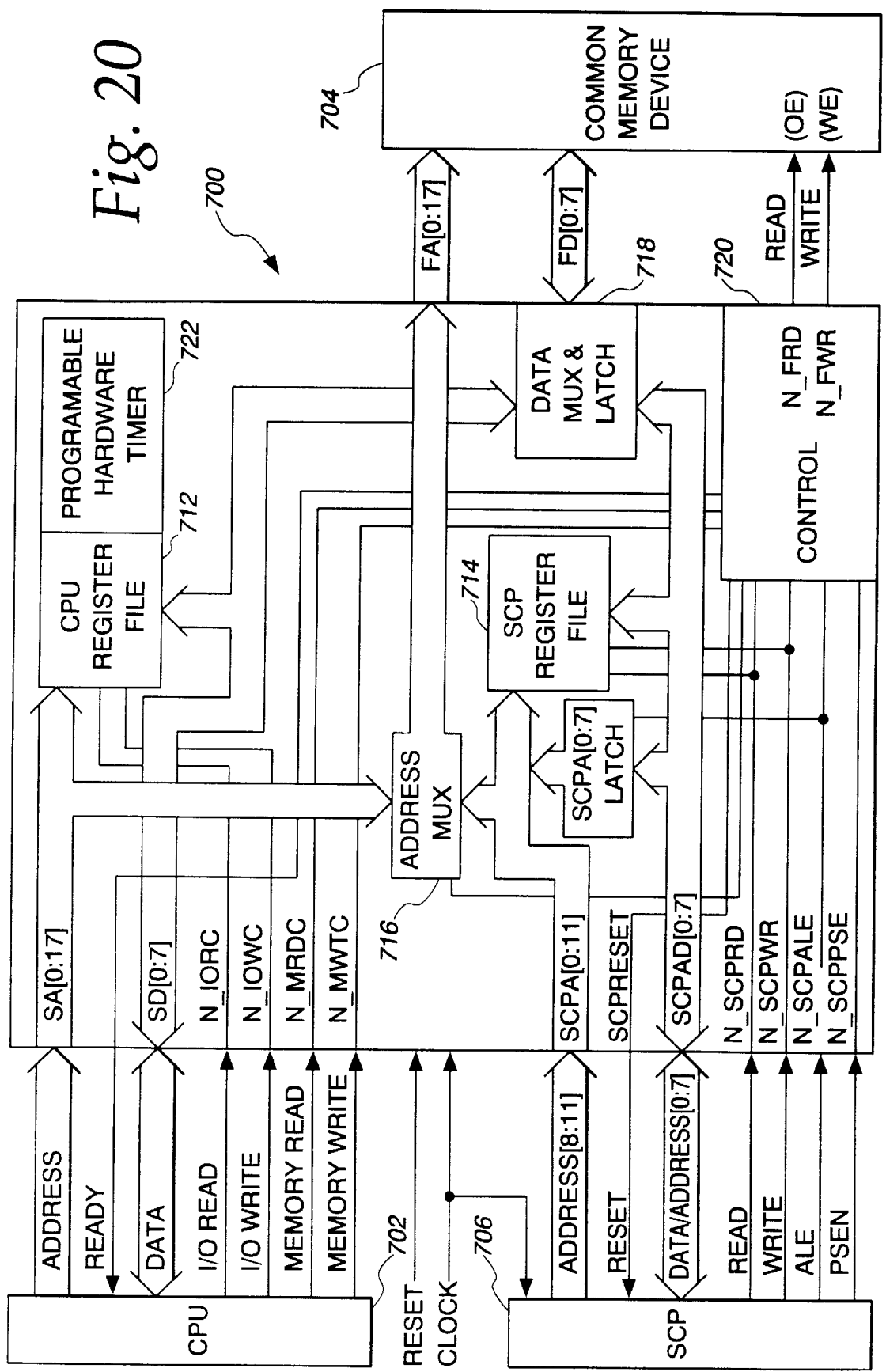
FIG. 20 is a block diagram of the Human User Input Interface (HUI) in accordance with present invention.
Figure 21:
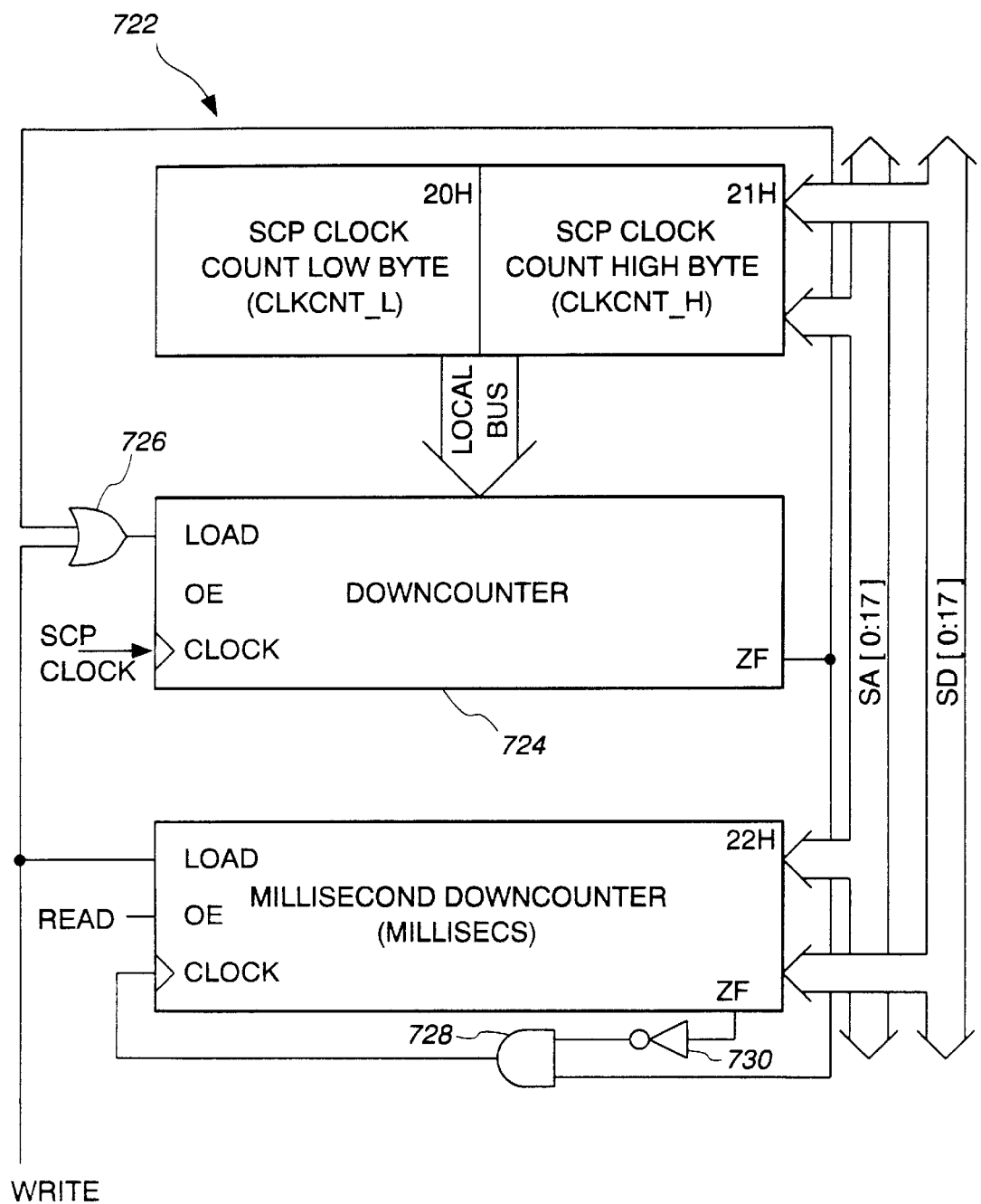
FIG. 21 is a block diagram of a programmable hardware timer that forms a portion of the HUI.

A system block diagram for the HUI, generally identified with the reference numeral 700, is illustrated in FIG. 20. The HUI 700 acts as an interface to enable a CPU 702 to communicate with a common memory device 704, as well as an SCP 706, by way of a CPU register file 712, connected to an 18-bit system address bus SA[0:17] and an 8-bit system data bus SD[0:7]. Similarly, the HUI 700 allows the SCP 706 to communicate with the CPU 702 and the common memory device 704 by way of an SCP register file 714, connected to an 8-bit multiplexed SCP address/data bus SCPAD[0:7] and a 4-bit address bus SCPA[8:11]. The SCP address data bus SCPAD[0:7] is demultiplexed to form an 8-bit address bus SCPA[0:7]. The system address bus SA[0:17] is multiplexed with the SCP address buses SCPA[0:7] and SCPA[8:11] by way of an address multiplexer (MUX) 716 to form an 18-bit memory address bus FA[0:17] to enable the CPU 702 and the SCP 706 to address a common memory device 704 up to 256K bytes. Similarly, the system data bus SD[0:7] is multiplexed with the SCP data bus SCPAD[0:7] by way of a data MUX and latch 718 to form an 8-bit memory data bus FD[0:7].

Reads and writes by the CPU 702 to the HUI 700 are under the control of various CPU control signals including an I/O read strobe N_IORC, an I/O write strobe N_IOWC, a memory data read strobe N_MRDC and a memory data write strobe N_MWTC. The I/O read N_IORC and I/O write N_IOWC strobes enable the CPU 702 to communicate with the SCP 706. The memory read strobe N_MRDC and the memory write strobe N_MWTC enable the CPU 702 to communicate with the common memory device 704.

Communication between the SCP 706 and the CPU 702, and between the SCP 706 and the common memory device 704 is under the control of various control signals including a memory read strobe N_SCPRD, a memory write strobe N_SCPWR, and address latch enable N—SCPALE and a program store enable N_CPPSE, similar to the SCP read SCPRD but indicates a code rather than data fetch.

Transfer of data to and from the common memory device 704 is under the control of the HUI 700. In particular, reads of the common memory device 704 are under the control of a memory read signal N_FRD; an output signal from control logic 720 (discussed in more detail below) that qualifies the reads with signals from either the CPU register file 712 or the SCP register file 714. The read signal N_FRD is typically connected to the output enable (OE) of the common memory device 704.

Writes to the common memory device 704 are under the control of a memory write signal N_FWR; another output signal from the control logic 720 that qualifies the writes with a signal from either the CPU register file 712 or the SCP register file 714. The memory write signal N_FWR is normally connected to a write enable (WE) input on the common memory device 704.

The HUI 700 also includes a programmable hardware timer 722. The programmable hardware timer 722 is used to provide a programmable reference time interval for various purposes including use by the BIOS. An important aspect of the programmable hardware timer 722 is that it can be used with computer systems having various operating speeds and is adapted to be autoconfigured by the BIOS to provide a suitable time interval based on the operating speed of the computer system in which it is used.

SYSTEM I/O INTERFACE

The HUI 700 has two methods of communicating with the CPU 702 through the system I/O bus. In the first method, the CPU I/O reads and writes to addresses that are decoded by the HUI 700. Examples of this method include system I/O reads and writes to addresses 60H and 64H; the addresses of the CPU/SCP communication registers described below. The second method is through an indexing scheme. In this method, the index of the desired register is first written to the system I/O address E6H.

In addition to the CPU/SCP interface at the system I/O addresses 60H and 64H, the HUI 700 has the capability to enable CPU/SCP communication through an alternate set of addresses to allow access to special SCP command sequences that might be intercepted by operating systems that monitor accesses to standard ports.

Table IX is a summary of the registers associated with the system data bus I/O space and identified in FIG. 20 as the CPU register file 712.

In the tables below, the various acronyms and defend as follows:
RO=Read Only
WO=Write Only
WORM=Write Once, Read Many
RW=Read/Write (Read and Write)
X=Don't Care
N/C=No Connect
Z=High Impedance
??=Uninitialized

TABLE XI

CPU REGISTER SUMMARY

| Mnemonic | Location | Read/Write | Function |
| --- | --- | --- | --- |
| CPU_OUT (r) | 60H | R/W | Read of SCP data byte; write of DATA to SCP. |
| CPU_DATA (w) | | | |
| CPU_STAT (r) | 64H | R/W | Read of SCP status; write of COMMAND to SCP. |
| CPU_CMD (w) | | | |
| CPU_INDEX | E6H | R/W | Selects register to read/write through CPU_VALUE. |

TABLE XI-continued

CPU REGISTER SUMMARY

| Mnemonic | Location | Read/Write | Function |
|---|---|---|---|
| CPU_VALUE | E7H | R/W | Portal to one of several registers - see next section. |
| FAST_A20 | EEH | R/W | Read clears FAST_A20 signal; Write sets FAST_A20 signal. |
| FAST_RC | EFH | RO | Read sets FAST_RC signal. |
| PRIVY_ACT | FBH | WO | Activate internal PRIVY signal |
| PRIVY_INACT | F9H | WO | Deactivate internal PRIVY signal |
| EISAID_1 | C80H | RO | EISA/ISA identification register 1. |
| EISAID_2 | C81H | RO | EISA/ISA identification register 2. |
| EISAID_3 | C82H | RO | EISA/ISA identification register 3. |
| EISAID_4 | C83H | RO | EISA/ISA identification register 4. |

Tables XII through XXIII describe the registers identified in Table XI in detail.

TABLE XII

SCP/CPU COMMUNICATION REGISTERS

```
MNEMONIC:            CPU_OUT (R)
                     CPU_DATA (w)
ADDRESS:             60H
ACCESS RESTRICTIONS: NONE
DESCRIPTION:         READ: THE SCP 'OUTPUT' BUFFER
                     CONTAINING DATA WRITTEN BY
                     THE SCP WRITE: BYTE FOR THE
                     SCP 'INPUT BUFFER' TO BE
                     READ BY THE SCP AS 'DATA'
        SCP OUTPUT BUFFER (CPU_OUT (READ-ONLY))
BIT          7    6    5    4    3    2    1    0
NUMBER
RESET                          ??
STATE
FIELD                    OUTPUT BUFFER
NAME
Read/Write               Read-Only
        SCP INPUT BUFFER (CPU_DATA (WRITE-ONLY))
Bit          7    6    5    4    3    2    1    0
Number
Reset                          ??
State
Field                    Input Buffer
Name
Read/Write               Write-Only
```

NOTE: This address actually communicates with 2 different registers - Writing sends data from the CPU to the SCP (Input Buffer), and clears the CMD/DATA flag, while reading accesses the data sent by the SCP to the CPU.

TABLE XIII

SCP Status Register

```
MNEMONIC:            CPU_STAT (r)
                     CPU_CMD (w)
ADDRESS:             64H
ACCESS RESTRICTIONS: None
DESCRIPTION:         READ: Status from the SCP (see below)
                     WRITE: byte for SCP 'input buffer'
                     to be read by SCP as 'command'
        SCP STATUS REGISTER (CPU_STAT (READ-ONLY)
```

| Bit Number | 7 | 6 | 5 | 4 | 3 | 2 | 1 | 0 |
|---|---|---|---|---|---|---|---|---|
| Reset State | 0 | 0 | 0 | 0 | 0 | 0 | 0 | 0 |
| Field Name | PE | GTO | TTO/AOBF | Inhibit | CMD/DATA | SysFlag | IBF | OBF |
| Read/Write | R | R | R | R | R | R | R | R |

PE: Parity Error - written by SCP

TABLE XIII-continued

SCP Status Register

| | |
|---|---|
| GTO: | General Time Out - written by SCP |
| TTO/AOBF: | Transmit Time Out -or- Auxiliary Output Buffer Full<br>When MKI register is clear, TTO is written by SCP. When MKT register is set, this bit is SET when SCP writes to AUX_OUT, cleared when SCP writes to SCP_OUT (i.e., AOBF indicates that data is from the AUX device, which is normally the mouse) |
| Inhibit: | Inhibit Switch - written by SCP |
| CMD/DATA: | Command/Data flag - indicates source of last byte from CPU as follows:<br>0 = data (CPU wrote to CPU DATA address)<br>1 = command (CPU wrote to CPU CMD address) |
| SysFlag: | System Flag - written by SCP. |
| IBF: | Input Buffer Full - indicates CPU has written a byte to CPU DATA or CPU_CMD, which is then available to be read by the SCP at SCP_IN. |
| CBF: | Output Buffer Full - indicates SCP has written a byte to SCP_OUT or AUX_OUT, which is then available to be read by the CPU at CPU_OUT. |

```
        SCP INPUT BUFFER (CPU_CMD (WRITE-ONLY))
BIT          7    6    5    4    3    2    1    0
NUMBER
RESET STATE                    ??
FIELD NAME               INPUT BUFFER
READ/WRITE               WRITE-ONLY
        STATUS REGISTER BIT DEFINITION SUMMARY
```

| | |
|---|---|
| BIT 7 PARITY ERROR | WRITTEN BY THE SCP. |
| BIT 6 RECEIVE TIME-OUT | WRITTEN BY THE SCP. |
| BIT 5 TRANSMIT TIME-OUT | WRITTEN BY THE SCP WHEN MKI FEATURES ARE DISABLED. |
| AUXILIARY OUTPUT BUFFER FULL | GENERATED BY THE MKI WHEN THE MKI FEATURES ARE ENABLED AND THE SCP WRITES TO THE AUXILIARY OUTPUT BUFFER. |
| BIT 4 INHIBIT SWITCH | WRITTEN BY THE SCP. |
| BIT 3 COMMAND/DATA | GENERATED BY THE MKI. THIS SIGNAL INDICATES WHETHER THE LAST BYTE WRITTEN BY THE CPU WAS A COMMAND (WRITTEN TO ADDRESS 64H) OR DATA (WRITTEN TO ADDRESS 60H) |
| BIT 2 SYSTEM FLAG | WRITTEN BY THE SCP. |
| BIT 1 INPUT BUFFER FULL | GENERATED BY THE MKI. THIS SIGNAL INDICATES WHEN |

TABLE XIII-continued

SCP Status Register

| | | |
|---|---|---|
| | | THE CPU HAS WRITTEN A BYTE TO THE INPUT BUFFER BUT THE SCP HAS NOT YET READ THE BYTE OUT OF THE LATCH. IT CAN BE USED BY THE CPU AS A FLAG TO INDICATE THAT THE SCP IS READY TO RECEIVE A BYTE. |
| BIT 0 | OUTPUT BUFFER FULL | GENERATED BY THE MKI. THIS SIGNAL INDICATES WHEN THE SCP HAS WRITTEN A BYTE TO THE OUTPUT BUFFER BUT THE CPU HAS NOT YET READ THE BYTE OUT OF THE LATCH. IT CAN BE USED BY THE SCP AS A FLAG TO INDICATE THAT THE CPU IS READY TO RECEIVE A BYTE. |

TABLE XIV

INDEX REGISTER

MNEMONIC: CPU_INDEX
ADDRESS: E6H
ACCESS RESTRICTIONS: PRIVY
DESCRIPTION: SELECTS REGISTER TO BE READ OR WRITTEN VIA THE CPU_VALUE PORT.

INDEX REGISTER (CPU_INDEX)

| BIT NUMBER | 7 | 6 | 5 | 4 | 3 | 2 | 1 | 0 |
|---|---|---|---|---|---|---|---|---|
| RESET STATE | | | | | ?? | | | |
| FIELD NAME | | | | INDEX | | | | |
| Read/Write | | | | R/W | | | | |

TABLE XV

Value register

MNEMONIC: CPU_VALUE
ADDRESS: E7H
ACCESS RESTRICTIONS: PRIVY
DESCRIPTION: Contains the data for the register selected by the CPU_INDEX register. See the 'CPU Indexed registers' section for details of each register.

VALUE REGISTER (CPU_VALUE)

| BIT NUMBER | 7 | 6 | 5 | 4 | 3 | 2 | 1 | 0 |
|---|---|---|---|---|---|---|---|---|
| RESET STATE | | | | | ?? | | | |
| FIELD NAME | | | | VALUE | | | | |
| Read/Write | | | | R/W | | | | |

TABLE XVI

ZBIOS FAST_A20 Control

MNEMONIC: FAST_A20
ADDRESS: EEH
ACCESS RESTRICTIONS: PRIVY
DESCRIPTION: Holds a place in system I/O space where Zenith BIOS can directly control the state of the Fast A20 signal generated by

TABLE XVI-continued

ZBIOS FAST_A20 Control

HUI. Writing to this I/O location sets the FAST_A20 signal, while Reading from this I/O location clears the FAST_A20 signal. The actual data written is irrelevant, and data read is undefined.

FAST_A20 CONTROL REGISTER (FAST_A20)

| BIT NUMBER | 7 | 6 | 5 | 4 | 3 | 2 | 1 | 0 |
|---|---|---|---|---|---|---|---|---|
| RESET STATE | | | | 'A20GATE INACTIVE' STATE | | | | |
| FIELD NAME | | | | x | | | | |
| Read/Write | | | | R/W | | | | |

TABLE XVII

ZBIOS FAST_RC CONTROL

MNEMONIC: FAST_RC
ADDRESS: EFH
ACCESS RESTRICTIONS: PRIVY
DESCRIPTION: HOLDS A PLACE IN SYSTEM I/O SPACE WHERE ZENITH BIOS CAN DIRECTLY CONTROL THE STATE OF THE FAST RC SIGNAL GENERATED BY HUI. READING FROM THIS I/O LOCATION SETS THE FAST RC SIGNAL. THE ACTUAL DATA READ IS UNDEFINED.

FAST_RC CONTROL REGISTER (FAST_RC)

| BIT NUMBER | 7 | 6 | 5 | 4 | 3 | 2 | 1 | 0 |
|---|---|---|---|---|---|---|---|---|
| RESET STATE | | | | 'FASTR INACTIVE' STATE | | | | |
| FIELD NAME | | | | x | | | | |
| Read/Write | | | | RO | | | | |

TABLE XVIII

PRIVY ACTIVATE REGISTER

MNEMONIC: PRIVY_ACT
ADDRESS: FBH
ACCESS RESTRICTIONS: NONE
DESCRIPTION: WRITING TO THIS PORT ACTIVATES THE INTERNAL PRIVY SIGNAL WHICH IS USED TO QUALIFY ACCESS TO CERTAIN OTHER REGISTERS. THE DATA VALUE DURING THE WRITE IS IGNORED.

PRIVY ACTIVATE (PRIVY_ACT)

| BIT NUMBER | 7 | 6 | 5 | 4 | 3 | 2 | 1 | 0 |
|---|---|---|---|---|---|---|---|---|
| RESET STATE | | | | 'PRIVY ACTIVE' STATE | | | | |
| FIELD NAME | | | | x | | | | |
| Read/Write | | | | WO | | | | |

TABLE XIX

PRIVY DEACTIVATE

MNEMONIC: PRIVY_INACT
ADDRESS: F9H
ACCESS RESTRICTIONS: NONE

TABLE XIX-continued

PRIVY DEACTIVATE

| | |
|---|---|
| DESCRIPTION: | WRITING TO THIS PORT DE-ACTIVATES THE INTERNAL PRIVY THE DATA VALUE DURING THE WRITE IS IGNORED. |

PRIVY DEACTIVATE (PRIVY_INACT)

| BIT NUMBER | 7 | 6 | 5 | 4 | 3 | 2 | 1 | 0 |
|---|---|---|---|---|---|---|---|---|
| RESET STATE | 'PRIVY ACTIVE' STATE | | | | | | | |
| FIELD NAME | | | | x | | | | |
| Read/Write | | | | WO | | | | |

TABLE XX

EISA/ISA IDENTIFICATION REGISTER 1

| | |
|---|---|
| MNEMONIC: | EISAID_1 |
| ADDRESS: | C80H |
| ACCESS RESTRICTIONS: | NONE |
| DESCRIPTION: | THIS REGISTER CONTAINS BITS 0 THROUGH 7 OF THE 32-BIT EISA/ISA IDENTIFICATION REGISTER. |

EISA/ISA IDENTIFICATION REGISTER 1 (EISAID_1)

| BIT NUMBER | 7 | 6 | 5 | 4 | 3 | 2 | 1 | 0 |
|---|---|---|---|---|---|---|---|---|
| RESET STATE | | | | 00 | | | | |
| FIELD NAME | | | | EISAID_1 | | | | |
| Read/Write | | | | RO | | | | |

TABLE XXI

EISA/ISA IDENTIFICATION REGISTER 2

| | |
|---|---|
| MNEMONIC: | EISAID_2 |
| ADDRESS: | C81H |
| ACCESS RESTRICTIONS: | NONE |
| DESCRIPTION: | THIS REGISTER CONTAINS BITS 8 THROUGH 15 OF THE 32-BIT EISA/ISA IDENTIFICATION REGISTER. |

EISA/ISA IDENTIFICATION REGISTER 2 (EISAID_2)

| BIT NUMBER | 7 | 6 | 5 | 4 | 3 | 2 | 1 | 0 |
|---|---|---|---|---|---|---|---|---|
| RESET STATE | | | | 00 | | | | |
| FIELD NAME | | | | x | | | | |
| Read/Write | | | | RO | | | | |

TABLE XXII

EISA/ISA IDENTIFICATION REGISTER 3

| | |
|---|---|
| MNEMONIC: | EISAID_3 |
| ADDRESS: | C82H |
| ACCESS RESTRICTIONS: | NONE |
| DESCRIPTION: | THIS REGISTER CONTAINS BITS 16 THROUGH 23 OF THE 32-BIT EISA/ISA IDENTIFICATION REGISTER. |

EISA/ISA IDENTIFICATION REGISTER 3 (EISAID_3)

| BIT NUMBER | 7 | 6 | 5 | 4 | 3 | 2 | 1 | 0 |
|---|---|---|---|---|---|---|---|---|
| RESET STATE | | | | 00 | | | | |
| FIELD NAME | | | | x | | | | |
| Read/Write | | | | RO | | | | |

TABLE XXIII

EISA/ISA IDENTIFICATION REGISTER 4

| | |
|---|---|
| MNEMONIC: | EISAID_4 |
| ADDRESS: | C83H |
| ACCESS RESTRICTIONS: | NONE |
| DESCRIPTION: | THIS REGISTER CONTAINS BITS 24 THROUGH 31 OF THE 32-BIT EISA/ISA IDENTIFICATION REGISTER. |

EISA/ISA IDENTIFICATION REGISTER 4 (EISAID_4)

| BIT NUMBER | 7 | 6 | 5 | 4 | 3 | 2 | 1 | 0 |
|---|---|---|---|---|---|---|---|---|
| RESET STATE | | | | 00 | | | | |
| FIELD NAME | | | | x | | | | |
| Read/Write | | | | RO | | | | |

Table XXIV is a register summary of the index registers accessed through the CPU index register (CPU_INDEX) at address E6H and the CPU value register (CPU_VALUE) at address E7H, described in Table XI. Tables XXV through XLII provide detailed descriptions of the registers identified in Table XXIV.

TABLE XXIV

INDEX REGISTER SUMMARY

| Mnemonic | Location | Read/Write | Function |
|---|---|---|---|
| VERSION | 00H | RO | Chip version. |
| CLKCNT_L | 20H | WORM | Low byte--number of SCP clocks to count for 1 millisecond. |
| CLKCNT_H | 21H | WORM | High byte--number of SCP clocks to count for 1 millisecond. |

TABLE XXIV-continued

INDEX REGISTER SUMMARY

| Mnemonic | Location | Read/Write | Function |
|---|---|---|---|
| MILLISECS | 22H | R/W | Loadable millisecond down-counter. |
| HWSTRAP_1 | 23H | RO | Hardware strap values on flash data bus at Reset. |
| HWSTRAP_2 | 24H | RO | Hardware strap values on SCP data bus at Reset. |
| FLASH_CTRL | 25H | R/W | Controls FLASH interface. |
| SCP_BASE | 26H | R/W | Selects location of SCP code within shared FLASH memory. |
| FAST_CTRL | 27H | R/W | Enables for fast HUI generation of A20 and RC signals. |
| HUI_STAT | 28H | R/W | Various fields indicating current MUI status. |
| WBOOT_EN | 2FH | WORM | Enable for warm boot vector fast recovery. |
| WBOOT_1 | 30H | WORM | First byte in warm boot vector. |
| WBOOT_2 | 31H | WORM | Second byte in warm boot vector. |
| WBOOT_3 | 32H | WORM | Third byte in warm boot vector. |
| WBOOT_4 | 33H | WORM | Fourth byte in warm boot vector. |
| WBOOT_5 | 34H | WORM | Fifth byte in warm boot vector. |
| WBOOT_6 | 35H | WORM | Sixth byte in warm boot vector. |
| WBOOT_7 | 36H | WORM | Seventh byte in warm boot vector. |
| WBOOT_8 | 37H | WORM | Eighth byte in warm boot vector. |
| WBOOT_9 | 38H | WORM | Ninth byte in warm boot vector. |
| WBOOT_10 | 39H | WORM | Tenth byte in warm boot vector. |
| WBOOT_11 | 3AH | WORM | Eleventh byte in warm boot vector. |
| WBOOT_12 | 3BH | WORM | Twelfth byte in warm boot vector. |
| WBOOT_13 | 3CH | WORM | Thirteenth byte in warm boot vector. |
| WBOOT_14 | 3DH | WORM | Fourteenth byte in warm boot vector. |
| WBOOT_15 | 3EH | WORM | Fifteenth byte in warm boot vector. |
| WBOOT_16 | 3FH | WORM | Sixteenth byte in warm boot vector. |
| ALT_CPU_OUT (r) ALT_CPU_DATA (w) | 60H | R/W | Alternate location to access CPU_OUT/CPU_DATA. Read of SCP data byte; write of DATA to SCP. |
| ALT_CPU_STAT (r) ALT_CPU_CMD (w) | 64H | R/W | Alternate location to access CPU_STAT/CPU_CMD. Read of SCP status; write of COMMAND to SCP. |
| EISAID_1 | 80H | WORM | EISA/ISA identification register 1. |
| EISAID_2 | 81H | WORM | EISA/ISA identification register 2. |
| EISAID_3 | 82H | WORM | EISA/ISA identification register 3. |
| EISAID_4 | 83H | WORM | EISA/ISA identification register 4. |

TABLE XXV

| | |
|---|---|
| MNEMONIC: | VERSION_REG |
| INDEX: | 00H |
| ACCESS RESTRICTIONS: | None |
| DESCRIPTION: | Returns version code for this chip. |

VERSION (VERSION_REG)

| BIT NUMBER | 7 | 6 | 5 | 4 | 3 | 2 | 1 | 0 |
|---|---|---|---|---|---|---|---|---|
| RESET STATE | | | | 00 | | | | |
| FIELD NAME | | | | VERSION REG | | | | |
| Read/Write | | | | RO | | | | |

TABLE XXVI

8SCP CLOCK COUNT LOW BYTE

| | |
|---|---|
| MNEMONIC: | CLKCNT_L |
| INDEX: | 20H |
| ACCESS RESTRICTIONS: | NONE |
| DESCRIPTION: | THIS REGISTER HOLDS THE LOW BYTE OF THE 16-BIT NUMBER REPRESENTING THE NUMBER OF SCP CLOCK PULSES TO COUNT BEFORE ONE MILLISECOND HAS PASSED AND THE MILLISECS REGISTER IS DECREMENTED. |

SCP CLOCK COUNT LOW BYTE (CLKCNT_L)

| BIT NUMBER | 7 | 6 | 5 | 4 | 3 | 2 | 1 | 0 |
|---|---|---|---|---|---|---|---|---|
| RESET STATE | | | | 00 | | | | |
| FIELD NAME | | | | CLKCNT_L | | | | |
| Read/Write | | | | WORM | | | | |

TABLE XXVII

SCP CLOCK COUNT HIGH BYTE

| | |
|---|---|
| MNEMONIC: | CLKCNT_H |
| INDEX: | 21H |
| ACCESS RESTRICTIONS: | NONE |
| DESCRIPTION: | THIS REGISTER HOLDS THE HIGH BYTE OF THE 16-BIT NUMBER REPRESENTING THE NUMBER OF SCP CLOCK PULSES TO COUNT BEFORE ONE MILLISECOND HAS PASSED AND THE MILLISECS REGISTER IS DECREMENTED. |

SCP CLOCK COUNT HIGH BYTE (CLKCNT_H)

| BIT NUMBER | 7 | 6 | 5 | 4 | 3 | 2 | 1 | 0 |
|---|---|---|---|---|---|---|---|---|
| RESET STATE | | | | 00 | | | | |
| FIELD NAME | | | | CLKCNT_H | | | | |

TABLE XXVII-continued

| SCP CLOCK COUNT HIGH BYTE | |
|---|---|
| Read/Write | WORM |

TABLE XXVIII

MILLISECOND DOWN-COUNTER

| | |
|---|---|
| MNEMONIC: | MILLISECS |
| INDEX: | 22H |
| ACCESS RESTRICTIONS: | NONE |
| DESCRIPTION: | LOADED BY SYSTEM BIOS, THIS REGISTER WILL DECREMENT EVERY MILLISECOND. STOPS DECREMENTING WHEN THE ZERO COUNT IS REACHED. |

MILLISECOND DOWN-COUNTER (MILLISECS)

| BIT NUMBER | 7 | 6 | 5 | 4 | 3 | 2 | 1 | 0 |
|---|---|---|---|---|---|---|---|---|
| RESET STATE | | | | | 00 | | | |
| FIELD | | | | COUNT | | | | |
| Read/Write | | | | R/W | | | | |

TABLE XXIX

Hardware Configuration Strap Register 1

| | |
|---|---|
| MNEMONIC: | HWSTRAP_1 |
| INDEX: | 23H |
| ACCESS RESTRICTIONS: | None |
| DESCRIPTION: | This register holds the state that the flash memory data bus was held in by pull-up and/or pull-down resistors on the PCB. It is latched on the falling edge of the system Reset signal: The contents are used as control for several parameters of the flash memory interface. |

HARDWARE CONFIGURATION STRAP REGISTER 1 (HWSTRAP_1)

| BIT NUMBER | 7 | 6 | 5 | 4 | 3 | 2 | 1 | 0 |
|---|---|---|---|---|---|---|---|---|
| Reset State | | | | depends on hardware | | | | |
| Field Name | FLSHsize | PASStrap | | ERASEtrap | | | BOOTblk | |
| Read/Write | | | | RO | | | | |

FIELD DEFINITIONS:

FLSHsize: Flash memory part size - indicates size of flash memory that the HUI is controlling
0 = 256K byte
1 = 128K byte PASStrap: Flash password area access trap - controls whether or not the HUI allows system memory reads and writes to the lowest 256 bytes in the flash memory space where the SCP can store the system password
0 = protect flash password storage area
1 = no password protection ERASEtrap: Flash software erase sequence trap - selects the flash software erase sequence standard that the HUI will intercept before it reaches the flash memory. Bit <5> is reserved for future chip erase sequences.
x0 = JEDEC flash software erase standard
x1 = no software erase trap BOOTblk: Flash boot-block size to emulate - selects the size of the flash memory boot-block at the top of the flash memory space that the HUI will emulate and protect from system memory writes
0000 (0H) = 2K byte boot block    1000 (8H) = 12K byte boot block
0001 (1H) = 3K byte boot block    1001 (9H) = 14K byte boot block
0010 (2H) = 4K byte boot block    1010 (AH) = 16K byte boot block
0011 (3H) = 5K byte boot block    1011 (BH) = 20K byte boot block
0100 (4H) = 6K byte boot block    1100 (CH) = 24K byte boot block
0101 (5H) = 7K byte boot block    1101 (DH) = 28K byte boot block
0110 (6H) = 8K byte boot block    1110 (EH) = 32K byte boot block
0111 (7H) = 10K byte boot block   1111 (FH) = no boot block protection

TABLE XXX

HARDWARE CONFIGURATION STRAP REGISTER 2

| | |
|---|---|
| MNEMONIC: | HWSTRAP_2 |
| INDEX: | 24H |
| ACCESS RESTRICTIONS: | NONE |
| DESCRIPTION: | THIS REGISTER HOLDS THE STATE THAT THE SCP ADDRESS/DATA BUS WAS HELD IN BY PULL-UP AND/OR PULL-DOWN RESISTORS ON THE PCB. IT IS LATCHED ON THE FALLING EDGE OF THE SYSTEM RESET SIGNAL. THE CONTENTS ARE INTENDED FOR USE BY SYSTEM SOFTWARE TO DERIVE CONFIGURATION INFORMATION FROM THE HARDWARE. THERE ARE NO FIELD DEFINITIONS. |

HARDWARE CONFIGURATION STRAP REGISTER 2 (HWSTRAP_2)

| BIT NUMBER | 7 | 6 | 5 | 4 | 3 | 2 | 1 | 0 |
|---|---|---|---|---|---|---|---|---|
| Reset State | depends on hardware ||||||||
| Field Name | HWSTRAP_2 ||||||||
| Read/Write | RO ||||||||

TABLE XXXI

FLASH INTERFACE CONTROL

| | |
|---|---|
| MNEMONIC: | FLASH_CTRL |
| INDEX: | 25H |
| ACCESS RESTRICTIONS: | NONE |
| DESCRIPTION: | CONTROLS THE FLASH INTERFACE FEATURES OF HUI. |

FLASH INTERFACE CONTROL (FLASH_CTRL)

| BIT NUMBER | 7 | 6 | 5 | 4 | 3 | 2 | 1 | 0 |
|---|---|---|---|---|---|---|---|---|
| RESET STATE | | | | | | 0 | 0 | 1 |
| FIELD NAME | x | | | | | VPPEN | CPUEXCL | SCPRESET |
| READ/WRITE | | | | | | R/W | RO | R/W |

FIELD DEFINITIONS:

VPPEN: Controls state of VPPEN output pin. Is cleared and becomes unalterable when in secure mode.

CPUexcl: Flag for when SCP has requested exclusive access to flash memory for a write and CPU is disallowed from reading and writing the FLASH- this bit can be cleared immediately if a '1' is written to SCPreset
0 = SCP sharing FLASH
1 = SCP holding FLASH exclusively SCPreset: 0 = share FLASH with SCP; let SCP run
1 = FLASH exclusive to system CPU; SCP is held in Reset

TABLE XXXII

FLASH SCP BASE ADDRESS

| | |
|---|---|
| MNEMONIC: | SCP_BASE |
| INDEX: | 26H |
| ACCESS RESTRICTIONS: | NONE |
| DESCRIPTION: | DETERMINES BASE ADDRESS OF SCP CODE WITHIN SHARED FLASH MEMORY - THIS 6-BIT VALUE IS USED AS BITS 17:12 (BITS 11:0 COME DIRECTLY FROM THE SCP) |

TABLE XXXII-continued

FLASH SCP BASE ADDRESS

OF THE SCP ADDRESS TO DETERMINE THE FLASH ADDRESS. THIS MEANS THAT THE SCP CODE MAY BE PLACED ON ANY 4K BOUNDARY WITHIN THE 256K FLASH ADDRESS SPACE.

FLASH SCP BASE ADDRESS (SCP_BASE)

| BIT NUMBER | 7 | 6 | 5 | 4 | 3 | 2 | 1 | 0 |
|---|---|---|---|---|---|---|---|---|
| Reset State | 00 ||||||||
| Field Name | SCP_BASE ||||||||
| Read/Write | R/W ||||||||

TABLE XXXIII

Zenith BIOS Fast Signal Control

| | |
|---|---|
| MNEMONIC: | FAST_CTRL |
| INDEX: | 27H |
| ACCESS RESTRICTIONS: | None |
| DESCRIPTION: | ZENITH BIOS FAST SIGNAL CONTROL (FAST_CTRL) |

| BIT NUMBER | 7 | 6 | 5 | 4 | 3 | 2 | 1 | 0 |
|---|---|---|---|---|---|---|---|---|
| RESET STATE | | | | | | | 0 | 0 |
| FIELD NAME | | | | x | | | ENFRC | ENFA20 |
| Read/Write | | | | | | | R/W | R/W |

FIELD DEFINITIONS:

enFRC: Enable ZBIOS fast RC control at system I/O address EFH
0 = control at EFH disabled
1 = control at EFH enabled enFA20: Enable ZBIOS fast A20 control at system I/O address EEH
0 = control at EEH disabled
1 = control at EEH enabled

TABLE XXXIV

MISCELLANEOUS HUI STATUS

| | |
|---|---|
| MNEMONIC | HUI_STAT |
| INDEX: | 28H |
| ACCESS RESTRICTIONS: | NONE |
| DESCRIPTION: | CONTAINS MISCELLANEOUS HUI STATUS BITS. |

MISCELLANEOUS HUI STATUS (HUI_STAT)

| BIT NUMBER | 7 | 6 | 5 | 4 | 3 | 2 | 1 | 0 |
|---|---|---|---|---|---|---|---|---|
| RESET STATE | | | | | | | 0 | 0 |
| FIELD NAME | | | | | | x | POWERUP | SECURE |
| READ/WRITE | | | | | | | R/W | RO |

FIELD DEFINITIONS:

powerup: System boot status flag. BIOS should set this bit during the cold boot sequence. During a warm boot, this bit will remain set and BIOS can use this flag to select which of the cold boot or warm boot code to execute.
0 = Current boot is a cold boot
1 = Current boot is a warm boot secure: HUI secure mode status. This bit is R/W by the SCP. When the SCP puts the HUI in secure mode by setting this bit, CPU system memory writes to the flash memory are ignored.
0 = HUI is not in secure mode
1 = HUI is in secure mode

TABLE XXXV

WARM BOOT VECTOR REGISTER FILE ENABLE

| | |
|---|---|
| MNEMONIC: | WBOOT_EN |
| INDEX: | 2FH |
| ACCESS RESTRICTIONS: | NONE |
| DESCRIPTION: | ENABLE FOR THE WARM BOOT VECTOR FAST RECOVERY REGISTER FILE. THIS REGISTER BECOMES READ-ONLY AFTER THE FIRST WRITE. THE FIRST WRITE TO THIS REGISTER ALSO LOCKS OUT ALL WRITES TO THE WARM BOOT VECTOR REGISTER FILE. |

WARM BOOT VECTOR REGISTER FILE COUNT (WBOOT_EN)

| BIT NUMBER | 7 | 6 | 5 | 4 | 3 | 2 | 1 | 0 |
|---|---|---|---|---|---|---|---|---|
| RESET STATE | | | | | | | | 0 |
| FIELD NAME | | | | | x | | | WBOOT_EN |
| READ/WRITE | | | | | | | | WORM |

FIELD DEFINITIONS:
WBOOT_EN: Enable for warm boot vector fast recovery.
    0 = Warm boot vector fast recovery feature disabled
    1 = Warm boot vector fast recovery feature enabled

TABLE XXXVI

WARM BOOT VECTOR REGISTER FILE

| | |
|---|---|
| MNEMONIC: | WBOOT_1 THROUGH WBOOT_16 |
| INDEX: | 30H–3FH |
| ACCESS RESTRICTIONS: | NONE |
| DESCRIPTION: | REGISTER FILE IN WHICH THE DATA TO BE RETURNED TO THE CPU ON MEMORY READS FROM FLASH MEMORY STARTING AT ADDRESS 3FFF0H (256KB PART) OR 1FFF0H (128KB PART.) THESE REGISTERS ARE READ/WRITE UNTIL THE FIRST TIME THAT INDEX WBOOT_EN IS WRITTEN, AT WHICH TIME THEY BECOME READ-ONLY. |

WARM BOOT VECTOR REGISTER FILE (WBOOT_1 THROUGH WBOOT_16)

| BIT NUMBER | 7 | 6 | 5 | 4 | 3 | 2 | 1 | 0 |
|---|---|---|---|---|---|---|---|---|
| RESET STATE | | | | ?? | | | | |
| FIELD NAME | | | | WBOOT_1 THROUGH WBOOT_1 6 | | | | |
| READ/WRITE | | | | WORM | | | | |

TABLE XXXVII

ALTERNATE SCP/CPU COMMUNICATION REGISTERS

| | |
|---|---|
| MNEMONIC: | ALT_CPU_OUT (R)<br>ALT_CPU_DATA (w) |
| INDEX: | 60H |
| ACCESS RESTRICTIONS: | NONE |
| DESCRIPTION: | READ: THE SCP 'OUTPUT' BUFFER CONTAINING DATA WRITTEN BY THE SCP<br>WRITE: BYTE FOR THE SCP 'INPUT BUFFER' TO BE READ BY THE SCP AS 'DATA' |

ALTERNATE SCP OUTPUT BUFFER (ALT_CPU_OUT (READ-ONLY))

| BIT NUMBER | 7 | 6 | 5 | 4 | 3 | 2 | 1 | 0 |
|---|---|---|---|---|---|---|---|---|
| RESET STATE | | | | ?? | | | | |
| FIELD NAME | | | | OUTPUT BUFFER | | | | |
| Read/Write | | | | Read-Only | | | | |

ALTERNATE SCP INPUT BUFFER (ALT_CPU_DATA (WRITE-ONLY))

| BIT NUMBER | 7 | 6 | 5 | 4 | 3 | 2 | 1 | 0 |
|---|---|---|---|---|---|---|---|---|
| RESET STATE | | | | ?? | | | | |
| FIELD NAME | | | | INPUT BUFFER | | | | |
| Read/Write | | | | Write-Only | | | | |

NOTE: This address actually communicates with 2 different registers - Writing sends data from the CPU to the SCP (Input Buffer), and clears the CND/DATA flag, while reading accesses the data sent by the SCP to the CPU.

TABLE XXXVIII

ALTERNATE SCP STATUS REGISTER

| | |
|---|---|
| MNEMONIC: | ALT_CPU_STAT (R)<br>ALT_CPU_CMD (w) |
| INDEX: | 64H |
| ACCESS RESTRICTIONS: | NONE |
| DESCRIPTION: | READ: STATUS FROM THE SCP (SEE BELOW)<br>WRITE: BYTE FOR SCP 'INPUT BUFFER' TO BE READ BY SCP AS 'COMMAND' |

ALTERNATE SCP STATUS REGISTER (ALT_CPU_STAT (READ-ONLY))

| Bit Number | 7 | 6 | 5 | 4 | 3 | 2 | 1 | 0 |
|---|---|---|---|---|---|---|---|---|
| Reset State | 0 | 0 | 0 | 0 | 0 | 0 | 0 | 0 |
| Field Name | PE | GTO | TTO/AOBF | Inhibit | CMD/DATA | SysFlag | IBF | OBF |
| Read/Write | R | R | R | R | R | R | R | R |

PE: Parity Error - written by SCP
GTO: General Time Out - written by SCP
TTO/AOBF: Transmit Time Out -or- Auxiliary Output Buffer Full When MKI register is clear, TTO is written by SCP. When MKI register is set, this bit is SET when SCP writes to AUX_OUT, cleared when SCP writes to SCP_OUT (i.e., AOBP indicates that data is from the AUX device, which is normally the mouse)
Inhibit: Inhibit Switch - written by SCP
CMD/DATA: Command/Data flag - indicates source of last byte from CPU as follows:
    0 = data (CPU wrote to CPU DATA address)
    1 = command (CPU wrote to CPU_CMD address)
SysFlag: System Flag - written by SCP.
IBF: Input Buffer Full - indicates CPU has written a byte to CPU_DATA or CPU_CMD, which is then available to be read by the SCP at SCP_IN.
OBF: Output Buffer Full - indicates SCP has written a byte to SCP_OUT or AUX_OUT, which is then available to be read by the CPU at CPU_OUT.

ALTERNATE SCP INPUT BUFFER (ALT_CPU_CMD (WRITE-ONLY))

| BIT NUMBER | 7 | 6 | 5 | 4 | 3 | 2 | 1 | 0 |
|---|---|---|---|---|---|---|---|---|
| RESET STATE | | | | ?? | | | | |
| FIELD NAME | | | | INPUT BUFFER | | | | |
| Read/Write | | | | Write-Only | | | | |

TABLE XXXIX

EISA/ISA IDENTIFICATION REGISTER 1

| | |
|---|---|
| MNEMONIC: | EISATD_1 |
| INDEX: | 80H |
| ACCESS RESTRICTIONS: | NONE |
| DESCRIPTION: | LOADED BY SYSTEM BIOS, USUALLY AFTER A COLD BOOT, THIS REGISTER HOLDS BITS 0 THROUGH 7 OF THE 32-BIT EISA/ISA IDENTIFICATION REGISTER. IT IS ALWAYS READABLE, AND IS WRITABLE UNTIL THE FIRST WRITE TO EISAID_4, AT WHICH TIME IT IS READ-ONLY. THE CONTENTS OF THIS REGISTER CAN ALSO BEREAD AT SYSTEM I/O ADDRESS 0C80H. A SIMPLE WAY TO REMEMBER THIS IS TO SIMPLY PREPEND A 'C' TO THE VALUE OF THIS REGISTER'S INDEX NUMBER. |

EISA/ISA IDENTIFICATION REGISTER 1 (EISAID_1)

| BIT NUMER | 7 | 6 | 5 | 4 | 3 | 2 | 1 | 0 |
|---|---|---|---|---|---|---|---|---|
| RESET STATE | 1 | | | | 00 | | | |
| FIELD | ENASYSIO | | | | EISAID_1 | | | |
| READ/WRITE | | | | | WORM | | | |

FIELD DEFINITIONS:

enaSYSIO: Enable system I/O - this bit controls whether or not the HUI will respond to system I/O reads at addresses C80H through C83H. The function of this bit is defined in Section 4.10.1 of the EISA specification.
0 = enable (the HUI will respond to system I/O reads at addresses C80H through C83H)
1 = disable (the HUI will not respond to system I/O reads at addresses C80H through C83H)

TABLE XL

EISA/ISA IDENTIFICATION REGISTER 2

| | |
|---|---|
| MNEMONIC: | EISAID_2 |
| INDEX: | 81H |
| ACCESS RESTRICTIONS: | NONE |
| DESCRIPTION: | LOADED BY SYSTEM BIOS, USUALLY AFTER A COLD BOOT, THIS REGISTER HOLDS BITS 8 THROUGH 15 OF THE 32-BIT EISA/ISA IDENTIFICATION REGISTER. IT IS ALWAYS READABLE, AND IS WRITABLE UNTIL THE FIRST WRITE TO EISAID_4, AT WHICH TIME IT IS READ-ONLY. THE CONTENTS OF THIS REGISTER CAN ALSO BE READ AT SYSTEM I/O ADDRESS 0C81H. A SIMPLE WAY TO REMEMBER THIS IS TO SIMPLY PREPEND A 'C' TO THE VALUE OF THIS REGISTER'S INDEX NUMBER. |

EISA/ISA IDENTIFICATION REGISTER 1 (EISAID_2)

| BIT NUMBER | 7 | 6 | 5 | 4 | 3 | 2 | 1 | 0 |
|---|---|---|---|---|---|---|---|---|
| RESET STATE | | | | | 00 | | | |
| FIELD NAME | | | | | EISAID_3 | | | |
| Read/Write | | | | | WORM | | | |

TABLE XLI

EISA/ISA IDENTIFICATION REGISTER 3

| | |
|---|---|
| MNEMONIC: | EISAID_3 |
| INDEX: | 82H |
| ACCESS RESTRICTIONS: | NONE |
| DESCRIPTION: | LOADED BY SYSTEM BIOS, USUALLY AFTER A COLD BOOT, THIS REGISTER HOLDS BITS 16 THROUGH 23 OF THE 32-BIT EISA/ISA IDENTIFICATION REGISTER. IT IS ALWAYS READABLE, AND IS WRITABLE UNTIL THE FIRST WRITE TO EISAID_4, AT WHICH TIME IT IS READ-ONLY. THE CONTENTS OF THIS REGISTER CAN ALSO BE READ AT SYSTEM I/O ADDRESS 0C82H. A SIMPLE WAY TO REMEMBER THIS IS TO SIMPLY PREPEND A 'C' TO THE VALUE OF THIS REGISTER'S INDEX NUMBER. |

EISA/ISA IDENTIFICATION REGISTER 1 (EISAID_3)

| BIT NUMBER | 7 | 6 | 5 | 4 | 3 | 2 | 1 | 0 |
|---|---|---|---|---|---|---|---|---|
| RESET STATE | | | | | 00 | | | |
| FIELD NAME | | | | | EISAID_3 | | | |
| Read/Write | | | | | WORM | | | |

TABLE XLII

EISA/ISA IDENTIFICATION REGISTER 4

| | |
|---|---|
| MNEMONIC: | EISAID_4 |
| INDEX: | 83H |
| ACCESS RESTRICTIONS: | NONE |
| DESCRIPTION: | LOADED BY SYSTEM BIOS, USUALLY AFTER A COLD BOOT, THIS REGISTER HOLDS BITS 24 THROUGH 31 OF THE 32-BIT EISA/ISA IDENTIFICATION REGISTER. IT IS ALWAYS READABLE, AND IS WRITABLE ONLY ONCE. AFTER THE FIRST WRITE TO THIS REGISTER, ALL FOUR OF THE EISA/ISA IDENTIFICATION REGISTER (ALL 32 BITS) BECOME READ-ONLY. THE CONTENTS OF THIS REGISTER CAN ALSO BE READ AT SYSTEM I/O ADDRESS 0083H. A SIMPLE WAY TO REMEMBER THIS IS TO SIMPLY PREPEND A 'C' TO THE VALUE OF THIS REGISTER'S INDEX NUMBER. |

EISA/ISA IDENTIFICATION REGISTER 1 (EISAID_4)

| BIT NUMBER | 7 | 6 | 5 | 4 | 3 | 2 | 1 | 0 |
|---|---|---|---|---|---|---|---|---|
| RESET STATE | | | | | 00 | | | |
| FIELD NAME | | | | | EISAID_4 | | | |
| Read/Write | | | | | WORM | | | |

TABLE XLIII

REGISTER SUMMARY

| Mnemonic | Location | Read/Write | Function |
|---|---|---|---|
| SCP_IN (r) SCP_OUT (w) | 0000H | R/W | Communication with system CPU write sends a byte to CPU, read accesses byte sent from CPU. |
| SCP_IN_ALT (r) STAT_OUT (w) | 0001H | R/W | Alternate way to read byte sent from CPU; Status (readable by CPU, or by SCP at 'STAT_IN'). |
| IRQ1 | 0005H | R/W | Controls generation of system IRQ1 when keyboard data is sent from SCP to CPU. |
| LAST_IO (r) | 0006H | RO | Read-back of last data byte sent to CPU. |
| STAT_IN (r) | 0007H | RO | Read-back SCP of status register. |
| RC_STAT (r) RC_ACT (w) | 0008H | R/W | Controls 'slow reset'. |
| RC_INACT (w) | 0009H | WO | Controls 'slow reset' |
| A20GATE (r) A20_INACT (w) | 000AH | R/W | Controls 'gate A20' |
| A20_ACT (w) | 000BH | WO | Controls 'gate A20'. |
| FUN_CTRL | 000CH | R/W | Controls generation of 'slow-reset' and 'gate A20'. |
| FUN_STAT (r) AUX_OUT (w) | 000DH | R/W | Read-back of various SCP status bits; write 'auxiliary device' (mouse) data to be read by CPU. |
| IRQ12 | 000EH | R/W | Controls generation of system IRQ12 when mouse data is sent from SCP to CPU. |
| MKI | 000FH | WO | Controls special handling of 'D1' commands. |
| ISR | 0012H | R/W | Interrupt Status register. |
| IER | 0014H | R/W | Interrupt Enable register. |
| AUTO_SERIAL | 0026H | R/W | Controls 'automatic mode' for serial interface to keyboard/mouse. |
| KBD_COMM | 0027H | R/W | Provides direct control of keyboard (and mouse) clock/data lines. |
| KBD_CTRL | 0029H | R/W | Control/Status of keyboard when in automatic mode. |
| KBD_DATA | 002AH | R/W | Keyboard data byte - writing initiates transfer if in automatic mode. |
| KBD_XDATA | 002BH | R/W | Stop/Parity bits for keyboard interface |
| AUX_CTRL | 002CH | R/W | Control/Status of mouse when in automatic mode. |
| AUX_DATA | 002DH | R/W | Mouse data byte - writing initiates transfer if in automatic mode. |
| AUX_XDATA | 002EH | R/W | Stop/Parity bits for mouse interface. |
| SECURE | 0040H | R/W | Secure mode status and control. |
| HUICFG_1 | 0041H | RO | Reset state of flash memory data bus. |
| HUICFG_2 | 0042H | RO | Reset state of SCP address/data bus. |
| FLASH_GPB | 0043H | R/W | SCP control of flash memory. |

TABLE XLIV

SCP/CPU Communication Registers

MNEMONIC: SCP_IN (r) SCP_OUT (w)
ADDRESS: 00H
ACCESS RESTRICTIONS: None
DESCRIPTION: READ: byte written by the CPU to CPU DATA/CPU CMD address (SCP input buffer)
WRITE: byte for SCP 'output buffer' to be read by the CPU as keyboard data - sets OBF and clears AOBF in SCP Status Register.

SCP INPUT BUFFER (SCP_IN (READ-ONLY))

| BIT NUMBER | 7 | 6 | 5 | 4 | 3 | 2 | 1 | 0 |
|---|---|---|---|---|---|---|---|---|
| RESET STATE | | | | | ?? | | | |
| FIELD NAME | INPUT BUFFER | | | | | | | |
| Read/Write | Read Only | | | | | | | |

SCP OUTPUT BUFFER (SCP_OUT (WRITE-ONLY))

| BIT NUMBER | 7 | 6 | 5 | 4 | 3 | 2 | 1 | 0 |
|---|---|---|---|---|---|---|---|---|
| RESET STATE | | | | | ?? | | | |

TABLE XLIV-continued

SCP/CPU Communication Registers

| FIELD NAME | OUTPUT BUFFER |
|---|---|
| READ/WRITE | WRITE-ONLY |

NOTE: THIS ADDRESS ACTUALLY COMMUNICATES WITH 2 DIFFERENT REGISTERS - WRITING SENDS DATA FROM THE SCP TO THE CPU (OUTPUT BUFFER), AND CLEARS THE AOBF FLAG, WHILE READING ACCESSES THE DATA SENT BY THE CPU TO THE SCP.

TABLE XLV

SCP STATUS REGISTER

MNEMONTC: SCP_IN_ALT (R) STA_T_OUT (w)
ADDRESS: 01H
ACCESS RESTRICTIONS: NONE
DESCRIPTION: READ: ALTERNATE READ METHOD FOR SCP INPUT BUFFER (SCP_IN)
WRITE: STATUS BITS (SEE BELOW)
SCP INPUT BUFFER (SCP_IN_ALT (READ-ONLY))

TABLE XLV-continued

SCP STATUS REGISTER

| BIT NUMBER | 7 | 6 | 5 | 4 | 3 | 2 | 1 | 0 |
|---|---|---|---|---|---|---|---|---|
| RESET STATE | | | | | ?? | | | |
| FIELD NAME | | | | INPUT BUFFER | | | | |
| READ/WRITE | | | | READ ONLY | | | | |

SCP STATUS REGISTER (STAT_OUT (WRITE-ONLY))

| Bit Number | 7 | 6 | 5 | 4 | 3 | 2 | 1 | 0 |
|---|---|---|---|---|---|---|---|---|
| Reset State | 0 | 0 | 0 | 0 | 0 | 0 | 0 | 0 |
| Field Name | PE | GTO | TTO/ AOBF | Inhibit | CMD/ DATA | SysFlag | IBF | OBF |
| Read/ Write | W | W | W/x | W | x | W | x | x |

NOTE: This register is written here, but is read back by the SCP at STAT_IN, and by the CPU at CPU_STAT. See the description of CPU_STAT for a complete description of the bit fields.

TABLE XLVI

KEYBOARD INTERRUPT ENABLE

| MNEMONIC: | IRQ1 |
|---|---|
| ADDRESS: | 05H |
| ACCESS RESTRICTIONS: | NONE |
| DESCRIPTION: | CONTROLS WHETHER OR NOT THE SCP WRITING TO THE 'OUTPUT BUFFER' CAUSES AN INTERRUPT TO THE CPU ON IRQ1. IF THE MODE BIT IS 0, THE INTERRUPT WILL BE DRIVEN ACTIVE THROUGHOUT THE TIME THAT THE INTERRUPT SOURCE (OBF) IS ON - I.E., IT WILL BE DRIVEN LOW AS SOON AS THE SCP WRITES TO THE OUTPUT BUFFER, AND RELEASED ONLY WHEN THE CPU READS THE DATA. IF THE MODE BIT IS 1, THE INTERRUPT WILL BE 'PULSED' LOW FOR THE DURATION OF THE SCP MEMW PULSE DURING THE SCP WRITE TO THE OUTPUT BUFFER. THIS WILL ALLOW 'SHARING' OF IRQ1 WITH OTHER COMPATIBLE SOURCES. |

KEYBOARD INTERRUPT ENABLE (IRQ1)

| BIT NUMBER | 7 | 6 | 5 | 4 | 3 | 2 | 1 | 0 |
|---|---|---|---|---|---|---|---|---|
| RESET STATE | | | | | | | 0 | 0 |
| FIELD NAME | | | X | | | | MODE | ENABLE |
| Read/ Write | | | | | | | R/W | R/W |

FIELD DEFINITIONS:
mode:   0 = normal (driven low when interrupt source is active)
        1 = sharable (pulsed low when interrupt source goes active)
enable: 0 = disabled
        1 = enabled

TABLE XLVII

LAST I/O

| MNEMONIC | LAST_IO (R) |
|---|---|
| ADDRESS: | 06H |
| ACCESS RESTRICTIONS: | NONE |
| DESCRIPTION: | READ: VALUE LAST WRITTEN TO SCP_OUT WRITE: NOT ALLOWED |

SCP OUTPUT BUFFER (LAST_IO (READ-ONLY))

| BIT NUMBER | 7 | 6 | 5 | 4 | 3 | 2 | 1 | 0 |
|---|---|---|---|---|---|---|---|---|
| RESET | | | | | ?? | | | |

TABLE XLVII-continued

LAST I/O

| STATE | | | | | | | | |
|---|---|---|---|---|---|---|---|---|
| FIELD NAME | | | | OUTPUT BUFFER | | | | |
| Read/Write | | | | Read Only | | | | |

NOTE: This register is read here, but is written by the SCP at SCP_OUT.

TABLE XLVIII

SCP STATUS REGISTER

| MNEMONIC: | STAT_IN |
|---|---|
| ADDRESS: | 07H |
| ACCESS RESTRICTIONS: | NONE |
| DESCRIPTION: | READ: STATUS BITS (SEE BELOW) WRITE: NOT ALLOWED |

SCP STATUS REGISTER (STAT_IN)

| Bit Number | 7 | 6 | 5 | 4 | 3 | 2 | 1 | 0 |
|---|---|---|---|---|---|---|---|---|
| Reset State | 0 | 0 | 0 | 0 | 0 | 0 | 0 | 0 |
| Field Name | PE | GTO | TTO/ AOBF | Inhibit | CMD/ DATA | SysFlag | IBF | OBF |
| Read/ Write | RO | RO | RO | RO | RO | RO | RO | RO |

NOTE: This register is read by the SCP here, but is written by the SCP at STAT_OUT. It is read by the CPU at CPU_STAT, which is also where the bit fields are fully described.

TABLE XLIX

SLOW RESET ACTIVATE/STATUS

| MNEMONIC: | RC_STAT (R) RC_ACT (w) |
|---|---|
| ADDRESS: | 08H |
| ACCESS RESTRICTIONS: | NONE |
| DESCRIPTION: | READ: CURRENT STATUS OF SLOW RESET SIGNAL (0 ACTIVE) WRITE: SET SLOW RESET ACTIVE (LOW) - DATA IS IGNORED. |

SLOW RESET STATUS (RC_STAT (READ-ONLY))

| BIT NUMBER | 7 | 6 | 5 | 4 | 3 | 2 | 1 | 0 |
|---|---|---|---|---|---|---|---|---|
| RESET STATE | | | | | | | | 1 |
| FIELD NAME | | | | X | | | | SLOW RESET |
| READ/WRITE | | | | | | | | R |

FIELD DEFINITIONS:
slow reset:   0 = active
             1 = inactive

SLOW RESET STATUS (RC_ACT (WRITE-ONLY))

| BIT NUMBER | 7 | 6 | 5 | 4 | 3 | 2 | 1 | 0 |
|---|---|---|---|---|---|---|---|---|
| RESET STATE | | | | | | | | |
| FIELD NAME | | | | x | | | | |
| READ/WRITE | | | | | | | | |

NOTE: slow reset is also know as 'RC' for some strange reason - Reset Cpu, maybe?

TABLE L

SLOW RESET DE-ACTIVATE

| MNEMONIC: | RC_INACT (w) |
|---|---|
| ADDRESS: | 09H |
| ACCESS RESTRICTIONS: | NONE |
| DESCRIPTION: | READ: NOT ALLOWED WRITE: SET SLOW RESET INACTIVE |

TABLE L-continued

SLOW RESET DE-ACTIVATE (HIGH) - DATA IS IGNORED.
SLOW RESET DE-ACTIVATE (RC_INACT)

| BIT NUMBER | 7 | 6 | 5 | 4 | 3 | 2 | 1 | 0 |
|---|---|---|---|---|---|---|---|---|
| RESET STATE | | | | | | | | |
| FIELD NAME | | | | | x | | | |
| READ/WRITE | | | | | | | | |

TABLE LI

GATE A20 DE-ACTIVATE/STATUS

| MNEMONIC: | A20GATE (R) |
| | A20_INACT (w) |
| ADDRESS: | 0AH |
| ACCESS RESTRICTIONS: | NONE |
| DESCRIPTION: | READ: CURRENT STATUS OF GATE A20 SIGNAL (1 = ACTIVE) |
| | WRITE: SET GATE A20 INACTIVE (LOW) - DATA IS IGNORED. |

GATE A20 STATUS (A20GATE (READ-ONLY))

| BIT NUMBER | 7 | 6 | 5 | 4 | 3 | 2 | 1 | 0 |
|---|---|---|---|---|---|---|---|---|
| RESET STATE | | | | | | | 1 | |
| FIELD NAME | | | | x | | GATE A20 | | x |
| READ/WRITE | | | | | | | R | |

FIELD DEFINITIONS:
gate A20:    0 = inactive
             1 = active

GATE A20 DE-ACTIVATE (A20_INACT (WRITE-ONLY))

| BIT NUMBER | 7 | 6 | 5 | 4 | 3 | 2 | 1 | 0 |
|---|---|---|---|---|---|---|---|---|
| RESET STATE | | | | | | | | |
| FIELD NAME | | | | | x | | | |
| READ/WRITE | | | | | | | | |

TABLE LII

GATE A20 ACTIVATE

| MNEMONIC: | A20_ACT (w) |
| ADDRESS: | 0BH |
| ACCESS RESTRICTIONS: | NONE |
| DESCRIPTION: | READ: NOT ALLOWED |
| | WRITE: SET GATE A20 ACTIVE (HIGH) - DATA IS IGNORED. |

GATE A20 ACTIVATE (A20_ACT)

TABLE LII-continued

GATE A20 ACTIVATE

| BIT NUMBER | 7 | 6 | 5 | 4 | 3 | 2 | 1 | 0 |
|---|---|---|---|---|---|---|---|---|
| RESET STATE | | | | | | | | |
| FIELD NAME | | | | | | x | | |
| READ/WRITE | | | | | | | | |

TABLE LIII

FUNCTION CONTROL

| MNEMONIC: | FUN_CTRL |
| ADDRESS: | 0CH |
| ACCESS RESTRICTIONS: | NONE |
| DESCRIPTION: | CONTROLS THE AUTOMATIC GENERATION OF SLOW RESET (RC) AND GATE A20 - IF ENABLED, THE HUI WILL GENERATE THE SIGNAL WITHOUT SCP INTERVENTION; OTHERWISE, THE SCP IS RESPONSIBLE FOR GENERATING THE SIGNAL BY DECODING THE COMMANDS AND WRITING TO THE APPROPRIATE REGISTER. |

FUNCTION CONTROL (FUN_CTRL)

| Bit Number | 7 | 6 | 5 | 4 | 3 | 2 | 1 | 0 |
|---|---|---|---|---|---|---|---|---|
| Reset State | | | | | | | 1 | 1 |
| Field Name | | | | x | | | gate A20 | slow reset |
| Read/Write | | | | | | | R/W | R/W |

FIELD DEFINITIONS:
gate A20:   0 = automatic generation disabled
            1 = automatic generation enabled
slow reset: 0 = automatic generation disabled
            1 = automatic generation enabled

TABLE LIV

FUNCTION STATUS

| MNEMONIC: | FUN_STAT (R) |
| | AUX_OUT (w) |
| ADDRESS: | 0DH |
| ACCESS RESTRICTIONS: | NONE |
| DESCRIPTION: | READ: FUNCTION STATUS (SEE BELOW) |
| | WRITE: MOUSE (AUX DEVICE) DATA FROM SCP IS WRITTEN HERE, TO BE READ BY CPU AT CPU_OUT. THE DATA GOES INTO THE 'OUTPUT BUFFER', JUST AS WHEN WRITING KEYBOARD DATA TO SCP_OUT. THE DIFFERENCE IS THAT WRITING HERE SETS BOTH OPF (OUTPUT BUFFER FULL) AND AOBF (AUXILLIARY OUTPUT BUFFER FULL) IN THE SCP STATUS REGISTER, AND ALSO THE MOBF |

TABLE LIV-continued

FUNCTION STATUS

BIT IN THE FUN_STAT REGISTER.
OBF IS CLEARED, AS USUAL, WHEN THE
CPU READS THE DATA FROM CPU_OUT.
MOBF IS ALSO CLEARED AT THIS TIME,
BUT AOBF REMAINS SET UNTIL THE SCP
SENDS KEYBOARD DATA BY WRITING TO
SCP_OUT. NOTE THAT VISIBLE IN BOTH
THE SCP STATUS REGISTER AND HERE AT
FUN_STAT.

FUNCTION STATUS (FUN_STAT (READ-ONLY))

| BIT NUMBER | 7 | 6 | 5 | 4 | 3 | 2 | 1 | 0 |
|---|---|---|---|---|---|---|---|---|
| Reset State | | | | | | | | |
| Field Name | | D1cmd | IRQ1en | IRQ12en | MOBF | AOBF | MKIen | x |
| Read/Write | | | | | | | | |

D1cmd: set when CPU writes 'D1' commands to CPU_CMD.
cleared when CPU writes any other value to CPU_CMD.
IRQ1en: alternate read method for IRQ1 register value.
IRQ12en: alternate read method for IRQ12 register value.
MOBF: set when SCP writes mouse (aux device) data to AUX_OUT;
cleared when CPU reads data from CPU_OUT.
AOBF: set when SCP writes mouse (aux device) data to AUX_OUT;
cleared when SCP writes keyboard data to SCP_OUT.
MKIen: alternate read method for MKI register value.

SCP OUTPUT BUFFER (AUX_OUT (WRITEONLY))

| BIT NUMBER | 7 | 6 | 5 | 4 | 3 | 2 | 1 | 0 |
|---|---|---|---|---|---|---|---|---|
| RESET STATE | | | | | ?? | | | |
| FIELD NAME | | | | OUTPUT BUFFER | | | | |
| Read/Write | | | | Write-Only | | | | |

TABLE LV

MOUSE INTERRUPT ENABLE

| | |
|---|---|
| MNEMONIC: | IRQ12 |
| ADDRESS: | 0EH |
| ACCESS RESTRICTIONS: | NONE |
| DESCRIPTION: | CONTROLS THE GENERATION OF IRQ12 WHEN THE SCP WRITES MOUSE DATA TO AUX_OUT. IF THE MODE BIT IS 0, THE INTERRUPT WILL BE DRIVEN ACTIVE THROUGHOUT THE TIME THAT THE INTERRUPT SOURCE (OBF) IS ON - I.E., IT WILL BE DRIVEN LOW AS SOON AS THE SCP WRITES TO THE OUTPUT BUFFER, AND RELEASED ONLY WHEN THE CPU READS THE DATA. IF THE MODE BIT IS 1, THE INTERRUPT WILL BE 'PULSED' LOW FOR THE DURATION OF THE SCP MEMW PULSE DURING THE SCP WRITE TO THE OUTPUT BUFFER. THIS WILL ALLOW 'SHARING' OF IRQ1 WITH OTHER COMPATIBLE SOURCES |

MOUSE INTERRUPT ENABLE (IRQ12)

| BIT NUMBER | 7 | 6 | 5 | 4 | 3 | 2 | 1 | 0 |
|---|---|---|---|---|---|---|---|---|
| RESET STATE | | | | | | | | 0 |
| FIELD NAME | | | x | | | | MODE | ENABLE |
| READ/WRITE | | | | | | | R/W | R/W |

FIELD DEFINITIONS:
mode: 0 = normal (driven low when interrupt source is active)
1 = sharable (pulsed low when interrupt source goes active)

TABLE LV-continued

MOUSE INTERRUPT ENABLE enable: 0 = disabled
1 = enabled

TABLE LVI

MKI 'D1' FEATURE CONTROL

| | |
|---|---|
| MNEMONIC: | MKI |
| ADDRESS: | 0FH |
| ACCESS RESTRICTIONS: | NONE |
| DESCRIPTION: | WHEN THIS FEATURE IS DISABLED, THE HUI WILL ALWAYS SET IBF AND GENERATE AN INTERRUPT TO THE SCP WHEN THE CPU WRITES TO CPU_CMD OR CPU_DATA. IF ENABLED, THESE ACTIONS WILL NOT BE PERFORMED FOR THE COMMAND VALUE 'D1', THE DATA FOLLOWING THE 'D1' COMMAND, OR AN 'FF' COMMAND IMMEDIATELY FOLLOWING EITHER THE 'D1' COMMAND OR THE 'D1' COMMAND DATA. THE STATUS OF THIS BIT IS READ BACK AT REGISTER FUN_STAT BIT <2> (0DH.) |

MKI 'D1' FEATURE CONTROL (MKI)

| BIT NUMBER | 7 | 6 | 5 | 4 | 3 | 2 | 1 | 0 |
|---|---|---|---|---|---|---|---|---|
| RESET STATE | | | | | | | | 0 |
| FIELD NAME | | | | x | | | | MKIEN |

TABLE LVI-continued

MKI 'D1' FEATURE CONTROL

READ/WRITE WO
FIELD DEFINITIONS:
MKIen:  0 = generate IBF/SCPINT on all CPU writes
        1 = special mode enabled (see above)

TABLE LVII

INTERRUPT STATUS REGISTER

MNEMONIC: ISR
ADDRESS: 12H
ACCESS RESTRICTIONS: NONE
DESCRIPTION: CONTAINS CURRENTLY PENDING SCP INTERRUPT SOURCE INDICATOR.

INTERRUPT STATUS REGISTER (ISR)

| BIT NUMBER | 7 | 6 | 5 | 4 | 3 | 2 | 1 | 0 |
|---|---|---|---|---|---|---|---|---|
| RESET STATE | | | 0 | 0 | | | | 0 |
| FIELD NAME | | x | MOUSE | KEYBOARD | x | | | IBF |
| READ/WRITE | | | R/W | R/W | | | | RO |

FIELD DEFINITIONS:
mouse:    automatic mode (byte-mode) enabled: set when byte from mouse is received and ready to be read by the SCP; cleared when the SCP reads the data.
          automatic mode disabled: set when the mouse pulls the data-in line low; cleared when the SCP writes a zero to this bit.
keyboard: automatic mode (byte-mode) enabled: set when byte from keyboard is received and ready to be read by the SCP; cleared when the SCP reads the data.
          automatic mode disabled: set when the keyboard pulls the data-in line low; cleared when the SCP writes a zero to this bit.
IBF:      Set when the CPU writes a byte to the SCP Input Buffer at CPU_DATA or CPU_CMD; cleared when the SCP reads the data at SCP_IN or SCP IN_ALT.

TABLE LVIII

INTERRUPT ENABLE REGISTER

MNENOMIC: IER
ADDRESS: 14H
ACCESS RESTRICTIONS: NONE
DESCRIPITION: SELECTS INTERRUPT SOURCES THAT ARE ENABLED TO GENERATE THE SCP INTERRUPT SIGNAL. DISABLED SOURCES STILL APPEAR IN THE ISR BUT DO NOT GENERATE AN INTERRUPT. FOR DESCRIPTIONS OF INTERRUPT SOURCES, SEE ISR REGISTER, ABOVE.

INTERRUPT ENABLE REGISTER (IER)

| BIT NUMBER | 7 | 6 | 5 | 4 | 3 | 2 | 1 | 0 |
|---|---|---|---|---|---|---|---|---|
| RESET STATE | | | 0 | 0 | | | | 0 |
| FIELD NAME | | x | MOUSE | KEYBOARD | x | | | IBF |
| READ/WRITE | | | R/W | R/W | | | | R/W |

FIELD DEFINITIONS:
mouse:    Enable ISR 'mouse' bit.
keyboard: Enable ISR 'keyboard' bit.
IBF:      Enable ISR 'IBF' bit.

TABLE LIX

AUTO-SERIAL REGISTER

MNEMONIC: AUTO_SERIAL
ADDRESS: 26H
ACCESS RESTRICTIONS: NONE
DESCRIPTION: CONTROLS 'AUTOMATIC MODE' FOR KEYBOARD/MOUSE INTERFACES.

AUTO-SERIAL REGISTER (AUTO_SERIAL)

| BIT NUMBER | 7 | 6 | 5 | 4 | 3 | 2 | 1 | 0 |
|---|---|---|---|---|---|---|---|---|
| RESET STATE | | | | | | | 0 | 0 |
| FIELD NAME | | x | | | | | MOUSE | KEYBOARD |
| READ/WRITE | | | | | | | R/W | R/W |

FIELD DEFINITIONS:
mouse:    0 = 'bit' mode
          1 = 'byte' (automatic) mode
keyboard: 0 = 'bit' mode
          1 = 'byte' (automatic) mode

TABLE LX

KEYBOARD/MOUSE CLOCK/DATA REGISTER

MNEMONIC: KBD_COMM
ADDRESS: 27H
ACCESS RESTRICTIONS: NONE
DESCRIPTION: PROVIDES DIRECT CONTROL OF KEYBOARD (AND MOUSE) CLOCK/DATA LINES.

KEYBOARD/MOUSE CLOCK/DATA REGISTER (KBD_COMM)

| Bit Number | 7 | 6 | 5 | 4 | 3 | 2 | 1 | 0 |
|---|---|---|---|---|---|---|---|---|
| Reset State | 1 | 0 | 0 | 0 | 1 | 0 | 0 | 0 |
| Field Name | MDataO | MClkO | MDataI | MClki | KBDataO | KBClkO | KBDataI | KBClkI |
| Read/Write | R/W | R/W | RO | RO | R/W | R/W | RO | RO |

TABLE LXI

KEYBOARD CONTROL/STATUS REGISTER

MNEMONIC: KBD_CTRL
ADDRESS: 29H
ACCESS RESTRICTIONS: NONE
DESCRIPTION: PROVIDES READ-BACK OF STATUS FOR KEYBOARD INTERFACE DURING AUTOMATIC-MODE TRANSFERS; ALSO, ALLOWS WRITING OF HOLD BIT TO INTERRUPT A TRANSFER, AND RCV BIT TO WAIT FOR A TRANSFER.

KEYBOARD CONTROL/STATUS REGISTER (KBD_CTRL)

| Bit Number | 7 | 6 | 5 | 4 | 3 | 2 | 1 | 0 |
|---|---|---|---|---|---|---|---|---|
| Reset State | 0 | 0 | 0 | 0 | 0 | 1 | 0 | 0 |
| Field Name | count8 | count4 | count2 | count1 | lineCtrl | HOLD | XMIT | RCV |
| Read/Write | RO | RO | RO | RO | RO | R/W | RO | R/W |

FIELD DEFINITIONS:
count8421: Allows read-back of bit-counter during transfer (will start at decimal 11, and count down to 0).
lineCtrl: Contains status returned by external device during final clock of a transmission to the device.
HOLD: set active automatically at the end of a transmission or receipt; can also be set manually by writing to the register. Cleared when RCV bit is set, or when transmission starts.
XMIT: set when transmission is started by writing to the KBD_DATA register; cleared when the transmission is complete.
RCV: set by writing to this bit; release HOLD mode and causes the chip to wait for a transmission from the external device. Cleared when the device starts transmitting.

TABLE LXII

KEYBOARD DATA REGISTER

MNEMONIC: KBD_DATA
ADDRESS: 2AH
ACCESS RESTRICTIONS: NONE
DESCRIPTION: CONTAINS RECEIVED FROM KEYBOARD, OR (IN AUTOMATIC MODE ONLY) DATA TO BE SENT TO KEYBOARD.

KEYBOARD DATA REGISTER (KBD_DATA)

| BIT NUMBER | 7 | 6 | 5 | 4 | 3 | 2 | 1 | 0 |
|---|---|---|---|---|---|---|---|---|
| RESET STATE | | | | 00 | | | | |
| FIELD NAME | | | | KBDATA | | | | |
| Read/Write | | | | R/W | | | | |

TABLE LXIII

KEYBOARD DATA REGISTER

MNEMONIC: KBD_DATA
ADDRESS: 2BH
ACCESS RESTRICTIONS: NONE
DESCRIPTION: CONTAINS STOP/PARITY BITS FOR KEYBOARD INTERFACE.

KEYBOARD EXTENEDED DATA REGISTER (KBD_XDATA)

| BIT NUMBER | 7 | 6 | 5 | 4 | 3 | 2 | 1 | 0 |
|---|---|---|---|---|---|---|---|---|
| RESET STATE | | | | | | | 1 | 0 |
| FIELD NAME | | x | | | | | STOP | PARITY |
| READ/WRITE | | | | | | | R/W | R/W |

FIELD DEFINITIONS:
STOP: stop bit value.
PARITY: parity bit value.

TABLE LXIV

MOUSE CONTROL/STATUS REGISTER

MNEMONIC: AUX_CTRL
ADDRESS: 2CH
ACCESS RESTRICTIONS: NONE
DESCRIPTION: PROVIDES READ-BACK OF STATUS FOR MODULE INTERFACE DURING AUTOMATIC-MODE TRANSFERS; ALSO, ALLOWS WRITING OF HOLD BIT TO INTERRUPT A TRANSFER, AND RCV BIT TO WAIT FOR A TRANSFER.

MOUSE CONTROL/STATUS REGISTER (AUX_CTRL)

| Bit Number | 7 | 6 | 5 | 4 | 3 | 2 | 1 | 0 |
|---|---|---|---|---|---|---|---|---|
| Reset State | 0 | 0 | 0 | 0 | 0 | 1 | 0 | 0 |
| Field Name | count8 | count4 | count2 | count1 | lineCtrl | HOLD | XMIT | RCV |
| Read/Write | RO | RO | RO | RO | RO | R/W | RO | R/W |

FIELD DEFINITIONS:
- count8421: Allows read-back of bit-counter during transfer (will start at decimal 11, and count down to 0).
- lineCtrl: Contains status returned by external device during final clock of a transmission to the device.
- HOLD: set active automatically at the end of a transmission or receipt; can also be set manually by writing to the register. Cleared when RCV bit is set, or when transmission starts.
- XMIT: set when transmission is started by writing to the AUX_DATA register; cleared when the transmission is complete.
- RCV: set by writing to this bit; release HOLD mode and causes the chip to wait for a transmission from the external device. Cleared when the device starts transmitting.

TABLE LXV

MOUSE DATA REGISTER

MNEMONIC: AUX_DATA
ADDRESS: 2DH
ACCESS RESTRICTIONS: NONE
DESCRIPTION: CONTAINS RECEIVED FROM MOUSE, OR (IN AUTOMATIC MODE ONLY) DATA TO BE SENT TO MOUSE.

MOUSE DATA REGISTER (AUX_DATA)

| BIT NUMBER | 7 | 6 | 5 | 4 | 3 | 2 | 1 | 0 |
|---|---|---|---|---|---|---|---|---|
| RESET STATE | | | | 00 | | | | |
| FIELD NAME | | | | AUXDATA | | | | |
| Read/Write | | | | R/W | | | | |

TABLE LXVI

MOUSE EXTENDED DATA REGISTER

MNEMONIC: AUX_XDATA
ADDRESS: 2EH
ACCESS RESTRICTIONS: NONE
DESCRIPTION: CONTAINS STOP/PARITY BITS FOR MOUSE INTERFACE.

MOUSE EXTENDED DATA REGISTER (AUX_XDATA)

| BIT NUMBER | 7 | 6 | 5 | 4 | 3 | 2 | 1 | 0 |
|---|---|---|---|---|---|---|---|---|
| RESET STATE | | | | | | | 1 | 0 |
| FIELD NAME | | x | | | | | STOP | PARITY |
| READ/WRITE | | | | | | | R/W | R/W |

FIELD DEFINITIONS:
- STOP: stop bit value.
- PARITY: parity bit value.

TABLE LXVII

SECURE MODE STATUS

MNEMONIC: SECURE
ADDRESS: 40H
ACCESS RESTRICTIONS: NONE
DESCRIPTION: CONTROLS STATE OF SECURE MODE IN THE HUI.

SECURE MODE STATUS (SECURE)

| BIT NUMBER | 7 | 6 | 5 | 4 | 3 | 2 | 1 | 0 |
|---|---|---|---|---|---|---|---|---|
| RESET STATE | | | | | | | | 0 |
| FIELD NAME | | | | | | x | | SECURE |
| READ/WRITE | | | | | | | | R/W |

FIELD DEFINITIONS:
- secure: Secure mode status
  - 0 = secure mode disabled
  - 1 = secure mode enabled

TABLE LXVIII

HUI HARDWARE CONFIGURATION STRAPS REGISTER 1

MNEMONIC: HUICFG_1
ADDRESS: 41H
ACCESS RESTRICTIONS: NONE
DESCRIPTION: CONTAINS THE STATE OF THE FLASH MEMORY DATA BUS LATCHED AT SYSTEM RESET.

HUI HARDWARE CONFIGURATION STRAPS REGISTER 1 (HUICFG_1)

| BIT NUMBER | 7 | 6 | 5 | 4 | 3 | 2 | 1 | 0 |
|---|---|---|---|---|---|---|---|---|
| Reset State | | | depends on hardware | | | | | |
| Field Name | | FLSHsize | PASStrap | | ERASEtrap | | BOOTblk | |
| Read/Write | | | | RO | | | | |

TABLE LXVIII-continued

HUI HARDWARE CONFIGURATION STRAPS REGISTER 1

FIELD DEFINITIONS:
FLSHsize:  Flash memory part size - indicates size of flash memory
           that the HUI is controlling
           0 = 256K byte
           1 = 128K byte
PASStrap:  Flash password area access trap - controls whether or
           not the HUI allows system memory reads and writes to the
           lowest 256 bytes in the flash memory space where the
           SCP can store the system password
           0 = protect flash password storage area
           1 = no password protection
ERASEtrap: Flash software erase sequence trap - enable the HUI to
           intercept the JEDEC flash software chip erase standard
           sequence before it reaches the flash memory. Bit <5>
           is reserved for future chip erase sequences.
           x0 = JEDEC flash software chip erase standard
           x1 = no software erase trap
BOOTblk:   Flash boot-block size to ernulate - selects the size of
           the flash memory boot-block at the top of the flash
           memory space that the HUI will emulate
           and protect from system memory writes
0000 (CH) = 2K byte boot block   1000 (8H) = 12K byte boot block
0001 (1H) = 3K byte boot block   1001 (9H) = 14K byte boot block
0010 (2H) = 4K byte boot block   1010 (AH) = 16K byte boot block
0011 (3H) = 5K byte boot block   1011 (BH) = 20K byte boot block
0100 (4H) = 6K byte boot block   1100 (CH) = 24K byte boot block
0101 (5H) = 7K byte boot block   1101 (DH) = 28K byte boot block
0110 (6H) = 8K byte boot block   1110 (EH) = 32K byte boot block
0111 (7H) = 10K byte boot block  1111 (FH) = no boot block protection

TABLE LXIX

HUI HARDWARE CONFIGURATION STRAPS REGISTER 2

MNEMONIC:            HUICFG_2
ADDRESS:             42H
ACCESS RESTRICTIONS: NONE
DESCRIPTION:         CONTAINS THE STATE OF THE SCP
                     ADDRESS/DATA BUS LATCHED
                     AT SYSTEM RESET.
    HUI HARDWARE CONFIGURATION STRAPS REGISTER 2
                     (HUICFG_2)
BIT NUMBER   7   6   5   4   3   2   1   0
RESET              DEPENDS ON HARDWARE
STATE
FIELD NAME              HUICFG_2
Read/                        RO
Write

TABLE LXX

SCP CONTROL OF FLASH MEMORY

MNEMONTC:            FLASH_GRAB
ADDRESS:             43H
ACCESS RESTRICTIONS: NONE
DESCRIPTION:
     SCP CONTROL OF FLASH MEMORY (FLASH_GRAB)
BIT          7   6   5   4   3   2   1       0
NUMBER
RESET                                 0       1
STATE                       x       VPPEN  CPUEXCL
FIELD
NAME
READ/WRITE                           R/W    R/W
FIELD DEFINITIONS:
VPPEN:   Controls state of VPPEN output pin. Is cleared
         and becomes unalterable when in secure mode.
CPUexcl: Flag for when SCP requests exclusive access to flash memory
         for a write and CPU is disallowed from reading and writing
         the FLASH- this bit can be cleared immediately if a '1'
         is written to SCPreset in the CPU indexed register FLASH

TABLE LXX-continued

SCP CONTROL OF FLASH MEMORY

CTRL.
0 = SCP sharing FLASH
1 = SCP holding FLASH exclusively

The interfaces, as well as the functional capability of the HUI 700 are described in detail below.

MOUSE/KEYBOARD INTERFACE

The mouse/keyboard interface of the HUI 700 is virtually identical to the MKI 300 described in detail above. In particular, the HUI 700 provides the three main functions of the MKI 300; bidirectional communication between the CPU 702 and the SCP 706, as well as hardware generation of the CPU SLOW RESET and hardware generation of the gate A20 signal. In addition, the HUI 700 provides automatic hardware control of the mouse and keyboard interface to relieve the SCP 706 of the task of shifting data into and out of the common memory device 704.

CPU/SCP COMMUNICATION

The HUI 700 enables the CPU 702 to communicate with the SCP 706 by writing a command to the command and/or data port 64H and 60H, respectively. The SCP 706 is automatically interrupted after each byte is written and reads the byte at the SCP input buffer SCP_IN address. Command and data bytes are distinguished by reading the status registers STAT_IN to check the value of the command/data flag (0=data; 1=command). The status register STAT_IN also contains an input buffer flag full bit IBF which indicates that the source of the current interrupt was the system CPU communication port. Both the interrupt line and the input buffer flag IBF are automatically cleared when the SCP reads the SCP input buffer SCP_IN.

The SCP 706 sends data (i.e., key codes, mouse data, etc.) to the CPU by writing to an SCP output buffer SCP_OUT to send the keyboard data or to an auxiliary output buffer AUX_OUT to send mouse data. Whenever keyboard data or mouse data is written to the output buffer SCP_OUT, the HUI 700 generates an interrupt to the system CPU (IRQ1 for keyboard, IRQ12 for mouse), which signals the CPU 702 to read the data at address 60H. Port 64H may also be read by the CPU 702 and will contain status bits indicating the source of the data. In particular, the output buffer full flag OBF is set for keyboard data, and both the output buffer flag OBF and an auxiliary output buffer full flag AOBF are set for the mouse data. The output buffer flag OBF is always cleared when the CPU reads the data byte at address 60H. However, the auxiliary output buffer flag AOBF bit remains set until the next time the SCP 706 sends keyboard data by writing to the SCP output buffer SCP_OUT. If the SCP 706 sends more mouse data by writing to the auxiliary output buffer AUX_OUT, the AOBF bit will remain set and the OBF bit will be set. The appropriate interrupt is cleared by way of the OBF bit.

The system's interrupt signals IRQ that the HUI 700 generates to the CPU 702 can be in one of two modes. The mode is selected in bit 1 of the enable registers, IRQMS_EN for the IRQMS interrupt and IRQKB_EN for the IRQKB interrupt. The output pin on the HUI 700 for the interrupt IRQ1 is a tri-state, open drain output. The output pins for the IRQ lines must be pulled up by a pull up resistor. As such, the HUI 700 can only drive the signal low and must let a signal float to generate a high.

In the first mode of operation, when an interrupt is enabled (bit 0) and bit 1 is low in the enable register IRQMS_EN or IRQKB_EN, the HUI 700 has full control of the interrupt line IRQ. In this mode, the HUI 700 will hold interrupt line IRQ low until the SCP 706 writes to the output buffer SCP_OUT or the auxiliary output buffer AUX_OUT, and sets the output buffer flag OBF flag. When this occurs, the HUI 700 will let the line tri-state to enable an external pull up resistor to pull the signal high to indicate to the CPU 702 that an interrupt has been generated. Once the CPU 702 services the interrupt and reads the SCP output buffer SCP_OUT, the output buffer full flag OBF is cleared and the interrupt line IRQ is pulled low.

In a second mode of operation, when the interrupt is enabled (bit 0 is set) and bit 1 is high in one of the enable registers IRQMS_EN or IRQKB_EN, the interrupt line IRQ will be shared between the HUI 700 and another device. In this mode, the HUI 700 allows the interrupt line IRQ to float high by tri-stating its output pin. When the SCP 706 writes to the output buffer, SCP_OUT or the auxiliary output buffer AUX_OUT, the HUI 700 will pull the interrupt line IRQ low as long as the SCP write signal N_SCPWR is in an active low state. When the SCP write signal N_SCPWR returns to an inactive state, the HUI 700 releases the interrupt line IRQ to float at its tri-state level.

HARDWARE SLOW RESET GENERATION

As mentioned above, the HUI 700 also incorporates the slow reset signal RC generation feature of the MKI 300. In particular, the slow reset signal is normally generated when the CPU 702 sends a command byte, normally of any even value between FOH and FFH, to the SCP 706. In known systems, this command byte is normally decoded and the command is executed in software. In order to speed up the generation of the slow reset RC signal, the HUI 700 interprets the command byte and hardware, and, thus, is able to generate a slow reset signal RC relatively quicker than the SCP 706.

The slow reset generation function can be disabled by writing to a function control register FUN_CTRL. In particular, bit 0 of the function control register FUN_CTRL is used to control the automatic generation of the slow reset signal RC. When bit 0 is set, the HUI 700 will automatically generate the slow reset signal RC. When bit 0 is not set, the slow reset signal RC is under the control of the system control processor 706. In this mode of operation, the SCP 706 can control the generation of the slow reset signal RC by writing to the slow reset status register RC_ACT and the slow reset deactivate register RC_INACT.

HARDWARE GATE A20 GENERATION

The HUI 700 also can decode the command to control the gate A20 signal directly. As discussed above, the gate A20 signal is set by a command byte D1 and a data byte. However, in some known software systems, an extra command byte FFH is sent after the command byte and the data byte form a part of the gate A20 control. In order to avoid misoperation of the system, the FFH command that follows the command and data byte is ignored. An FFH command which does not follow a command data sequence for the hardware generation of the gate A20 signal will be passed on to the SCP 706 in the normal way. The hardware control of the gate A20 signal may be disabled by writing to the function control register FUN_CTRL. Once the automatic feature is disabled, the SCP 706 can control the gate A20 signal by writing to either the gate A20 deactivate register (A20_INACT) or the gate A20 activate register (A20_ACT).

As mentioned above, the gate A20 and the fast reset RC signals are controlled by the HUI 700 through direct decoding of commands from the CPU 702 or through direct control of the SCP 706 by writing data to the associated registers in the register files 712 or 714. In addition, the gate A20 and fast reset RC signals can also be controlled by way of the system I/O bus. By enabling these signals, gate A20 and fast reset RC, to be controlled by the system I/O bus, the BIOS is able to directly control these signals by reading and writing to system I/O addresses, such as EEH and EFH. The BIOS control of the gate A20 signal is performed through the system I/O address of EEH. More particularly, writing to address EEH sets the gate A20 signal, while reading EEH clears the gate A20 signal. In either case, any data written or read is ignored and undefined. As will be discussed in more detail below, both operations are protected operations and are under the control of the PRIVY protection, discussed in detail below. The BIOS control of the gate A20 signal can be enabled or disabled at a CPU index register identified as FAST_CTRL. As will be discussed in more detail below, the index registers are accessible by way of the CPU_INDEX and CPU_VALUE registers at addresses E6H and E7H.

BIOS control of the fast reset signal RC is performed through a system I/O address of EFH. In particular, a write to the address EFH has no effect on the fast reset signal RC. However, reading address EFH sets the fast reset signal RC for the duration of the I/O read pulse plus 2 to 3 SCP clock pulses, after which the RC signal is released. The RC signal is an active low signal and is under the control of the PRIVY protection to be discussed below. Similar to the gate A20 signal, the BIOS control of the fast reset signal RC can be enabled or disabled by way of the CPU index register FAST_CTRL.

PROGRAMMABLE HARDWARE TIMER

As mentioned above, the HUI 700 includes a programmable hardware software timer 722 in order to provide a convenient way for the firmware to assess when a specific time interval has elapsed. The programmable hardware timer 722 has many functions including enabling the firmware to determine when a computer system is not functioning properly. More particularly, in known computer systems, the firmware, normally stored in non-volatile memory, such as ROM, EPROM or EEPROM, is executed immediately after power-up and performs various functions including testing and initializing the hardware within the computer system, configuring the operating environment and other general housekeeping functions. While such operations are being carried out, the firmware must be able to track the amount of time elapsed between operations for various reasons, including interrogating the hardware to determine whether there has been a device failure. More particularly, when hardware devices are initialized, a response from the device is normally returned within a specific period of time. If a response from the device is not returned in the predetermined time period, the device is considered to have failed.

In known systems, software timing loops have been used for providing such time intervals. Such software timing loops normally use an integer variable that is initialized with a specific value. The value is tested, decremented and looped until the value goes to zero. Although such a method provides adequate performance in most situations, certain problems have developed with such methods which can result in system failure. In particular, such software timing loops are known to be incorporated within the firmware. Since the system firmware is normally designed to operate across a relatively wide range of performance levels—commonly done to amortize the development cost of the firmware across product lines—it can be difficult, if not impossible, to precisely tune the timing loops to meet all requirements. For example, a software timing loop will execute considerably faster on a 66 MHz Intel type 80486 CPU than it will on a 25 MHz Intel type 80386 CPU. Such discrepancies can lead to system failure.

The programmable hardware timer 722 in accordance with the present invention solves this problem by providing programmable hardware to allow predetermined time intervals to be programmed and be relatively consistent over a relatively wide range of performance levels. More particularly, with reference to FIG. 21, the programmable hardware timer 722 includes a downcounter 724 driven by an SCP clock, normally 14 MHz. The downcounter 724 counts predetermined time intervals, such as 1 millisecond intervals as a function of the input clock frequency. The output of the downcounter 724 is applied to the millisecond downcounter register (MILLISECS), which stores the number of 1 millisecond loops counted by the downcounter 724. In order to account for the specific clock frequency of the SCP 706 written to the personal computer in which the programmable timer 722 is installed, the number of clock pulses per predetermined time interval, for example, 1 millisecond, based upon the clock frequency of the SCP 706, is programmed into an SCP clock count low byte register (CLKCNT_L) and an SCP clock count high byte register (CLKCNT_H). These registers, (CLKCNT_L) and (CLKCNT_H), are write once read many (WORM) registers, which enable the programmable hardware timer 722 to be configured based upon the clock frequency of the particular SCP 706 used in the computer system to count a specific time interval. For example, if the clock frequency of the SCP 706 is 14 MHz and the desired time interval is, for example, 3 milliseconds, the downcounter 724 would count 14,000 clock cycles per millisecond. Thus, the SCP clock count low byte (CLKCNT_L) and SCP clock count high byte (CLKCNT H) registers would be set for the hexadecimal equivalent of 14,000 or $36B0. These hex values are loaded into the registers CLKCNT_L and CLKCNT_H, index registers at addresses 20H and 21H, respectively. The registers, CLKCNT_L and CLKCNT_H are accessed through index registers CPU_INDEX and CPU_VALUE at addresses E6H and E7H, in the manner as discussed above.

The value from the registers CLKCNT_L and CLKCNT_H is downloaded to the downcounter 724 by way of a 16-bit local bus whenever the LOAD input on the downcounter 724 is active, Since the zero flag ZF goes active whenever the downcounter 724 counts to zero, the zero flag signal ZF is fed back to the LOAD input by way of an OR gate 726. Such an arrangement causes the data from the CLKCNT_L and CLKCNT_H registers to be loaded into the downcounter 724 every time the downcounter counts down to zero (i.e., counts the specified time interval). For example, if the clock input to the down counter 724 is 14 MHz and the desired time interval is 1 millisecond, the zero flag signal ZF would go active every 14,000 clock cycles, which, in turn, is applied to LOAD input of the downcounter 724 to cause the value of the registers CLKCNT_L and CLKCNT_H to be loaded into the downcounter each time the downcounter 724 counts to zero.

The millisecond downcounter register (MILLISECS) is configured as a downcounter to enable a multiple of the programmed time interval counted by the downcounter 724 to be generated. More specifically, the millisecond downcounter MILLISECS is initially programmed with a predetermined value, for example, 3. Thus, if the downcounter 724 is configured to generate a active zero flag signal ZF every 1 millisecond, the MILLISECS downcounter will generate a zero flag signal ZF at 3 milliseconds. Thus, the output of the zero flag signal ZF of the downcounter 724 is applied as a clock input to the MILLISECS downcounter. As such, every time the downcounter 724 counts the specified time interval, for example, 1 millisecond, and generates an active zero flag ZF, the MILLISECS downcounter will be decremented. After the MILLISECS downcounter counts down to the specified time interval, its zero flag signal ZF will go active. The MILLISECS downcounter can be read by the system data bus SD[0:7] under the control of a low READ signal applied to its output enable terminal OE.

In order to restart the downcounter 724 every time the millisecond downcounter is loaded with a new value, the LOAD signal of the millisecond downcounter is ORed with the zero flag output of the downcounter by way of the OR gate 726. Thus, any time the MILLISECS downcounter is loaded with a new value, the downcounter will be reloaded with the value in the registers CLKCNT_L and CLKCNT_H.

In order to prevent the millisecond downcounter MILLISECS from counting below zero, the output of the zero flag signal ZF from the MILLISECS downcounter is ANDed with the output of the zero flag signal ZF on the millisecond downcounter by way of a AND gate 728 and an inverter 730. Thus, while the MILLISECS downcounter is counting down, the zero flag output signal ZF from the downcounter 724 strobes the clock input of the millisecond downcounter MILLISECS by way of the AND gate 728. Once the count of the millisecond downcounter MILLISECS goes to zero, its zero flag signal ZF disables the AND gate 726 which, in turn, disables the clock input to the millisecond downcounter MILLISECS, thus, preventing the millisecond downcounter MILLISECS from counting below zero.

ALTERNATE I/O PORT ACCESS TO STANDARD REGISTER SET

Personal computers built to an IBM type AT standard have standardized ports for various standardized functions including ports 60H and 64H, used for communication between the CPU and the SCP for execution of a standard set of commands, primarily related to keyboard and mouse control coordination. Over time, more and more functions are being added to the SCP. For example, in portable personal computers, programs to conserve the power of the battery (known as power management programs) have been relegated to the SCP. In addition, various security functions are also handled by the SCP with other than standard commands to the standard CPU/SCP command ports 60H and 64H.

Unfortunately, various software programs, such as the Microsoft Windows® program, examine accesses to the various standard ports, such as the CPU/SCP standard ports, to verify the accesses to these ports. More particularly, such software programs, in an attempt to guarantee the standard functionality of the ports, limit accesses to the standard ports to standard functions. In so doing, such software creates conflicts with non-standard functionality assigned to such ports. In particular, when non-standard commands are written to standard ports, such as 60H and 64H, the non-standard functions can be excluded. More particularly, in a computer system using an 80×86 microprocessor, the operating environment software places the microprocessor into a virtual mode. In such a mode, the I/O port accesses are configured to force a processor exception any time various standard ports, such as 60H and 64H, are accessed. When such a processor exception occurs, the exception handler examines the code at the time of execution and determines if such operations are valid for the particular port according to the industry's standard definitions. If not, the code is ignored; preventing non-standard commands from being executed by way of the standard ports. Thus, in the case of the power management software normally relegated to the SCP, non-standard commands used in conjunction with the power management would not be executed in a Windows® environment. As such, hardware designers are forced into developing completely new subsystems for any non-standard system functionality which includes the allocation of new ports and additional hardware when the existing ports have both the capability and the bandwidth to support such functions.

The method in accordance with the present invention solves this problem by allowing the standard ports to be accessed in a computer system through an alternate method of access. As such, standard ports, such as the ports allocated to the CPU/SCP communication can be expanded in functionality without additional software or hardware while, at the same, obviating the problem that any non-standard commands will be ignored.

Figure 22:
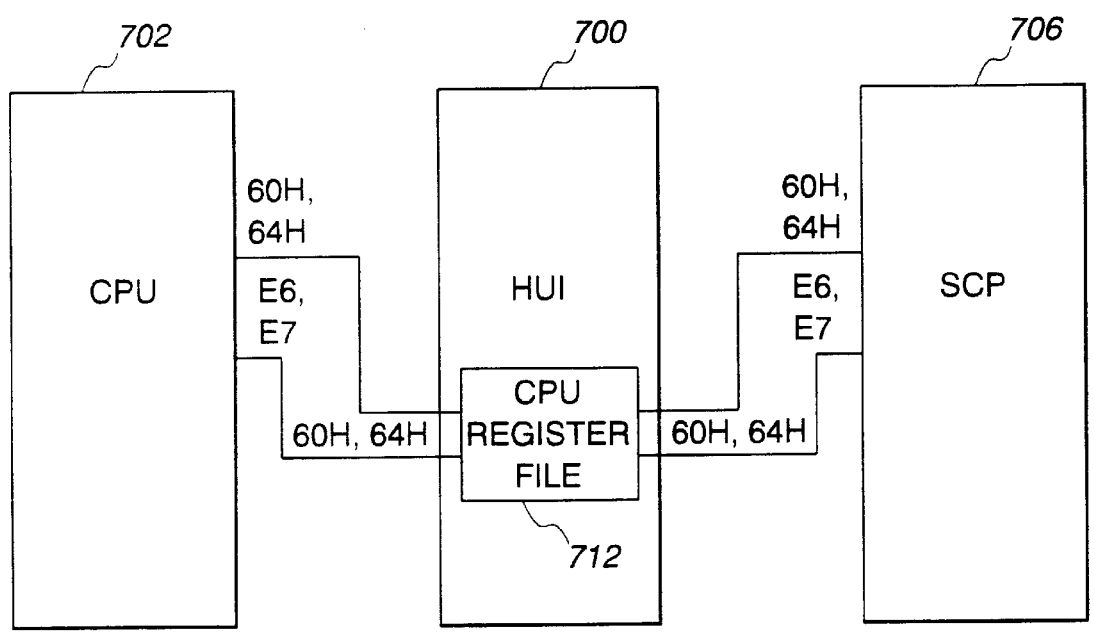
FIG. 22 is a functional block diagram illustrating a method for alternate I/O port access to a standard register set in accordance with the present invention.

More particularly, with reference to FIG. 22, both the CPU 702 and SCP 706 are adapted to access the standardized ports in two ways. In a normal access (i.e., standardized commands), the CPU/SCP communicates by way of accesses to the port addresses 60H and 64H. As illustrated above, there are actually two registers at each of the port addresses 60H and 64H. In particular, the SCP output buffer (CPU_OUT), as well as the SCP input buffer (CPU_DATA) are located at port address 60H. The SCP output buffer (CPU_OUT) is a read-only buffer by the CPU 702 to read data written by the SCP 704. The SCP input buffer (CPU_DATA) is a write-only buffer which enables the CPU 702 to write to the SCP 704. Thus, writes to the port address 60H write data to the SCP input buffer (CPU_DATA), while reads to the port address 60H enable the CPU to read data written to the SCP output buffer (CPU_OUT). The port address 64H is likewise used for two registers; the SCP status register (CPU_STAT) and the SCP input buffer (CPU_CMD). The SCP status register (CPU_STAT) is a read-only register which allows the SCP status register (CPU_STAT) to be read by the CPU. The SCP input buffer (CPU_CMD) is a write-only register which allows the CPU 702 to write commands to the SCP 704. As such, writes to the port address 64H will access the SCP input buffer (CPU_CMAD), while reads to the port address 64H will allow the SCP status register (CPU_STAT) to be read.

In order to prevent non-standard commands to standard ports 60H and 64H from generating interrupts and not being executed, an alternate access path is provided to the registers stored at the port addresses 60H and 64H within the HUI 700. In particular, as illustrated in simplified form in FIG. 22, the registers at port addresses 60H and 64H within the HUI 700 can be accessed by way of an index register (CPU_INDEX) and a value register (CPU_VALUE) at non-standardized addresses E6H and E7H. In particular, the value written to the index register (CPU_INDEX) selects one of the index registers identified in Table XXIV, while the value register (CPU_VALUE) is used for the data for the register selected by the index register (CPU_INDEX).

With reference to Tables XXXVII and XXXVIII, an alternate SCP output buffer address (ALT_CPU_OUT), as well as an alternate SCP input buffer address (ALT_CPU_DATA) are mapped to the same registers as the SCP output buffer (CPU_OUT) and the SCP input buffer (CPU_DATA). Similarly, an alternate SCP status register address (ALT_CPU_STATE), as well as an alternate SCP input buffer address (ALT_CPU_CMD) are mapped to the same registers as the SCP status register (CPU_STAT) and SCP input buffer (CPU_CMD).

By defining the indexed registers (ALT_CPU_DATA); (ALT_CPU_OUT); (ALT_CPU_CMD) as the same registers as the standard port addresses 60H and 64H, additional functionality can be added to the ports while obviating the possibility of non-standard commands to such standard ports generating software interrupts and possibly being ignored. More particularly, standard functions, such as keyboard and mouse control, are accessed through normal port accesses addresses, such as 60H and 64H. However, non-standard functionality such as power management can be executed by way of the alternate access paths to allow the SCP to perform additional functions. As such, such indexed accesses will not be examined as long as the port addresses are non-standard ports normally not monitored by the operating environment.

COMMON MEMORY DEVICE

As mentioned above, known IBM type AT PC-compatible personal computers utilize an SCP 706 with an internal ROM for program storage. It is also known that the BIOS is stored in a separate memory device. The HUI 700 allows both the CPU 702 and the SCP 706 to share a common memory device 704. As such, the BIOS, as well as the SCP code, can be stored in a single memory device; thus eliminating the need for additional devices. As will be discussed in more detail below, the arbitration scheme is relatively straight forward and prevents the SCP 706 from gaining access to the common memory device 704 during periods when the CPU 702 has exclusive control since, during such conditions, the SCP 706 is held in reset.

Figure 24:
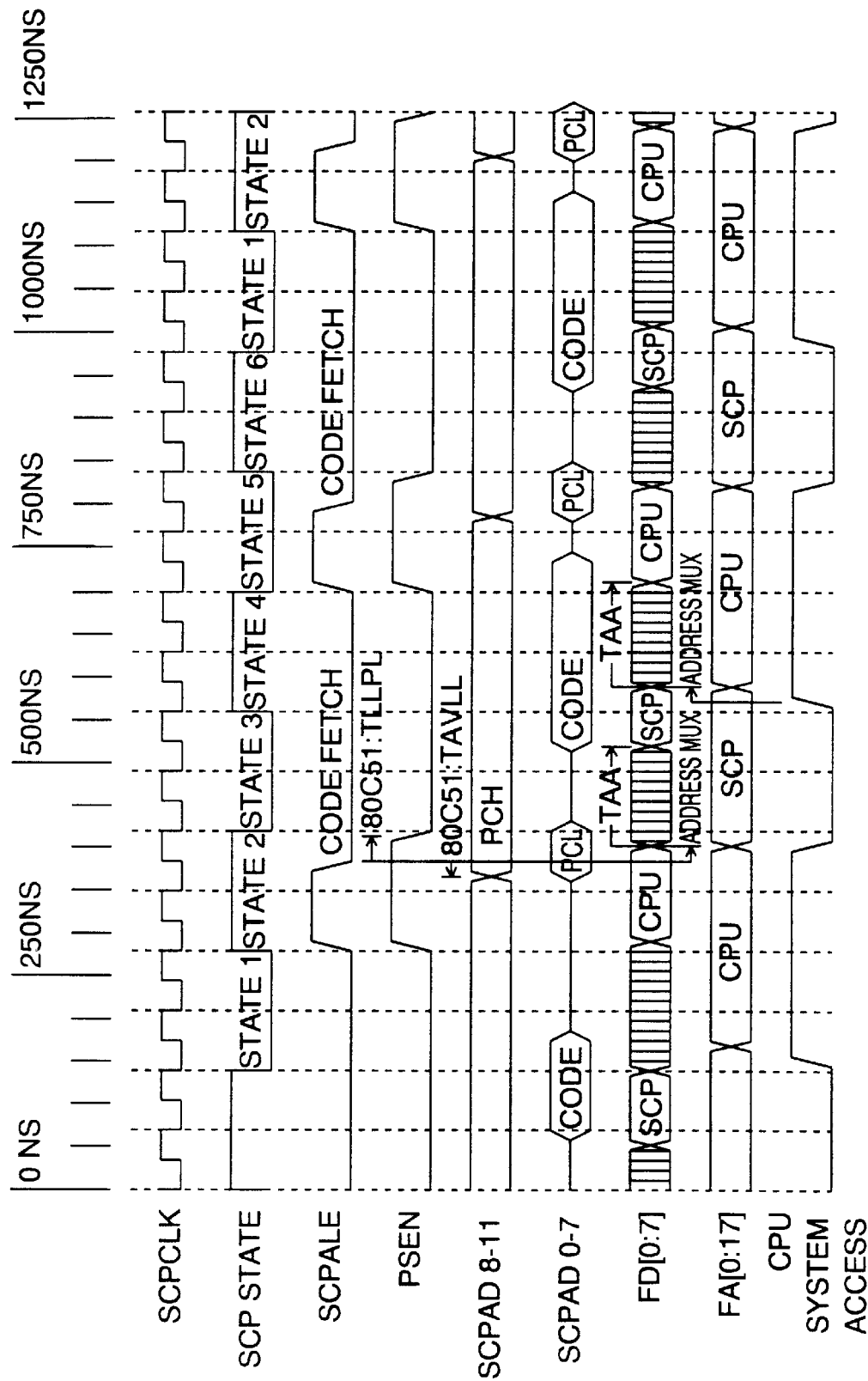
FIG. 24 is a timing diagram illustrating the interleaved access of a common memory device in accordance with the present invention.

Full access is provided to both the CPU 702, as well as the SCP 706, utilizing a time based interleaving method as illustrated in FIG. 24 and described in more detail below. In this method, the SCP 706 normally has priority to the common memory device 704 in a shared mode of operation. In order for the SCP 706 to gain exclusive control, the CPU 702 may be forced into a wait state by the HUI 700 by pulling the input/output channel ready signal IOCHRDY inactive. In particular, exclusive use of the common memory device 704 can be given to the SCP 706 by asserting a CPU EXCLUDED signal by way of the SCP 706 control of a Flash Memory register, FLASH_GRAB, at address 43H in the SCP register file 714; read by the CPU 702 as bit 1 of a flash interface control register FLASH_CTRL; read-only by the CPU 702. During conditions when the SCP has exclusive access of the common memory device 704, the CPU 702 can gain control by forcing the SCP 706 into reset by setting bit 0 of the flash interface control register FLASH_CTRL. Alternatively, the CPU 702 can gain exclusive control of the common memory device 704 by placing the SCP 706 into a reset state by setting bit 0 of the flash interface control register FLASH_CTRL. In a shared mode, bits 0 and 1 of the flash interface control register FLASH_CTRL are deasserted.

Figure 23:
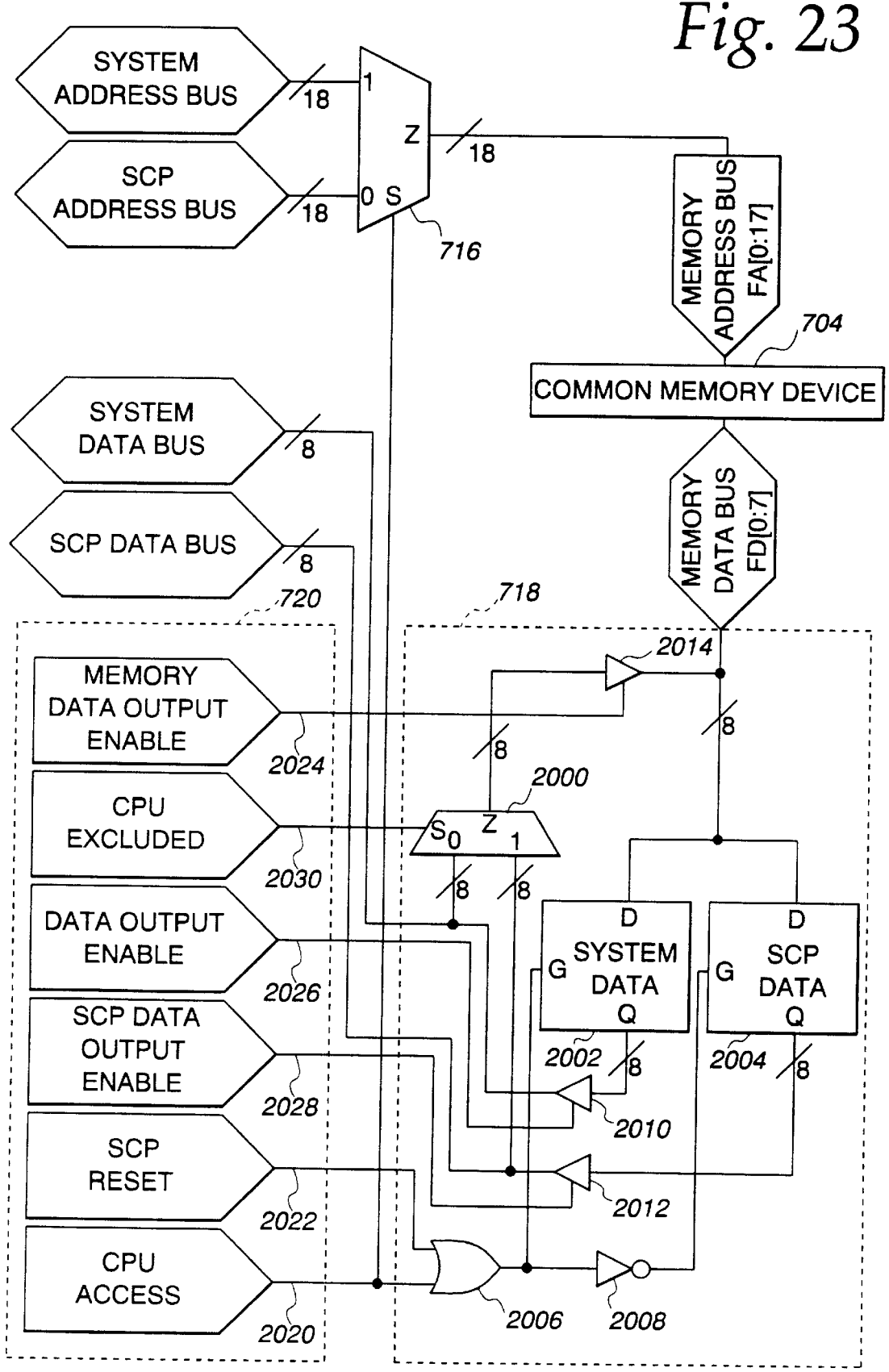
FIG. 23 is a block diagram illustrating the control of a common memory interface in accordance with the present invention.

Turning now to FIG. 23, a block diagram shows how the HUI 700 multiplexes access to the common device between the CPU 702 and the SCP 706. Several signals within the control block 720 are conceptually represented in FIG. 23 for clarification to perform the below-described functions. The actual signals are generated within the Verilog code (Appendix I) for the HUI 700. The correlation between the signals identified in FIG. 23 and the actual signals within the Verilog code are as follows: MEMORY DATA OUTPUT ENABLE 2024=FD_OEN; CPU EXCLUDED 2030= CPUexcl; DATA OUTPUT ENABLE 2026=SD_OEN; SCP DATA OUTPUT ENABLE 2028=SCPAD_OEN; SCP reset 2022=SCPreset; and CPU access 2020=SySAccess.

Exclusive access by the CPU 702 is required to write to the common memory device 704. This access is provided by the data multiplexer 718 which multiplexes both the system data bus SD[0:7] and the SCP data bus SCPAD[0:7] under the control of a CPU EXCLUDED signal 2030; available as bit 1 of the flash interface control register FLASH_CTRL. As mentioned above, when this bit is set, the CPU 702 has exclusive access to the common memory device 704 to enable the CPU 702 to write to the common memory device 704. During such conditions, the SCP 706 is prevented from writing to the common memory device 704 since the SCP is held in a reset state during such conditions.

The SCP 706 can only write to the common memory device 704 when it has exclusive access. As mentioned above, the SCP 706 can gain exclusive access to the common memory device 704 by asserting a CPU EXCLUDED signal (i.e., setting bit 1 of the flash interface control register FLASH_CTRL). During such a condition, the data multiplexer 718 blocks the system data bus SD[0:71] from the path of the memory data bus FD[0:7].

During shared conditions when both the SCP 706 and the CPU 702 are given full access to the common memory device 704, the common memory device 704 is configured as a read only memory by way of an 8-bit tri-state device 2014 under the control of a MEMORY DATA OUTPUT ENABLE signal 2024. More particularly, as mentioned above, writes to the common memory device 704 are by way of either the system data bus SD[0:7] or the SCP data bus SCPAD[0:7]. These data buses SD[0:7] and SCPAD[0:7] are multiplexed by the data multiplexer 718 under the control of the CPU EXCLUDED signal FLASH_CTRL [1] such that only one or the other of the CPU 702 or the SCP 706 can write to the common memory device 704.

In order to enable the CPU 702 and the SCP 706 to read the common memory device 704, an 8-bit system data latch 2002 and an 8-bit SCP data latch 2004 are connected to the memory data bus FD[0:7]. The Q outputs of the system data latch 2002 are connected to the system data bus SD[0:7] by way of an 8-bit tri-state device 2010. The tri-state devices 2010 are under the control of a SYSTEM DATA OUTPUT ENABLE signal. Similarly, the Q outputs of the SCP data latches 2004 are connected to the SCP data bus SCPAD[0:7] by way of an 8-bit tri-state device 2012. The tri-state devices 2012 are under the control of an SCP DATA OUTPUT ENABLE signal.

Data is latched in both the system data latches 2002 and the SCP data latches 2004 under the control of a CPU ACCESS signal. The CPU ACCESS signal provides for interleaved access to the common memory device 704, as shown in FIG. 24. Whenever the SCP 706 is in reset or the CPU ACCESS signal is asserted, the common data bus SD[0:7] will be latched into the 8-bit system data latch 2002. Thus, the SCP RESET signal is ORed with the CPU ACCESS signal by way of the OR gate 2006, applied to the G inputs of the system data latches 2002.

In order to prevent the SCP data latches 2004 from latching data during a condition when the signal CPU ACCESS is asserted, the output of the OR gate 2006 is inverted by way of an inverter 2008 and applied to the G inputs of the SCP data latches 2004. Thus, when the CPU ACCESS signal is asserted, data on the memory data bus FD[0:7] will be latched by the system data latches 2002. Similarly, when the CPU ACCESS signal is deasserted, data on the memory data bus FD[0:7] will be latched by the SCP data bus 2004.

As will be discussed in connection with FIG. 25, during all modes of operation, the system address bus SA[0:17] and the eighteen bit SCP address bus SCPA[0: 17] are time multiplexed by way of an address multiplexer 716 to access the common memory device 704 via the 18-bit memory address bus FA[0:17]. The SCP address bus SCPA[0:17] is formed from the SCP multiplexed address/data bus SCPAD [0:11], concantenated to an SCP base address system register SCP_BASE [0:7] discussed below.

As mentioned above, during a shared mode, multiplexing of the common memory device 704 provides for interleaved access to the common memory device 704 by the CPU 702 and the SCP 706. With reference to FIG. 24, the timing of various control signals, as well as the interleaving of the CPU 702 and SCP 706, accesses are illustrated. The SCP clock SCPCLK, SCP state signals SCPSTATE, SCP address latch enable SCPALE and program store enable PSEN signals are standard control signals for an Intel type 8031/51 type microprocessor, which may be used as the SCP 706. These signals are described in detail in a handbook entitled *Embedded Microcontrollers and Processors*, Vol. I, copyright 1993 by Intel Inc., hereby incorporated by reference. The timing diagram illustrated in FIG. 24 also shows the states of the SCP address data bus SCPAD[8:11] and SCPAD [0:7], as well as the state of the CPU system ACCESS signal described above.

In operation, with reference to FIG. 24, at the falling edge of SCP address latch enable SCPALE, indicating that the SCP address is valid, memory control is given to the SCP 706. The SCP 706 has control for about 2.5 through 3.5 SCP clock periods, after which time the CPU 702 is given control. The CPU ACCESS signal 2020, used as the select line to the address multiplexer 716, determines which address is sent to the common memory device 704. The CPU access signal 2020 is generated as follows. Access is granted to the SCP 706 as soon as the SCP address latch enable signal SCPALE occurs (start of an SCP cycle) and switched to the CPU 702 after two rising and one falling edges of the SCP clock SCPCLK are detected. This timing is dictated by SCP address latch enable signal SCPALE timing relative to SCP clock SCPCLK in the 8031/51—SCP address latch enable signal SCPALE changes anywhere from 25 to 125 nanoseconds after the falling edge of SCP clock SCPCLK, even though the cycle time of the SCP clock SCPCLK is only 70 nanoseconds. Note, however, that if it is assumed that the timing of SCP address latch enable signal SCPALE relative to SCP clock SCPCLK is consistent from cycle to cycle, the delay over a single clock period will not present a problem. Delays longer than a single clock period are the same as shorter delays from the next clock edge. The situation is believed to be the worst possible would occur if the delay is almost exactly one clock cycle (approximately 70 nanoseconds), in which case the sampling of the SCP address latch enable signal SCPALE might catch the transition on one cycle but miss the transition on the next cycle. However, waiting for two rising edges and one falling edge of SCP clock SCPCLK guarantees the worst-case timing will-be available to the SCP 706 for access. Switching, according to the CPU system access signal 2020, from the SCP 706 to the CPU 702, not only switches the address bus, but also latches the data from the common memory device 704 into latches 2002 and 2004 or the SCP 706 data bus since the SCP 706 cycle is not complete at the time switching occurs.

Figure 25:
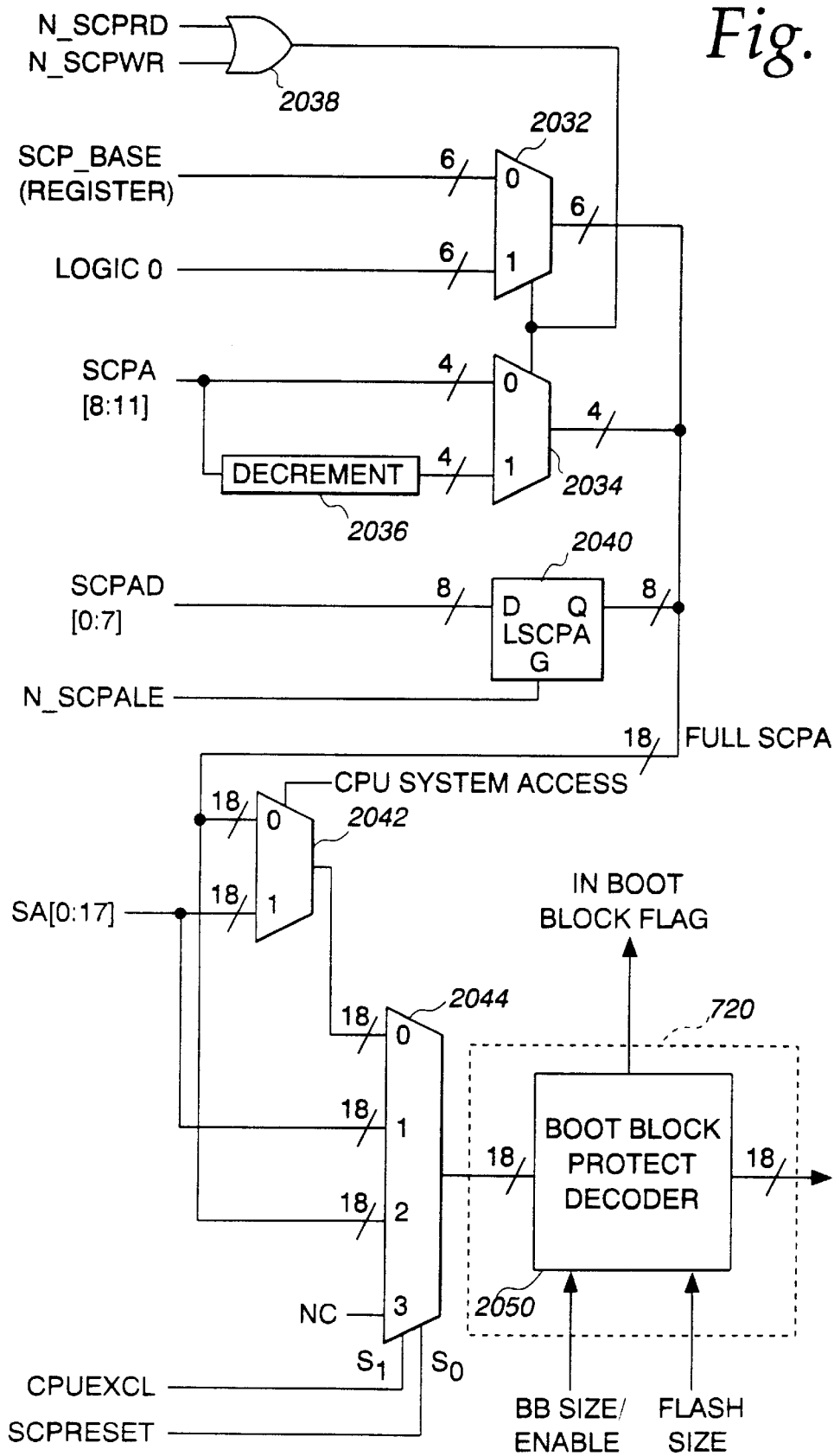
FIG. 25 is a schematic diagram illustrating non-volatile sector protection for a standard programmable memory in accordance with the present invention.
Figure 26:
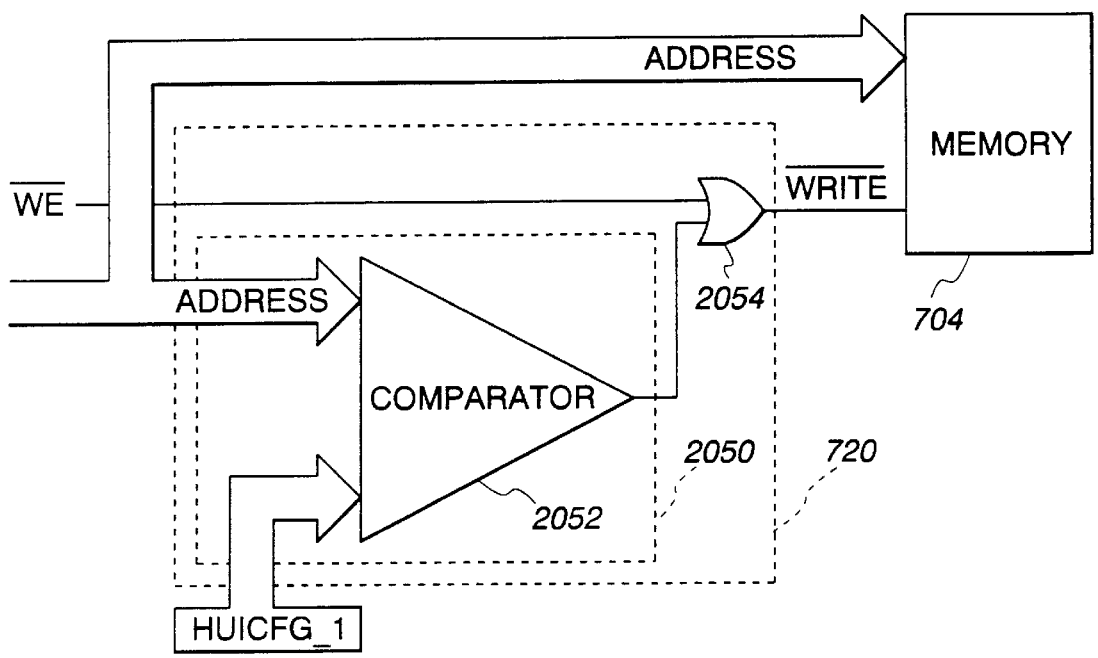
FIG. 26 is a block diagram forming a portion of the invention illustrated in FIG. 25.

The interleaved access discussed above is under the control of the interface circuitry illustrated in FIG. 25. In particular, turning to FIG. 25, a schematic diagram of the HUI 700 address bus interface circuitry is shown for the common memory device 704. The SCP 706 address is concentrated with the highest 6-bits from a multiplexer 2032, the middle 4-bits from a multiplexer 2034 and the lower 8-bits via latch 2040. An SCP read signal SCPRD and an SCP write signal SCPWR are ORed by way of an OR gate 2038 to provide a select signal for the multiplexers 2032 and 2034 on SCP 706 read and write operations. The upper 6-bits of an SCP base register SCP_BASE, utilized as a page register or pointer (discussed below), may relocate and point to the SCP 706 address space as an SCP pointer, allowing the allocation of 4 kilobytes of code within a 256 kilobyte space associated with the common memory device 704. Alternatively, for data accesses, logic 0s are provided in the upper 6-bits locating the SCP 706 data space in the lowest 4 kilobytes, as explained in conjunction with the password storage. The SCP address lines SCPA[11:8] defining the middle of the selected bits of the indexed SCP 706 address are selectable via multiplexer 2034 providing a decrement 2036 which effectively substitutes 256 bytes as discussed in conjunction with password storage. The full 18-bit SCP address SCPA is then multiplexed with system address SA[17:0] from the CPU 702 via multiplexer 2042 under the control of the SYSTEM ACCESS signal 2020. The multiplexer 2044 further multiplexes the addresses according to CPU exclusive signal 2030 and an SCP reset providing the exclusive CPU 702 or SCP 706 access to the common memory part 704, as discussed above.

NON-VOLATILE SECTOR PROTECTION

The HUI 700 provides non-volatile sector protection allowing a standard electrically erasable programmable read-only memory (EEPROM) to be used as the common memory device 704 and utilized as a functional equivalent to a protected "boot block" memory device. In effect, the HUI 700 acts as front-end to the common memory device 704. As such, it captures protected address ranges to block data writes. And, since the HUI 700 is hardware strapped, it does not allow software reconfiguration of memory protection. Thus, as described below, where the programmable memory provides for global erasure, the HUI 700 front-end hardware traps the command, rendering it inoperable. Moreover, the software is completely disabled from writing to define non-volatile sectors.

In particular, the memory address bus FA[0:17] is compared in a boot block protect decoder 2050 (FIGS. 25 and 26), part of the control logic 720, with a predetermined address range forming the protected boot block. The boot block size bit HUICFG_1 [0:3] and flash size bit HUICFG_1[7] may be specified in a configuration register HUICFG_1[0:17] to define the non-volatile sector. In order to block writes to the protected sector, the output of the comparator 2052 is ORed by way of an OR gate 2054 with a write enable signal WE to create a non-volatile sector.

Various sector sizes are possible as illustrated in Table LXVIII. And, several of the bits in the HUICFG_1[0:3, 7] may be configured in hardware with either pull-up or pull-down resistors (not shown) to provide any of the sizes shown in the Table LXVIII.

In operation, during a system reset, the HUI 700 will read the state of the memory data bus FD[0:7] by way of the SCP address/data bus and latch 718 on the falling edge of the reset signal. In particular, hardware configured HUI configuration straps register 1, HUICFG_1[0:7] are read. This data can be read by both the CPU and the SCP 706 through the indexing scheme described above. The data read from the memory data bus FD[0:7] is used to configure several parameters of the HUI 700 interface: (1) size of boot block to emulate as indicated in Table LXVIII, (2) software chip erase sequence to trap, (3) enable of protection or password addresses in the memory as discussed below and (4) the size of the memory device 704. The data latched from the SCP 706 address/data bus is not used to directly control the HUI, but can be read and used by the CPU 702 or SCP 706 software as configured.

Thus, as described, the HUI 700 can be configured to emulate boot block protection to enable memory devices such as the common memory device 704 which do not have built-in boot block protection capability to be used for storage of the boot block protected code non-volatile sector. When the boot block protection feature is enabled, the HUI 700 will intercept all writes to the selected upper range of memory, thus rendering the address range as read-only to protect the system boot code.

Figure 27:
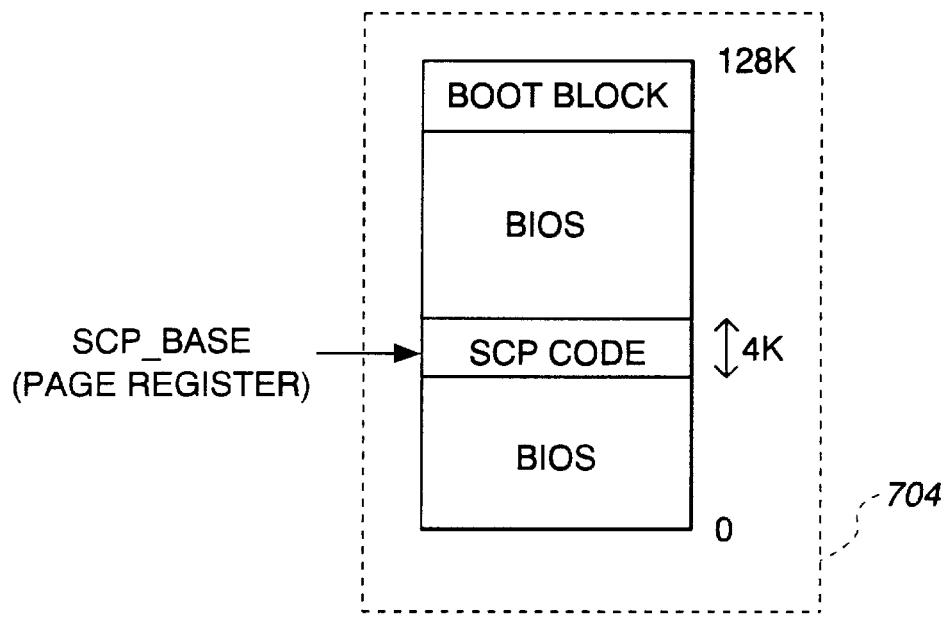
FIG. 27 is a memory map for a common memory device in accordance with the present invention.

The protected boot block range should start on a 1 kilobyte memory boundary and finish at the top of memory as shown in FIG. 27. The size (as defined by Table LXVIII) and, therefore, the starting address of the protected range can be determined from the hardware configuration register HUICFG_1[0:7] described above. In addition, FIG. 27 also shows 4 kilobytes of SCP non-protected areas used for various purposes such as 4 kilobytes of SCP code defined by a page register SCP_BASE (described below in more detail), utilized for relocating the SCP code. The remaining memory space in the common memory device 704 may be utilized for the BIOS software.

HUI TRAP OF FLASH MEMORY ERASE SEQUENCES

The HUI 700 can be configured to monitor and trap various ERASE commands including the standard Japanese Electronics Device standard (JEDEC), standard "Chip Erase" command sequence recognized by many electronically programmable memory devices, such as the Advanced Micro Devices AM28F10. The "Chip Erase" command performs a global erasure command sequence of any memory device in software and, thus, would undermine the non-volatile sectoring described above. To obviate this problem, the HUI 700 monitors and traps global erasure command sequences ahead of the common memory device 704 to prevent global erasures which would erase the entire memory 704 including the protected sector.

Figure 28:
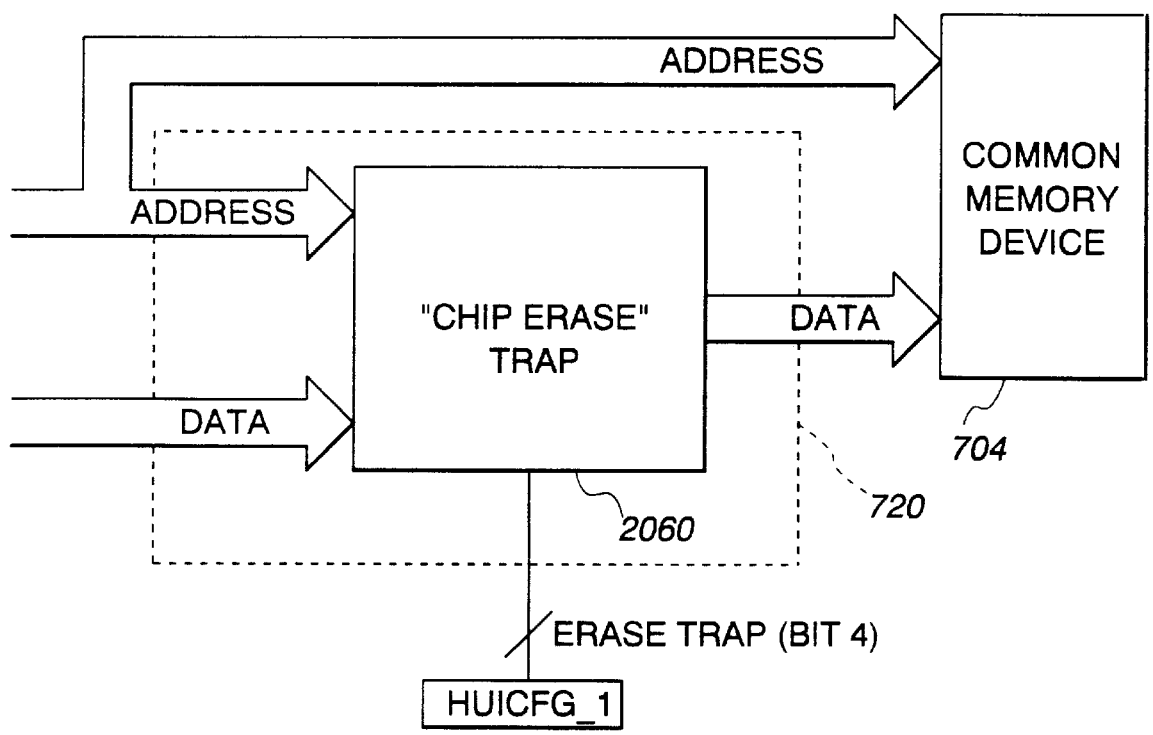
FIG. 28 is a block diagram illustrating a chip erase command trap in accordance with the present invention.

Turning now to FIG. 28, a schematic diagram of the HUI 700 data bus interface circuitry is shown which includes a software chip erase trap 2060 (part of the HUI control block 720), which monitors the system data bus SD[0:7] and the SCP data bus SCPAD[0:7] for global chip erase command sequences. Such command sequences are trapped under the control of an enable signal HUICFG_1[4] from the HUI configuration register HUICFG_1 which enables the software chip erase sequence trap 2060 to enable the HUI 700 to intercept global chip erase command sequences before they reach the common memory device 704.

The global chip erase function is initiated by writing the following address and data sequences to the common memory device 704: (1) write AAH to 5555H, (2) write 55H to 2AAAH, (3) write 80H to 5555H, (4) write AAH to 5555H, (5) write 55H to 2AAAH, and (6) write 10H to 5555H (see FIG. 30).

The HUI 700 recognizes the last three writes, (4) through (6) as the trigger for the "Chip Erase" command and, when this sequence is detected, the ERASE TRAP bit HUICFG_ 1[4], which enables the chip erase trap function, is set, the 10H data in write (6) is changed to F0H data before the memory write pulse N_FWR goes into its active low state. This has the effect of replacing the "Chip Erase" command with a "Read/Reset" command.

The trap 2060 (FIG. 28) includes a three-step state machine 2062 (FIG. 29) for tracking the first three bus write cycles of all address/data command sequences to the common memory device 704. The chip erase trap 2060, including the state machine 2062, effectively intercepts global chip erase command sequence and renders it inoperable. In particular, as shown in the command sequence table in FIG. 30, the first three cycles of a command sequence are used to identify the chip erase function which results from writing AAH to address 5555H in the first write cycle, 55H to address 2AAAH in the second write cycle and 10H to address 5555H in the third write cycle. If this sequence is detected, the software chip erase trap 2060 (FIG. 28) assumes a global chip erase command sequence. Subsequently, the state machine 2062 selects an alternate data path to the multiplexer 2064 to allow the F0H data byte, to force a read/reset condition in lieu of a chip erase command.

It should be appreciated that the tracking, capture, and subsequent substitution of the command sequences by the HUI 700 is applicable to virtually any peripheral device and virtually any command sequences. As such, the HUI 700 can be used in multiuser systems to prevent conflicts, inadvertent operations or intentional malicious operations.

HUI WARM BOOT DETERMINATION AND REVECTORING

The HUI 700 provides for faster warm booting of a computer system by revectoring system control volatile memory, thus eliminating the need to access the common memory device 704 during such a condition. In particular, computers have several modes of reset in operation. These modes include (1) reset on power-up (also referred to as "cold boot"), (2) reset due to warm boot, and (3) reset from protected mode operations. Each of the three modes has a specific set of requirements depending upon the state of the computer system. The three modes of reset may be viewed as having a hierarchy, however, it should noted that a cold boot, a superset of the warm boot, also includes instructions that can affect the configuration set up by the warm boot subset since a cold boot performs functions not applicable to a warm boot process. For example, on a cold boot, a cold boot vector points to code which, inter alia, initializes the system. In addition, memory is normally, and, in many known systems, the BIOS is swapped from the top of the memory map to another area of memory. Since these functions are both time consuming and do affect program configuration settings of the system, warm boots are known to execute after the system has been operational since many of the functions mentioned above are not necessary during such a condition.

In accordance with the present invention, during a warm boot condition, the CPU 702 can directly access a unique code execution vector provided within the HUI 700 without having to access the common memory device 704. The need for memory sharing during the warm boot is, therefore, avoided allowing the SCP 706 exclusive access to the common memory device 704 during the warm boot. On warm boot reset, the warm boot vector is not directed to the address 3FFF0H in the common memory device 704 as is the cold boot vector. Rather, revectoring is provided through the HUI 700 on warm boot directly to volatile memory; thus, eliminating the need to access the common memory device 704; greatly reducing the time for such a warm boot process.

Figure 31:
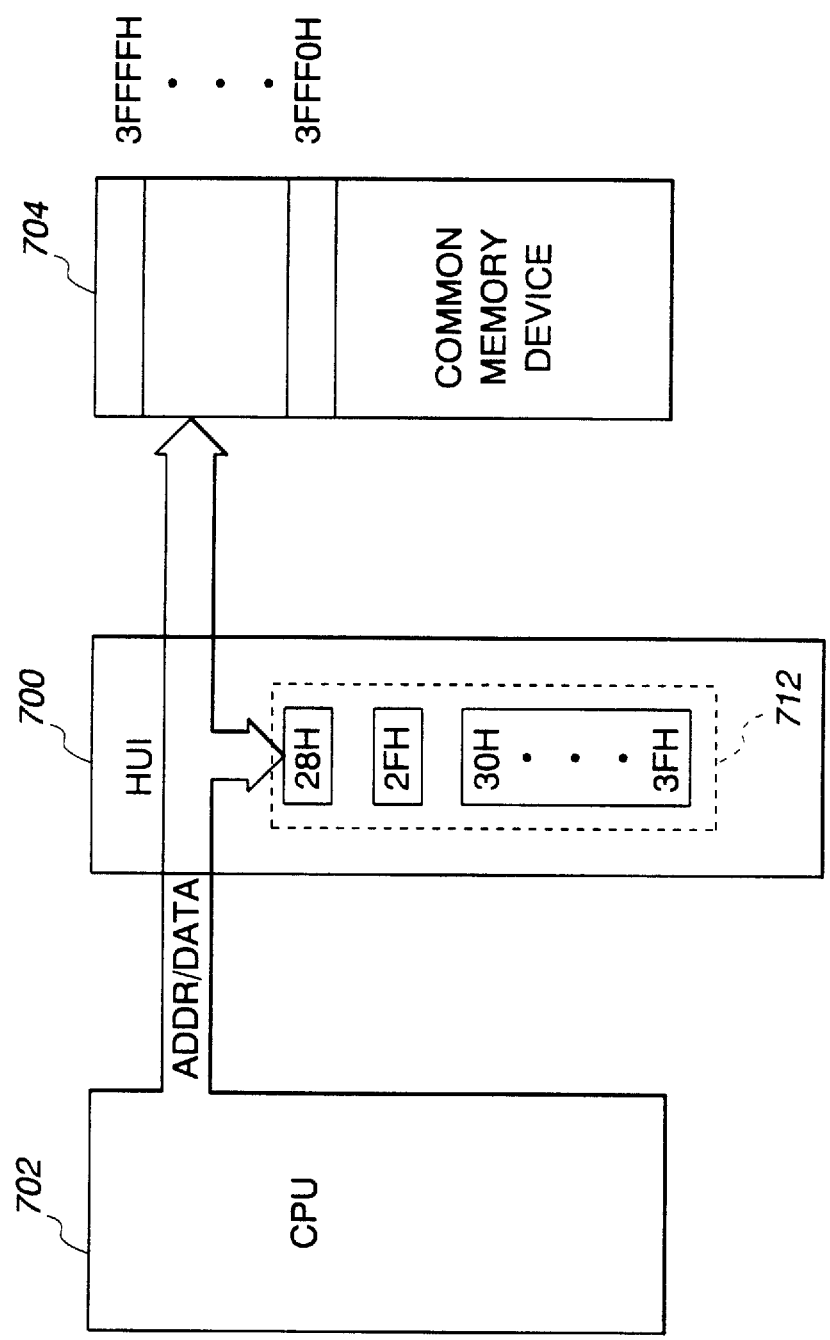
FIG. 31 is a functional block diagram illustrating a warm boot revectoring method in accordance with the present invention.

With reference to FIG. 31, the basic components of the warm boot revectoring integrated within the HUI 700 are illustrated. The HUI 700 contains the control logic and warm boot vector file register WBOOT_1 through WBOOT_16, Table XXXVI, within CPU register file 712 at locations 30H through 3FH to support warm boot vectoring. The last 16 bytes of the common memory device 704, 3FFF0H to 3FFFFH, are effectively mapped to the warm boot vector registers WBOOT_1 through WBOOT_16 in the CPU register file 712, the location for the warm boot reset vector.

Initially, the CPU 702 undergoes a cold boot operation. The warm boot flag of the CPU HUI status register, HUI_ STAT (address 28H) bit 1 "power-up," provides the system boot status; set by the BIOS during the cold boot sequence. During a warm boot, this bit will remain set so that the BIOS can refer to the HUI status register, HUI_STAT to select which of the cold boot or warm boot codes to execute.

The 16 bytes of the warm boot vector register file WBOOT_1 through WBOOT_16 are intended to correspond to the uppermost 16 bytes of the common memory device 704, in particular, addresses 3FFF0H through 3FFFFH. Advantageously, the first warm boot vector is located on a zero boundary allowing the addresses to be indexed with the lower 4-bits of the address bus. With a 80×86 family CPU as the CPU 702, a 16 byte prefetch is required, however, typically only the first 3–6 bytes are used to jump to the boot code. For example, 3 bytes have been used in the boot vector including the E9 op code which is a "jump relative" followed by a 16-bit offset occupying the next 2 bytes.

Enabling of the warm boot vector register file within the HUI 700 is accomplished with the warm boot vector register file enable WBOOT_EN (address 2FH). Bit 0 in this register is used to enable and disable the warm boot vector fast recovery feature. This bit is write once, read many WORM memory which permanently enables or disables warm boot.

During a normal warm boot sequence, the CPU 702 will start to fetch data from the top 16 bytes of addressable memory which, in turn, are mapped to the top 16 bytes of the common memory device 704, requiring accesses to go through the HUI 700. If, however, software already running on the system requires frequent warm boots, a great deal of the time is saved by allowing a warm boot to be controlled out of the CPU register file 712, obviating the need for memory sharing exchanges through the HUI 700 and copying of the BIOS to volatile memory; thus providing a faster recovery from a warm boot since during conditions when the HUI 700 returns data out of the HUI internal CPU register file 712, there is no need for the CPU to assert input-output channel ready, IOCHRDY, while waiting for the SCP 706 to finish with the common memory device 704. Furthermore, the CPU register file 712 is static random access memory SRAM instead of the slower programmable read only memory devices utilized for the common memory device 704.

There are two steps to programming the HUI 700 for warm boot vectoring. The first step is to load the CPU register file 712 in the HUI 700. This register file is accessed through the CPU system I/O indexing scheme (described above). When the warm boot feature is enabled, the byte loaded into index warm boot register, WBOOT_1, will be returned when the CPU 702 reads data from addresses 3FFFF0H for a 256K byte common memory device 704. The warm boot index register WBOOT_2 will be returned on a system memory read to flash address 3FFFF1H, and so on up to the index WBOOT_16. The second step in programming the HUI 700 for warm boot vector fast recovery is to enable the feature and lock the register file 712 by writing a "1" to bit 0 of the warm boot enable register, WBOOT_EN. Writing a "0" to bit 0 of register WBOOT_EN disables the feature and causes all system memory reads to be taken from the top 16 bytes of the common memory device 704 and, thus, go through the HUI 700 unaccepted, as described above.

The reset state of the warm boot enable register WBOOT_EN is "0", i.e., warm boot vector fast recovery is disabled. The first time that this register is written to after a system reset, the entire file and enable register are locked and cannot be altered thereafter because, as described the register is a write once, read only WORM device. Thus, it is important that the register file be loaded before the enable register is set. The described locking can only be cleared upon the system reset.

Since the lock on the warm boot register file (WBOOT_1 through WBOOT_16) can only be cleared on system reset, an update to the top 16 bytes of the common memory part 704 can create an inconsistency with the data stored in the CPU register file 712, which can only be corrected by a system reset after the update. Also, since all 16 bytes of the warm boot register in the CPU register file 712 are locked and enabled together, it is desirable to load all 16 bytes by BIOS on a cold boot prior to enabling the warm boot feature.

The warm boot registers (WBOOT_1 through WBOOT_16) in the CPU register file 712 are enabled upon three (3) conditions, namely (1) address bits A4 through A17 being all ones, (2) warm boot being enabled and (3) selection of the common memory device 704. When these three conditions are met, the warm boot vector is substituted by the HUI 700. Advantageously, this process is transparent to the user providing an automatic configuration for the warm boot feature. It should be appreciated that the substitution described herein is applicable generally where a transparent or automatic configuration of a computer system is desired. To this end, the 16 bytes set up as the warm boot vector within the CPU register file 712 are more than sufficient for the typical reset vector which, as described, is usually 3 bytes but may be as long as 6 bytes possibly. The additional registers can be used to store system information representing data and configuration information valid only during warm boots, while the same address range could contain similar information valid only during cold boots, thus providing for transparent automatic configuration during boot up procedures.

PRIVILEGED DATA STORAGE WITHIN THE PRIMARY CPU MEMORY SPACE

Hardware protection of a password or other critical system data is provided by designating a segment of the common memory device 704 as a restricted segment. In the preferred embodiment, the lowest 256 bytes of the common memory device 704 fall may within the restricted segment. All passwords or the critical system data are stored in the lowest 256 bytes of the shared memory device 704. The circuitry of this invention selectively blocks access by the CPU 702 to the restricted segment. The SCP 706 continues to have access to the restricted segment of the common memory device 704. Since the SCP can only run programs stored in the common memory device 704, only programs in the common memory device 704 can control the password or other critical system data stored within the restricted segment of the common memory device 704.

In the preferred embodiment, the protection of critical information can be turned off or on. The protection of critical data is enabled at system boot-up by setting pin 6 of the HUI 700. Pin 6 is also used as system address line 5 (SA5). This is accomplished by latching the value on pin 6 at the falling edge of the reset signal. The value is set to a logical 1 by use of a pull up resistor tied to pin 6, or to a logical 0 by use of pull down resistor on pin 6. The state of pin 6 at reset is stored in the 6th bit of the Hardware Configuration Strap Register 1 (HWSTRAP_1). Latching a logical 1 on pin 6 at reset enables protection of critical data, while latching a logical 0 on pin 6 at reset disables the protection of critical data. This allows a system designer to elect to use the present invention or not without changing the design of the HUI 700 and preventing software control of this feature.

Figure 32:
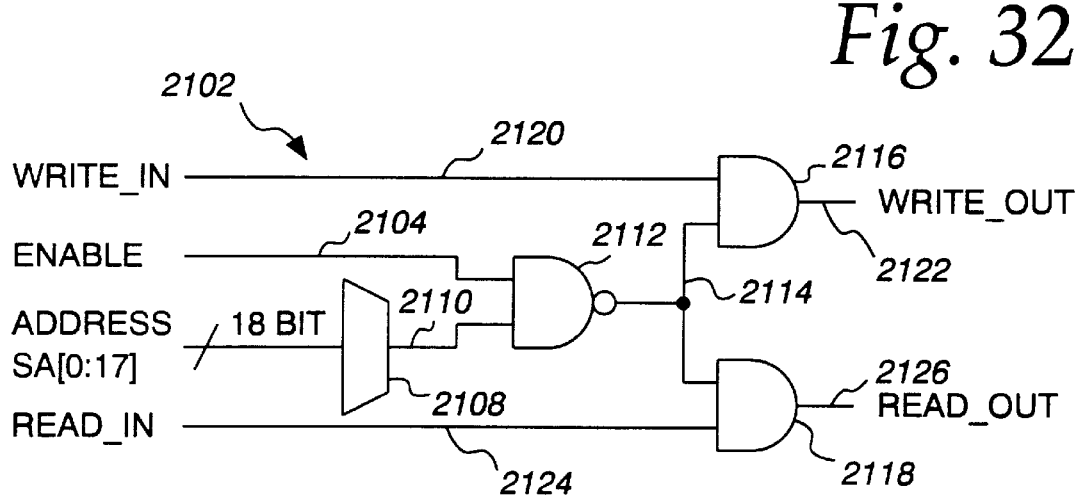
FIG. 32 is a schematic of a method for password or other critical data protection in accordance with the present invention.

The hardware control of the restricted segment of the common memory device 704 is shown in FIG. 32. The state of pin 6 at reset is latched in the 6th bit of the Hardware Configuration Strap Register (HWSTRAP_1) in the register file 712. That information is provided to a critical data control circuit 2102 on an enable signal line 2104. When the CPU 702 addresses the common memory device 704, the address from the CPU 702, is first received by the HUI 700 on address lines SA[0:17]. A decoder 2108 decodes the signals on the address lines SA[0:17] for an address within the restricted segment of the common memory device 704. If the decoder 2108 decodes an address within the restricted segment of the shared memory device 704, it produces a decode signal 2110 to a NAND gate 2112. If critical data protection is enabled and the decoder 704 decodes an address within the restricted segment of the common memory device 704, the NAND gate 2112 provides a NOT_LOCKED signal 2114 to AND gates 2116 and 2118.

The CPU provides a WRITE_IN signal 2120 to the AND gate 2116. If the NOT_LOCKED signal 2114 is active, the write is not locked and the AND gate 2116 provides a WRITE_OUT signal 2122 to the write enable pin of the shared memory device 704. If the NOT_LOCKED signal 2114 is not active, the WRITE_OUT signal is blocked and no write operation is made to the shared memory device 704.

Data reads work in the same manner. If the NOT_LOCKED signal is active and the CPU provides a READ_IN signal 2124 to an AND gate 2118, the AND gate 2118 provides a READ_OUT signal 2126 to the read enable pin of shared memory device 704. If the NOT_LOCKED signal is not active, AND gate 2118 blocks a READ_OUT signal 2126 and no read operation is made to the shared memory device 704.

METHOD TO ALLOW A PRIMARY CPU TO CONTROL THE RELOCATION OF CODE BLOCKS FOR SUBSIDIARY CPUs

The HUI 700 provides an SCP base address register SCP_BASE, part of the register file 712, which acts as a page register for address paging. The SCP base address register SCP_BASE is in the I/O address space of the CPU 702. In the preferred embodiment, the SCP base address register SCP_BASE is an indexed I/O address. One I/O address contains the actual data and another holds an index into a group of indexed I/O addresses. The SCP base address register SCP_BASE is index 26 at I/O address E6. The data is at I/O address E7. Indexed registers allow the CPU to expand the number of available I/O addresses. The CPU can set the SCP base address register SCP_BASE to any value, thereby determining which section of common memory device 704, the SCP 706 will be able to access.

Figure 33:
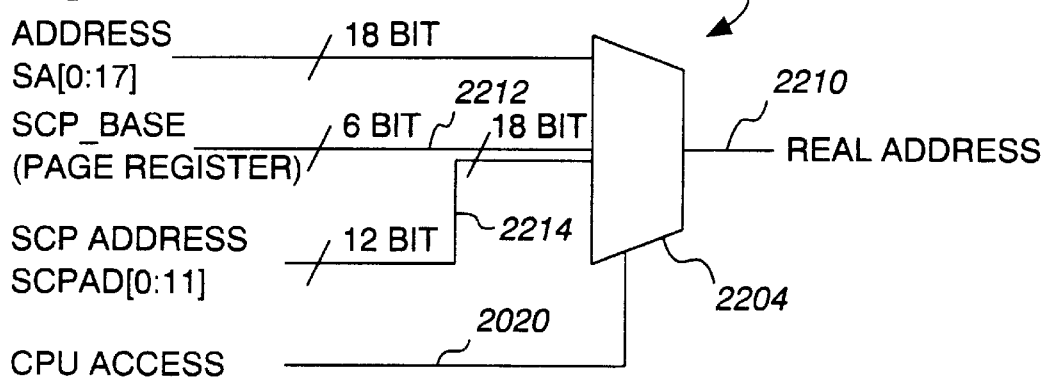
FIG. 33 is a schematic diagram illustrating a method for relocating code blocks within an addressable memory in accordance with the present invention.

The address relocation circuit 2202 is shown in FIG. 33. CPU addresses are provided to a MUX 2204 on the system bus SA[0:17] provided that the control line CPU access 2020 is set for CPU addressing; the CPU addresses are unaltered by MUX 2204 and directly address shared memory device 704 on real address lines 2210.

However, SCP address lines SCPA[0:17] are combined with index address lines of the page register SCP_BASE and are provided to the MUX 2204 provided the CPU access 2020 is set for SCP addressing, the MUX 2204 provides the index address as the higher 6 bits and the SCP address as the lower 12 bits to common memory device 704 on real address lines 2210. Index address lines receive their signal from SCP base page register SCP_BASE. Since the HUI 700 passes 12 bits of the SCP address, the SCP 706 can address 4096 (4K) bytes. The SCP 706 will address the code at the value in the page register as its address 0 and will be able to address the 4096 bytes at and above that address. As an example, If the index register is set to 4096, the SCP will obtain data from the common memory device 704 at real address 4096 as its address 0. The SCP will obtain the data at real address 8191 in the common memory device 704 as its address 4095. Note that in this example, the SCP 706 does not address code between addresses 4096 and 8191 in the common memory device 704.

In the preferred embodiment, the SCP 706 is an Intel 8051 which has separate program and data address spaces. It should be noted that both the program address space and the data address space of the SCP 706 can be contained in the same common memory device 704. Hence, relocation of the program address space does not affect addressing of a protected password or other system critical data as described above.

While in the preferred embodiment the CPU 702 is controlling access by the SCP 706 to the common memory device 704, the invention can be used in other applications. As an example, an SCP 706 can be used for multiple purposes by relocating its code to different areas in the common memory device 704. The CPU 702 can determine the current function of the SCP 706 by changing the page value of the SCP's base register SCP_BASE. Although this embodiment shows two processors, the CPU 702 can control multiple peripheral processors.

METHOD TO PROGRAM A READ-ONLY I/O PORT

Figure 34:
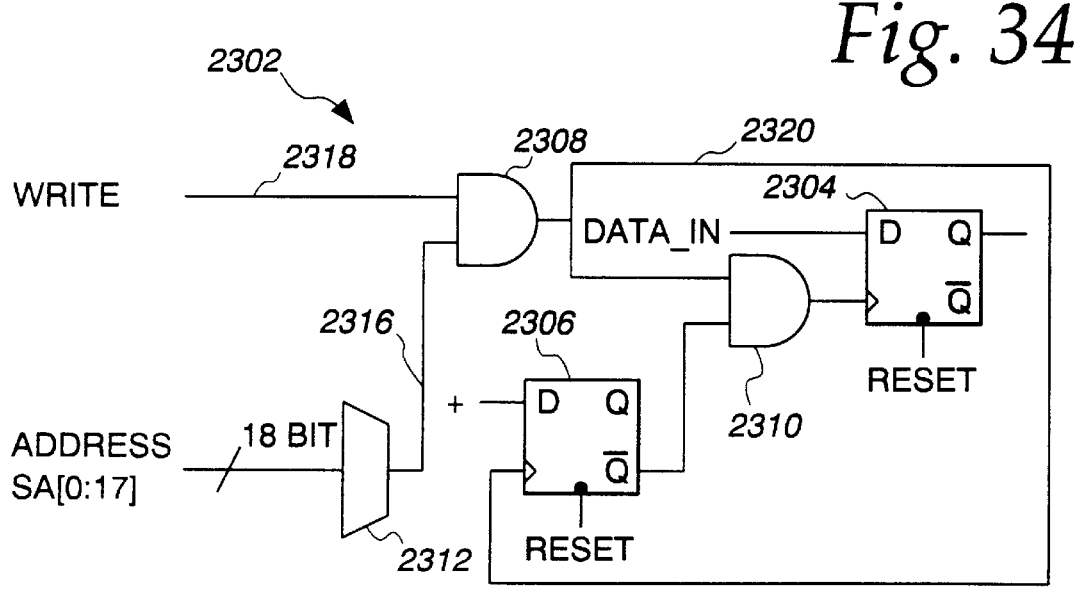
FIG. 34 is a schematic diagram of a write once read only memory in accordance with the present invention.

In the HUI 700, data can be set by firmware which cannot be changed by other applications. This is accomplished with a write-once read-many (WORM) register 2302. When the CPU 702 is reset, it is controlled by its firmware and, thus, other application can gain control of the CPU 702 before the firmware gives it control. The circuit shown in FIG. 34 is a WORM register that is cleared at system reset. It can be written to only one (1) time after each system reset. Once this WORM register 2302 has been written, it cannot be re-written until the CPU 702 is reset again. A system reset is a hardware state occurring only during system power-on. It should not be confused with a CPU RESET which will occur also at warm boot. Since firmware has control of the system after a reset, the firmware can write to the WORM register before relinquishing control of the system. Once the WORM register has been written to by the firmware, it can not be altered by any other program.

The WORM register 2302 includes two D-type flip-flops 2304 and 2306. Both flip-flops are set to a logical 0 at system reset. It is understood that there are many structures equivalent to a D-type flip-flop, including DRAM, which could replace the D-type flip-flop in this embodiment. The WORM register 2302 also includes two AND gates 2308 and 2310. When the decoder 2312 decodes the address of the WORM register 2302 on address lines SA[0:17], it sends a decode signal 2316 to AND gate 2308. If the WORM register is being addressed for a write, write signal 2318 is also active. When the AND gate 2308 receives a write signal 2318 and decode signal 2316, it provides a write signal 2320 to AND gate 2310 and flip-flop 2306. On the next clock, the write signal 2320 will set flip-flop 2306 to a logical 1. However in the current clock, flip-flop 2306 is a logical 0, hence its not Q output is a logical 1. When the AND gate 2310 receives the inverted output of flip-flop 2306 (a logical 1 ) and the write signal 2320, is sent to flip-flop 2304. The flip-flop 2304 locks the then current data. Any attempt to write on a subsequent cycle will result in a logical 0 being sent to flip-flop 2304 from AND gate 2310. The AND gate 2310 will block any further write signal to flip-flop 2304.

The WORM register 2302 is useful for storing configuration information that should not be altered by user applications. Examples include EISA identification numbers, board revision numbers, or firmware revision numbers. The information can only be changed by a change to the firmware. Thereafter, the firmware loads the data into the WORM register after each power-on. While only the firmware can set the WORM register in the preferred embodiment, there are many other uses for a WORM register such as a flag to indicate that a system has been tampered with.

HUI IMPLEMENTATION

The HUI 700 may be implemented as a 100 pin integrated circuit and, more specifically a Toshiba Model TC160G Application Specific Integrated Circuit (ASIC) which utilizes 0.8 micron gate array technology. A pin diagram is illustrated in FIG. 35. The Verilog hardware description logic which describes the hardware within the ASIC is attached as Appendix A.

The descriptions for the HUI 700 are sorted by category and are provided in Table LXXI.

TABLE LXXI

The following represents a pin reference of the HUI 700 sorted by category:

| Symbol | Type | Name and Function |
|---|---|---|
| FLASH I/F | | |
| FA [17:0] | O | FLASH address. Address bus connected to FLASH memory device. |
| FD [7:0] | I/O | FLASH Data Bus. Used to read SCP code via SCP, or to read/write CPU code (and write SCP code) via CPU. |
| N_FRD | O | FLASH Read. _MEMR qualified by internal register signal, normally connected to FLASH 'Output Enable) (OE). |
| N_FWR | O | FLASH Write. _MEMW qualified by internal register signal, normally connected to FLASH |

TABLE LXXI-continued

The following represents a pin reference of the HUI 700 sorted by category:

| Symbol | Type | Name and Function |
| --- | --- | --- |
| | | 'Write Enable' (WE). |
| VPPEN | O | FLASH Vpp Enable. Connected to external analog logic which will drive the appropriate programming voltage (usually 12v) to the FLASH device. Controlled by writing to an internal register from the system CPU. |
| SCP I/F | | |
| N_SCPINT | O | SCP Interrupt. Generated whenever keyboard, mouse, or system CPU sends data to SCP. SCP will read internal register to determine source. |
| N_SCPPSE | I | SCP Code fetch. Similar to _SCPRD, but indicates code rather than data fetch. |
| N_SCPRD | I | SCP Read. Memory read strobe from SCP. |
| N_SCPWR | I | SCP Write. Memory write strobe from SCP. |
| SCPA [11:8] | I | SCP Address. System Control Processor high-order address bus. Only bits 8–11 are required, since the maximum allowed address space for the SCP code is 4K bytes. |
| SCPAD [7:0] | I/O | SCP Address/Data. System Control Processor multiplexed address/data bus. |
| SCPALE | I | SCP Address Latch Enable. De-mux signal for SCP A/D bus. |
| SSCPCLK | I | SCP Clock. Maximum frequency 16 MHz (usually 14.31818 MHz). Used to mux flash address/data buses from SCP to CPU at appropriate time. |
| SCPRESET | OD | SCP Reset. Reset signal to the SCP, controlled by writing to an internal register from the system CPU. |
| SCPI | | |
| A20GATE | O | SCP Gate A20. Gate A20 signal from SCP Interface logic. |
| N_FASTRC | O | SCP RC. Reset signal for the system CPU from SCP Interface logic. |
| SERIAL I/F | | |
| IRQKB | OD | Keyboard Interrupt. Activated on receipt of a transmission from the external keyboard. |
| IRQMS | OD | Mouse Interrupt. Activated on receipt of a transmission from the external mouse. |
| KBCLK | I/OD | Keyboard Clock (input). Clock signal from keyboard. |
| KBDATA | I/OD | Keyboard Data (input). Data signal from keyboard. |
| MSCLK | I/OD | Mouse Clock (input). Clock signal from mouse. |
| MSDATA | I/OD | Mouse Data (input). Data signal from mouse. |
| SYSTEM I/F | | |
| AEN | I | Address Enable. Active level indicates DMA cycle in-progress. |
| IOCHRDY | OD | I/O Channel Ready. De-asserted whenever an SCP cycle is in progress and the system attempts to read (or write) the FLASH memory. |
| N_CSFLSH | I | ROM Chip Select. System decode of physical ROM space (top 128/256K of 4G processor address space). |
| N_IORC | I | I/O Read. System I/O read strobe. |
| N_IOWC | I | I/O Write. System I/O write strobe. |
| N_MRDC | I | Memory Read. System memory read strobe. |
| N_MWTC | I | Memory Write. System memory write strobe. |
| N_RESET | I | System Reset. Restores all registers to default values. |
| SA [17:0] | I | System Address. 80x86 main processor address bus. |
| SD [7:0] | I/O | System Data. 80x86 main processor data bus. Used to read/write the internal registers and the external FLASH. |

Pin assignments of the HUI 700 by pin number are identified in Table LXXII.

TABLE LXXII

| Pin No. | Symbol |
| --- | --- |
| 1 | SA0 |
| 2 | SA1 |
| 3 | SA2 |
| 4 | SA3 |
| 5 | SA4 |
| 6 | SA5 |
| 7 | SA6 |
| 8 | SA7 |
| 9 | SA8 |
| 10 | SA9 |
| 11 | SA10 |
| 12 | SA11 |
| 13 | SA12 |
| 14 | SA13 |
| 15 | VSS3_1 |
| 16 | SA14 |
| 17 | SA15 |
| 18 | SA16 |
| 19 | SA17 |
| 20 | VDD3 |
| 21 | AEN |
| 22 | N_RESET |
| 23 | N_CSFLSH |
| 24 | N_MRDC |
| 25 | N_MWTC |
| 26 | N_IORC |
| 27 | N_IOWC |
| 28 | N_SCPRD |
| 29 | N_SCPWR |
| 30 | N_SCPPSE |
| 31 | SCPALE |
| 32 | SCPAD0 |
| 33 | SCPAD1 |
| 34 | SCPAD2 |
| 35 | SCPAD3 |
| 36 | SCPAD4 |
| 37 | SCPAD5 |
| 38 | SCPAD6 |
| 39 | SCPAD7 |
| 40 | VSS3_2 |
| 41 | VDD13 |
| 42 | SCPA8 |
| 43 | SCPA9 |
| 44 | SCPA10 |
| 45 | SCPA11 |
| 46 | N_SCPINT |
| 47 | SCPRESET |
| 48 | SCPCLK |
| 49 | MSDATA |
| 50 | MSCLK |
| 51 | KBDTA |
| 52 | KBCLK |
| 53 | FA0 |
| 54 | FA1 |
| 55 | FA2 |
| 56 | FA3 |
| 57 | FA4 |
| 58 | FA5 |
| 59 | FA6 |
| 60 | FA7 |
| 61 | FA8 |
| 62 | FA9 |
| 63 | FA10 |
| 64 | FA11 |
| 65 | FA12 |
| 66 | VSS1_1 |
| 67 | VDD1 |
| 68 | FA13 |
| 69 | FA14 |
| 70 | FA15 |
| 71 | FA16 |
| 72 | FA17 |
| 73 | FD0 |
| 74 | FD1 |
| 75 | FD2 |
| 76 | FD3 |
| 85 | N_FASTRC |
| 86 | A20GATE |
| 87 | SD0 |
| 88 | SD1 |
| 89 | SD2 |
| 90 | VSS |
| 91 | VDD |
| 92 | SD3 |
| 93 | SD4 |
| 94 | SD5 |
| 95 | VSS1_2 |
| 96 | SD6 |
| 97 | SD7 |
| 98 | IRQMS |
| 99 | IRQKB |
| 100 | IOCHRDY |

TABLE LXXII-continued

| Pin No. | Symbol |
|---|---|
| 77 | FD4 |
| 78 | FD5 |
| 79 | FD6 |
| 80 | FD7 |
| 81 | VSST |
| 82 | VPPEN |
| 83 | N_FWR |
| 84 | N_FRD |

The identifications for the input/output buffers for each pin for the Toshiba ASIC are identified in Table LXXIV. The naming convention for the pad I/O buffer each pin is identified in the column identified as "pad type" in Table LXXIV and identified as follows:

TABLE LXXIV

Pin/Pad Definitions (Sorted by Pin Name) : Pin/Pad Definitions (Sorted by Pin Name)

| Symbol | Category | Pin No. | Active | Pad Type | Type | Cap. Load | Enable |
|---|---|---|---|---|---|---|---|
| A20GATE | SCPI | 86 | HIGH | O | BT4 | 15 | |
| AEN | System I/F | 21 | HIGH | I | TLCHT | — | |
| FA0 | FLASH I/F | 53 | HIGH | O | BT4R | 15 | |
| FA1 | FLASH I/F | 54 | HIGH | O | BT4R | 15 | |
| FA10 | FLASH I/F | 63 | HIGH | O | BT4R | 15 | |
| FA11 | FLASH I/F | 64 | HIGH | O | BT4R | 15 | |
| FA12 | FLASH I/F | 65 | HIGH | O | BT4R | 15 | |
| FA13 | FLASH I/F | 68 | HIGH | O | BT4R | 15 | |
| FA14 | FLASH I/F | 69 | HIGH | O | BT4R | 15 | |
| FA15 | FLASH I/F | 70 | HIGH | O | BT4R | 15 | |
| FA16 | FLASH I/F | 71 | HIGH | O | BT4R | 15 | |
| FA17 | FLASH I/F | 72 | HIGH | O | BT4R | 15 | |
| FA2 | FLASH I/F | 55 | HIGH | O | BT4R | 15 | |
| FA3 | FLASH I/F | 56 | HIGH | O | BT4R | 15 | |
| FA4 | FLASH I/F | 57 | HIGH | O | BT4R | 15 | |
| FA5 | FLASH I/F | 58 | HIGH | O | BT4R | 15 | |
| FA6 | FLASH I/F | 59 | HIGH | O | BT4R | 15 | |
| FA7 | FLASH I/F | 60 | HIGH | O | BT4R | 15 | |
| FA8 | FLASH I/F | 61 | HIGH | O | BT4R | 15 | |
| FA9 | FLASH I/F | 62 | HIGH | O | BT4R | 15 | |
| FD0 | FLASH I/F | 73 | HIGH | I/O | BD4RTU | 15 | FD_OEN |
| FD1 | FLASH I/F | 74 | HIGH | I/O | BD4RTU | 15 | FD_OEN |
| FD2 | FLASH I/F | 75 | HIGH | I/O | BD4RTU | 15 | FD_OEN |
| FD3 | FLASH I/F | 76 | HIGH | I/O | BD4RTU | 15 | FD_OEN |
| FD4 | FLASH I/F | 77 | HIGH | I/O | BD4RTU | 15 | FD_OEN |
| FD5 | FLASH I/F | 78 | HIGH | I/O | BD4RTU | 15 | FD_OEN |
| FD6 | FLASH I/F | 79 | HIGH | I/O | BD4RTU | 15 | FD_OEN |
| FD7 | FLASH I/F | 80 | HIGH | I/O | BD4RTU | 15 | FD_OEN |
| IOCHRDY | System I/F | 100 | HIGH | OD | BT24OD | 85 | |
| IRQKB | Serial I/F | 99 | HIGH | OD | BT4OD | 15 | |
| IRQMS | Serial I/F | 98 | HIGH | OD | BT24OD | 15 | |
| KBCLK | Serial I/F | 52 | HIGH | I/OD | BD16RSTU | 10000 | |
| KBDATA | Serial I/F | 51 | HIGH | I/OD | BD16RSTU | 10000 | |
| MSCLK | Serial I/F | 50 | HIGH | I/OD | BD16RSTU | 10000 | |
| MSDATA | Serial I/F | 49 | HIGH | I/OD | BD16RSTU | 10000 | |
| N_CSFLSH | System I/F | 23 | LOW | I | TLCHN | — | |
| N_FASTRC | SCPI | 85 | LOW | O | BT4 | 15 | |
| N_FRD | FLASH I/F | 84 | LOW | O | BT4 | 15 | |
| N_FWR | FLASH I/F | 83 | LOW | O | BT4 | 15 | |
| N_IORC | System I/F | 26 | LOW | I | TLCHN | — | |
| N_IOWC | System I/F | 27 | LOW | I | TLCHN | — | |
| N_MRDC | System I/F | 24 | LOW | I | TLCHN | — | |
| N_MWTC | System I/F | 25 | LOW | I | TLCHN | — | |
| N_RESET | System I/F | 22 | LOW | I | TLCHN | — | |
| N_SCPINT | SCP I/F | 46 | LOW | O | BT4 | 15 | |
| N_SCPPSE | SCP I/F | 30 | LOW | I | TLCHN | — | |
| N_SCPRD | SCP I/F | 28 | LOW | I | TLCHN | — | |
| N_SCPWR | SCP I/F | 29 | LOW | I | TLCHN | — | |
| SA0 | System I/F | 1 | HIGH | I | TLCHTU | — | |
| SA1 | System I/F | 2 | HIGH | I | TLCHTU | — | |
| SA10 | System I/F | 11 | HIGH | I | TLCHTU | — | |
| SA11 | System I/F | 12 | HIGH | I | TLCHTU | — | |
| SA12 | System I/F | 13 | HIGH | I | TLCHTU | — | |
| SA13 | System I/F | 14 | HIGH | I | TLCHTU | — | |

TABLE LXXIV-continued

Pin/Pad Definitions (Sorted by Pin Name) : Pin/Pad Definitions (Sorted by Pin Name)

| Symbol | Category | Pin No. | Active | Type | Pad Type | Cap. Load | Enable |
|---|---|---|---|---|---|---|---|
| SA14 | System I/F | 16 | HIGH | I | TLCHTU | — | |
| SA15 | System I/F | 17 | HIGH | I | TLCHTU | — | |
| SA16 | System I/F | 18 | HIGH | I | TLCHTU | — | |
| SA17 | System I/F | 19 | HIGH | I | TLCHTU | — | |
| SA2 | System I/F | 3 | HIGH | I | TLCHTU | — | |
| SA3 | System I/F | 4 | HIGH | I | TLCHTU | — | |
| SA4 | System I/F | 5 | HIGH | I | TLCHTU | — | |
| SA5 | System I/F | 6 | HIGH | I | TLCHTU | — | |
| SA6 | System I/F | 7 | HIGH | I | TLCHTU | — | |
| SA7 | System I/F | 8 | HIGH | I | TLCHTU | — | |
| SA8 | System I/F | 9 | HIGH | I | TLCHTU | — | |
| SA9 | System I/F | 10 | HIGH | I | TLCHTU | — | |
| SCPA10 | SCP I/F | 44 | HIGH | I | TLCHT | — | |
| SCPA11 | SCP I/F | 45 | HIGH | I | TLCHT | — | |
| SCPA8 | SCP I/F | 42 | HIGH | I | TLCHT | — | |
| SCPA9 | SCP I/F | 43 | HIGH | I | TLCHT | — | |
| SCPAD0 | SCP I/F | 32 | HIGH | I/O | BD4TU | 50 | |
| SCPAD1 | SCP 1/F | 33 | HIGH | I/O | BD4TU | 50 | SCPAD_OEN |
| SCPAD2 | SCP 1/F | 34 | HIGH | I/O | BD4TU | 50 | SCPAD_OEN |
| SCPAD3 | SCP 1/F | 35 | HIGH | I/O | BD4TU | 50 | SCPAD_OEN |
| SCPAD4 | SCP 1/F | 36 | HIGH | I/O | BD4TU | 50 | SCPAD_OEN |
| SCPAD5 | SCP 1/F | 37 | HIGH | I/O | BD4TU | 50 | SCPAD_OEN |
| SCPAD6 | SCP 1/F | 38 | HIGH | I/O | BD4TU | 50 | SCPAD_OEN |
| SCPAD7 | SCP 1/F | 39 | HIGH | I/O | BD4TU | 50 | SCPAD_OEN |
| SCPALE | SCP 1/F | 31 | HIGH | I | TLCHT | — | SCPAD_OEN |
| SCPCLK | SCP I/F | 48 | HIGH | I | DRVT8 | — | |
| SCPRESET | SCP I/F | 47 | HIGH | O | DBT8OD | 15 | |
| SD0 | System I/F | 87 | HIGH | I/O | BD24RTU | 85 | |
| SD1 | System I/F | 88 | HIGH | I/O | BD24RTU | 85 | SD_OEN |
| SD2 | System I/F | 89 | HIGH | I/O | BD24RTU | 85 | SD_OEN |
| SD3 | System I/F | 92 | HIGH | I/O | BD24RTU | 85 | SD_OEN |
| SD4 | System I/F | 93 | HIGH | I/O | BD24RTU | 85 | SD_OEN |
| SD5 | System I/F | 94 | HIGH | I/O | BD24RTU | 85 | SD_OEN |
| SD6 | System I/F | 96 | HIGH | I/O | BD24RTU | 85 | SD_OEN |
| SD7 | System I/F | 97 | HIGH | I/O | BD24RTU | 85 | SD_OEN |
| VDD | Power | 91 | | | | | SD_OEN |
| VDD1 | Power | 67 | | | | | |
| VDD13 | Power | 41 | | | | | |
| VDD3 | Power | 20 | | | | | |
| VPPEN | FLASH I/F | 82 | HIGH | O | BT8 | 15 | |
| VSS | Power | 90 | | | | | |
| VSS1_1 | Power | 66 | | | | | |
| VSS1_2 | Power | 95 | | | | | |
| VSS3_1 | Power | 15 | | | | | |
| VSS3_2 | Power | 40 | | | | | |
| VSST | Power | 81 | | | | | |

Obviously, many modifications and variations of the present invention are possible in light of the above teachings. Thus, it is to be understood that within the scope of the appended claims, the invention may be practiced otherwise than as specifically designated above.

APPENDIX I

```
wire [7:0] KB_BYTE;
wire [7:0] MS_BYTE;
wire [3:0] KB_COUNT;
wire [3:0] MS_COUNT;
wire [1:0] IRQMS_EN;
wire [1:0] IRQKB_EN;
wire [7:0] IBUF;
wire [7:0] OBUF;
wire [2:0] ISR1;
wire [2:0] IER1;
wire [7:0] SD_O;
wire [5:0] SCP_BASE;
wire [7:0] HWSTRAP_1;
wire [7:0] HWSTRAP_2;
wire [1:0] FLASH_GRAB;

wire [7:0] LSCPA;
wire [7:0] F2SD_O;
wire [7:0] F2SCPD_O;

wire [15:0] CLKCNT_I;
wire [15:0] CLKCNT_O;
wire [7:0] MILLISECS;
wire [2:0] FAST_CTRL;
```

-148-

```
serif SERIF_KB (.RESET(RESET), .CLKIN(KBCLK_I),
.DATAIN(KBDATA_I),
    .RS_MODE(RS_AUTO_SERIAL), .SCPD_MODE(SCPAD_I[0]),
.RS_COMM(RS_KBD_COMM),
    .SCPD_CLK(SCPAD_I[2]), .SCPD_DATA(SCPAD_I[3]),
.RS_DATA(RS_KBD_DATA),
    .RS_XDATA(RS_KBD_XDATA), .RS_CTRL(RS_KBD_CTRL),
.SCPAD_I(SCPAD_I[7:0]),
    .SCPWR(SCPWR),
    .MODEBIT(KB_MODE),
    .COUNTER(KB_COUNT), .LNCTRL(KB_LNCTRL),
.HOLD(KB_HOLD),
    .TRANSMIT(KB_TRANSMIT), .RECEIVE(KB_RECEIVE),
    .DATAREG(KB_BYTE), .PARITY(KB_PARITY),
.STOP(KB_STOP),
    .CLKOUT(KBCLK_O), .DATAOUT(KBDATA_O),
    .RXINT(KB_RXINT));

serif SERIF_MS (.RESET(RESET), .CLKIN(MSCLK_I),
.DATAIN(MSDATA_I),
    .RS_MODE(RS_AUTO_SERIAL), .SCPD_MODE(SCPAD_I[1]),
.RS_COMM(RS_KBD_COMM),
    .SCPD_CLK(SCPAD_I[6]), .SCPD_DATA(SCPAD_I[7]),
.RS_DATA(RS_AUX_DATA),
    .RS_XDATA(RS_AUX_XDATA), .RS_CTRL(RS_AUX_CTRL),
.SCPAD_I(SCPAD_I[7:0]),
    .SCPWR(SCPWR),
    .MODEBIT(MS_MODE),
    .COUNTER(MS_COUNT), .LNCTRL(MS_LNCTRL),
.HOLD(MS_HOLD),
    .TRANSMIT(MS_TRANSMIT), .RECEIVE(MS_RECEIVE),
    .DATAREG(MS_BYTE), .PARITY(MS_PARITY),
.STOP(MS_STOP),
    .CLKOUT(MSCLK_O), .DATAOUT(MSDATA_O),
    .RXINT(MS_RXINT));
```

-149-

```
scpdecod SCPDECOD (.SCPA(SCPA[11:8]),
.LSCPA(LSCPA[7:0]), .RS_SCP_OUT(RS_SCP_OUT),
    .RS_STAT_OUT(RS_STAT_OUT), .RS_IRQKB_EN(RS_IRQKB_EN),
    .RS_LAST_IO(RS_LAST_IO), .RS_STAT_IN(RS_STAT_IN),
.RS_RC_ACT(RS_RC_ACT),
    .RS_RC_INACT(RS_RC_INACT),
.RS_A20_INACT(RS_A20_INACT),
    .RS_A20_ACT(RS_A20_ACT), .RS_FUN_CTRL(RS_FUN_CTRL),
.RS_AUX_OUT(RS_AUX_OUT),
    .RS_IRQMS_EN(RS_IRQMS_EN), .RS_MKI(RS_MKI),
.RS_ISR1(RS_ISR1),
    .RS_IER1(RS_IER1), .RS_AUTO_SERIAL(RS_AUTO_SERIAL),
    .RS_KBD_COMM(RS_KBD_COMM), .RS_KBD_CTRL(RS_KBD_CTRL),
    .RS_KBD_DATA(RS_KBD_DATA),
.RS_KBD_XDATA(RS_KBD_XDATA),
    .RS_AUX_CTRL(RS_AUX_CTRL), .RS_AUX_DATA(RS_AUX_DATA),
    .RS_AUX_XDATA(RS_AUX_XDATA),   .RS_SECURE(RS_SECURE),
    .RS_HUICFG_1(RS_HUICFG_1), .RS_HUICFG_2(RS_HUICFG_2),
    .RS_FLASH_GRAB(RS_FLASH_GRAB));

mki MKI     (.RESET(RESET),
.SCPAD_I(SCPAD_I[7:0]),    .SD_I(SD_I[7:0]),
    .IORD(IORC),   .IOWR(IOWC), .CMD(SA[2]),
.ALT_CMD(ALT_CMD),
    .SCPCS(SCPCS), .ALT_SCPCS(ALT_SCPCS), .SCPRD(SCPRD),
.SCPWR(SCPWR),
    .RS_SCP_OUT(RS_SCP_OUT), .RS_AUX_OUT(RS_AUX_OUT),
    .RS_STAT_OUT(RS_STAT_OUT),
    .RS_A20_ACT(RS_A20_ACT), .RS_A20_INACT(RS_A20_INACT),
    .RS_RC_ACT(RS_RC_ACT), .RS_RC_INACT(RS_RC_INACT),
    .RS_FUN_CTRL(RS_FUN_CTRL),
    .RS_IRQMS_EN(RS_IRQMS_EN), .RS_IRQKB_EN(RS_IRQKB_EN),
    .RS_MKI(RS_MKI),
    .PE(PE), .GTO(GTO), .AOBF_TTO(AOBF_TTO),
.INHIBIT(INHIBIT),
    .CMD_DATA(CMD_DATA),    .SYSFLAG(SYSFLAG), .IBF(IBF),
```

-150-
```
.OBF_MOBF(OBF_MOBF),
   .A20GATE(A20GATE), .FASTRC(FASTRC),
   .FAST_A20_ACT(FAST_A20_ACT),
.FAST_A20_INACT(FAST_A20_INACT),
   .FAST_RC_ACT(FAST_RC_ACT), .SCPCLK(SCPCLK),
   .D1_CMD(D1_CMD), .MOBF(MOBF), .AOBF(AOBF),
.MKI_EN(MKI_EN),
   .A20GATE_EN(A20GATE_EN), .FASTRC_EN(FASTRC_EN),
   .IRQKB_EN(IRQKB_EN[1:0]), .IRQMS_EN(IRQMS_EN[1:0]),
   .IBUF(IBUF[7:0]), .OBUF(OBUF[7:0]),
   .IRQKB(IRQKB), .IRQMS(IRQMS)   );

flashif     FLASHIF     (.RESET(RESET),
.SA(SA[17:0]), .SD_I(SD_I[7:0]),
   .F2SD_O(F2SD_O[7:0]), .F2SD_OEN(F2SD_OEN),
.MEMRD(MRDC), .MEMWR(MWTC),
   .ROMCS(CSFLSH), .IOCHRDY(IOCHRDY),
   .SCPA(SCPA[11:8]), .SCPAD_I(SCPAD_I[7:0]),
.F2SCPD_O(F2SCPD_O[7:0]),
   .SCPALE(SCPALE), .SCPRD(SCPRD), .SCPWR(SCPWR),
   .SCPPSE(SCPPSE), .SCPCLK(SCPCLK), .LSCPA(LSCPA[7:0]),
   .FA(FA[17:0]), .FD_I(FD_I[7:0]), .FD_O(FD_O[7:0]),
   .FD_OEN(FD_OEN), .FRD(FRD), .FWR(FWR),
.INTERCEPT(INTERCEPT),
   .SCP_BASE(SCP_BASE[5:0]), .SECURE(SECURE),
.SCPreset(SCPRESET),
   .CPUexcl(CPUexcl), .VPPEN(VPPEN),
   .HWSTRAP_1(HWSTRAP_1[7:0]),
.HWSTRAP_2(HWSTRAP_2[7:0]));

scprdmux SCPRDMUX (.SCPA(SCPA[11:8]),
.LSCPA(LSCPA[7:0]),
   .SCPRD(SCPRD), .SCPPSE(SCPPSE),
   .SCPAD_O(SCPAD_O[7:0]), .SCPAD_OEN(SCPAD_OEN),
   .IBUF(IBUF),   .OBUF(OBUF),
   .PE(PE), .GTO(GTO), .AOBF_TTO(AOBF_TTO),
```

-151-

```
.INHIBIT(INHIBIT),
    .CMD_DATA(CMD_DATA),    .SYSFLAG(SYSFLAG), .IBF(IBF),
.OBF_MOBF(OBF_MOBF),
    .A20GATE(A20GATE), .FASTRC(N_FASTRC),
    .D1_CMD(D1_CMD), .MOBF(MOBF), .AOBF(AOBF),
.MKI_EN(MKI_EN),
    .A20GATE_EN(A20GATE_EN), .FASTRC_EN(FASTRC_EN),
    .ISR1(ISR1),    .IER1(IER1),
    .IRQKB_EN(IRQKB_EN),    .IRQMS_EN(IRQMS_EN),
    .KB_MODE(KB_MODE), .MS_MODE(MS_MODE),
    .KB_COUNT(KB_COUNT),    .KB_LNCTRL(KB_LNCTRL),
.KB_HOLD(KB_HOLD),
    .KB_TRANSMIT(KB_TRANSMIT), .KB_RECEIVE(KB_RECEIVE),
    .MS_COUNT(MS_COUNT),    .MS_LNCTRL(MS_LNCTRL),
.MS_HOLD(MS_HOLD),
    .MS_TRANSMIT(MS_TRANSMIT), .MS_RECEIVE(MS_RECEIVE),
    .KBCLK_I(KBCLK_I), .KBCLK_O(KBCLK_O),
.KBDATA_I(KBDATA_I), .KBDATA_O(KBDATA_O),
    .MSCLK_I(MSCLK_I), .MSCLK_O(MSCLK_O),
.MSDATA_I(MSDATA_I), .MSDATA_O(MSDATA_O),
    .KB_BYTE(KB_BYTE), .MS_BYTE(MS_BYTE),
    .KB_PARITY(KB_PARITY), .KB_STOP(KB_STOP),
    .MS_PARITY(MS_PARITY), .MS_STOP(MS_STOP),
    .SECURE(SECURE),
    .HUICFG_1(HWSTRAP_1[7:0]),
    .HUICFG_2(HWSTRAP_2[7:0]),
    .FLASH_GRAB({VPPEN, CPUexcl}),
    .F2SCPD_O(F2SCPD_O[7:0]));

security SECURITY (.RESET(RESET), .IOW(IOWC),
.SD_I(SD_I[7:0]),    .SCPWR(SCPWR),
    .SCPAD_I(SCPAD_I[7:0]),
.RS_FLASH_CTRL(RS_FLASH_CTRL),
    .RS_SECURE(RS_SECURE), .RS_FLASH_GRAB(RS_FLASH_GRAB),
    .VPPEN(VPPEN), .CPUexcl(CPUexcl),
.SCPreset(SCPRESET), .SECURE(SECURE));
```

-152-

```
cpureg CPUREG (.SA(SA[17:0]), .SD_I(SD_I[7:0]),
.SD_O(SD_O[7:0]),
    .SD_OEN(SD_OEN), .IOR(IORC),    .IOW(IOWC),
.MEMR(MRDC),
    .AEN(AEN), .RESET(RESET), .PRIVY(PRIVY), .TEST(TEST),
    .INTERCEPT(INTERCEPT), .ROMCS(CSFLSH),
    .CPU_OUT(OBUF[7:0]),
    .CPU_STAT({PE, GTO, AOBF_TTO, INHIBIT, CMD_DATA,
SYSFLAG, IBF, OBF_MOBF}),
    .CLKCNT(CLKCNT_I[15:0]), .CLKCNT_O(CLKCNT_O[15:0]),
    .MILLISECS(MILLISECS[7:0]),
    .HWSTRAP_1(HWSTRAP_1[7:0]),
.HWSTRAP_2(HWSTRAP_2[7:0]),
    .FLASH_CTRL({VPPEN, CPUexcl,    SCPRESET}),
    .SCP_BASE(SCP_BASE[5:0]), .FAST_CTRL(FAST_CTRL[2:0]),
.SECURE(SECURE),
    .F2SD_O(F2SD_O[7:0]), .F2SD_OEN(F2SD_OEN),
    .SCPCS(SCPCS), .ALT_SCPCS(ALT_SCPCS),
.ALT_CMD(ALT_CMD),
    .RS_FLASH_CTRL(RS_FLASH_CTRL),
.RS_CLKCNT_L(RS_CLKCNT_L),
    .RS_CLKCNT_H(RS_CLKCNT_H),
.RS_MILLISECS(RS_MILLISECS),
    .RS_FAST_RC(RS_FAST_RC), .RS_FAST_A20(RS_FAST_A20),
    .FAST_A20_ACT(FAST_A20_ACT),
.FAST_A20_INACT(FAST_A20_INACT),
    .FAST_RC_ACT(FAST_RC_ACT));

millisec MILLISEC (.RESET(RESET), .IOR(IORC),
.IOW(IOWC),
    .SD_I(SD_I[7:0]), .RS_CLKCNT_L(RS_CLKCNT_L),
.RS_CLKCNT_H(RS_CLKCNT_H),
    .RS_MILLISEC(RS_MILLISECS), .SCPCLK(SCPCLK),
    .CLKCNT_I(CLKCNT_I[15:0]), .CLKCNT_O(CLKCNT_O[15:0]),
    .MILLISEC_O(MILLISECS[7:0]));
```

-153-

```
intreg INTREG (.RESET(RESET), .SCPWR(SCPWR),
.SCPRD(SCPRD),
    .SCPAD_I_5(SCPAD_I[5]), .SCPAD_I_4(SCPAD_I[4]),
.SCPAD_I_0(SCPAD_I[0]),
    .IBF(IBF), .KB_RXINT(KB_RXINT), .MS_RXINT(MS_RXINT),
    .RS_ISR1(RS_ISR1), .RS_IER1(RS_IER1),
    .RS_KBD_DATA(RS_KBD_DATA), .RS_AUX_DATA(RS_AUX_DATA),
    .AUTO_SERIAL({MS_MODE, KB_MODE}),
    .ISR1(ISR1[2:0]), .IER1(IER1[2:0]),
.SCPINTR(SCPINT));

`timescale 1ns/1ns

`define     OneK      (1 <<       10)
`define     MemTop128 ((1 << 17) - 1)
`define     MemTop256 ((1 << 18) - 1)
`define     Block32K  ((1 << 15) - 1)
`define     Block28K  (`Block32K - 4*`OneK)
`define     Block24K  (`Block32K - 8*`OneK)
`define     Block20K  (`Block32K - 12*`OneK)
`define     Block16K  ((1 << 14) - 1)
`define     Block14K  (`Block16K - 2*`OneK)
`define     Block12K  (`Block16K - 4*`OneK)
`define     Block10K  (`Block16K - 6*`OneK)
`define     Block8K        ((1 << 13) - 1)
`define     Block7K        (`Block8K - `OneK)
`define     Block6K        (`Block8K - 2*`OneK)
`define     Block5K        (`Block8K - 3*`OneK)
`define     Block4K        ((1 << 12) - 1)
`define     Block3K        (`Block4K - `OneK)
`define     Block2K        ((1 << 11) - 1)

module bootblk(FA, BOOTblkSz, FLASHsize, InBootBlk);

input [17:0] FA;
input [3:0] BOOTblkSz;
```

-154-

```verilog
input FLASHsize;

output    InBootBlk;
reg       InBootBlk;

always @(BOOTblkSz or FLASHsize   or FA) begin
   if (FLASHsize) begin      // 128K byte  flash part
      case (BOOTblkSz)       // synopsys full_case
         4'h0: InBootBlk =
            (FA[16:0] <= `MemTop128) &&        (FA[16:0] >=
(`MemTop128 - `Block2K));
         4'h1: InBootBlk =
            (FA[16:0] <= `MemTop128) &&        (FA[16:0] >=
(`MemTop128 - `Block3K));
         4'h2: InBootBlk =
            (FA[16:0] <= `MemTop128) &&        (FA[16:0] >=
(`MemTop128 - `Block4K));
         4'h3: InBootBlk =
            (FA[16:0] <= `MemTop128) &&        (FA[16:0] >=
(`MemTop128 - `Block5K));
         4'h4: InBootBlk =
            (FA[16:0] <= `MemTop128) &&        (FA[16:0] >=
(`MemTop128 - `Block6K));
         4'h5: InBootBlk =
            (FA[16:0] <= `MemTop128) &&        (FA[16:0] >=
(`MemTop128 - `Block7K));
         4'h6: InBootBlk =
            (FA[16:0] <= `MemTop128) &&        (FA[16:0] >=
(`MemTop128 - `Block8K));
         4'h7: InBootBlk =
            (FA[16:0] <= `MemTop128) &&        (FA[16:0] >=
(`MemTop128 - `Block10K));
         4'h8: InBootBlk =
            (FA[16:0] <= `MemTop128) &&        (FA[16:0] >=
(`MemTop128 - `Block12K));
         4'h9: InBootBlk =
```

-155-

```
            (FA[16:0] <= 'MemTop128) &&        (FA[16:0] >=
('MemTop128 - 'Block14K));
        4'ha: InBootBlk =
            (FA[16:0] <= 'MemTop128) &&        (FA[16:0] >=
('MemTop128 - 'Block16K));
        4'hb: InBootBlk =
            (FA[16:0] <= 'MemTop128) &&        (FA[16:0] >=
('MemTop128 - 'Block20K));
        4'hc: InBootBlk =
            (FA[16:0] <= 'MemTop128) &&        (FA[16:0] >=
('MemTop128 - 'Block24K));
        4'hd: InBootBlk =
            (FA[16:0] <= 'MemTop128) &&        (FA[16:0] >=
('MemTop128 - 'Block28K));
        4'he: InBootBlk =
            (FA[16:0] <= 'MemTop128) &&        (FA[16:0] >=
('MemTop128 - 'Block32K));
        4'hf: InBootBlk =   0;
        endcase
      end
      else    begin           // 256K byte flash part
        case (BOOTblkSz)     // synopsys full_case
        4'h0: InBootBlk =
            (FA[17:0] <= 'MemTop256) &&        (FA[17:0] >=
('MemTop256 - 'Block2K));
        4'h1: InBootBlk =
            (FA[17:0] <= 'MemTop256) &&        (FA[17:0] >=
('MemTop256 - 'Block3K));
        4'h2: InBootBlk =
            (FA[17:0] <= 'MemTop256) &&        (FA[17:0] >=
('MemTop256 - 'Block4K));
        4'h3: InBootBlk =
            (FA[17:0] <= 'MemTop256) &&        (FA[17:0] >=
('MemTop256 - 'Block5K));
        4'h4: InBootBlk =
```

```
                (FA[17:0] <= `MemTop256) &&          (FA[17:0] >=
(`MemTop256 - `Block6K));
        4'h5: InBootBlk =
                (FA[17:0] <= `MemTop256) &&          (FA[17:0] >=
(`MemTop256 - `Block7K));
        4'h6: InBootBlk =
                (FA[17:0] <= `MemTop256) &&          (FA[17:0] >=
(`MemTop256 - `Block8K));
        4'h7: InBootBlk =
                (FA[17:0] <= `MemTop256) &&          (FA[17:0] >=
(`MemTop256 - `Block10K));
        4'h8: InBootBlk =
                (FA[17:0] <= `MemTop256) &&          (FA[17:0] >=
(`MemTop256 - `Block12K));
        4'h9: InBootBlk =
                (FA[17:0] <= `MemTop256) &&          (FA[17:0] >=
(`MemTop256 - `Block14K));
        4'ha: InBootBlk =
                (FA[17:0] <= `MemTop256) &&          (FA[17:0] >=
(`MemTop256 - `Block16K));
        4'hb: InBootBlk =
                (FA[17:0] <= `MemTop256) &&          (FA[17:0] >=
(`MemTop256 - `Block20K));
        4'hc: InBootBlk =
                (FA[17:0] <= `MemTop256) &&          (FA[17:0] >=
(`MemTop256 - `Block24K));
        4'hd: InBootBlk =
                (FA[17:0] <= `MemTop256) &&          (FA[17:0] >=
(`MemTop256 - `Block28K));
        4'he: InBootBlk =
                (FA[17:0] <= `MemTop256) &&          (FA[17:0] >=
(`MemTop256 - `Block32K));
        4'hf: InBootBlk =     0;
        endcase
    end
end
```

-157-

```
endmodule
`timescale 1ns/1ns

`include "defines.h"

/***********************************************************
    Module:     CPUREG
    Design:     HUII
    Engineer:   David      T. DeRoo
    Date    Created:   Friday 18 September 1992

Description:
***********************************************************/ module cpureg(RESET, SA, SD_I, SD_O, SD_OEN, IOR, IOW,
MEMR, AEN, ROMCS,
    PRIVY, TEST,    INTERCEPT,
    CPU_OUT, CPU_STAT,
    .CLKCNT({CLKCNT_H, CLKCNT_L}), CLKCNT_O, MILLISECS,
    HWSTRAP_1, HWSTRAP_2, FLASH_CTRL, SCP_BASE,
FAST_CTRL, SECURE,
    F2SD_O, F2SD_OEN, SCPCS, ALT_SCPCS, ALT_CMD,
RS_FLASH_CTRL,
    RS_CLKCNT_L,    RS_CLKCNT_H, RS_MILLISECS,
RS_FAST_RC, RS_FAST_A20,
    FAST_A20_ACT, FAST_A20_INACT, FAST_RC_ACT);

input       RESET;              // system reset
signal
    input       [17:0]      SA;     // system address
bus
    input       [7:0] SD_I;    // system data bus input
    output      [7:0] SD_O;    // system data bus output
    output      SD_OEN;        // system data bus enables
    input       IOR;           // system I/O read
strobe
```

-158-

```
input          IOW;                 // system I/O write strobe
input          MEMR;                // system memory read strobe
input          AEN;                 // system address enable pin (high = DMA cycle)
input          ROMCS;               // system chip select for flash memory
output         PRIVY;               // PRIVY source for the System
output         TEST;                // test signal (disables all output buffers)
output         INTERCEPT;   // signal to flashifblock to not pull IOCHRDY // register read-back values
input          [7:0] CPU_OUT;       // from MKI block
input          [7:0] CPU_STAT;      // from MKI block
output         [7:0] CLKCNT_H;      // to MILLISEC block
output         [7:0] CLKCNT_L;      // to MILLISEC block
input          [15:0]     CLKCNT_O; // from MILLISEC block (read value of CLKCNT reg)
input          [7:0] MILLISECS;     // from MILLISEC block
input          [7:0] HWSTRAP_1;     // from FLASHIF block
input          [7:0] HWSTRAP_2;     // from FLASHIF block
input          [2:0] FLASH_CTRL;    // from SECURITY block
output         [5:0] SCP_BASE;      // to FLASHIF block
output         [2:0] FAST_CTRL;     // to FASTCTRL block
input          SECURE;              // from SECURITY block
input          [7:0] F2SD_O;        // from FLASHIF block
input          F2SD_OEN;            // from FLASHIF block // register select decodes
output         SCPCS;               // system address decode for MKI regs
```

-159-

```
output      ALT_SCPCS;      // alternate   system
address decode for MKI regs
output      ALT_CMD;        // alternate   command/data
flag for MKI regs
output      RS_FLASH_CTRL;       // system address
decode for    FLASH_CTRL reg
output      RS_CLKCNT_L;         // system address
decode for    CLKCNT_L reg
output      RS_CLKCNT_H;         // system address
decode for    CLKCNT_H reg
output      RS_MILLISECS;        // system address
decode for    MILLISEC reg
output      RS_FAST_RC;     // system address decode
for           FAST_RC    reg
output      RS_FAST_A20;         // system address
decode for    FAST_A20 reg output      FAST_A20_ACT;        //
output      FAST_A20_INACT;      //
output      FAST_RC_ACT;         //

/***********************************************
    Create internal wires.
***********************************************/ reg RS_CPU_INDEX;
reg RS_CLKCNT_L;    wire [7:0]  CLKCNT_L;
reg RS_CLKCNT_H;    wire [7:0]  CLKCNT_H;
reg RS_MILLISECS;
reg RS_FLASH_CTRL;
reg RS_SCP_BASE;    wire [5:0]  SCP_BASE;
reg RS_FAST_CTRL;   wire [2:0]  FAST_CTRL;
reg RS_HUII_STAT;   wire POWERUP;
reg RS_WBOOT_EN;    wire WBOOT_EN;
reg RS_WBOOT_1;           wire [7:0]  WBOOT_1;
reg RS_WBOOT_2;           wire [7:0]  WBOOT_2;
```

-160-

```
reg RS_WBOOT_3;            wire [7:0]  WBOOT_3;
reg RS_WBOOT_4;            wire [7:0]  WBOOT_4;
reg RS_WBOOT_5;            wire [7:0]  WBOOT_5;
reg RS_WBOOT_6;            wire [7:0]  WBOOT_6;
reg RS_WBOOT_7;            wire [7:0]  WBOOT_7;
reg RS_WBOOT_8;            wire [7:0]  WBOOT_8;
reg RS_WBOOT_9;            wire [7:0]  WBOOT_9;
reg RS_WBOOT_10;   wire [7:0]   WBOOT_10;
reg RS_WBOOT_11;   wire [7:0]   WBOOT_11;
reg RS_WBOOT_12;   wire [7:0]   WBOOT_12;
reg RS_WBOOT_13;   wire [7:0]   WBOOT_13;
reg RS_WBOOT_14;   wire [7:0]   WBOOT_14;
reg RS_WBOOT_15;   wire [7:0]   WBOOT_15;
reg RS_WBOOT_16;   wire [7:0]   WBOOT_16;
reg RS_ALT_CPU_OUT;
reg RS_ALT_CPU_STAT;
reg RS_EISA_ID_0;
reg RS_EISA_ID_1;
reg RS_EISA_ID_2;
reg RS_EISA_ID_3;   wire [31:0] EISA_ID;
reg RS_FAST_RC;
reg RS_FAST_A20;
reg RS_PRIV_ACT;
reg RS_PRIV_INACT;

/***********************************************************
   Create the PRIVY register.
***********************************************************/

// MUX next state of PRIVY
reg PRIVY_bit;
always @(RS_PRIV_ACT or    RS_PRIV_INACT or PRIVY)
  casex({RS_PRIV_ACT, RS_PRIV_INACT}) // synopsys full_case parallel_case
      2'b00:   PRIVY_bit = PRIVY;
      2'bx1:   PRIVY_bit = 0;
```

-161-

```verilog
        2'b1x:    PRIVY_bit = 1;
    endcase reg PRIVY_reg;
always @(negedge IOW or    posedge         RESET)
    if (RESET)
        PRIVY_reg    = 1;
    else
        PRIVY_reg    = PRIVY_bit;

// FAST_CTRL[2]    is the enable for PRIVY  protection
wire PRIVY = FAST_CTRL[2]? PRIVY_reg : 1;

/************************************************************
    FORCE is used to economically initialize all
registers to reset conditions.
    It forces the data presented    to the registers to be
all zeros when on.
    It is set to   one at reset and cleared upon seeing
IOW asserted.
    This solves the issue of providing hold time    on
the forced zero data to the registers from the time
reset is deasserted.
************************************************************/ reg FORCE;
always @(posedge IOW or    posedge         RESET) begin
    if (RESET)    FORCE=1;
    else              FORCE=0;
end // QSD_I contains the data to present to the internal
registers.
wire   [7:0] QSD_I = FORCE ? 8'h00 : SD_I;
```

```
/************************************************************
    Create the CPU_INDEX    register.
************************************************************/ wire [7:0] INDEX;
wire ga_INDEX =     RESET |      (RS_CPU_INDEX &  IOW &
~AEN & PRIVY);
latch4 iINDEXh (.Q(INDEX[7:4]),    .D(QSD_I[7:4]),
.G(ga_INDEX));
latch4 iINDEXl (.Q(INDEX[3:0]),    .D(QSD_I[3:0]),
.G(ga_INDEX));

/************************************************************
    Miscellanous wires.
************************************************************/ wire TEST = (IOR & IOW);      // will never occur under
normal operation!
wire SCPCS = (SA == `CPU_DATA || SA == `CPU_CMD) &&
!AEN;

// create alternate path to MKI   status,   input, and
output buffers
wire ALT_SCPCS = (RS_ALT_CPU_OUT || RS_ALT_CPU_STAT);
wire ALT_CMD = INDEX[2];

// create signals to control fast A20 signal
wire FAST_A20_ACT = (RS_FAST_A20 && IOW     && PRIVY &&
FAST_CTRL[0]);
wire FAST_A20_INACT = (RS_FAST_A20 && IOR && PRIVY &&
FAST_CTRL[0]);

// create signals to control fast RC signal
wire FAST_RC_ACT = RS_FAST_RC && IOR &&     PRIVY &&
FAST_CTRL[1];
```

-163-

```
/************************************************************
    Interecpt system memory reads to top    16 bytes of
flash memory and generate signal to tell flashif block
to not pull IOCHRDY.
*************************************************************/ reg [7:0] WBOOT_O;
reg WBOOT_OEN;
wire INTERCEPT = ROMCS && &(SA[17:4]) && WBOOT_EN;
always @(INTERCEPT or MEMR or SA) begin
    WBOOT_O = 8'h00; WBOOT_OEN =    0;
    if (INTERCEPT && MEMR)
       case (SA[3:0])      // synopsys full_case parallel_case
    4'h0: begin WBOOT_O = WBOOT_1;      WBOOT_OEN = 1; end
    4'h1: begin WBOOT_O = WBOOT_2;      WBOOT_OEN = 1; end
    4'h2: begin WBOOT_O = WBOOT_3;      WBOOT_OEN = 1; end
    4'h3: begin WBOOT_O = WBOOT_4;      WBOOT_OEN = 1; end
    4'h4: begin WBOOT_O = WBOOT_5;      WBOOT_OEN = 1; end
    4'h5: begin WBOOT_O = WBOOT_6;      WBOOT_OEN = 1; end
    4'h6: begin WBOOT_O = WBOOT_7;      WBOOT_OEN = 1; end
    4'h7: begin WBOOT_O = WBOOT_8;      WBOOT_OEN = 1; end
    4'h8: begin WBOOT_O = WBOOT_9;      WBOOT_OEN = 1; end
    4'h9: begin WBOOT_O = WBOOT_10; WBOOT_OEN = 1; end
    4'ha: begin WBOOT_O = WBOOT_11; WBOOT_OEN = 1; end
    4'hb: begin WBOOT_O = WBOOT_12; WBOOT_OEN = 1; end
    4'hc: begin WBOOT_O = WBOOT_13; WBOOT_OEN = 1; end
```

-164-

```
    4'hd: begin WBOOT_O = WBOOT_14; WBOOT_OEN = 1;  end
    4'he: begin WBOOT_O = WBOOT_15; WBOOT_OEN = 1;  end
    4'hf: begin WBOOT_O = WBOOT_16; WBOOT_OEN = 1;  end
       endcase
end /**********************************************************
   MUX data to IO_SD_O.  Also, generate register select
address decodes for writing to CPU registers.
**********************************************************/ reg [7:0] IO_SD_O;
reg IO_SD_OEN;
always @(IOR or    PRIVY or AEN or         SA or INDEX
or
    CLKCNT_O or MILLISECS)  begin
    RS_CPU_INDEX   = 0;
    RS_CLKCNT_L = 0;        RS_CLKCNT_H = 0;
RS_MILLISECS = 0;
    RS_FLASH_CTRL = 0;      RS_SCP_BASE = 0;
RS_FAST_CTRL = 0;
    RS_HUII_STAT   = 0;     RS_WBOOT_EN = 0;
    RS_WBOOT_1 =   0;       RS_WBOOT_2 = 0;
RS_WBOOT_3    = 0;
    RS_WBOOT_4 =   0;       RS_WBOOT_5 = 0;
RS_WBOOT_6    = 0;
    RS_WBOOT_7 =   0;       RS_WBOOT_8 = 0;
RS_WBOOT_9    = 0;
    RS_WBOOT_10 = 0;        RS_WBOOT_11 = 0;
RS_WBOOT_12 = 0;
    RS_WBOOT_13 = 0;        RS_WBOOT_14 = 0;
RS_WBOOT_15 = 0;
    RS_WBOOT_16 = 0;
    RS_ALT_CPU_OUT = 0;     RS_ALT_CPU_STAT = 0;
    RS_EISA_ID_0   = 0;     RS_EISA_ID_1 = 0;
    RS_EISA_ID_2   = 0;     RS_EISA_ID_3 = 0;
```

-165-

```
   RS_FAST_RC =    0;     RS_FAST_A20 = 0;
   RS_PRIV_ACT = 0;       RS_PRIV_INACT =  0;

IO_SD_O = 8'b0;    IO_SD_OEN = 0;

case     (SA[15:0])   //     synopsys full_case parallel_case
   `CPU_OUT:  if (IOR && !AEN)    begin IO_SD_O = CPU_OUT; IO_SD_OEN = 1;   end
   `CPU_STAT: if (IOR && !AEN)    begin IO_SD_O = CPU_STAT; IO_SD_OEN = 1; end
   `CPU_INDEX: if (!AEN) begin
              RS_CPU_INDEX = 1;
              if (IOR && PRIVY) begin IO_SD_O = INDEX; IO_SD_OEN = 1; end
         end
   `CPU_VALUE: case (INDEX)   // synopsys full_case parallel_case
         `VER_REG:   if (IOR && !AEN && PRIVY) begin
                     IO_SD_O =           `VERSION;
                     IO_SD_OEN = 1;
                  end
         `CLKCNT_L: if (!AEN) begin
                     RS_CLKCNT_L = 1;
                     if (IOR && PRIVY) begin
                        IO_SD_O = CLKCNT_O[7:0];
                        IO_SD_OEN = 1;
                     end
                  end
         `CLKCNT_H: if (!AEN) begin
                     RS_CLKCNT_H = 1;
                     if (IOR && PRIVY) begin
                        IO_SD_O = CLKCNT_O[15:8];
                        IO_SD_OEN = 1;
                     end
                  end
```

-166-
```
        `MILLISECS: if (!AEN) begin
                        RS_MILLISECS = 1;
                        if (IOR && PRIVY)  begin
                           IO_SD_O = MILLISECS[7:0];
IO_SD_OEN = 1;
                        end
                   end
        `HWSTRAP_1: if (IOR && !AEN && PRIVY) begin
                        IO_SD_O =          HWSTRAP_1;
IO_SD_OEN = 1;
                   end
        `HWSTRAP_2: if (IOR && !AEN && PRIVY) begin
                        IO_SD_O =          HWSTRAP_2;
IO_SD_OEN = 1;
                   end
        `FLASH_CTRL:if (!AEN) begin
                        RS_FLASH_CTRL = 1;
                        if (IOR && PRIVY)  begin
                           IO_SD_O = {5'b0,
FLASH_CTRL}; IO_SD_OEN = 1;
                        end
                   end
        `SCP_BASE:  if (!AEN) begin
                        RS_SCP_BASE = 1;
                        if (IOR && PRIVY)  begin
                           IO_SD_O = {2'b0, SCP_BASE};
IO_SD_OEN = 1;
                        end
                   end
        `FAST_CTRL: if (!AEN) begin
                        RS_FAST_CTRL = 1;
                        if (IOR && PRIVY)  begin
                           IO_SD_O = {5'b0, FAST_CTRL};
IO_SD_OEN     = 1;
                        end
                   end
```

-167-

```
'HUI_STAT:   if (!AEN) begin
                 RS_HUII_STAT = 1;
                 if (IOR && PRIVY) begin
                    IO_SD_O = {6'b0, POWERUP, SECURE};
                    IO_SD_OEN = 1;
                 end
              end
'WBOOT_EN:   if (!AEN) begin
                 RS_WBOOT_EN = 1;
                 if (IOR && PRIVY) begin
                    IO_SD_O = {7'b0, WBOOT_EN}; IO_SD_OEN = 1;
                 end
              end
'WBOOT_1:    if (!AEN) begin
                 RS_WBOOT_1 = 1;
                 if (IOR && PRIVY) begin
                    IO_SD_O = WBOOT_1; IO_SD_OEN = 1;
                 end
              end
'WBOOT_2:    if (!AEN) begin
                 RS_WBOOT_2 = 1;
                 if (IOR && PRIVY) begin
                    IO_SD_O = WBOOT_2; IO_SD_OEN = 1;
                 end
              end
'WBOOT_3:    if (!AEN) begin
                 RS_WBOOT_3 = 1;
                 if (IOR && PRIVY) begin
                    IO_SD_O = WBOOT_3; IO_SD_OEN = 1;
                 end
              end
```

-168-

```
'WBOOT_4:    if (!AEN) begin
                 RS_WBOOT_4 = 1;
                 if (IOR && PRIVY)  begin
                     IO_SD_O = WBOOT_4; IO_SD_OEN = 1;
                 end
             end
'WBOOT_5:    if (!AEN) begin
                 RS_WBOOT_5 = 1;
                 if (IOR && PRIVY)  begin
                     IO_SD_O = WBOOT_5; IO_SD_OEN = 1;
                 end
             end
'WBOOT_6:    if (!AEN) begin
                 RS_WBOOT_6 = 1;
                 if (IOR && PRIVY)  begin
                     IO_SD_O = WBOOT_6; IO_SD_OEN = 1;
                 end
             end
'WBOOT_7:    if (!AEN) begin
                 RS_WBOOT_7 = 1;
                 if (IOR && PRIVY)  begin
                     IO_SD_O = WBOOT_7; IO_SD_OEN = 1;
                 end
             end
'WBOOT_8:    if (!AEN) begin
                 RS_WBOOT_8 = 1;
                 if (IOR && PRIVY)  begin
                     IO_SD_O = WBOOT_8; IO_SD_OEN = 1;
                 end
             end
'WBOOT_9:    if (!AEN) begin
```

-169-
```
                        RS_WBOOT_9 = 1;
                        if (IOR && PRIVY) begin
                           IO_SD_O = WBOOT_9; IO_SD_OEN = 1;
                        end
                     end
         `WBOOT_10: if (!AEN) begin
                        RS_WBOOT_10 = 1;
                        if (IOR && PRIVY) begin
                           IO_SD_O = WBOOT_10; IO_SD_OEN = 1;
                        end
                     end
         `WBOOT_11: if (!AEN) begin
                        RS_WBOOT_11 = 1;
                        if (IOR && PRIVY) begin
                           IO_SD_O = WBOOT_11; IO_SD_OEN = 1;
                        end
                     end
         `WBOOT_12: if (!AEN) begin
                        RS_WBOOT_12 = 1;
                        if (IOR && PRIVY) begin
                           IO_SD_O = WBOOT_12; IO_SD_OEN = 1;
                        end
                     end
         `WBOOT_13: if (!AEN) begin
                        RS_WBOOT_13 = 1;
                        if (IOR && PRIVY) begin
                           IO_SD_O = WBOOT_13; IO_SD_OEN = 1;
                        end
                     end
         `WBOOT_14: if (!AEN) begin
                        RS_WBOOT_14 = 1;
```

-170-

```
                              if (IOR && PRIVY)  begin
                                 IO_SD_O = WBOOT_14;
IO_SD_OEN = 1;
                              end
                           end
          'WBOOT_15:   if (!AEN) begin
                           RS_WBOOT_15 = 1;
                           if (IOR && PRIVY)  begin
                              IO_SD_O = WBOOT_15;
IO_SD_OEN = 1;
                           end
                        end
          'WBOOT_16:   if (!AEN) begin
                           RS_WBOOT_16 = 1;
                           if (IOR && PRIVY)  begin
                              IO_SD_O = WBOOT_16;
IO_SD_OEN = 1;
                           end
                        end
          'ALT_CPU_OUT:   if (!AEN)         begin
                              RS_ALT_CPU_OUT = 1;
                              if (IOR && PRIVY) begin
                                 IO_SD_O = CPU_OUT;
IO_SD_OEN = 1;
                              end
                           end
          'ALT_CPU_STAT: if (!AEN)         begin
                              RS_ALT_CPU_STAT = 1;
                              if (IOR && PRIVY) begin
                                 IO_SD_O = CPU_STAT;
IO_SD_OEN = 1;
                              end
                           end
          'EISA_ID_0: if (!AEN) begin
                         RS_EISA_ID_0 = 1;
                         if(IOR &&           PRIVY) begin
```

-171-
```
                              IO_SD_O = EISA_ID[7:0];
IO_SD_OEN = 1;
                        end
                  end
         `EISA_ID_1: if (!AEN) begin
                        RS_EISA_ID_1 = 1;
                        if(IOR &&          PRIVY) begin
                           IO_SD_O = EISA_ID[15:8];
IO_SD_OEN = 1;
                        end
                  end
         `EISA_ID_2: if (!AEN) begin
                        RS_EISA_ID_2 = 1;
                        if(IOR &&          PRIVY) begin
                           IO_SD_O = EISA_ID[23:16];
IO_SD_OEN = 1;
                        end
                  end
         `EISA_ID_3: if (!AEN) begin
                        RS_EISA_ID_3 = 1;
                        if(IOR &&          PRIVY) begin
                           IO_SD_O = EISA_ID[31:24];
IO_SD_OEN = 1;
                        end
                  end
         endcase
   `FAST_RC:   if (!AEN) RS_FAST_RC = 1;
   `FAST_A20:  if (!AEN) RS_FAST_A20 = 1;
   `PRIV_ACT:  if (!AEN) RS_PRIV_ACT = 1;
   `PRIV_INACT:if (!AEN) RS_PRIV_INACT = 1;
   {4'hC, `EISA_ID_0}:    if (IOR         && !AEN&&
!EISA_ID[7]) begin
                        IO_SD_O = EISA_ID[7:0]; IO_SD_OEN
= 1;
                  end
   {4'hC, `EISA_ID_1}:    if (IOR         && !AEN&&
```

```
                        -172-
!EISA_ID[7]) begin
                    IO_SD_O = EISA_ID[15:8]; IO_SD_OEN
= 1;
              end
  {4'hC, `EISA_ID_2}:   if (IOR      && !AEN&&
!EISA_ID[7]) begin
                    IO_SD_O = EISA_ID[23:16];
IO_SD_OEN = 1;
              end
  {4'hC, `EISA_ID_3}:   if (IOR      && !AEN&&
!EISA_ID[7]) begin
                    IO_SD_O = EISA_ID[31:24];
IO_SD_OEN = 1;
              end
    endcase
end reg [7:0] SD_O;
reg SD_OEN;
always @(WBOOT_O or WBOOT_OEN or IO_SD_O or IO_SD_OEN or
F2SD_O     or F2SD_OEN)
   casex({WBOOT_OEN, IO_SD_OEN,  F2SD_OEN})   //
synopsys full_case parallel_case
     3'b000:  begin SD_O = 8'h00; SD_OEN = 0; end
     3'bxx1:  begin SD_O = F2SD_O; SD_OEN = 1;   end
     3'bx1x:  begin SD_O = IO_SD_O; SD_OEN = 1; end
     3'b1xx:  begin SD_O = WBOOT_O; SD_OEN = 1; end
   endcase /*********************************************************
   Create the CPU index register file.
*********************************************************/ indexreg iINDEXREG (.RESET(RESET), .QSD_I(QSD_I),
.IOW(IOW), .PRIVY(PRIVY),
   .RS_CLKCNT_L(RS_CLKCNT_L),      .CLKCNT_L(CLKCNT_L),
```

-173-

```
    .RS_CLKCNT_H(RS_CLKCNT_H),       .CLKCNT_H(CLKCNT_H),
    .RS_SCP_BASE(RS_SCP_BASE),       .SCP_BASE(SCP_BASE),
    .RS_FAST_CTRL(RS_FAST_CTRL),
.FAST_CTRL(FAST_CTRL),
    .RS_HUII_STAT(RS_HUII_STAT),     .POWERUP(POWERUP),
    .RS_WBOOT_EN(RS_WBOOT_EN),       .WBOOT_EN(WBOOT_EN),
    .RS_WBOOT_1(RS_WBOOT_1),         .WBOOT_1(WBOOT_1),
    .RS_WBOOT_2(RS_WBOOT_2),         .WBOOT_2(WBOOT_2),
    .RS_WBOOT_3(RS_WBOOT_3),         .WBOOT_3(WBOOT_3),
    .RS_WBOOT_4(RS_WBOOT_4),         .WBOOT_4(WBOOT_4),
    .RS_WBOOT_5(RS_WBOOT_5),         .WBOOT_5(WBOOT_5),
    .RS_WBOOT_6(RS_WBOOT_6),         .WBOOT_6(WBOOT_6),
    .RS_WBOOT_7(RS_WBOOT_7),         .WBOOT_7(WBOOT_7),
    .RS_WBOOT_8(RS_WBOOT_8),         .WBOOT_8(WBOOT_8),
    .RS_WBOOT_9(RS_WBOOT_9),         .WBOOT_9(WBOOT_9),
    .RS_WBOOT_10(RS_WBOOT_10),       .WBOOT_10(WBOOT_10),
    .RS_WBOOT_11(RS_WBOOT_11),       .WBOOT_11(WBOOT_11),
    .RS_WBOOT_12(RS_WBOOT_12),       .WBOOT_12(WBOOT_12),
    .RS_WBOOT_13(RS_WBOOT_13),       .WBOOT_13(WBOOT_13),
    .RS_WBOOT_14(RS_WBOOT_14),       .WBOOT_14(WBOOT_14),
    .RS_WBOOT_15(RS_WBOOT_15),       .WBOOT_15(WBOOT_15),
    .RS_WBOOT_16(RS_WBOOT_16),       .WBOOT_16(WBOOT_16),
    .RS_EISA_ID_0(RS_EISA_ID_0),
.RS_EISA_ID_1(RS_EISA_ID_1),
    .RS_EISA_ID_2(RS_EISA_ID_2),
.RS_EISA_ID_3(RS_EISA_ID_3),
    .EISA_ID(EISA_ID));
```

-174-

```
/***********************************************************
    End of module CPUREG.
***********************************************************/ endmodule
`timescale 1ns/1ns

/***********************************************************
    Module:    ERASTRAP
    Design:    HUI
    Engineer:  David     T. DeRoo
    Date    Created:  Monday 28 September 1992

Description:    Traps software chip erase
sequences to flash memory.
        When enabled, this module will track writes to
the flash
        and when  the JEDEC standard erase sequence
arrives,
        the erase command will be replaced with a
harmless
        Read/Reset command.

***********************************************************/ module erastrap(RESET, FA, FD_I, FWR, FLASH_SIZE,
JEDEC_EN, FD_O);

input       RESET;              // system RESET
signal
input       [17:0]    FA;       // flash address bus
input       [7:0] FD_I; // flash data in from flashif
block
input       FWR;                //         flash write
strobe
input       FLASH_SIZE; // flash size selector
```

-175-

```verilog
input      JEDEC_EN;    // enable for JEDEC standard
trap output     [7:0] FD_O;  // flash data bus out to
flash parameter [1:0]
   IDLE     = 2'b00,
   WrCycle1 = 2'b01,
   WrCycle2 = 2'b10;

reg [1:0] current_state;   wire   [1:0] test_cs =
current_state;
reg [1:0] next_state;      wire         [1:0]
test_ns =    next_state;
reg  BlockCmd;

wire decode_5555 = (FA[16:0] ==   17'h5555);
wire decode_2aaa = (FA[16:0] ==   17'h2aaa);

wire addr_5555 = (FLASH_SIZE ==   1)? decode_5555 :
FA[17] == 0 && decode_5555;
wire addr_2aaa = (FLASH_SIZE ==   1)? decode_2aaa :
FA[17] == 0 && decode_2aaa;

always @(FA or FD_I or current_state) begin
   BlockCmd = 0;
   next_state =   IDLE;
   case    (current_state)         // synopsys
full_case parallel_case
      IDLE:   if (addr_5555 &&  (FD_I == 8'haa))
              next_state = WrCycle1;
      WrCycle1:   if (addr_2aaa      && (FD_I ==
8'h55))
              next_state = WrCycle2;
      WrCycle2:   begin
```

```
            next_state = IDLE;
            if (addr_5555    && (FD_I == 8'h10))
                BlockCmd =    1;
        end
    endcase
end always @(negedge FWR or    posedge         RESET)
    if (RESET)
        current_state = IDLE;
    else
        current_state = next_state;

// MUX flash data output:  send    a Read/Reset cmd
wire [7:0] FD_O    = (BlockCmd && JEDEC_EN)? 8'hf0:
FD_I;

/***********************************************************
    End of module ERASTRAP.
***********************************************************/ endmodule
`timescale 1ns/1ns

/***********************************************************
    Module:    FLASHIF
    Design:    HUI
    Engineer:  David    T. DeRoo (originally Richard
Ball)
    Date    Created:  10 July 1992

Description:    Provides interface from main system
CPU and SCP address
                and data busses to a flash memory
device.  MUXes the
                system and SCP busses    to flash
```

-177-

```
busses          using novel time-
                sharing mechanism.  System addresses go
through to flash
                unaltered, but SCP address are
relocatable on     4K page
                boundaries.
***********************************************************/ module flashif(   RESET, SA, SD_I, F2SD_O, F2SD_OEN,
MEMRD, MEMWR, ROMCS,       IOCHRDY,
    SCPA, SCPAD_I, F2SCPD_O, SCPALE, SCPRD, SCPWR,
SCPPSE, SCPCLK,
    LSCPA, FA, FD_I, FD_O, FD_OEN, FRD, FWR, INTERCEPT,
    SCP_BASE, SECURE, SCPreset, CPUexcl,     VPPEN,
HWSTRAP_1, HWSTRAP_2);

input           RESET;              // system reset
input           [17:0]    SA;       // system address
bus
input           [7:0] SD_I;    // system data bus in
output          [7:0] F2SD_O;       // flash data out
to              system data bus
output          F2SD_OEN;      // enable flash data out
to system data bus
input           MEMRD;              // system memory
read
input           MEMWR;              // system memory
write
input           ROMCS;              // system chip
select for flash memory
output          IOCHRDY;       // system AT  bus I/O
channel         ready input           [11:8]    SCPA;     // SCP address
lower           nybble of upper     byte
input           [7:0] SCPAD_I;      // SCP data and
```

-178-

```
lower address byte (MUXed)
output      [7:0] F2SCPD_O;   // flash data out toSCP
data bus
input       SCPALE;           // SCP addressd latch
enable      for SCPAD_I
input       SCPRD;            // SCP data memory
read
input       SCPWR;            // SCP data memory
write
input       SCPPSE;           // SCP code read
input       SCPCLK;           // SCP clock
output      [7:0] LSCPA;      // SCP lower
address     byte (deMUXed)

output      [17:0]    FA;     // flash address
bus
input       [7:0] FD_I;       // flash data bus in
output      [7:0] FD_O;       // flash data bus out
output      FD_OEN;           // flash data bus output
enable
output      FRD;              // flash memory
read
output      FWR;              // flash memory
write
input       INTERCEPT;        // signal from cpureg
block to not pull IOCHRDY
                              // because warm boot vector
intercepted input       [5:0] SCP_BASE;   // HUI register: 4K
page for SCP code
input       SECURE;           // HUI register: HUI
'secure mode' status
input       SCPreset;         // HUI register bit: CPU
holding SCP in reset
input       CPUexcl;          // HUI register bit: SCP
```

-179-

```
excluding CPU from flash
input           VPPEN;              // HUI register
bit:            flash VPP enabled
output          [7:0] HWSTRAP_1;    // HUI register: RESET
state of flash data bus
output          [7:0] HWSTRAP_2;    // HUI register: RESET
state of SCP  data bus /***********************************************************
   Latch flash data bus    and SCP         address/data
bus on system RESET;
   Creation of hardware    strap registers.
***********************************************************/ wire            [7:0] HWSTRAP_1;
wire            [7:0] HWSTRAP_2;

latch4 iHWSTRAP_1l (.Q(HWSTRAP_1[3:0]),
.D(FD_I[3:0]), .G(RESET));
latch4 iHWSTRAP_1h (.Q(HWSTRAP_1[7:4]),
.D(FD_I[7:4]), .G(RESET));
latch4 iHWSTRAP_2l (.Q(HWSTRAP_2[3:0]),
.D(SCPAD_I[3:0]), .G(RESET));
latch4 iHWSTRAP_2h (.Q(HWSTRAP_2[7:4]),
.D(SCPAD_I[7:4]), .G(RESET));

/*
   Signals used    to control configuration of HUIflash
interface.
*/ wire            FLASHsize =    HWSTRAP_1[7];
wire            PASStrap  =    HWSTRAP_1[6];
wire            ERASEtrap =    HWSTRAP_1[4];
wire [3:0]      BOOTblkSz =    HWSTRAP_1[3:0];
```

-180-

```
wire in_pw_area   = (FLASHsize ==        1) ?
SA[16:8]   == 0 :      // 128K flash
                              SA[17:8]  == 0 ;  //
256K flash wire trap_pw_access = (PASStrap   == 0) && in_pw_area;

wire InBootBlk;        //      flag indicating
current       flash address is in boot block /************************************************
   Create latched version of SCP address (i.e.,
de-MUX address from data).
*************************************************/ wire [7:0] LSCPA;
latch4 iLSCPAl (.Q(LSCPA[3:0]),   .D(SCPAD_I[3:0]),
.G(SCPALE));
latch4 iLSCPAh (.Q(LSCPA[7:4]),   .D(SCPAD_I[7:4]),
.G(SCPALE));

//****************************************
// System CPU FLASH read/write signals
//****************************************
wire stopRomRead = trap_pw_access;
wire stopRomWrite = trap_pw_access || InBootBlk    ||
SECURE;

wire ROMRD    = ROMCS      && !INTERCEPT &&
!stopRomRead;
wire ROMRDvalid   = ROMRD       && MEMRD;

wire ROMWRvalid   = ROMCS       && MEMWR && VPPEN &&
!stopRomWrite;

// syncronizer and clear pulse generator for FWR signal
```

```
reg [3:0] ROMWRdelay;

// synchronize ROMWR and generate clear    signal 2-3
SCPCLKs after ROMWR goes active
always @(posedge SCPCLK    or posedge RESET) begin
   if (RESET)
      ROMWRdelay <= 4'b0000;
   else
      ROMWRdelay <= {ROMWRdelay[2:0],ROMWRvalid};
end wire clr_ROMWR = ~ROMWRdelay[3]    & ROMWRdelay[2];

// ROMWR_reg goes active immed.    on a ROMWRvalid, but
goes inactive 2-3 clocks later
reg ROMWR_reg;
always @(posedge ROMWRvalid or posedge RESET or
posedge      clr_ROMWR) begin
   if (RESET)
      ROMWR_reg    = 0;
   else     if (clr_ROMWR)
      ROMWR_reg    = 0;
   else
      ROMWR_reg    = 1;
end // ROMWRpulse signal goes valid    as soon    as write
starts, but goes off at end
//    of 2-3 clocks (via ROMWR_reg) or at the end of the
write,       whichever comes
//    first. This avoids inadvertently      holdingthe
FLASH write    strobe past the
//    end of the cycle.
wire ROMWRpulse    = ROMWRvalid & ROMWR_reg;
```

-182-

```
//***********************************
// SCP write generation
//***********************************
wire HUI_regs  =    ~|SCPA;             // top address bits all zero
wire SCPRDvalid   = (SCPRD & !HUI_regs);
wire SCPWRvalid   = (SCPWR & !HUI_regs) &  VPPEN & !InBootBlk;

// generate delayed read pulse to avoid    switching address simultaneously with F_RD
//    going active - although this should not cause a problem, it seemed to in rev1.
reg [1:0] SCPRDdelay;
always @(posedge SCPCLK   or posedge RESET) begin
    if (RESET)      SCPRDdelay[1:0] = 0;
    else            SCPRDdelay[1:0] = {SCPRDdelay[0], SCPRDvalid};
end wire SCPRDpulse   = (SCPRDdelay[1] & SCPRDdelay[0]) | SCPPSE;

// generate delayed write pulse   to provide address setup time - needed because
//   we must switch the address when the SCPWR arrives      to remap the FLASH password
//              area from 'h100 SCP address down to physical address 0.
// Not necessary from the system side, since the address doesn't switch.
reg [3:0] SCPWRdelay;
always @(posedge SCPCLK    or posedge RESET) begin
    if (RESET)      SCPWRdelay[3:0] = 0;
    else            SCPWRdelay[3:0] = {SCPWRdelay[2:0], SCPWRvalid};
```

-183-
end

```
// generate pulse - delayed 2 clocks (140ns @ 14.318MHz) to provide setup,
//    then turned off 2   clocks later (at end of original 4-clock write pulse).
// NOTE: trailing edge is not created with SCPWR itself because      this would create
//                 a variable-width pulse        (since the leading edge  is synchronized).
wire SCPWRpulse   = SCPWRdelay[1]        & ~SCPWRdelay[3];

//****************************************
// Combined FLASH write    (CPU and SCP)
//****************************************
reg FRD_req;      // flash memory read request
reg FWR_req;      // flash memory write      request
reg FD_OEN_req;      // data output enable  (for writes)

always @(CPUexcl or SCPreset or  ROMRDvalid or SCPRDpulse) begin
   casex({CPUexcl, SCPreset}) // synopsys full_case
      2'b00:  FRD_req = 1'b1;                   // read-only in  shared mode
      2'bx1:  FRD_req = ROMRDvalid;
      2'b1x:  FRD_req = SCPRDpulse;
      // CPUexcl and SCPreset are mutually exclusive, so 2'b11 can never occur
   endcase
end always @(CPUexcl or SCPreset or  ROMWRpulse or SCPWRpulse) begin
   casex({CPUexcl, SCPreset}) // synopsys full_case
      2'b00:  FWR_req = 1'b0;           // no writes in
```

-184-

```
shared mode
    2'bx1:   FWR_req = ROMWRpulse;
    2'b1x:   FWR_req = SCPWRpulse;
    // CPUexcl and SCPreset are mutually exclusive, so
2'b11 can never occur
   endcase
end always @(CPUexcl or SCPreset or   ROMWRvalid or
SCPWRvalid) begin
   casex({CPUexcl, SCPreset}) // synopsys full_case
    2'b00:   FD_OEN_req = 1'b0;    // no   writes in
shared mode
    2'bx1:   FD_OEN_req = ROMWRvalid;
    2'b1x:   FD_OEN_req = SCPWRvalid;
    // CPUexcl and SCPreset are mutually exclusive, so
2'b11 can never occur
   endcase
end wire FRD = FRD_req;
wire FWR = FWR_req;
wire FD_OEN = FD_OEN_req;

/************************************************
   Create flash    sharing      signal to switch
control between the SCP and the CPU.
   This       signal switches      high (indicating an
SCP         access)      asynchronously when
   SCPALE goes from high to low, indicating the    SCP
address is valid.  This
   signal is held high for 2.5 to 3.5 SCPCLK cycles,
after which it is
   cleared and stays low (indicating the flash is
controlled by     the CPU) until
   the next high-to-low   transition of SCPALE.
```

-185-
`*********************************************************/`

```
reg flashSCP;           //      flash sharing signal
wire clr_flashSCP;      //   active-high signal clears
'flashSCP' for CPU access
wire sync_flashSCP;     //   connects stages of a clock
count synchronizer always @(negedge SCPALE    or posedge RESET or posedge
clr_flashSCP) begin
   if (RESET)
      flashSCP <= 0;
   else    if (clr_flashSCP)  // give flash accessto
CPU
      flashSCP <= 0;
   else
      flashSCP <= 1;
end /*
   Join     two double-synchronizers to count 2.5 to
3.5 clocks after 'flashSCP'
   goes      high to    clear it and turn the flash
over to the   CPU.
*/ wire NC1, NC2;    // avoid leaving pins unconnected
(for ExperTest)

sync2 Stage1 (.ASYNC_SIG(flashSCP), .CLK(SCPCLK),
.CLR(RESET),
         .SYNC_SIG(sync_flashSCP), .PULSE(NC1));

sync2 Stage2 (.ASYNC_SIG(sync_flashSCP), .CLK(SCPCLK),
.CLR(RESET),
         .SYNC_SIG(NC2), .PULSE(clr_flashSCP));
```

```
/***********************************************************
    Generation of signals to hold off AT bus access to
    FLASH memory until SCP is done         with it's
own code fetch.
    This is done my holding IOCHRDY low until the data to
be
    place on the AT data bus is valid.  Note that IOCHRDY
is
    only pulled when necessary, i.e., for a BIOS
(ROM/FLASH)
    read in 'shared' mode (SCP not          held in
reset).
***********************************************************/
// declare IOCHRDY for use in SysAccess      definition
reg IOCHRDY;

// generate signal indicating ROM cycle      access is
in-progress
// only     gets set if ROM     cycle is being held
off         by IOCHRDY,
//    cleared asynchronously when cycle     is over.
reg SysAccess_reg;
always @(negedge flashSCP or posedge IOCHRDY or
posedge     RESET) begin
    if (RESET)          SysAccess_reg = 0;
    else     if (IOCHRDY) SysAccess_reg = 0;
    else              SysAccess_reg = ~IOCHRDY;
end
wire SysAccess = SysAccess_reg | SCPreset;

reg release_IOCHRDY;
wire clr_release_IOCHRDY;
wire NC4;
sync2 syncIOCHRDY (.ASYNC_SIG(release_IOCHRDY),
.CLK(SCPCLK), .CLR(RESET),
              .SYNC_SIG(NC4),
```

-187-

```verilog
.PULSE(clr_release_IOCHRDY));

// generate signal indicating ROM cycle   is done-
goes when above signal
//    indicates    ROM cycle access is over, and next
SCP ALE is detected.
always @(negedge SCPALE   or posedge RESET or posedge
clr_release_IOCHRDY) begin
   if (RESET)
      release_IOCHRDY <= 0;
   else      if (clr_release_IOCHRDY)
      release_IOCHRDY <= 0;
   else
      release_IOCHRDY <= SysAccess;
end // generate IOCHRDY to hold off   CPU access until ready
- goes immediately
//    after a valid ROM   read is        detected,
stays         until access is      complete
// NOTE       that IOCHRDY can only go if in shared mode
- if          SCP is in RESET,
//    it doesn't need to go, and if CPU   is excluded,
it            can't go.
always @(posedge MEMRD or posedge release_IOCHRDY or
posedge RESET) begin
   if (RESET)
      IOCHRDY <= 1;
   else      if (release_IOCHRDY)
      IOCHRDY <= 1;
   else
      IOCHRDY <= ~(ROMRD & ~SCPreset & ~CPUexcl);
end /*
   Flash address bus interface.
```

-188-
```
*/

// if doing an SCP data    write or read, must over-ride
SCP_BASE setting and
// re-map SCP address from 256 to 4K to    flash
address 0    to (4K - 256)
wire SCP_DataMem = SCPWR || SCPRD;
wire [5:0] SCP_Page   =    SCP_DataMem? 6'b000000   :
SCP_BASE;
wire [3:0] SCP_Middle =    SCP_DataMem? SCPA - 1'b1 :
SCPA;
wire [17:0] FullSCPA  =    {SCP_Page, SCP_Middle,
LSCPA};

// generate 'shared' address - System or SCP
wire [17:0] FA = SysAccess? SA : FullSCPA;

// tests flash address to see if they are in the
protected boot    block
bootblk       BOOTBLK      (.FA(FA),
.BOOTblkSz(BOOTblkSz), .FLASHsize(FLASHsize),
              .InBootBlk(InBootBlk));

/*
   Flash data bus interface.
*/ wire  [7:0] F2SD_O;        // latch flash data for
system at end of 'SysAccess'
latch4 iLSDl (.Q(F2SD_O[3:0]), .D(FD_I[3:0]),
.G(SysAccess));
latch4 iLSDh (.Q(F2SD_O[7:4]), .D(FD_I[7:4]),
.G(SysAccess));

wire  [7:0] F2SCPD_O;      // latch flash data for SCP
at start of    'SysAccess'
```

-189-

```verilog
latch4 iLSCPDl (.Q(F2SCPD_O[3:0]), .D(FD_I[3:0]),
.G(~SysAccess));
latch4 iLSCPDh (.Q(F2SCPD_O[7:4]), .D(FD_I[7:4]),
.G(~SysAccess));

// MUX flash data out bus - for   writes only, so
shared mode N/A
reg [7:0] FD_UNTRAP_REG;
wire [7:0] FD_UNTRAP = FD_UNTRAP_REG;
always @(SD_I or SCPAD_I or CPUexcl) begin
   if (CPUexcl)
      FD_UNTRAP_REG = SCPAD_I;
   else
      FD_UNTRAP_REG = SD_I;
end // drive FLASH data to System Data Bus only when reading
FLASH
wire F2SD_OEN =    ROMRDvalid;

/*
   Trap      software chip erase sequences from making
it out to the      flash
   memory part on the flash data bus.
*/ wire [7:0] FD_O;    //    MUX flash data out bus
wire JEDEC_EN =    ERASEtrap == 1'b0;
erastrap ERASTRAP (.RESET(RESET), .FA(FA[17:0]),
.FD_I(FD_UNTRAP[7:0]),
   .FWR(FWR_req), .FLASH_SIZE(FLASHsize),
.JEDEC_EN(JEDEC_EN), .FD_O(FD_O[7:0]));

/************************************************
      End of module FLASHIF.
************************************************/
```

-190-

```
endmodule
`timescale 1ns/1ns

`define     OneK       (1 << 10)
`define     MemTop128  ((1 << 17) - 1)
`define     MemTop256  ((1 << 18) - 1)
`define     Block32K   ((1 << 15) - 1)
`define     Block28K   (`Block32K - 4*`OneK)
`define     Block24K   (`Block32K - 8*`OneK)
`define     Block20K   (`Block32K - 12*`OneK)
`define     Block16K   ((1 << 14) - 1)
`define     Block14K   (`Block16K - 2*`OneK)
`define     Block12K   (`Block16K - 4*`OneK)
`define     Block10K   (`Block16K - 6*`OneK)
`define     Block8K           ((1           << 13) - 1)
`define     Block7K    (`Block8K -  `OneK)
`define     Block6K    (`Block8K -  2*`OneK)
`define     Block5K    (`Block8K -  3*`OneK)
`define     Block4K           ((1           << 12) - 1)
`define     Block3K    (`Block4K -  `OneK)
`define     Block2K           ((1           << 11) - 1)

module bootblk(FA, BOOTblkSz, FLASHsize, InBootBlk);

input [17:0] FA;
input [3:0] BOOTblkSz;
input FLASHsize;

output      InBootBlk;
reg         InBootBlk;

always @(BOOTblkSz or FLASHsize   or FA) begin
   if (FLASHsize) begin       // 128K byte  flash part
      case (BOOTblkSz)        // synopsys full_case
      4'h0: InBootBlk =
      (FA[16:0] <= `MemTop128) && (FA[16:0] >= (`MemTop128
```

-191-

```
-         'Block2K));
             4'h1: InBootBlk =
          (FA[16:0] <= 'MemTop128) && (FA[16:0] >= ('MemTop128
-         'Block3K));
             4'h2: InBootBlk =
          (FA[16:0] <= 'MemTop128) && (FA[16:0] >= ('MemTop128
-         'Block4K));
             4'h3: InBootBlk =
          (FA[16:0] <= 'MemTop128) && (FA[16:0] >= ('MemTop128
-         'Block5K));
             4'h4: InBootBlk =
          (FA[16:0] <= 'MemTop128) && (FA[16:0] >= ('MemTop128
-         'Block6K));
             4'h5: InBootBlk =
          (FA[16:0] <= 'MemTop128) && (FA[16:0] >= ('MemTop128
-         'Block7K));
             4'h6: InBootBlk =
          (FA[16:0] <= 'MemTop128) && (FA[16:0] >= ('MemTop128
-         'Block8K));
             4'h7: InBootBlk =
          (FA[16:0] <= 'MemTop128) && (FA[16:0] >= ('MemTop128
-         'Block10K));
             4'h8: InBootBlk =
          (FA[16:0] <= 'MemTop128) && (FA[16:0] >= ('MemTop128
-         'Block12K));
             4'h9: InBootBlk =
          (FA[16:0] <= 'MemTop128) && (FA[16:0] >= ('MemTop128
-         'Block14K));
             4'ha: InBootBlk =
          (FA[16:0] <= 'MemTop128) && (FA[16:0] >= ('MemTop128
-         'Block16K));
             4'hb: InBootBlk =
          (FA[16:0] <= 'MemTop128) && (FA[16:0] >= ('MemTop128
-         'Block20K));
             4'hc: InBootBlk =
          (FA[16:0] <= 'MemTop128) && (FA[16:0] >= ('MemTop128
```

-192-

```
- 'Block24K));
    4'hd: InBootBlk =
   (FA[16:0] <= 'MemTop128) && (FA[16:0] >= ('MemTop128
- 'Block28K));
    4'he: InBootBlk =
   (FA[16:0] <= 'MemTop128) && (FA[16:0] >= ('MemTop128
- 'Block32K));
    4'hf: InBootBlk = 0;
   endcase
  end
  else     begin              // 256K   byte flash part
    case (BOOTblkSz)       // synopsys full_case
    4'h0: InBootBlk =
   (FA[17:0] <= 'MemTop256) && (FA[17:0] >= ('MemTop256
- 'Block2K));
    4'h1: InBootBlk =
   (FA[17:0] <= 'MemTop256) && (FA[17:0] >= ('MemTop256
- 'Block3K));
    4'h2: InBootBlk =
   (FA[17:0] <= 'MemTop256) && (FA[17:0] >= ('MemTop256
- 'Block4K));
    4'h3: InBootBlk =
   (FA[17:0] <= 'MemTop256) && (FA[17:0] >= ('MemTop256
- 'Block5K));
    4'h4: InBootBlk =
   (FA[17:0] <= 'MemTop256) && (FA[17:0] >= ('MemTop256
- 'Block6K));
    4'h5: InBootBlk =
   (FA[17:0] <= 'MemTop256) && (FA[17:0] >= ('MemTop256
- 'Block7K));
    4'h6: InBootBlk =
   (FA[17:0] <= 'MemTop256) && (FA[17:0] >= ('MemTop256
- 'Block8K));
    4'h7: InBootBlk =
   (FA[17:0] <= 'MemTop256) && (FA[17:0] >= ('MemTop256
```

-193-

```
- `Block10K));
    4'h8: InBootBlk =
    (FA[17:0] <= `MemTop256) && (FA[17:0] >= (`MemTop256
- `Block12K));
    4'h9: InBootBlk =
    (FA[17:0] <= `MemTop256) && (FA[17:0] >= (`MemTop256
- `Block14K));
    4'ha: InBootBlk =
    (FA[17:0] <= `MemTop256) && (FA[17:0] >= (`MemTop256
- `Block16K));
    4'hb: InBootBlk =
    (FA[17:0] <= `MemTop256) && (FA[17:0] >= (`MemTop256
- `Block20K));
    4'hc: InBootBlk =
    (FA[17:0] <= `MemTop256) && (FA[17:0] >= (`MemTop256
- `Block24K));
    4'hd: InBootBlk =
    (FA[17:0] <= `MemTop256) && (FA[17:0] >= (`MemTop256
- `Block28K));
    4'he: InBootBlk =
    (FA[17:0] <= `MemTop256) && (FA[17:0] >= (`MemTop256
- `Block32K));
    4'hf: InBootBlk = 0;
    endcase
  end
end endmodule
`timescale 1ns/1ns /*********************************************************
   Module:    INDEXREG
   Design:    HUII
   Engineer:  David    T. DeRoo
   Date      created:  Sunday 6 September 1992
```

-194-

Description:    Creates a register file for the CPU
index registers.
*******************************************************/ module indexreg(RESET, QSD_I, IOW, PRIVY,
    RS_CLKCNT_L,    CLKCNT_L,
    RS_CLKCNT_H,    CLKCNT_H,
    RS_SCP_BASE,    .SCP_BASE({SCP_BASE_H,
SCP_BASE_L}),
    RS_FAST_CTRL,   FAST_CTRL,
    RS_HUII_STAT,   POWERUP,
    RS_WBOOT_EN,    WBOOT_EN,
    RS_WBOOT_1,     WBOOT_1,
    RS_WBOOT_2,     WBOOT_2,
    RS_WBOOT_3,     WBOOT_3,
    RS_WBOOT_4,     WBOOT_4,
    RS_WBOOT_5,     WBOOT_5,
    RS_WBOOT_6,     WBOOT_6,
    RS_WBOOT_7,     WBOOT_7,
    RS_WBOOT_8,     WBOOT_8,
    RS_WBOOT_9,     WBOOT_9,
    RS_WBOOT_10,    WBOOT_10,
    RS_WBOOT_11,    WBOOT_11,
    RS_WBOOT_12,    WBOOT_12,
    RS_WBOOT_13,    WBOOT_13,
    RS_WBOOT_14,    WBOOT_14,
    RS_WBOOT_15,    WBOOT_15,
    RS_WBOOT_16,    WBOOT_16,
    RS_EISA_ID_0,
    RS_EISA_ID_1,
    RS_EISA_ID_2,
    RS_EISA_ID_3,
    .EISA_ID({EISA_ID_3,    EISA_ID_2, EISA_ID_1,
EISA_ID_0H, EISA_ID_0L}));

input           RESET;              // system reset signal

-195-

```
input       [7:0] QSD_I;         // system data bus
input       IOW;                 // system I/O write strobe
input       PRIVY;               // Privy mode input       RS_CLKCNT_L;         output [7:0] CLKCNT_L;
input       RS_CLKCNT_H;         output [7:0] CLKCNT_H;
input       RS_SCP_BASE;         output [3:0] SCP_BASE_L;   output [1:0] SCP_BASE_H;
input       RS_FAST_CTRL;        output [2:0] FAST_CTRL;
input       RS_HUII_STAT;        output POWERUP;
input       RS_WBOOT_EN;         output WBOOT_EN;
input       RS_WBOOT_1;  output [7:0] WBOOT_1;
input       RS_WBOOT_2;  output [7:0] WBOOT_2;
input       RS_WBOOT_3;  output [7:0] WBOOT_3;
input       RS_WBOOT_4;  output [7:0] WBOOT_4;
input       RS_WBOOT_5;  output [7:0] WBOOT_5;
input       RS_WBOOT_6;  output [7:0] WBOOT_6;
input       RS_WBOOT_7;  output [7:0] WBOOT_7;
input       RS_WBOOT_8;  output [7:0] WBOOT_8;
input       RS_WBOOT_9;  output [7:0] WBOOT_9;
input       RS_WBOOT_10;         output [7:0] WBOOT_10;
input       RS_WBOOT_11;         output [7:0] WBOOT_11;
input       RS_WBOOT_12;         output [7:0] WBOOT_12;
input       RS_WBOOT_13;         output [7:0] WBOOT_13;
input       RS_WBOOT_14;         output [7:0] WBOOT_14;
input       RS_WBOOT_15;         output [7:0] WBOOT_15;
input       RS_WBOOT_16;         output [7:0] WBOOT_16;
input       RS_EISA_ID_0;
input       RS_EISA_ID_1;
input       RS_EISA_ID_2;
input       RS_EISA_ID_3;
output      [3:0]        EISA_ID_0L;
output      [3:0]        EISA_ID_0H;
output      [7:0]        EISA_ID_1;
```

-196-

```
output      [7:0]      EISA_ID_2;
output      [7:0]      EISA_ID_3;

/**********************************************************
   Create locks    for WORMed registers.
**********************************************************/ wire wr_clkcnt_h = (RS_CLKCNT_H   & IOW &   PRIVY);
reg lock_clkcnt;    // controls    WORMing   of SCP clock
count registers
always @(negedge wr_clkcnt_h or   posedge   RESET) begin
   if (RESET)  lock_clkcnt = 0;
   else            lock_clkcnt = 1;
end wire wr_wboot_cnt = (RS_WBOOT_EN & IOW & PRIVY);
reg lock_wboot;         //         controls WORMing of
warm reboot    vector registers
always @(negedge wr_wboot_cnt or posedge RESET)    begin
   if (RESET)  lock_wboot = 0;
   else            lock_wboot = 1;
end wire wr_eisa_id_3 = (RS_EISA_ID_3 & IOW    & PRIVY);
reg lock_eisaID;    // controls    WORMing   of EISAID
registers
always @(negedge wr_eisa_id_3 or posedge RESET)    begin
   if (RESET)  lock_eisaID = 0;
   else           lock_eisaID = 1;
end /**********************************************************
   Generate latch enable signals.
**********************************************************/ wire ga_clkcnt_l =   RESET | (RS_CLKCNT_L    & IOW &
```

-197-

```
                                PRIVY & !lock_clkcnt);
wire ga_clkcnt_h =    RESET | (RS_CLKCNT_H    & IOW &
PRIVY & !lock_clkcnt);
wire ga_scp_base =    RESET | (RS_SCP_BASE    & IOW &
PRIVY);
wire ga_fast_ctrl =   RESET | (RS_FAST_CTRL   & IOW &
PRIVY);
wire ga_huii_stat =   RESET | (RS_HUII_STAT   & IOW &
PRIVY);
wire ga_wboot_en =    RESET | (RS_WBOOT_EN    & IOW &
PRIVY & !lock_wboot);
wire ga_wboot_1   =     RESET | (RS_WBOOT_1    & IOW &
PRIVY & !lock_wboot);
wire ga_wboot_2   =     RESET | (RS_WBOOT_2    & IOW &
PRIVY & !lock_wboot);
wire ga_wboot_3   =     RESET | (RS_WBOOT_3    & IOW &
PRIVY & !lock_wboot);
wire ga_wboot_4   =     RESET | (RS_WBOOT_4    & IOW &
PRIVY & !lock_wboot);
wire ga_wboot_5   =     RESET | (RS_WBOOT_5    & IOW &
PRIVY & !lock_wboot);
wire ga_wboot_6   =     RESET | (RS_WBOOT_6    & IOW &
PRIVY & !lock_wboot);
wire ga_wboot_7   =     RESET | (RS_WBOOT_7    & IOW &
PRIVY & !lock_wboot);
wire ga_wboot_8   =     RESET | (RS_WBOOT_8    & IOW &
PRIVY & !lock_wboot);
wire ga_wboot_9   =     RESET | (RS_WBOOT_9    & IOW &
PRIVY & !lock_wboot);
wire ga_wboot_10 =    RESET | (RS_WBOOT_10   & IOW &
PRIVY & !lock_wboot);
wire ga_wboot_11 =    RESET | (RS_WBOOT_11   & IOW &
PRIVY & !lock_wboot);
wire ga_wboot_12 =    RESET | (RS_WBOOT_12   & IOW &
PRIVY & !lock_wboot);
wire ga_wboot_13 =    RESET·| (RS_WBOOT_13   & IOW &
```

```
                                PRIVY & !lock_wboot);
wire ga_wboot_14 =   RESET | (RS_WBOOT_14    & IOW &
PRIVY & !lock_wboot);
wire ga_wboot_15 =   RESET | (RS_WBOOT_15    & IOW &
PRIVY & !lock_wboot);
wire ga_wboot_16 =   RESET | (RS_WBOOT_16    & IOW &
PRIVY & !lock_wboot);
wire ga_eisa_id_0 =  RESET | (RS_EISA_ID_0   & IOW &
PRIVY & !lock_eisaID);
wire wr_eisa_id_0 =          (RS_EISA_ID_0   & IOW &
PRIVY & !lock_eisaID);
wire ga_eisa_id_1 =  RESET | (RS_EISA_ID_1   & IOW &
PRIVY & !lock_eisaID);
wire ga_eisa_id_2 =  RESET | (RS_EISA_ID_2   & IOW &
PRIVY & !lock_eisaID);
wire ga_eisa_id_3 =  RESET | (RS_EISA_ID_3   & IOW &
PRIVY & !lock_eisaID);

/***********************************************************
   Create index    register latches.
***********************************************************/

// indices 20H and 21H:    CLKCNT_L and CLKCNT_H
wire [7:0] CLKCNT_L, CLKCNT_H;
latch4 l_clk_cnt_ll (.Q(CLKCNT_L[3:0]),
.D(QSD_I[3:0]),    .G(ga_clkcnt_l));
latch4 l_clk_cnt_lh (.Q(CLKCNT_L[7:4]),
.D(QSD_I[7:4]),    .G(ga_clkcnt_l));
latch4 l_clk_cnt_hl (.Q(CLKCNT_H[3:0]),
.D(QSD_I[3:0]),    .G(ga_clkcnt_h));
latch4 l_clk_cnt_hh (.Q(CLKCNT_H[7:4]),
.D(QSD_I[7:4]),    .G(ga_clkcnt_h));

// index 26H:  SCP_BASE
wire [3:0] SCP_BASE_L;
reg  [1:0] SCP_BASE_H;
```

```
-199-
latch4 l_scp_basel  (.Q(SCP_BASE_L[3:0]),
.D(QSD_I[3:0]), .G(ga_scp_base));
always @(ga_scp_base or    QSD_I)
   if (ga_scp_base) begin
       SCP_BASE_H[0] = QSD_I[4];
       SCP_BASE_H[1] = QSD_I[5];
   end // index 27H:  FAST_CTRL
reg [2:0] FAST_CTRL;
always @(ga_fast_ctrl or QSD_I)
   if (ga_fast_ctrl) begin
       FAST_CTRL[0] = QSD_I[0];
       FAST_CTRL[1] = QSD_I[1];
       FAST_CTRL[2] = QSD_I[2];
   end // index 28H:  HUII_STAT
reg POWERUP;
always @(ga_huii_stat or QSD_I)
   if (ga_huii_stat)
       POWERUP =    QSD_I[1];

// index 2FH:  WBOOT_EN
reg WBOOT_EN;
always @(ga_wboot_en or    QSD_I)
   if (ga_wboot_en)
       WBOOT_EN = QSD_I[0];

// indices 30H thru 3FH:  WBOOT_1 thru WBOOT_16
registers
wire [7:0] WBOOT_1, WBOOT_2, WBOOT_3, WBOOT_4, WBOOT_5,
WBOOT_6, WBOOT_7,
   WBOOT_8, WBOOT_9, WBOOT_10, WBOOT_11, WBOOT_12,
WBOOT_13, WBOOT_14,
   WBOOT_15, WBOOT_16;
```

-200-

```
latch4 l_wboot1l (.Q(WBOOT_1[3:0]), .D(QSD_I[3:0]),
.G(ga_wboot_1));
latch4 l_wboot1h (.Q(WBOOT_1[7:4]), .D(QSD_I[7:4]),
.G(ga_wboot_1));
latch4 l_wboot2l (.Q(WBOOT_2[3:0]), .D(QSD_I[3:0]),
.G(ga_wboot_2));
latch4 l_wboot2h (.Q(WBOOT_2[7:4]), .D(QSD_I[7:4]),
.G(ga_wboot_2));
latch4 l_wboot3l (.Q(WBOOT_3[3:0]), .D(QSD_I[3:0]),
.G(ga_wboot_3));
latch4 l_wboot3h (.Q(WBOOT_3[7:4]), .D(QSD_I[7:4]),
.G(ga_wboot_3));
latch4 l_wboot4l (.Q(WBOOT_4[3:0]), .D(QSD_I[3:0]),
.G(ga_wboot_4));
latch4 l_wboot4h (.Q(WBOOT_4[7:4]), .D(QSD_I[7:4]),
.G(ga_wboot_4));
latch4 l_wboot5l (.Q(WBOOT_5[3:0]), .D(QSD_I[3:0]),
.G(ga_wboot_5));
latch4 l_wboot5h (.Q(WBOOT_5[7:4]), .D(QSD_I[7:4]),
.G(ga_wboot_5));
latch4 l_wboot6l (.Q(WBOOT_6[3:0]), .D(QSD_I[3:0]),
.G(ga_wboot_6));
latch4 l_wboot6h (.Q(WBOOT_6[7:4]), .D(QSD_I[7:4]),
.G(ga_wboot_6));
latch4 l_wboot7l (.Q(WBOOT_7[3:0]), .D(QSD_I[3:0]),
.G(ga_wboot_7));
latch4 l_wboot7h (.Q(WBOOT_7[7:4]), .D(QSD_I[7:4]),
.G(ga_wboot_7));
latch4 l_wboot8l (.Q(WBOOT_8[3:0]), .D(QSD_I[3:0]),
.G(ga_wboot_8));
latch4 l_wboot8h (.Q(WBOOT_8[7:4]), .D(QSD_I[7:4]),
.G(ga_wboot_8));
latch4 l_wboot9l (.Q(WBOOT_9[3:0]), .D(QSD_I[3:0]),
.G(ga_wboot_9));
latch4 l_wboot9h (.Q(WBOOT_9[7:4]), .D(QSD_I[7:4]),
.G(ga_wboot_9));
```

```
latch4 l_wboot10l (.Q(WBOOT_10[3:0]), .D(QSD_I[3:0]),
    .G(ga_wboot_10));
latch4 l_wboot10h (.Q(WBOOT_10[7:4]), .D(QSD_I[7:4]),
    .G(ga_wboot_10));
latch4 l_wboot11l (.Q(WBOOT_11[3:0]), .D(QSD_I[3:0]),
    .G(ga_wboot_11));
latch4 l_wboot11h (.Q(WBOOT_11[7:4]), .D(QSD_I[7:4]),
    .G(ga_wboot_11));
latch4 l_wboot12l (.Q(WBOOT_12[3:0]), .D(QSD_I[3:0]),
    .G(ga_wboot_12));
latch4 l_wboot12h (.Q(WBOOT_12[7:4]), .D(QSD_I[7:4]),
    .G(ga_wboot_12));
latch4 l_wboot13l (.Q(WBOOT_13[3:0]), .D(QSD_I[3:0]),
    .G(ga_wboot_13));
latch4 l_wboot13h (.Q(WBOOT_13[7:4]), .D(QSD_I[7:4]),
    .G(ga_wboot_13));
latch4 l_wboot14l (.Q(WBOOT_14[3:0]), .D(QSD_I[3:0]),
    .G(ga_wboot_14));
latch4 l_wboot14h (.Q(WBOOT_14[7:4]), .D(QSD_I[7:4]),
    .G(ga_wboot_14));
latch4 l_wboot15l (.Q(WBOOT_15[3:0]), .D(QSD_I[3:0]),
    .G(ga_wboot_15));
latch4 l_wboot15h (.Q(WBOOT_15[7:4]), .D(QSD_I[7:4]),
    .G(ga_wboot_15));
latch4 l_wboot16l (.Q(WBOOT_16[3:0]), .D(QSD_I[3:0]),
    .G(ga_wboot_16));
latch4 l_wboot16h (.Q(WBOOT_16[7:4]), .D(QSD_I[7:4]),
    .G(ga_wboot_16));

// indices 80H thru 83H:  EISAID_1 thru    EISAID_4
registers
wire [3:0] EISA_ID_0L;
latch4 l_eisaid0l (.Q(EISA_ID_0L[3:0]),
    .D(QSD_I[3:0]),    .G(ga_eisa_id_0));
reg [3:0] l_eisaid0h;    wire [3:0] EISA_ID_0H = l_eisaid0h;
always @(negedge wr_eisa_id_0 or posedge RESET)
```

-202-

```
   if (RESET)
      l_eisaid0h = 4'b1000;
   else
      l_eisaid0h = QSD_I[7:4];

wire [7:0] EISA_ID_1;
latch4 l_eisaid1l (.Q(EISA_ID_1[3:0]), .D(QSD_I[3:0]),
.G(ga_eisa_id_1));
latch4 l_eisaid1h (.Q(EISA_ID_1[7:4]), .D(QSD_I[7:4]),
.G(ga_eisa_id_1));

wire [7:0] EISA_ID_2;
latch4 l_eisaid2l (.Q(EISA_ID_2[3:0]), .D(QSD_I[3:0]),
.G(ga_eisa_id_2));
latch4 l_eisaid2h (.Q(EISA_ID_2[7:4]), .D(QSD_I[7:4]),
.G(ga_eisa_id_2));

wire [7:0] EISA_ID_3;
latch4 l_eisaid3l (.Q(EISA_ID_3[3:0]), .D(QSD_I[3:0]),
.G(ga_eisa_id_3));
latch4 l_eisaid3h (.Q(EISA_ID_3[7:4]), .D(QSD_I[7:4]),
.G(ga_eisa_id_3));

/***********************************************************
   End of module INDEXREG.
***********************************************************/ endmodule
`timescale 1ns/1ns

/*
   Module:          INTREG
   Design:          HUI
   Engineer:        David     T. DeRoo
   Date   Created:  10 August 1992
```

-203-

Description:    Contains SCP interrupt service and enable registers.
         Also controls    MUXing of keyboard, mouse, amd MKI
         interrupts into a single interrupt tothe SCP.
*/

```
module intreg (RESET, SCPWR, SCPRD,
   SCPAD_I_5, SCPAD_I_4, SCPAD_I_0,
   IBF,    KB_RXINT, MS_RXINT,
   RS_ISR1, RS_IER1, RS_KBD_DATA, RS_AUX_DATA,
   AUTO_SERIAL,
   .ISR1({ISR1_5, ISR1_4, ISR1_0}),
   .IER1({IER1_5, IER1_4, IER1_0}),
   SCPINTR);

// module port directions defined below
input       RESET;            // system reset signal
input       SCPWR,    SCPRD;  // SCP mem control signals
input       SCPAD_I_5,        // SCP address/data bus bit 5 in
   SCPAD_I_4,                 // SCP address/data bus bit 4 in
   SCPAD_I_0;                 // SCP address/data bus bit 0 in
input       IBF,
   KB_RXINT,
   MS_RXINT;    // internal interrupts
input       RS_ISR1,
   RS_IER1,
   RS_KBD_DATA,
   RS_AUX_DATA;         // SCP address selects
input       [1:0] AUTO_SERIAL;   // serial
```

-204- device communications enables

```
output      ISR1_5, ISR1_4,
   ISR1_0;         // SCP mem read address 0012h
output      IER1_5, IER1_4,
   IER1_0;         // SCP mem read address 0014h
output      SCPINTR;        // main SCP interrupt // output port registers defined below
reg   ISR1_5, ISR1_4;
reg   IER1_5, IER1_4, IER1_0;

// output port wires defined below
wire  ISR1_0 =     IBF;
wire  SCPINTR =    (ISR1_5 && IER1_5) || (ISR1_4&&
IER1_4) ||
              (ISR1_0 && IER1_0);

// internally used nets    defined        below
wire  wr_ISR1 =       SCPWR && RS_ISR1;
wire  wr_IER1 =       SCPWR && RS_IER1;
wire  rd_KBD_DATA = SCPRD && RS_KBD_DATA;
wire  rd_AUX_DATA = SCPRD && RS_AUX_DATA;
wire  isr1_clr_4 =  AUTO_SERIAL[0]? (rd_KBD_DATA) :
(wr_ISR1 && !SCPAD_I_4);
wire  isr1_clr_5 =  AUTO_SERIAL[1]? (rd_AUX_DATA) :
(wr_ISR1 && !SCPAD_I_5);

// SCP mem write to address 00014h (IER1)
always @(negedge wr_IER1 or posedge RESET) begin
   if (RESET) begin
      IER1_0 = 0;
      IER1_4 = 0;
      IER1_5 = 0;
   end
```

```
        else    begin
            IER1_0 = SCPAD_I_0;
            IER1_4 = SCPAD_I_4;
            IER1_5 = SCPAD_I_5;
        end
end // SCP mem write to address 12H    (ISR1)
always @(posedge KB_RXINT or posedge RESET or posedge
isr1_clr_4) begin
    if (RESET)              ISR1_4 = 0;
    else    if (isr1_clr_4)     ISR1_4 = 0;
    else                    ISR1_4 = 1;
end always @(posedge MS_RXINT or posedge RESET or posedge
isr1_clr_5) begin
    if (RESET)              ISR1_5 = 0;
    else    if (isr1_clr_5)     ISR1_5 = 0;
    else                    ISR1_5 = 1;
end endmodule // intreg
`timescale 1ns/1ns /*
    Module:     johncnt12
    Design:     HUI
    Engineer:   David   T. DeRoo
    Date        Created: 3 August 1992

Description:    A 6-stage Johnson counter to count
12          sequences.
                Decodes output into standard 4-bit
binary and
                generates timing signals on counts 0,1,
```

-206-

```
and 11.
*/ module johncnt12(CLK, CLR, COUNTER, COUNT0, COUNT1,
COUNT11);

// module port directions defined below
input           CLK, CLR;
output          [3:0] COUNTER;
output          COUNT0, COUNT1, COUNT11;

// internal alias for COUNTER port
reg             [3:0] counter_reg;
wire            [3:0] COUNTER = counter_reg;

// internal alias for COUNT timing signal ports
reg             count_0_reg, count_1_reg, count_11_reg;
wire            COUNT0    = count_0_reg;
wire            COUNT1    = count_1_reg;
wire            COUNT11 = count_11_reg;

// internal Johnson counter register and alias
reg             [5:0] johnson_reg;

// this      function generates the next-state logicfor
the         Johnson     counter
function [5:0] next_state;
    input [5:0] cur_state;   // current counter state
    integer index;       // used for looping through
counter bits begin
    for (index =    1; index <= 5; index = index + 1)
       next_state[index]    = cur_state[index - 1];
    next_state[0] = (!cur_state[5] ||
               (cur_state[0]     && !cur_state[4] &&
```

-207-

```verilog
                  !cur_state[3]));
                    // provide self-correction to counter
   end endfunction // create a 6-stage Johnson counter initialized   to generate '11' on encoded output
always @(posedge CLK or    posedge       CLR) begin
   if (CLR) johnson_reg  = 6'b000000;
   else         johnson_reg      = next_state(johnson_reg);
end // decode the outputs of the Johnson counter into binary for the COUNTER reg
// also, decode   the count 0, 1,       and 11 timing signals
always @(johnson_reg) begin
   count_0_reg = 0;
   count_1_reg = 0;
   count_11_reg   = 0;
   casex (johnson_reg) // synopsys full_case
      6'b0xxxx0    : begin
                   counter_reg = 4'hb;
                   count_11_reg = 1;
               end
      6'bxxxx01    : counter_reg =      4'ha;
      6'bxxx01x    : counter_reg =      4'h9;
      6'bxx01xx    : counter_reg =      4'h8;
      6'bx01xxx    : counter_reg =      4'h7;
      6'b01xxxx    : counter_reg =      4'h6;
      6'b1xxxx1    : counter_reg =      4'h5;
      6'bxxxx10    : counter_reg =      4'h4;
      6'bxxx10x    : counter_reg =      4'h3;
```

```
                            -208-
    6'bxx10xx    : counter_reg =          4'h2;
    6'bx10xxx    : begin
                    counter_reg = 4'h1;
                    count_1_reg = 1;
                  end
    6'b10xxxx    : begin
                    counter_reg = 4'h0;
                    count_0_reg = 1;
                  end
    endcase
end endmodule //johncnt12
module latch4 (    Q, D, G);
output [3:0] Q;
input [3:0] D;
input G;

reg [3:0] Q_LATCH;
wire [3:0] Q = Q_LATCH;

always @(D or G)
    if (G)
        Q_LATCH =    D;

endmodule
`timescale 1ns/1ns

/***********************************************
   Module:     MILLISEC
   Design:     HUII
   Engineer:   David    T. DeRoo
   Date      Created:  16 July 1992

Description:     Creates a software-configurable
counter. This
```

-209-

```
                counter can be configured to count
milliseconds by
                loading an appropriate number       in
CLKCNT_L and
                CLKCNT_H that     represents the number
of SCP clocks
                to count for one mS.
***********************************************/ module millisec(RESET, IOR, IOW, SD_I,
    RS_CLKCNT_L,   RS_CLKCNT_H, RS_MILLISEC,
    SCPCLK, CLKCNT_I, CLKCNT_O, MILLISEC_O);

input         RESET;                   // system   reset
signal
    input         IOR;                     // system   I/O
read signal
    input         IOW;                     // system   I/O
write signal
    input         [7:0] SD_I;      // system  data bus in
    input         RS_CLKCNT_L;             // system
address       decode for CLKCNT_L reg
    input         RS_CLKCNT_H;             // system
address       decode for CLKCNT_H reg
    input         RS_MILLISEC;             // system
address       decode for MILLISEC reg
    input         SCPCLK;           // SCP clock
    input         [15:0]    CLKCNT_I;   // CLKCNT_H,
CLKCNT_L reg  values
    output        [15:0]    CLKCNT_O;   // synced value
of CLKCNT_L/H counter regs
    output        [7:0] MILLISEC_O;   // synced    value
of MILLISEC reg /***********************************************
    Douple sync the system I/O read and write strobes w/
```

-210-

SCPCLK to
   generate synced R/W pulses of one-half clock
duration going active
   on the negative edge   of SCPCLK.
*********************************************/

```verilog
wire sync_iord;
sync2 iIOR (.ASYNC_SIG(IOR), .CLK(SCPCLK), .CLR(RESET),
.PULSE(sync_iord));

wire sync_iowr;
sync2 iIOW (.ASYNC_SIG(IOW), .CLK(SCPCLK), .CLR(RESET),
.PULSE(sync_iowr));

wire wr_MILLISEC = sync_iowr & RS_MILLISEC;
wire lck_MILLISEC = sync_iord &  RS_MILLISEC;
wire lck_CLKCNT   = sync_iord & RS_CLKCNT_H;
```

/***********************************************************
   Create the SCP clock   counter.  This counter is
loaded synchronously
   with      the CLKCNT value (CLKCNT_H, CLKCNT_L)
every time that the
   MILLISEC regsiger is   written.  It decrements on
every positive edge
   of SCPCLK until the zero count is reached, at which
time the    CLKCNT
   value is re-loaded and the count starts over
again.
***********************************************************/

```verilog
reg [15:0] SCPCLK_cnt;         // SCP clock counter
reg [15:0] next_clk_cnt;       // next state of SCP clock
counter
wire one_mS = ~|SCPCLK_cnt;    // all clock counter bits
are zero
```

-211-
```
// MUX next state of SCPCLK counter
always @(wr_MILLISEC or   one_mS or SCPCLK_cnt or CLKCNT_I)
   casex({one_mS, wr_MILLISEC})    // synopsys full_case
      2'b00:  next_clk_cnt = SCPCLK_cnt - 1'b1;
      2'bx1:  next_clk_cnt = CLKCNT_I;
      2'b1x:  next_clk_cnt = CLKCNT_I;
   endcase always @(posedge SCPCLK)
   SCPCLK_cnt =   next_clk_cnt;

/*
   Lock     the state of the SCP clock counter at the beginning of the system
   I/O read so that it is not changing states w/ SCPCLK during the read    cycle.
*/
reg [15:0] CLKCNT_O;
always @(posedge lck_CLKCNT) CLKCNT_O =    SCPCLK_cnt;

/************************************************************
   Create the MILLISEC counter.   This counter is loaded       synchronously
   from     the SD bus whenever an I/O write to the MILLISEC register is
   done.  It decrements    when the SCP clock counter reaches the zero
   count, representing one mS.   When this counter reaches the zero
   count, it holds at zero until the next write    to the MILLISEC register.
*************************************************************/ reg [7:0] mS_cnt;            // MILLISEC counter
reg [7:0] next_mS_cnt;         // next state of
```

-212-

```
MILLISEC counter
wire dec_mS = one_mS & |mS_cnt;      // one  mS has passed and not zero count // MUX next state of MILLISEC counter
always @(wr_MILLISEC or    dec_mS or mS_cnt or SD_I)
   casex({dec_mS, wr_MILLISEC})     // synopsys full_case
      2'b00:   next_mS_cnt = mS_cnt;
      2'bx1:   next_mS_cnt = SD_I;
      2'b10:   next_mS_cnt = mS_cnt - 1'b1;
   endcase always @(posedge SCPCLK    or posedge RESET)
   if (RESET)
      mS_cnt = 8'h00;
   else
      mS_cnt = next_mS_cnt;

/*
   Lock      the state of the millisecond counter at the beginning of the system
   I/O read so that it is not changing states w/ SCPCLK during the read    cycle.
*/
reg [7:0] MILLISEC_O;
always @(posedge lck_MILLISEC) MILLISEC_O = mS_cnt;

/*********************************************************
      End of module MILLISEC.
*********************************************************/ endmodule
//********************************************************
// Module:   MKI
// Author:   David T. DeRoo
//
```

-213-
```
// This        module is the standard 'MKI'
(Mouse/Keyboard Interface).
//
//*****************************************************
module mki(RESET,
   IOWR, IORD, SCPCS, ALT_SCPCS, CMD, ALT_CMD, SD_I,
   SCPWR, SCPRD, SCPAD_I,
   RS_SCP_OUT, RS_STAT_OUT, RS_IRQKB_EN, RS_RC_ACT,
RS_RC_INACT,
   RS_A20_INACT, RS_A20_ACT, RS_FUN_CTRL, RS_AUX_OUT,
   RS_IRQMS_EN,   RS_MKI,
   IBUF, OBUF,
   A20GATE, FASTRC,
   FAST_A20_ACT, FAST_A20_INACT, FAST_RC_ACT, SCPCLK,
   PE, GTO, AOBF_TTO, INHIBIT, CMD_DATA, SYSFLAG, IBF,
OBF_MOBF,
   A20GATE_EN, FASTRC_EN,
   D1_CMD, MOBF, AOBF, MKI_EN,
   IRQKB, IRQMS,
   IRQMS_EN, IRQKB_EN );

input RESET;              // system       reset signal
input IOWR, IORD;         // AT control bus signals
input SCPCS;              // decode       of AT I/O
addresses 60h    & 64h
input ALT_SCPCS;          // decode       of CPU index
regs 60h &    64h
input CMD;                // AT address bus bit
2--command or data
input ALT_CMD;                  // CPU INDEX reg bit
2--command or data
input [7:0] SD_I;         // AT data bus in
input SCPWR, SCPRD;            // SCP mem control
signals
input [7:0] SCPAD_I;           // SCP address/data bus
in
```

-214-

```
input RS_SCP_OUT, RS_STAT_OUT, RS_IRQKB_EN,
   RS_RC_ACT, RS_RC_INACT, RS_A20_INACT,
   RS_A20_ACT, RS_FUN_CTRL, RS_AUX_OUT,
   RS_IRQMS_EN,   RS_MKI;            // SCP address
selects output     [7:0] IBUF;       // Input Buffer  (CPU
-->        SCP)
output     [7:0] OBUF;       // Output  Buffer (SCP
-->        CPU)
output     A20GATE;          // system  addressbit
20 control
output     FASTRC;           // system  reset
control
input      FAST_A20_ACT;     //
input      FAST_A20_INACT;   //
input      FAST_RC_ACT;      //
input      SCPCLK;           // output     PE;               // Parity  Error
(register  bit)
output     GTO;              // General Time
Out (reg.  bit)
output     AOBF_TTO;         // Aux OutBuff
Full/Transmit Time Out (muxed bit)
output     INHIBIT;          // Inhibit (register
bit)
output     CMD_DATA;         // COMMAND/DATA (CPU
byte       type)
output     SYSFLAG;          // System  Flag
(register bit)
output     IBF;              // Input Buffer
Full
output     OBF_MOBF;         // Output  Buffer Full
(normal or auxilliary)
```

-215-
```
output         A20GATE_EN;        // Enable for
automatic A20GATE generation
output         FASTRC_EN;         // Enable for
automatic FASTRC generation output         AOBF;                       // Auxilliary
Output Buffer Full
output         MOBF;                       // Mouse Output
Buffer Full
output         D1_CMD;            // D1 Command
in-progress
output         MKI_EN;            // "MKI" feature
enabled output         IRQKB;                      // AT control
bus            interrupt request 1
output         IRQMS;                      // AT control
bus            interrupt request 12
output    [1:0] IRQKB_EN;         // SCP mem read
address 0005h
output    [1:0] IRQMS_EN;         // SCP mem read
address 000Eh // output port registers (note:   only wires drive
outputs)
reg  [7:0] IBUF_REG;         wire      [7:0] IBUF =
IBUF_REG;
reg  [7:0] OBUF_REG;         wire      [7:0] OBUF =
OBUF_REG;

reg  A20GATE_REG;    wire          A20GATE     =
A20GATE_REG;
reg  FASTRC_REG;     wire          FASTRC      =
FASTRC_REG;

reg  AOBF_REG;               wire          AOBF       =
```

-216-

```
AOBF_REG;
reg   MOBF_REG;              wire      MOBF      =
MOBF_REG;
reg   D1_CMD_REG;    wire      D1_CMD    =
D1_CMD_REG;
reg   MKI_EN_REG;    wire      MKI_EN    =
MKI_EN_REG;

reg   PE_REG;                 wire      PE        =
PE_REG;
reg   GTO_REG;                wire      GTO       =
GTO_REG;
reg   TTO_REG;                wire      AOBF_TTO  =
AOBF_REG |   TTO_REG;
reg   INHIBIT_REG;   wire      INHIBIT   =
INHIBIT_REG;
reg   CMD_DATA_REG;           wire      CMD_DATA  =
CMD_DATA_REG;
reg   SYSFLAG_REG;   wire      SYSFLAG   =
SYSFLAG_REG;
reg   IBF_REG;                wire      IBF       =
IBF_REG;
reg   OBF_REG;                wire      OBF       =
OBF_REG;

wire      OBF_MOBF  = OBF ||
MOBF;

reg   A20GATE_EN_REG;         wire      A20GATE_EN =
A20GATE_EN_REG;
reg   FASTRC_EN_REG;          wire      FASTRC_EN =
FASTRC_EN_REG;

reg   iIRQKB;                 wire      IRQKB     =
iIRQKB;
reg   iIRQMS;                 wire      IRQMS     =
```

-217-

```
iIRQMS;
reg   [1:0] IRQKB_EN_REG;   wire   [1:0] IRQKB_EN =
IRQKB_EN_REG;
reg   [1:0] IRQMS_EN_REG;   wire   [1:0] IRQMS_EN =
IRQMS_EN_REG;

// internally used nets
wire  wr_IBUF_REG =  IOWR && (SCPCS || ALT_SCPCS);
wire CMD_bit = ALT_SCPCS? ALT_CMD : CMD;       //    MUX
command/data status       bit // Special note:  even though the signal names here are
RS_SCP_OUT and
//                 RS_STAT_OUT, we are really watching
for READS    of the
//                 corresponding       addresses,
SCP_IN and SCP_IN_ALT.
wire  rd_IBUF_REG =  SCPRD && (RS_SCP_OUT ||
RS_STAT_OUT);

wire  wr_SCP_OUT =   SCPWR && RS_SCP_OUT;
wire  wr_AUX_OUT =   SCPWR && RS_AUX_OUT;

wire  wr_OBUF_REG =  wr_SCP_OUT   || wr_AUX_OUT;
wire  rd_OBUF_REG =  IORD && ((SCPCS &&    !CMD) ||
(ALT_SCPCS && !ALT_CMD));

wire  wr_STATUS    =   SCPWR && RS_STAT_OUT;

wire  wr_RC_ACT    =   SCPWR && RS_RC_ACT;
wire  wr_RC_INACT=   SCPWR && RS_RC_INACT;
wire  wr_A20_INACT = SCPWR && RS_A20_INACT;
wire  wr_A20_ACT   =   SCPWR && RS_A20_ACT;

wire  wr_FUN_CTRL =  SCPWR && RS_FUN_CTRL;
wire  wr_MKI_EN    =   SCPWR && RS_MKI;
```

-218-
```
wire  wr_IRQKB_EN = SCPWR && RS_IRQKB_EN;
wire  wr_IRQMS_EN = SCPWR && RS_IRQMS_EN;

// internally used registers
reg   iD1_DATA;        //       set when data for D1
command received
reg   iB8_CMD;         //       set when B8 command
received //***********************************************************
// Emulation of   the Intel 8042 interface to theAT bus
//***********************************************************

// IBUF     register I/F to     AT bus (Input Buffer)
always @(negedge wr_IBUF_REG or    posedge   RESET) begin
   if (RESET) begin
      IBUF_REG      = 8'h00;
      CMD_DATA_REG = 1'b0;
      iB8_CMD       = 1'b0;
   end
    else      begin
      IBUF_REG      = SD_I[7:0];              // System
data         bus
      CMD_DATA_REG = CMD_bit;        // record which
register (CMD or DATA) via address bit
      iB8_CMD       = ((SD_I==8'hB8) && CMD_bit);
   end
end // OBUF     register I/F to     AT bus (Output Buffer) .
always @(negedge wr_OBUF_REG or    posedge   RESET) begin
   if (RESET)  OBUF_REG   = 8'h00;
   else              OBUF_REG    = SCPAD_I[7:0];    //
SCP addr/data bus
end
```

-219-
```
// STATUS register (R/W    bits)
always @(negedge wr_STATUS or posedge RESET) begin
   if (RESET) begin
      SYSFLAG_REG  = 1'b0;
      INHIBIT_REG  = 1'b0;
      TTO_REG      = 1'b0;
      GTO_REG      = 1'b0;
      PE_REG       = 1'b0;
   end
   else     begin
      SYSFLAG_REG  = SCPAD_I[2];
      INHIBIT_REG  = SCPAD_I[4];
      TTO_REG      = SCPAD_I[5];
      GTO_REG      = SCPAD_I[6];
      PE_REG       = SCPAD_I[7];
   end
end /*
   STATUS REGISTER - (Read-Only   bits)

(Note the different clearing   of AOBF   and MOBF)
*/

// Input Buffer    Full flag
always @(negedge wr_IBUF_REG   or posedge RESET or
posedge rd_IBUF_REG) begin
   if (RESET)                IBF_REG <= 1'b0;
   else     if (rd_IBUF_REG)   IBF_REG <= 1'b0;   //
cleared when  SCP reads Input    Buffer
   else                       IBF_REG <=           //
set UNLESS D1 command sequence
     !(MKI_EN && (((SD_I==8'hD1) && A20GATE_EN    &&
CMD_bit) ||
             (D1_CMD && !CMD_bit) ||
             ((SD_I==8'hFF) && iD1_DATA &&
```

-220-

```
CMD_bit)));
end

// Output Buffer Full flag
always @(negedge wr_SCP_OUT or posedge RESET or
posedge      rd_OBUF_REG) begin
    if (RESET)              OBF_REG = 1'b0;
    else    if (rd_OBUF_REG)  OBF_REG = 1'b0;   //
cleared when  CPU reads Output Buffer
    else                    OBF_REG = 1'b1;     //
set on SCP write to Output Buffer
end // Auxillary Output Buffer Full   flag (note the clear)
always @(negedge wr_AUX_OUT or posedge RESET or
posedge      wr_SCP_OUT) begin
    if (RESET)              AOBF_REG = 1'b0;
    else    if (wr_SCP_OUT)    AOBF_REG = 1'b0;
//         cleared      on SCP write to  Output
Buffer
    else                    AOBF_REG = 1'b1;  // set
on SCP write to AuxOutput Buffer
end // Mouse Output   Buffer Full flag
always @(negedge wr_AUX_OUT or posedge RESET or
posedge      rd_OBUF_REG) begin
    if (RESET)              MOBF_REG = 1'b0;
    else    if (rd_OBUF_REG)  MOBF_REG = 1'b0;   //
cleared      when CPU reads Output Buffer
    else                    MOBF_REG = 1'b1;  // set
on SCP write to AuxOutput Buffer
end /*
   Generate the    MKI IRQ       signals    - each may
```

-221- be 'shared' or non-shared.

'Non-shared' interrupt floats high when disabled, goes low when enabled,
and floats high when the interrupt occurs. It then stays floating until
the interrupt is cleared, at which time it goes low again.

'Shared' interrupt normally floats high, even when enabled, and goes
low only for the duration of the SCPWR pulse that causes the interrupt.
*/

```
// generate a MUX for the KeyBoard interrupt
always @(IRQKB_EN or wr_SCP_OUT   or OBF)  begin
   if (IRQKB_EN[0])                // IRQ   enabled?
      if (IRQKB_EN[1])             // (shared mode)
   iIRQKB    = 1;         // float to 1 in shared mode
      else
   iIRQKB    = OBF;                // track status bit -
i.e., float when   interrupt occurs
   else
      iIRQKB = 0;         // pull to 0 when 'disabled'
end // generate a MUX for the Mouse    interrupt
always @(IRQMS_EN or wr_AUX_OUT   or MOBF) begin
   if (IRQMS_EN[0])                // IRQ   enabled?
      if (IRQMS_EN[1])             // (shared mode)
   iIRQMS    = 1;         // float to 1 in shared mode
      else
   iIRQMS    = MOBF;               // track status bit -
i.e., float when   interrupt occurs
   else
```

-222-

```
      iIRQMS = 0;           // pull to 0 when 'disabled'
end

// Keyboard Interrupt Enable/Control
always @(negedge wr_IRQKB_EN  or posedge RESET)    begin
   if (RESET)   IRQKB_EN_REG = 2'b00;
   else              IRQKB_EN_REG = SCPAD_I[1:0];
end // Mouse Interrupt Enable/Control
always @(negedge wr_IRQMS_EN  or posedge RESET)    begin
   if (RESET)   IRQMS_EN_REG = 2'b00;
   else              IRQMS_EN_REG = SCPAD_I[1:0];
end //*********************************************************
// Special MKI features
//*********************************************************
/*
   Control registers
*/

// Automatic/Manual control of A20GATE and FASTRC
always @(negedge wr_FUN_CTRL  or posedge RESET)    begin
   if (RESET)  begin
      A20GATE_EN_REG = 1;
      FASTRC_EN_REG  = 1;
      end
   else       begin
      A20GATE_EN_REG = SCPAD_I[1];
      FASTRC_EN_REG  = SCPAD_I[0];
      end
end // Enable/Disable of 'ignoring'   of D1 commands
always @(negedge wr_MKI_EN or posedge RESET) begin
```

-223-

```
   if (RESET)   MKI_EN_REG = 1'b0;
   else              MKI_EN_REG = SCPAD_I[0];
end /*
   D1 Command Sequence Special Handling    (A20GATE)
*/

// D1_CMD_REG is set on    write to Input Buffer
(COMMAND)       of 'D1'
always @(negedge wr_IBUF_REG  or posedge RESET or
posedge FASTRC
      or posedge wr_A20_INACT
      or posedge wr_A20_ACT) begin
   if (RESET)               D1_CMD_REG <= 1'b0;
   else       if (FASTRC)    D1_CMD_REG <= 1'b0;
   else       if (wr_A20_ACT)      D1_CMD_REG <= 1'b0;
   else       if (wr_A20_INACT)  D1_CMD_REG <= 1'b0;
   else                     D1_CMD_REG <=
((SD_I==8'hD1)    && A20GATE_EN && CMD_bit);
end always @(negedge wr_IBUF_REG  or posedge RESET or
posedge FASTRC
      or posedge wr_A20_INACT
      or posedge wr_A20_ACT) begin
   if (RESET)               iD1_DATA <= 1'b0;
   else       if (FASTRC)    iD1_DATA <= 1'b0;
   else       if (wr_A20_ACT)      iD1_DATA <= 1'b0;
   else       if (wr_A20_INACT)  iD1_DATA <= 1'b0;
   else                     iD1_DATA <= (D1_CMD_REG &&
!CMD_bit);
end // generate write pulse    if writing DATA  portionof D1
command
```

-224-

```verilog
wire wr_CPU_A20_STATE =   (wr_IBUF_REG    &&
D1_CMD_REG && !CMD_bit);

// generate the    actual A20GATE flip-flop
always @(negedge wr_CPU_A20_STATE
    or posedge RESET or posedge FASTRC
    or posedge FAST_A20_ACT or posedge FAST_A20_INACT
    or posedge wr_A20_ACT or posedge wr_A20_INACT) begin
    if (RESET)                 A20GATE_REG = 1'b1;
    else      if (FASTRC)      A20GATE_REG = 1'b1;
    else      if (FAST_A20_ACT)    A20GATE_REG = 1'b1;
    else      if (FAST_A20_INACT)  A20GATE_REG = 1'b0;
    else      if (wr_A20_ACT)      A20GATE_REG =
1'b1;
    else      if (wr_A20_INACT)    A20GATE_REG = 1'b0;
    else                           A20GATE_REG = SD_I[1];
end /*
    FAST    RC Generation
*/
reg   SCP_RC_bit;
reg   iSCPRC_ACTIVE;

// generate a MUX for input to SCP RC flip-flop
always @(RS_RC_ACT or RS_RC_INACT or iSCPRC_ACTIVE)
    if (RS_RC_ACT)    SCP_RC_bit =           1'b1;
    else     if (RS_RC_INACT)  SCP_RC_bit =           1'b0;
    else                       SCP_RC_bit =
iSCPRC_ACTIVE;

// generate flip-flop to remember state    of SCP
version of FASTRC
always @(negedge SCPWR or posedge RESET) begin
    if (RESET)  iSCPRC_ACTIVE = 1'b0;
    else                iSCPRC_ACTIVE = SCP_RC_bit;
```

-225-

```
end

// generate clear pulse   for FASTRC if active and SCP
reads input buffer (???)
wire  clr_fastrc =   (rd_IBUF_REG && !iSCPRC_ACTIVE);

// 'F-even' command that does not follow a 'B8'
command       w/ chip       generation
// of fast reset signal    enabled
reg CPU_RC_bit;
always @(SD_I or CMD_bit or iB8_CMD or FASTRC_EN_REG)
   CPU_RC_bit =     CMD_bit && (SD_I[7:4]  == 4'hf) &&
(SD_I[0] ==   1'b0) &&
              !iB8_CMD && FASTRC_EN_REG;

reg [3:0] FRC_INACT_reg;
wire FAST_RC_INACT = FRC_INACT_reg[2] &
~FRC_INACT_reg[3];

always @(negedge wr_IBUF_REG or   posedge   RESET or
posedge clr_fastrc
                   or posedge wr_RC_INACT or posedge
wr_RC_ACT
                   or posedge FAST_RC_INACT or
posedge FAST_RC_ACT)
begin
   if (RESET)             FASTRC_REG =  1'b0;
   else     if (clr_fastrc)       FASTRC_REG =  1'b0;
   else     if (wr_RC_INACT)   FASTRC_REG =      1'b0;
   else     if (wr_RC_ACT)        FASTRC_REG =  1'b1;
   else     if (FAST_RC_INACT) FASTRC_REG =     1'b0;
   else     if (FAST_RC_ACT)   FASTRC_REG =     1'b1;
   else                    FASTRC_REG =  CPU_RC_bit;
end // synchronize the falling edge   of FAST_RC_ACT and
```

-226-

```verilog
generate clear pulse
// for FASTRC_REG 2-3 SCPCLKs after this edge
always @(posedge SCPCLK    or posedge RESET) begin
   if (RESET)
      FRC_INACT_reg <= 4'b1111;
   else
      FRC_INACT_reg <=

{FRC_INACT_reg[2],FRC_INACT_reg[1],FRC_INACT_reg[0],!FAST_RC_ACT};
end endmodule // mki
`include "defines.h"

// MODULE:   SCPDECOD
// AUTHOR:   Richard Ball
// STARTED:  July 10, 1992

// Decodes the SCP address bus to create the 'register
select' signals.
// Note      that these decodes should be qualified
with _SCPMEMW to   create
// register 'clock' signals.

module scpdecod   (
SCPA,
LSCPA,
RS_SCP_OUT,
RS_STAT_OUT,
RS_IRQKB_EN,
RS_LAST_IO,
RS_STAT_IN,
RS_RC_ACT,
RS_RC_INACT,
RS_A20_INACT,
```

-227-

```
RS_A20_ACT,
RS_FUN_CTRL,
RS_AUX_OUT,
RS_IRQMS_EN,
RS_MKI,
RS_ISR1,
RS_IER1,
RS_AUTO_SERIAL,
RS_KBD_COMM,
RS_KBD_CTRL,
RS_KBD_DATA,
RS_KBD_XDATA,
RS_AUX_CTRL,
RS_AUX_DATA,
RS_AUX_XDATA,
RS_SECURE,
RS_HUICFG_1,
RS_HUICFG_2,
RS_FLASH_GRAB);

input [11:8] SCPA;
input [7:0] LSCPA;

output RS_SCP_OUT;
output RS_STAT_OUT;
output RS_IRQKB_EN;
output RS_LAST_IO;
output RS_STAT_IN;
output RS_RC_ACT;
output RS_RC_INACT;
output RS_A20_INACT;
output RS_A20_ACT;
output RS_FUN_CTRL;
output RS_AUX_OUT;
output RS_IRQMS_EN;
output RS_MKI;
```

-228-

```
output RS_ISR1;
output RS_IER1;
output RS_AUTO_SERIAL;
output RS_KBD_COMM;
output RS_KBD_CTRL;
output RS_KBD_DATA;
output RS_KBD_XDATA;
output RS_AUX_CTRL;
output RS_AUX_DATA;
output RS_AUX_XDATA;
output RS_SECURE;
output RS_HUICFG_1;
output RS_HUICFG_2;
output RS_FLASH_GRAB;

wire   RS_SCP_OUT  =      {SCPA, LSCPA}==`SCP_OUT;
wire   RS_STAT_OUT =      {SCPA, LSCPA}==`STAT_OUT;
wire   RS_IRQKB_EN =      {SCPA, LSCPA}==`IRQKB_EN;
wire   RS_LAST_IO  =      {SCPA, LSCPA}==`LAST_IO;
wire   RS_STAT_IN  =      {SCPA, LSCPA}==`STAT_IN;
wire   RS_RC_ACT   =      {SCPA, LSCPA}==`RC_ACT;
wire   RS_RC_INACT =      {SCPA, LSCPA}==`RC_INACT;
wire   RS_A20_INACT =     {SCPA, LSCPA}==`A20_INACT;
wire   RS_A20_ACT  =      {SCPA, LSCPA}==`A20_ACT;
wire   RS_FUN_CTRL =      {SCPA, LSCPA}==`FUN_CTRL;
wire   RS_AUX_OUT  =      {SCPA, LSCPA}==`AUX_OUT;
wire   RS_IRQMS_EN =      {SCPA, LSCPA}==`IRQMS_EN;
wire   RS_MKI      =      {SCPA, LSCPA}==`MKI;
wire   RS_ISR1     =      {SCPA, LSCPA}==`ISR1;
wire   RS_IER1     =      {SCPA, LSCPA}==`IER1;
wire   RS_AUTO_SERIAL = {SCPA, LSCPA}==`AUTO_SERIAL;
wire   RS_KBD_COMM =      {SCPA, LSCPA}==`KBD_COMM;
wire   RS_KBD_CTRL =      {SCPA, LSCPA}==`KBD_CTRL;
wire   RS_KBD_DATA =      {SCPA, LSCPA}==`KBD_DATA;
wire   RS_KBD_XDATA =     {SCPA, LSCPA}==`KBD_XDATA;
wire   RS_AUX_CTRL =      {SCPA, LSCPA}==`AUX_CTRL;
```

-229-

```
wire  RS_AUX_DATA  =   {SCPA, LSCPA}==`AUX_DATA;
wire  RS_AUX_XDATA =   {SCPA, LSCPA}==`AUX_XDATA;
wire  RS_SECURE    =   {SCPA, LSCPA}==`SECURE;
wire  RS_HUICFG_1  =   {SCPA, LSCPA}==`HUICFG_1;
wire  RS_HUICFG_2  =   {SCPA, LSCPA}==`HUICFG_2;
wire  RS_FLASH_GRAB =  {SCPA, LSCPA}==`FLASH_GRAB;

endmodule
`include "defines.h"

// MODULE:  SCPRDMUX
// AUTHOR:  Richard Ball
// STARTED: July 10, 1992
//
// This       module drives the SCPAD_O bus, which isthe outgoing version
// of the bidirectional   SCP address/data bus.  Driven onto this    bus
// are the FLASH data (for SCP code fetches) or   the contents of
// internal registers (for SCP memory reads to certain address space).

module scprdmux    ( SCPA,       LSCPA, SCPRD, SCPPSE, SCPAD_O, SCPAD_OEN,
   IBUF, OBUF,
   PE, GTO, AOBF_TTO, INHIBIT, CMD_DATA, SYSFLAG, IBF, OBF_MOBF,
   FASTRC, A20GATE,
   D1_CMD, MOBF, AOBF, MKI_EN,
   FASTRC_EN, A20GATE_EN,
   ISR1, IER1,
   IRQKB_EN, IRQMS_EN,
   KB_MODE, MS_MODE,
   KB_COUNT, KB_LNCTRL,  KB_HOLD, KB_TRANSMIT, KB_RECEIVE,
```

-230-

```
    MS_COUNT, MS_LNCTRL,    MS_HOLD, MS_TRANSMIT,
MS_RECEIVE,
    KBCLK_I, KBCLK_O, KBDATA_I, KBDATA_O,
    MSCLK_I, MSCLK_O, MSDATA_I, MSDATA_O,
    KB_BYTE, MS_BYTE,
    KB_PARITY, KB_STOP,
    MS_PARITY, MS_STOP,
    SECURE, HUICFG_1, HUICFG_2, FLASH_GRAB,
    F2SCPD_O );

input [11:8] SCPA;
input [7:0] LSCPA;
input SCPRD;
input SCPPSE;

output [7:0] SCPAD_O;
output SCPAD_OEN;

input [7:0] IBUF;
input [7:0] OBUF;
input PE, GTO, AOBF_TTO, INHIBIT, CMD_DATA, SYSFLAG,
IBF, OBF_MOBF;
input FASTRC, A20GATE;
input D1_CMD, MOBF, AOBF, MKI_EN;
input FASTRC_EN, A20GATE_EN;
input [2:0] ISR1;
input [2:0] IER1;
input [1:0] IRQKB_EN;
input [1:0] IRQMS_EN;
input KB_MODE;
input MS_MODE;
input KBCLK_I, KBCLK_O;
input KBDATA_I,   KBDATA_O;
input MSCLK_I, MSCLK_O;
input MSDATA_I,   MSDATA_O;
input [3:0] KB_COUNT;
```

-231-

```
input [3:0] MS_COUNT;
input KB_RECEIVE;
input KB_TRANSMIT;
input KB_HOLD;
input KB_LNCTRL;
input MS_RECEIVE;
input MS_TRANSMIT;
input MS_HOLD;
input MS_LNCTRL;
input [7:0] KB_BYTE;
input KB_PARITY;
input KB_STOP;
input [7:0] MS_BYTE;
input MS_PARITY;
input MS_STOP;
input SECURE;
input [7:0] HUICFG_1;
input [7:0] HUICFG_2;
input [1:0] FLASH_GRAB;

input [7:0] F2SCPD_O;           // FLASH data input bus
(for           code fetches and data R/W)

reg [7:0] iD;      // internal (register) data

// return FLASH    data if      'code fetch' cycle or
non-register cycle (addr > 'hff)
wire [7:0] SCPAD_O = (SCPPSE ||   (SCPA != 0))? F2SCPD_O
: iD;

// drive SCPAD bus if code fetch or data read
wire SCPAD_OEN = SCPPSE    | SCPRD;

always @(LSCPA) begin
   case      (LSCPA)    // synopsys parallel_case
full_case
```

-232-

```
 `SCP_IN      : iD = IBUF;
 `SCP_IN_ALT  : iD = IBUF;
 `LAST_IO     : iD = OBUF;
 `STAT_IN     : iD = {PE, GTO, AOBF_TTO, INHIBIT,
CMD_DATA, SYSFLAG, IBF, OBF_MOBF};
 `RC_STAT     : iD = {7'b0, FASTRC};
 `A20_STAT    : iD = {6'b0, A20GATE, 1'b0};
 `FUN_CTRL    : iD = {6'b0, A20GATE_EN, FASTRC_EN};
 `FUN_STAT    : iD = {D1_CMD,    IRQKB_EN[0],
IRQMS_EN[0], MOBF, AOBF, MKI_EN, 2'b0};
 `ISR1        : iD = {2'b0, ISR1[2], ISR1[1],   3'b0,
ISR1[0]};
 `IER1        : iD = {2'b0, IER1[2], IER1[1],   3'b0,
IER1[0]};
 `VER         : iD = {`VERSION};
 `IRQKB_EN    : iD = {6'b0, IRQKB_EN};
 `IRQMS_EN    : iD = {6'b0, IRQMS_EN};
 `AUTO_SERIAL : iD = {6'b0, MS_MODE, KB_MODE};
 `KBD_COMM    : iD = {MSDATA_O, MSCLK_O, MSDATA_I,
MSCLK_I, KBDATA_O, KBCLK_O, KBDATA_I, KBCLK_I};
 `KBD_CTRL    : iD = {KB_COUNT, KB_LNCTRL, KB_HOLD,
KB_TRANSMIT, KB_RECEIVE};
 `KBD_DATA    : iD = KB_BYTE;
 `KBD_XDATA   : iD = {6'b0, KB_STOP, KB_PARITY};
 `AUX_CTRL    : iD = {MS_COUNT, MS_LNCTRL, MS_HOLD,
MS_TRANSMIT, MS_RECEIVE};
 `AUX_DATA    : iD = MS_BYTE;
 `AUX_XDATA   : iD = {6'b0, MS_STOP, MS_PARITY};
 `SECURE      : iD = {7'b0, SECURE};
 `HUICFG_1    : iD = HUICFG_1;
 `HUICFG_2    : iD = HUICFG_2;
 `FLASH_GRAB  : iD = {6'b0, FLASH_GRAB};
 endcase end
```

-233-

```
endmodule
`timescale 1ns/1ns

/**********************************************************
   Module:     SECURITY
   Design:     HUI
   Engineer:   David    T. DeRoo
   Date      Created:   Sunday 13 September 1992

Description:
**********************************************************/ module security(RESET, IOW, SD_I, SCPWR, SCPAD_I,
                RS_FLASH_CTRL, RS_SECURE, RS_FLASH_GRAB,
                VPPEN, SECURE, SCPreset, CPUexcl);

input       RESET;               // system reset
signal
input       IOW;                 // system I/O write
input       [7:0] SD_I;    // system data bus in
input       SCPWR;               // SCP data memory
write
input       [7:0] SCPAD_I;       // SCP address/data
bus
input       RS_FLASH_CTRL,       // select for
system      index register FLASH_CTRL
    RS_SECURE,         // select for SCP register SECURE
    RS_FLASH_GRAB;     // select for SCP register
FLASH_GRAB output      VPPEN;               // drives VPPEN pin
output      SECURE;        // status of 'securemode'
output      SCPreset;      // drives SCPRESET pin
output      CPUexcl;       // flag to exclude CPU
from flash memory accesses
```

-234-

```verilog
reg VPPEN_CPU;
reg VPPEN_SCP;
reg SECURE;
reg SCPreset_bit;
reg CPUexcl;
wire wr_SECURE   = SCPWR && RS_SECURE;
wire set_SECURE  = wr_SECURE && SCPAD_I[0];
wire wr_FLASH_GRAB = SCPWR && RS_FLASH_GRAB;
wire wr_FLASH_CTRL = IOW && RS_FLASH_CTRL;

/************************************************************
      Control of VPPEN & SCPRESET pins
************************************************************/ wire VPPEN = VPPEN_SCP || VPPEN_CPU;
wire SCPreset =   RESET || SCPreset_bit;

/************************************************************
      CPU index    register FLASH_CTRL writes
************************************************************/ always @(negedge wr_FLASH_CTRL or posedge RESET) begin
   if (RESET)
      SCPreset_bit <= 1;
   else
      SCPreset_bit <= SD_I[0];
end always @(negedge wr_FLASH_CTRL or posedge RESET   or
posedge set_SECURE) begin
   if (RESET)
      VPPEN_CPU    <= 1'b0;
   else     if (set_SECURE)
      VPPEN_CPU    <= 1'b0;
   else
      VPPEN_CPU    <= SECURE? 0 : SD_I[2];
```

-235-
```
end

/************************************************************
        SCP HUI register SECURE writes
************************************************************/ always @(negedge wr_SECURE or posedge RESET) begin
    if (RESET)
        SECURE  <=    1'b0;
    else
        SECURE  <=    SCPAD_I[0];
end /************************************************************
        SCP HUI register FLASH_GRAB writes
************************************************************/ always @(negedge wr_FLASH_GRAB or posedge SCPreset)
begin
    if (SCPreset) begin
        CPUexcl <= 1'b0;
        VPPEN_SCP    <= 1'b0;
    end
    else     begin
        CPUexcl <= SCPAD_I[0];
        VPPEN_SCP    <= SCPAD_I[1];
    end
end /************************************************************
        End of module SECURITY.
************************************************************/ endmodule
`timescale 1ns/1ns
```

-236-
```
/*
   Name:        SERIF
   Description:   contains one instance of the
serial interface, consisting of
               2-line (clock/data) connection to the
device,     and several
               registers in the SCP I/O space.  The
serial interface   is
               bidirectional, but with the clock always
controlled by
               the external device (however,       the
chip can interrupt
               or prohibit transfers      by holding
the clock line low).
*/ module serif (RESET, CLKIN, DATAIN,
   RS_MODE, SCPD_MODE,
   RS_COMM, SCPD_CLK, SCPD_DATA,
   RS_DATA, RS_XDATA, RS_CTRL, SCPAD_I,
   SCPWR,
   COUNTER, LNCTRL, HOLD, TRANSMIT, RECEIVE,
   MODEBIT,
   DATAREG,
   PARITY, STOP,
   CLKOUT, DATAOUT,
   RXINT);

// NOTE: this block receives register selects and data
bits rather than
//          pre-latched register bits, due      to
the need for  other actions
//          to occur when the registers are written
(e.g.,      start transmitting
//          when the byte-wide data register is
written).
```

-237-

```
// ALSO: several data bits are connected to more than 1 port - the entire
//            data bus enters the block, but individual bits   are also brought
//            in because several registers have bitsin multiple instances.

// module port directions defined below
input RESET;
input CLKIN;          // master clock          input
input DATAIN;               // master data input
input RS_MODE;              // decode of mode register (bit/byte mode)
input SCPD_MODE;    // mode      data bit for this instance
input RS_COMM;              // decode of communication register (clk/data control)
input SCPD_CLK;             // clock data bit for this instance
input SCPD_DATA;    // data      data bit for this instance
input RS_DATA;              // decode of byte-wide data register
input RS_XDATA;             // decode of xtra-data register    (parity/stop bit)
input RS_CTRL;              // decode of control register (RCV mode, HOLD, etc.)
input [7:0] SCPAD_I;        // data         bus (used for above)
input SCPWR;        // write strobe output [3:0] COUNTER;       // counter output (for monitoring transfer)
output LNCTRL;              // line          controlbit (received at EOT)
output HOLD;        // HOLD       bit (manually or
```

-238-

```
automatically set)
output TRANSMIT;       // TRANSMIT bit
(automatically set)
output RECEIVE;        // RECEIVE bit (manually set)
output MODEBIT;        // mode         bit (for
readback)
output [7:0] DATAREG;  // byte-wide data register
(TRANSMIT or RECEIVE    data)
output PARITY;         // desired parity
output STOP;      // desired stop       bit polarity
output CLKOUT;         // clock output  (enable,
since OD)
output DATAOUT;        // data          output
(enable,    since OD)
output RXINT;          // RECEIVE data  interrupt
(set at EOT)

// output port wires defined below
wire  [3:0] COUNTER;
wire  CLKOUT, DATAOUT;
wire  RXINT;

// output port registers defined below
reg   MODEBIT_REG; wire MODEBIT  =     MODEBIT_REG;
reg   LNCTRL_REG;  wire LNCTRL   =     LNCTRL_REG;
reg   HOLD_REG;         wire HOLD     = HOLD_REG;
reg   TRANSMIT_REG;     wire TRANSMIT =
TRANSMIT_REG;
reg   RECEIVE_REG; wire RECEIVE  =     RECEIVE_REG;
reg   PARITY_REG;  wire PARITY   =     PARITY_REG;
reg   STOP_REG;         wire STOP     = STOP_REG;
reg   [7:0] iDATAREG;
wire  [7:0] DATAREG = iDATAREG;

// internally used registers defined below
reg   BITclkout, BITdataout;
```

-239-

```
reg    [9:0] shift_reg;
wire   [9:0] shift_reg_wire = shift_reg;
reg    [9:0] shift_reg_bits;
wire   [9:0] shift_reg_bits_wire  = shift_reg_bits;
wire   shift_reg0 = shift_reg[0];
reg    mask_edge;
reg    RIP_REG; // extended version of receive -   i.e.,
receive-in-progress
reg    RECEIVING; // current (or   last) operation  is
RECEIVE (used for interrupt)
reg    Rx_bit, Tx_bit, Hold_bit;
reg    Rip_bit, Rxing_bit;
reg    BYTEclkout, BYTEdataout;

// internally used nets    defined         below wire   count0, count1, count11;              // counter
timing signals wire   wr_MODE =     (SCPWR && RS_MODE);
wire   wr_COMM =     (SCPWR && RS_COMM);
wire   wr_CTRL =     (SCPWR && RS_CTRL);

wire   wr_DATA =     (SCPWR && RS_DATA);     // SCP mem
write to (base + 1)
       // write to the DATAREG when:
       //   1. SCP writes to DATAREG
       //   2. serial reception   from device complete
wire   wr_DATAREG =  (wr_DATA || (RIP_REG && count1 &&
!CLKIN));

wire   wr_XDATA = (SCPWR && RS_XDATA);        // SCP mem
write to (base + 2)
       // write to the XDATA when:
       //   1. SCP writes to XDATA
       //   2. serial reception   from device complete
```

-240-

```
wire wr_XDATAREG = (wr_XDATA || (RIP_REG && count1 &&
!CLKIN));

wire begin_Rx = (!DATAIN && !CLKIN &&    count11);
// indicates receive is starting // read line control on negative edge of device
clock if in
    // Transmit mode and have  shifted  out last bit
wire rd_line_ctrl = (TRANSMIT && count1 && !CLKIN);

// clear counter when:
    //    1. RESET
    //    2. Enter Transmit mode by writing to DATA
reg
    //    3. Enter Receive mode by writing 1 to
RECEIVE bit
wire count_clr   = (RESET || wr_DATA || (wr_CTRL&&
SCPAD_I[0]));

// CLKIN is passed to counter when edge is not
being masked
    // NOTE that the counter is clocked on the rising
edge of    CLKIN
wire count_clk   = (CLKIN && !mask_edge);

// instantiate a mod-12 Johnson counter
johncnt12 JCNT12( .CLK(count_clk), .CLR(count_clr),
.COUNTER(COUNTER),
            .COUNT0(count0), .COUNT1(count1),
.COUNT11(count11));

/*
  Mask      out the    device clock from the counter
on the first rising edge
   of the clock.  This edge is actually    generated by
```

-241-

```
the act of    the SCP
   releasing the clock line to float high when preparing
to start a
   transmission, and thus should never clock the
counter.
*/
always @(negedge CLKIN or posedge count_clr) begin
   if (count_clr) mask_edge = 1;
   else               mask_edge = 0; // clear mask on
first        neg edge
end // control multiplexing    of data         in for bits
0, 1, and 2   of the control register
always @(RS_CTRL or RS_DATA or SCPAD_I or RECEIVE or
RIP_REG or    RECEIVING or TRANSMIT or HOLD) begin
   Rx_bit    = RECEIVE;           // default is to
retain value
   Rip_bit   = RIP_REG;
   Rxing_bit = RECEIVING;
   Tx_bit    = TRANSMIT;
   Hold_bit  = HOLD;

if (RS_CTRL)     begin
      if (SCPAD_I[2]) begin        // set   HOLD mode
   Rx_bit    = 0;              // receive cleared
   Tx_bit    = 0;              // transmit cleared
   Rip_bit = 0;                // receive-in-progress
cleared
   Hold_bit = 1;               // hold set
      end
      else if (SCPAD_I[0]) begin // set    RECEIVEmode
   Rx_bit    = 1;              // receive set
   Rip_bit = 1;                // receive-in-progress
set
   Rxing_bit = 1;              // receiving set
```

-242-
```
      Hold_bit = 0;              // hold cleared
        end
     end else    if (RS_DATA) begin    // set  TRANSMIT
mode on data write
        Tx_bit = 1;              // transmit  set
        Rxing_bit   = 0;                // receiving
cleared
        Hold_bit = 0;                 // hold cleared
     end end // bit 0 of the   Status Register--Receive mode
(cleared when receive starts)
always @(negedge SCPWR    or posedge RESET
                or posedge begin_Rx) begin
   if (RESET)           RECEIVE_REG = 0;
   else     if (begin_Rx)      RECEIVE_REG = 0;
   else                 RECEIVE_REG = Rx_bit;
end // bit 1 of the   Status Register--Transmit mode
always @(negedge SCPWR    or posedge RESET
                or posedge count0) begin
   if (RESET)           TRANSMIT_REG = 0;
   else     if (count0)  TRANSMIT_REG = 0;
   else                 TRANSMIT_REG = Tx_bit;
end // bit 2 of the   Status Register--Hold mode
always @(negedge SCPWR    or posedge RESET
                or posedge count0) begin
   if (RESET)           HOLD_REG = 1;
   else     if (count0)  HOLD_REG = 1;
```

-243-
```
      else                  HOLD_REG = Hold_bit;
end

// bit 3 of the    Status Register--Line Control bit
// NOTE: probably don't    need to         preset at
beginning of TRANSMIT      - this was done
//             because the device always sends back line
control = 0, so presetting
//             ensures that the bit will switch at EOT.
always @(posedge rd_line_ctrl or posedge RESET or
posedge wr_DATA) begin
   if (RESET)            LNCTRL_REG = 1;
   else     if (wr_DATA) LNCTRL_REG = 1;
   else                  LNCTRL_REG = DATAIN;
end // extended RECEIVE - indicates    receive   is
in-progress (cleared      when receive complete)
always @(negedge SCPWR    or posedge RESET
               or posedge count0) begin
   if (RESET)            RIP_REG       = 0;
   else     if (count0)  RIP_REG       = 0;
   else                  RIP_REG       = Rip_bit;
end // RECEIVING - current/last operation is a RECEIVE (only
cleared by transmit)
always @(negedge SCPWR or posedge RESET) begin
   if (RESET)            RECEIVING = 0;
   else                  RECEIVING = Rxing_bit;
end // write to serial i/f mode register (bit vs. byte)
always @(negedge wr_MODE or posedge RESET) begin
   if (RESET) MODEBIT_REG = 0;    // come up in
bit-wide     mode
```

-244-

```
   else               MODEBIT_REG = SCPD_MODE;
end

// write to bit-mode clock/data   control   reg
always @(negedge wr_COMM or posedge RESET) begin
   if (RESET) begin              // come up in Hold mode
      BITclkout   = 0;           // hold clock low to
prevent device from sending
      BITdataout = 1;            // let data float high
   end
   else      begin
      BITclkout   = SCPD_CLK;
      BITdataout = SCPD_DATA;
   end
end // write to Data register (8-bit data)
always @(posedge wr_DATAREG or posedge RESET) begin
   if (RESET)  iDATAREG   = 8'h00;
   else              iDATAREG   = RIP_REG?
shift_reg[8:1] : SCPAD_I[7:0];
end // write to eXtra Data register   (parity  and stop
bits)
always @(posedge wr_XDATAREG or  posedge  RESET) begin
   if (RESET)begin
      STOP_REG    = 1;
      PARITY_REG = 0;
      end
   else      begin
      if (RIP_REG) begin
   STOP_REG = DATAIN;
   PARITY_REG = shift_reg[9];
   end
      else begin
```

-245-

```
    STOP_REG   = SCPAD_I[1];
    PARITY_REG = SCPAD_I[0];
    end
      end
end // control multiplexing    of shift register inputs
always @(   TRANSMIT or    RIP_REG         or DATAIN or
iDATAREG or STOP_REG or PARITY_REG         or
       shift_reg or count0  or count1 or count11) begin if (TRANSMIT)     //    TRANSMIT mode
      if (count11)
   shift_reg_bits  = {STOP_REG, PARITY_REG, iDATAREG};
      else
   shift_reg_bits  = {DATAIN, shift_reg[9:1]};

else     if (RIP_REG) //    RECEIVE    mode
      if (!count0 && !count1)
   shift_reg_bits  = {DATAIN, shift_reg[9:1]};
      else
   shift_reg_bits  = shift_reg;

else                  //         HOLD mode
      shift_reg_bits = shift_reg;

end

// data     bits shifted in/out on negative       edge
of          device clock
always @(negedge CLKIN)    begin
   shift_reg = shift_reg_bits;
end // control multiplexing    of data       and clock
output pins to device
```

-246-

```
always @(TRANSMIT or HOLD or count1 or shift_reg0 or mask_edge)    begin if (HOLD) begin              // if in Hold mode...
      BYTEclkout = 0;                  // ...pull clock low
      BYTEdataout = 1;                 // ...let data float high
   end else    if (TRANSMIT) begin   // if in Transmit mode...
      BYTEclkout = 1;                  // ...let clock float high
      if (count1)
         BYTEdataout = 1;              // ...float for line control receipt
      else if (mask_edge)
         BYTEdataout = 0;              // ...start bit (always 0)
      else
         BYTEdataout = shift_reg0;     // ...drive out shift reg data
   end else    begin                        // if in Receive mode...
      BYTEclkout = 1;                  // ...let clock float high
      BYTEdataout = 1;                 // ...let data float high
   end
   ;
end assign         CLKOUT     =    MODEBIT? BYTEclkout :
```

-247-

```
BITclkout;
assign      DATAOUT =   MODEBIT? BYTEdataout :
BITdataout;

assign      RXINT =     MODEBIT? count0 &&
RECEIVING: !DATAIN;

endmodule
`timescale 1ns/1ns module sync2(ASYNC_SIG,   CLK, CLR, SYNC_SIG, PULSE);
input       ASYNC_SIG, CLK, CLR;
output      SYNC_SIG;
output      PULSE;

reg         posedge1, negedge1, posedge2;
wire        SYNC_SIG = posedge2;
wire        PULSE = (negedge1 && !posedge2);

always @(posedge CLK or   posedge       CLR) begin
   if (CLR) begin
      posedge1 <= 0;
      posedge2 <= 0;
   end
   else     begin
      posedge1 <= ASYNC_SIG;
      posedge2 <= negedge1;
   end
end always @(negedge CLK or   posedge       CLR) begin
   if (CLR) negedge1 <=   0;
   else             negedge1 <=    posedge1;
end endmodule // sync2
```

We claim:

1. A timer comprising:

a first programmable downcounter adapted to provide a first predetermined timing signal after a software programmable number of clock pulses of a predetermined frequency are counted;

a second programmable downcounter adapted to count said first predetermined timing signal to provide a second predetermined timing signal at a predetermined software programmable multiple of said first predetermined timing signal;

one or more predetermined software programmable registers for storing said predetermined number of clock pulses at said predetermined frequency to be counted for providing said first predetermined timing signals; and one or more predetermined software programmable registers for storing said predetermined multiple for providing said second predetermined timing signal, said predetermined multiple being user programmable independent of said predetermined number of clock pulses stored in said programmable registers.

2. The timer recited in claim 1, wherein said programmable registers are write once, read many memory devices.

3. The timer recited in claim 1, further including means for transferring said predetermined number of clock pulses from said programmable registers to said first downcounter every time said first downcounter counts to zero.

4. The timer recited in claim 1, further including means for loading said predetermined number of clock pulses from said programmable registers to said first downcounter every time said programmable registers are programmed with a new value.

5. The timer recited in claim 1, further including means for preventing said second downcounter from counting below zero.

* * * * *